US012688545B2

(12) United States Patent
Edwards et al.

(10) Patent No.: US 12,688,545 B2
(45) Date of Patent: *Jul. 21, 2026

(54) APPLICATION PROGRAMMING INTERFACE TO PERFORM DELAYED MEMORY TRANSACTION INFORMATION CHECK

(71) Applicant: NVIDIA Corporation, Santa Clara, CA (US)

(72) Inventors: Harold Carter Edwards, Campbell, CA (US); Olivier Giroux, Santa Clara, CA (US); Jack H. Choquette, Palo Alto, CA (US); Gokul Ramaswamy Hirisave Chandra Shekhara, Bangalore (IN); Rui Guo, Shanghai (CN); Chao Li, Austin, TX (US); Vishalkumar Ketankumar Mehta, Stäfa (CH); David Dastous St. Hilaire, Lake Stevens, WA (US); Aditya Avinash Atluri, Redmond, WA (US); Apoorv Parle, San Jose, CA (US); Ronny Meir Krashinsky, Portola Valley, CA (US); Subhasmita Chakraborty, Austin, TX (US); Vikram Dhar, Campbell, CA (US)

(73) Assignee: NVIDIA Corporation, Santa Clara, CA (US)

( * ) Notice: Subject to any disclaimer, the term of this patent is extended or adjusted under 35 U.S.C. 154(b) by 575 days.

This patent is subject to a terminal disclaimer.

(21) Appl. No.: 18/081,552

(22) Filed: Dec. 14, 2022

(65) Prior Publication Data

US 2024/0168795 A1     May 23, 2024

Related U.S. Application Data

(63) Continuation of application No. PCT/CN2022/132533, filed on Nov. 17, 2022.

(51) Int. Cl.
*G06T 1/60* (2006.01)
*G06F 3/06* (2006.01)
(Continued)

(52) U.S. Cl.
CPC ................ *G06T 1/60* (2013.01); *G06F 3/061* (2013.01); *G06F 3/0625* (2013.01);
(Continued)

(58) Field of Classification Search
None
See application file for complete search history.

(56) References Cited

U.S. PATENT DOCUMENTS

| | | | |
|---|---|---|---|
| 4,432,079 A | 2/1984 | Mackelburg et al. | |
| 4,571,674 A | 2/1986 | Hartung | |

(Continued)

FOREIGN PATENT DOCUMENTS

| | | |
|---|---|---|
| CN | 111078771 A | 4/2020 |
| CN | 112907344 A | 6/2021 |

(Continued)

OTHER PUBLICATIONS

International Search Report and Written Opinion for Application No. PCT/CN2022/132533, mailed Jul. 24, 2023, 7 pages.
(Continued)

*Primary Examiner* — S. Sough
*Assistant Examiner* — Selena Sabah Nahra
(74) *Attorney, Agent, or Firm* — Davis Wright Tremaine LLP

(57) ABSTRACT

One or more processors include circuitry to, in response to a call to an application programming interface (API), check for information about one or more memory transactions after a timeout event indicated by one or more input parameters of the API. A system includes one or more processors to, in response to a call to an application programming interface
(Continued)

(API), check for information about one or more memory transactions after a timeout event indicated by one or more input parameters of the API. A method includes receiving an application programming interface (API) call and, in response to receiving the API call, checking for information about one or more memory transactions after a timeout event indicated by one or more input parameters of the API.

20 Claims, 54 Drawing Sheets

(51) Int. Cl.

| | |
|---|---|
| *G06F 9/30* | (2018.01) |
| *G06F 9/38* | (2018.01) |
| *G06F 9/46* | (2006.01) |
| *G06F 9/48* | (2006.01) |
| *G06F 9/54* | (2006.01) |
| *G06T 1/20* | (2006.01) |

(52) U.S. Cl.

CPC .......... *G06F 3/0659* (2013.01); *G06F 3/0673* (2013.01); *G06F 9/3004* (2013.01); *G06F 9/30087* (2013.01); *G06F 9/3877* (2013.01); *G06F 9/466* (2013.01); *G06F 9/467* (2013.01); *G06F 9/4881* (2013.01); *G06F 9/541* (2013.01); *G06T 1/20* (2013.01)

(56) References Cited

U.S. PATENT DOCUMENTS

| | | | |
|---|---|---|---|
| 4,955,346 | A | 9/1990 | Kaneyasu et al. |
| 5,487,172 | A | 1/1996 | Hyatt |
| 5,531,771 | A | 7/1996 | van der Veen |
| 6,510,470 | B1 | 1/2003 | Capelli |
| 6,792,931 | B1 | 9/2004 | Schaar |
| 6,910,213 | B1 | 6/2005 | Hirono et al. |
| 6,956,579 | B1 | 10/2005 | Diard et al. |
| 7,506,126 | B2 | 3/2009 | Lovett |
| 7,634,621 | B1 | 12/2009 | Coon et al. |
| 7,684,144 | B1 | 3/2010 | Goker et al. |
| 7,913,236 | B2 | 3/2011 | Adl-Tabatabai et al. |
| 8,392,312 | B2 | 3/2013 | Batsakis et al. |
| 8,539,516 | B1 | 9/2013 | Wilt et al. |
| 8,555,035 | B1 | 10/2013 | Patney et al. |
| 8,692,834 | B2 | 4/2014 | Peterson et al. |
| 8,930,926 | B2 | 1/2015 | Bastoul et al. |
| 9,300,759 | B1* | 3/2016 | Jorgensen ............... G06F 9/541 |
| 9,478,062 | B2 | 10/2016 | Clohset et al. |
| 9,817,585 | B1 | 11/2017 | Trachtman |
| 9,959,074 | B1 | 5/2018 | Shain et al. |
| 10,223,407 | B2 | 3/2019 | Pijewski et al. |
| 10,275,851 | B1 | 4/2019 | Zhao et al. |
| 10,678,697 | B1 | 6/2020 | Iyer et al. |
| 10,891,156 | B1 | 1/2021 | Zhao et al. |
| 11,093,139 | B1 | 8/2021 | Karr et al. |
| 11,176,631 | B1 | 11/2021 | Tu et al. |
| 11,321,092 | B1 | 5/2022 | Raikin et al. |
| 11,327,676 | B1 | 5/2022 | Fernandez et al. |
| 11,388,047 | B1 | 7/2022 | Hardwick et al. |
| 11,442,669 | B1 | 9/2022 | Frandzel et al. |
| 11,450,059 | B1 | 9/2022 | Morrical |
| 11,494,321 | B1 | 11/2022 | Yu et al. |
| 11,500,621 | B2 | 11/2022 | Lethin et al. |
| 11,544,229 | B1 | 1/2023 | Seideman et al. |
| 11,698,787 | B2 | 7/2023 | Grochowski et al. |
| 11,861,221 | B1 | 1/2024 | Richardson et al. |
| 2001/0042041 | A1 | 11/2001 | Moshal et al. |
| 2002/0152142 | A1 | 10/2002 | Schellmann et al. |
| 2005/0046400 | A1 | 3/2005 | Rotem |
| 2005/0097245 | A1 | 5/2005 | Lym et al. |
| 2006/0085591 | A1 | 4/2006 | Kumar et al. |
| 2007/0143755 | A1 | 6/2007 | Sahu et al. |

| | | | |
|---|---|---|---|
| 2007/0162425 | A1 | 7/2007 | Betawadkar-Norwood et al. |
| 2008/0155546 | A1* | 6/2008 | Ruemmler .............. G06F 9/526 |
| | | | 718/102 |
| 2010/0239186 | A1 | 9/2010 | Fowler et al. |
| 2011/0078361 | A1* | 3/2011 | Chen ................... G06F 9/45558 |
| | | | 718/1 |
| 2011/0122262 | A1 | 5/2011 | Shinozaki et al. |
| 2011/0173595 | A1 | 7/2011 | Gustafsson et al. |
| 2011/0219208 | A1 | 9/2011 | Asaad et al. |
| 2012/0081373 | A1 | 4/2012 | Li et al. |
| 2012/0146727 | A1 | 6/2012 | Cyrusian |
| 2012/0174120 | A1 | 7/2012 | Malkiman et al. |
| 2012/0198214 | A1 | 8/2012 | Gadre et al. |
| 2014/0108773 | A1 | 4/2014 | Jagatheesan et al. |
| 2014/0351826 | A1 | 11/2014 | Llamas |
| 2014/0362292 | A1 | 12/2014 | Lee et al. |
| 2015/0363890 | A1 | 12/2015 | Butters et al. |
| 2016/0103765 | A1 | 4/2016 | Rastogi |
| 2016/0188337 | A1 | 6/2016 | Lee et al. |
| 2016/0321291 | A1 | 11/2016 | Malhotra et al. |
| 2016/0371139 | A1 | 12/2016 | Stark et al. |
| 2017/0003972 | A1 | 1/2017 | Elliott et al. |
| 2017/0039396 | A1 | 2/2017 | Sharp et al. |
| 2017/0236244 | A1 | 8/2017 | Price et al. |
| 2017/0344880 | A1 | 11/2017 | Nekuii |
| 2018/0024836 | A1 | 1/2018 | Gschwind et al. |
| 2018/0322078 | A1 | 11/2018 | Qiu et al. |
| 2018/0365561 | A1 | 12/2018 | Temam et al. |
| 2019/0042336 | A1 | 2/2019 | McElrath et al. |
| 2019/0043477 | A1 | 2/2019 | Bang et al. |
| 2019/0107965 | A1 | 4/2019 | Deval et al. |
| 2019/0114254 | A1 | 4/2019 | Memon et al. |
| 2019/0220308 | A1 | 7/2019 | Cui et al. |
| 2019/0220383 | A1 | 7/2019 | Brooking et al. |
| 2019/0294439 | A1 | 9/2019 | Ostby |
| 2019/0340392 | A1 | 11/2019 | Khorrami et al. |
| 2020/0042859 | A1 | 2/2020 | Mappouras et al. |
| 2020/0174697 | A1 | 6/2020 | Brennan |
| 2020/0192720 | A1* | 6/2020 | Liu ........................... G06F 9/52 |
| 2020/0193229 | A1 | 6/2020 | Natarajan et al. |
| 2020/0285655 | A1 | 9/2020 | Kaushik et al. |
| 2020/0301764 | A1 | 9/2020 | Thoresen et al. |
| 2021/0019070 | A1 | 1/2021 | Karr et al. |
| 2021/0019093 | A1 | 1/2021 | Karr et al. |
| 2021/0019237 | A1 | 1/2021 | Karr et al. |
| 2021/0044204 | A1 | 2/2021 | Kesterson et al. |
| 2021/0072957 | A1 | 3/2021 | Eilert et al. |
| 2021/0072986 | A1 | 3/2021 | Yudanov et al. |
| 2021/0072987 | A1 | 3/2021 | Yudanov et al. |
| 2021/0081373 | A1 | 3/2021 | Tian |
| 2021/0117249 | A1 | 4/2021 | Doshi et al. |
| 2021/0117544 | A1* | 4/2021 | Kurtz ................... G06F 21/566 |
| 2021/0124582 | A1 | 4/2021 | Kerr et al. |
| 2021/0124610 | A1 | 4/2021 | Gardner et al. |
| 2021/0157687 | A1 | 5/2021 | Drejza et al. |
| 2021/0200600 | A1 | 7/2021 | Thakkar et al. |
| 2021/0294707 | A1 | 9/2021 | Evans et al. |
| 2021/0311900 | A1 | 10/2021 | Malladi et al. |
| 2021/0326175 | A1 | 10/2021 | Herbert |
| 2021/0373955 | A1 | 12/2021 | Galles et al. |
| 2021/0382986 | A1 | 12/2021 | Lebin et al. |
| 2021/0398676 | A1 | 12/2021 | Evans et al. |
| 2022/0019367 | A1 | 1/2022 | Freilich et al. |
| 2022/0019385 | A1 | 1/2022 | Karr et al. |
| 2022/0035714 | A1 | 2/2022 | Schultz et al. |
| 2022/0038532 | A1 | 2/2022 | Horigane et al. |
| 2022/0083245 | A1 | 3/2022 | Kant et al. |
| 2022/0113867 | A1 | 4/2022 | Aharoni et al. |
| 2022/0138551 | A1 | 5/2022 | Marani et al. |
| 2022/0245082 | A1 | 8/2022 | Vijayashekar et al. |
| 2022/0303178 | A1 | 9/2022 | Hardwick et al. |
| 2022/0309336 | A1 | 9/2022 | Minkin |
| 2022/0342568 | A1 | 10/2022 | Roberts |
| 2022/0365750 | A1 | 11/2022 | Bharambe et al. |
| 2022/0414088 | A1 | 12/2022 | Krishnan et al. |
| 2023/0028317 | A1 | 1/2023 | Yoon et al. |
| 2023/0065994 | A1 | 3/2023 | Yamato |
| 2023/0071424 | A1 | 3/2023 | Kibardin et al. |
| 2023/0104845 | A1 | 4/2023 | Ray et al. |

(56)          References Cited

U.S. PATENT DOCUMENTS

| | | | |
|---|---|---|---|
| 2023/0110438 A1 | 4/2023 | Ramani et al. | |
| 2023/0164121 A1* | 5/2023 | Moon ..................... | G06F 9/546 |
| | | | 726/26 |
| 2023/0176769 A1 | 6/2023 | Shalom et al. | |
| 2023/0185570 A1 | 6/2023 | Kerr et al. | |
| 2023/0289242 A1 | 9/2023 | Guo et al. | |
| 2023/0289292 A1 | 9/2023 | Minkin et al. | |
| 2023/0298129 A1 | 9/2023 | Puffer et al. | |
| 2024/0011691 A1 | 1/2024 | Kim et al. | |
| 2024/0028423 A1* | 1/2024 | Zhu ......................... | G06F 9/522 |
| 2024/0069914 A1 | 2/2024 | George et al. | |
| 2024/0161224 A1 | 5/2024 | Edwards et al. | |
| 2025/0060908 A1 | 2/2025 | Siluvainathan et al. | |

FOREIGN PATENT DOCUMENTS

| | | | |
|---|---|---|---|
| JP | 4049293 | B2 | 2/2008 |
| JP | 2023530064 | A | 7/2023 |
| KR | 20190020374 | A | 3/2019 |
| KR | 102797037 | B1 | 4/2025 |
| WO | 2018200851 | A1 | 11/2018 |
| WO | 2021018394 | A1 | 2/2021 |
| WO | 2024242805 | A1 | 11/2024 |

OTHER PUBLICATIONS

Gelado et al., "An Asymmetric Distributed Shared Memory Model for Heterogeneous Parallel Systems," ASPLOS, 2010, 12 pages.

U.S. Appl. No. 17/691,276, "Method and Apparatus for Efficient Access to MultiDimensional Data Structures and-or Other Large Data Blocks," filed Mar. 10, 2022.

U.S. Appl. No. 17/691,422, "Method and Apparatus for Efficient Access to MultiDimensional Data Structures and-or Other Large Data Blocks," filed Mar. 10, 2022.

U.S. Appl. No. 17/691,288, "Programmatically Controlled Data Multicasting Across Multiple Compute Engines," filed Mar. 10, 2022.

Mathworks, "Im2col," retrieved from https://www.mathworks.com/help/images/ref/im2col.html, 2021, 3 pages.

Caffe, "Im2col," retrieved from https://caffe.berkeleyvision.org/tutorial/layers/im2col.html, 2020, 1 page.

Octave Forge," Im2col," retrieved from https://octave.sourceforge.io/image/function/im2col.html, (undated), 2 pages.

Diaz et al., "A Survey of Parallel Programming Models and Tools in the Multi and Many-Core Era," IEEE Transactions on Parallel and Distributed Systems, 23(8): Aug. 2012, 18 pages.

Lili et al., "Streaming FFT Asynchronously on Graphics Processor Units," International Forum on Information Technology and Applications, 2010, 5 pages.

Georganas et al., "Anatomy of High-Performance Deep Learning Convolutions on SIMD Architectures," ACM, Nov. 2018, 12 pages.

Abhijit et al., "Implementing Adaptive and Dynamic Data Structures using CUDA Parallelism," IEEE International Conference on Advances in Engineering & Technology Research, Aug. 2014, 7 pages.

IEEE "IEEE Standard for Floating-Point Arithmetic", Microprocessor Standards Committee of the IEEE Computer Society, IEEE Std 754-2008, dated Jun. 12, 2008, 70 pages.

NVIDIA, "Shared Memory," retrieved from https://docs.nvidia.com/cuda/cuda-c-programming-guide/index.html#shared-memory, May 2019, 597 pages.

NVIDIA, CUDA: Parallel Thread Execution ISA Version 8.3, Retrieved from, https://docs.nvidia.com/cuda/parallel-thread-execution/index.html, Oct. 10, 2023, 594 Pages.

NVIDIA, "CUDA Toolkit Documentation 12.2 Update 2," Retrieved from, https://docs.nvidia.com/cuda/archive/12.2.2/, Aug. 2023, 10 Pages.

NVIDIA, "NVIDA H100 Tensor Core GPU Architecture", Mar. 2022, NVIDA Corporation, 71 pages.

Andersch, et al., "NVIDIA Hopper Architecture In-Depth", Mar. 22, 2022, NVIDIA Developer, 39 pages.

\* cited by examiner

1100

Obtaining a tokenless barrier arrive request ⟋ 1102

Performing barrier arrive operation ⟋ 1104

Performing Other Actions ⟋ 1106

1300

Obtaining a wait operation request — 1302

Performing wait operation — 1304

Performing Other Actions — 1306

1400

Obtaining a delayed wait operation request    ⌐ 1402

Performing delayed wait operation    ⌐ 1404

Performing Other Actions    ⌐ 1406

1500

Obtaining a make pipeline request ⌐ 1502

Performing make pipeline operation ⌐ 1504

Performing Other Actions ⌐ 1506

1600

Obtaining a consumer commit request ⟞ 1602

Performing consumer commit operation ⟞ 1604

Performing Other Actions ⟞ 1606

Figure 17:
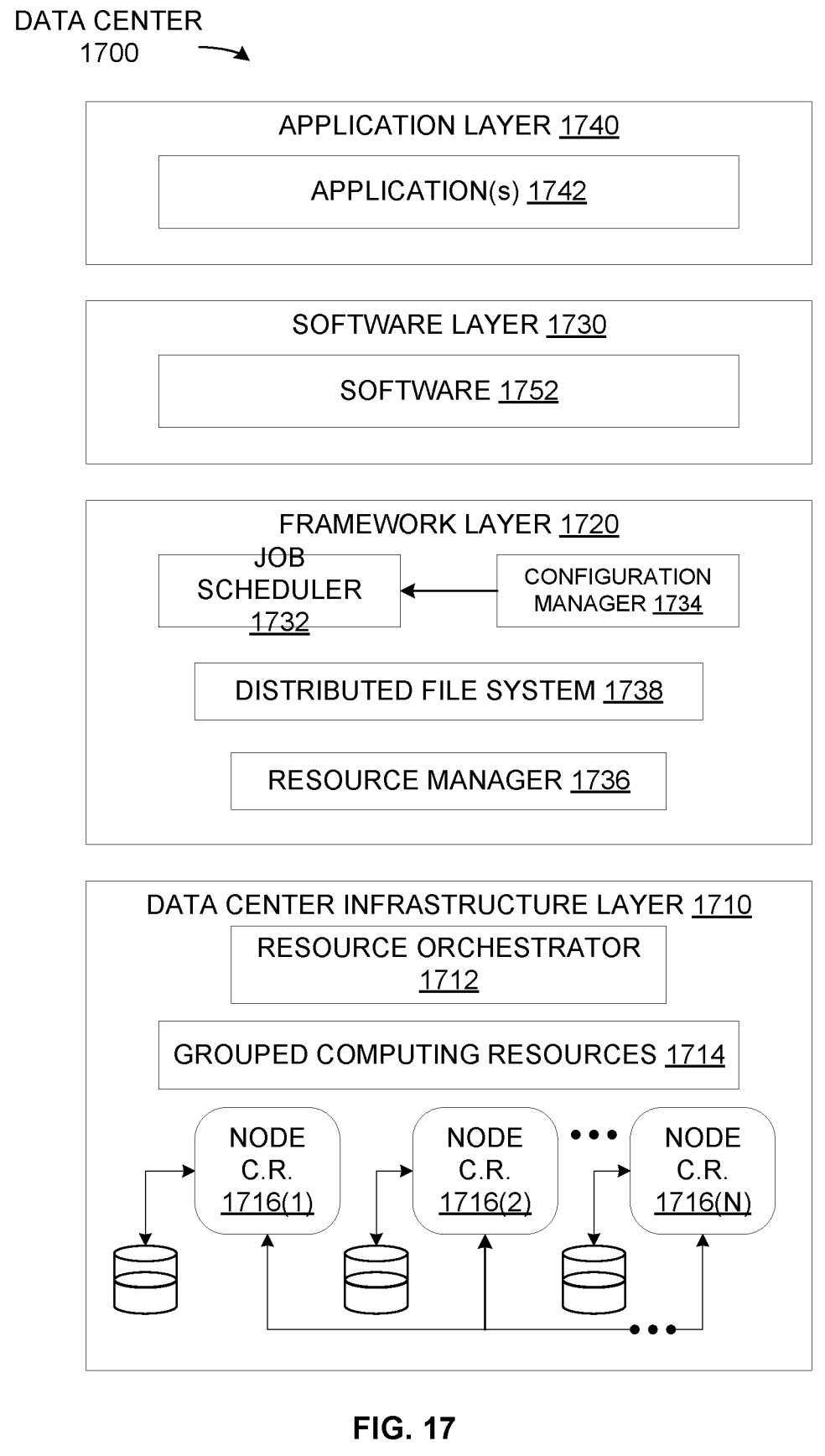

DATA CENTER
1700

APPLICATION LAYER 1740

APPLICATION(s) 1742

SOFTWARE LAYER 1730

SOFTWARE 1752

FRAMEWORK LAYER 1720

JOB SCHEDULER 1732

CONFIGURATION MANAGER 1734

DISTRIBUTED FILE SYSTEM 1738

RESOURCE MANAGER 1736

DATA CENTER INFRASTRUCTURE LAYER 1710

RESOURCE ORCHESTRATOR 1712

GROUPED COMPUTING RESOURCES 1714

NODE C.R. 1716(1)

NODE C.R. 1716(2)

• • •

NODE C.R. 1716(N)

INTEGRATED
CIRCUIT
2100

2200

GRAPHICS PROCESSOR
2610

GRAPHICS PROCESSOR
2640

INTER-CORE TASK MANAGER
(e.g., THREAD DISPATCHER)
2645

SHADER CORE 2655A

SHADER CORE 2655C

SHADER CORE 2655E

- - -

SHADER CORE 2655N-1

SHADER CORE 2655B

SHADER CORE 2655D

SHADER CORE 2655F

- - -

SHADER CORE 2655N

TILING UNIT
2658

MMU
2620A

MMU
2620B

CACHE
2625A

CACHE
2625B

INTERCONNECT
2630A

INTERCONNECT
2630B

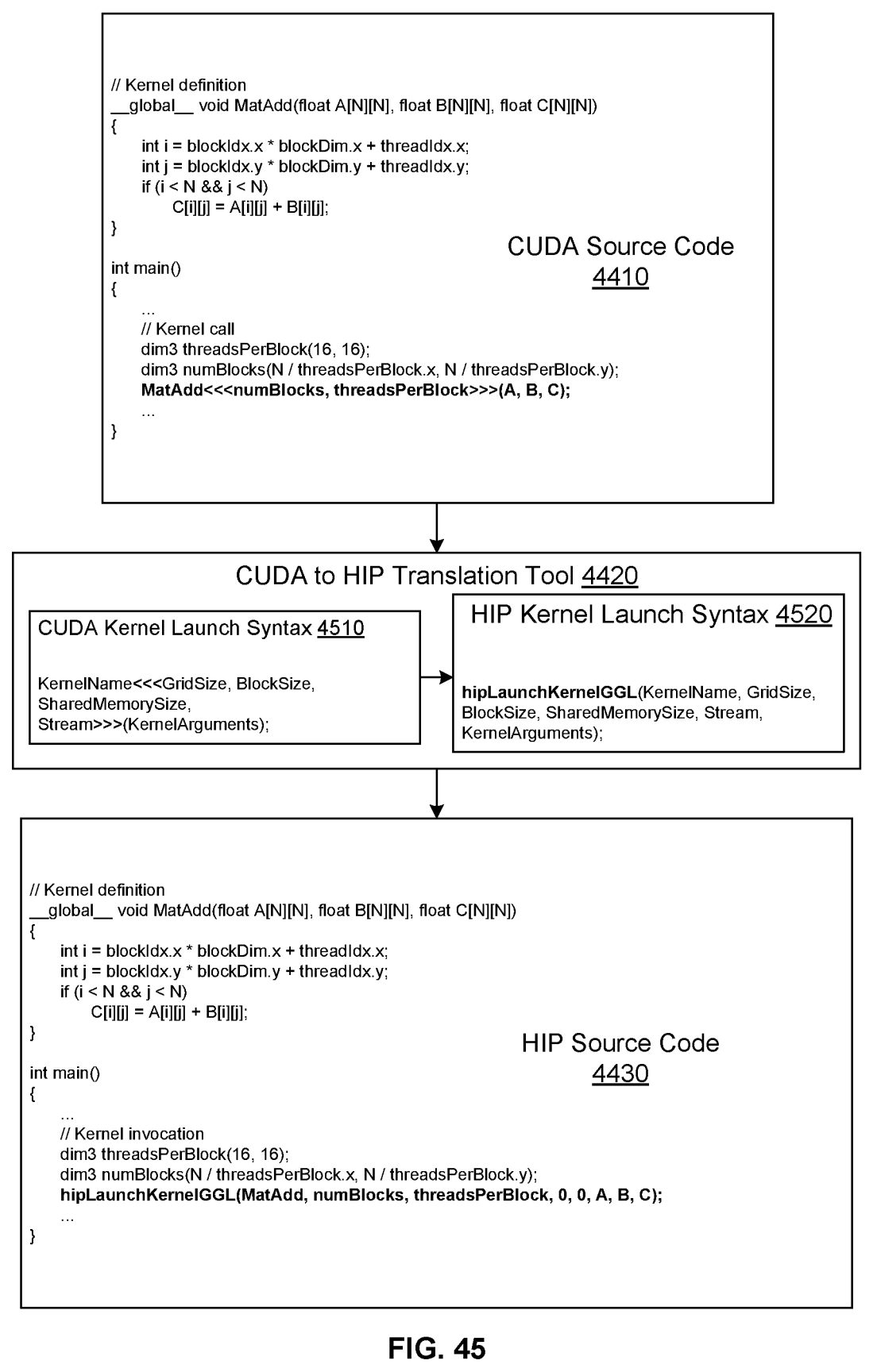

```
// Kernel definition
__global__ void MatAdd(float A[N][N], float B[N][N], float C[N][N])
{
    int i = blockIdx.x * blockDim.x + threadIdx.x;
    int j = blockIdx.y * blockDim.y + threadIdx.y;
    if (i < N && j < N)
        C[i][j] = A[i][j] + B[i][j];
}
int main()
{
    ...
    // Kernel call
    dim3 threadsPerBlock(16, 16);
    dim3 numBlocks(N / threadsPerBlock.x, N / threadsPerBlock.y);
    MatAdd<<<numBlocks, threadsPerBlock>>>(A, B, C);
    ...
}
```

CUDA Source Code
4410

CUDA to HIP Translation Tool 4420

CUDA Kernel Launch Syntax 4510

KernelName<<<GridSize, BlockSize, SharedMemorySize, Stream>>>(KernelArguments);

HIP Kernel Launch Syntax 4520 hipLaunchKernelGGL(KernelName, GridSize, BlockSize, SharedMemorySize, Stream, KernelArguments);

```
// Kernel definition
__global__ void MatAdd(float A[N][N], float B[N][N], float C[N][N])
{
    int i = blockIdx.x * blockDim.x + threadIdx.x;
    int j = blockIdx.y * blockDim.y + threadIdx.y;
    if (i < N && j < N)
        C[i][j] = A[i][j] + B[i][j];
}
int main()
{
    ...
    // Kernel invocation
    dim3 threadsPerBlock(16, 16);
    dim3 numBlocks(N / threadsPerBlock.x, N / threadsPerBlock.y);
    hipLaunchKernelGGL(MatAdd, numBlocks, threadsPerBlock, 0, 0, A, B, C);
    ...
}
```

HIP Source Code
4430

FIG. 45

Grid <u>4720</u>
*GridSize = dim3(BX,BY,1)    BlockSize = dim3(TX,TY,1)*

Thread Block <u>4730(1,1)</u>

| Thread <u>4740(1,1)</u> | • • • | Thread <u>4740(1,TY)</u> |
|---|---|---|

| Thread <u>4740(TX,1)</u> | • • • | Thread <u>4740(TX,TY)</u> |
|---|---|---|

<u>4730(1,BY)</u>

<u>4730(BJ,1)</u>

• • •

<u>4730(BJ,BY)</u>

Compute Unit <u>4640(1)</u>

Shared Memory <u>4660(1)</u>

<u>4730(BJ+1,1)</u>

Compute Unit <u>4640(2)</u>

• • •

<u>4730(BJ+1,BY)</u>

<u>4730(BX,1)</u>

• • •

<u>4730(BX,BY)</u>

Shared Memory <u>4660(2)</u>

Compute Unit <u>4640(C)</u>

Programmable Processing Unit 4620(1)

APPLICATION PROGRAMMING INTERFACE TO PERFORM DELAYED MEMORY TRANSACTION INFORMATION CHECK

CROSS-REFERENCE TO RELATED APPLICATIONS

This application is a continuation of International Patent Application No. PCT/CN2022/132533, filed on Nov. 17, 2022, entitled "APPLICATION PROGRAMMING INTER- FACE TO PERFORM ASYNCHRONOUS DATA MOVE- MENT," the disclosure of which is incorporated herein by reference in its entirety.

TECHNICAL FIELD

At least one embodiment pertains to processing resources used to execute one or more programs written for a parallel computing platform and application interface. For example, at least one embodiment pertains to processors or computing systems that perform an application programming interface (API) according to various novel techniques described herein.

BACKGROUND

Performing data movement operations can use significant time, power, or computing resources. The amount of time, power, or computing resources can be improved.

BRIEF DESCRIPTION OF THE DRAWINGS

FIG. 17 illustrates an exemplary data center, in accor- dance with at least one embodiment;

FIG. 45 illustrates an exemplary kernel translated by CUDA-to-HIP translation tool of FIG. 44C, in accordance with at least one embodiment;

DETAILED DESCRIPTION

In the following description, numerous specific details are set forth to provide a more thorough understanding of at least one embodiment. However, it will be apparent to one skilled in the art that the inventive concepts may be practiced without one or more of these specific details.

Figure 1:
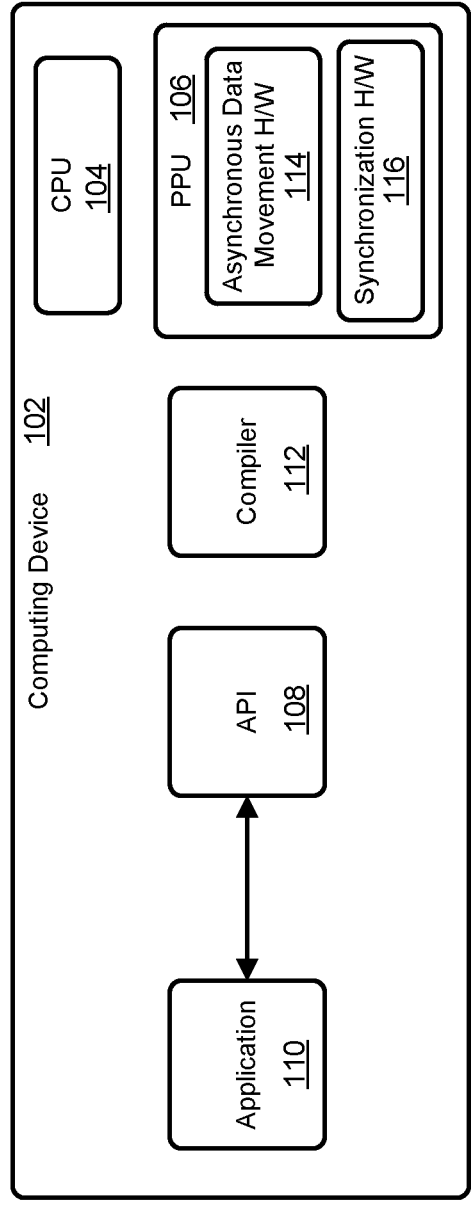
FIG. 1 is a block diagram that illustrates a system, according to at least one embodiment.

FIG. 1 is a block diagram that illustrates a system 100 to perform asynchronous data movement operations with threads using manual transaction accounting, according to at least one embodiment. In at least one embodiment, system 100 includes a computing device 102 that includes a central processing unit (CPU) 104 and a parallel processing unit (PPU) 106 (e.g., an accelerator such as a graphics processing unit (GPU), field programmable gate array (FPGA), application specific integrated circuit (ASIC), and/or some other suitable device). In at least one embodiment, computing device 102 includes one or more other components, not shown for clarity, such as main memory used by CPU 104, memory on PPU 106 (e.g., global memory, shared memory), a storage device, one or more networking components, one or more additional CPUs, and/or one or more additional PPUs. In at least one embodiment, an API 108 provides at least one function accessible to an application 110.

In at least one embodiment, API 108 provides an asynchronous copy function (e.g., from global to shared memory on PPU 106) that uses manual transaction accounting. In at least one embodiment, manual transaction accounting is referred to as manual tracking. In at least one embodiment, manual transaction accounting is when a user (e.g., computer program code, such as a kernel running on PPU 106) performs one or more aspects of tracking data to be asynchronously moved (e.g., tracking a count of data in bytes, transactions, or some other suitable count). In at least one embodiment, user provides this count to one or more APIs. In at least one embodiment, API 108 provides one or more functions to be used to generate and/or use one or more thread synchronization objects (e.g., barriers and/or pipelines) with one or more asynchronous operations that use manual transaction accounting. In at least one embodiment, a compiler 112 translates requests received via API 108 into instructions (e.g., instructions that are part of an instruction set architecture for PPU 106) that can be executed on PPU 106.

In at least one embodiment, PPU 106 includes asynchronous data movement hardware (H/W) 114. In at least one embodiment, asynchronous data movement hardware is referred to as a tensor memory accelerator (TMA) or some other suitable name. In at least one embodiment, PPU 106 includes synchronization hardware 116. In at least one embodiment, synchronization hardware 116 is referred to as a SyncUnit or some other suitable name. In at least one embodiment, a user (e.g., a thread performing computer program code being performed by PPU 106) initiates an asynchronous data movement operation (e.g., a copy and/or reduction operation) using one or more functions of API 108. In at least one embodiment, asynchronous data movement H/W 114 performs data movement operation in response to function of API initiated by thread. In at least one embodiment, user tracks an expected count (e.g., in bytes, transactions, or some other suitable amount) of data to be moved (e.g., copied), and provides expected count using one or more functions of API 108. In at least one embodiment, expected count is previously defined and/or otherwise known to user. In at least one embodiment, expected count is provided to synchronization H/W 116 using function of API 108. In at least one embodiment, asynchronous data movement H/W 114 indicates to synchronization H/W 116 when data movement operation is complete. In at least one embodiment, synchronization H/W 116 generates an indication of when a sequence of data movement operations to be performed by a group of threads are complete based, at least in part, on balancing a sum of completed data movement operations received from asynchronous data movement H/W 114 and a sum of expected counts of data to be moved received via one or more functions of API 108 from one or more users (e.g., computer program code being performed by PPU 106) performing manual transaction accounting.

In at least one embodiment, asynchronous data movement operations between memories (e.g., between global and shared memory) on a GPU are useful because threads that initiate asynchronous data movement can perform other operations while data is being moved. In at least one embodiment, a thread can perform an instruction to perform a data movement operation and, because operation is asynchronous, that thread can continue to perform additional instructions before data movement operation is complete. In at least one embodiment, performing asynchronous data movement operations using manual transaction accounting provides one or more advantages (e.g., decreased computing and/or memory resources) over legacy approaches that use automatic transaction accounting.

Figure 2:
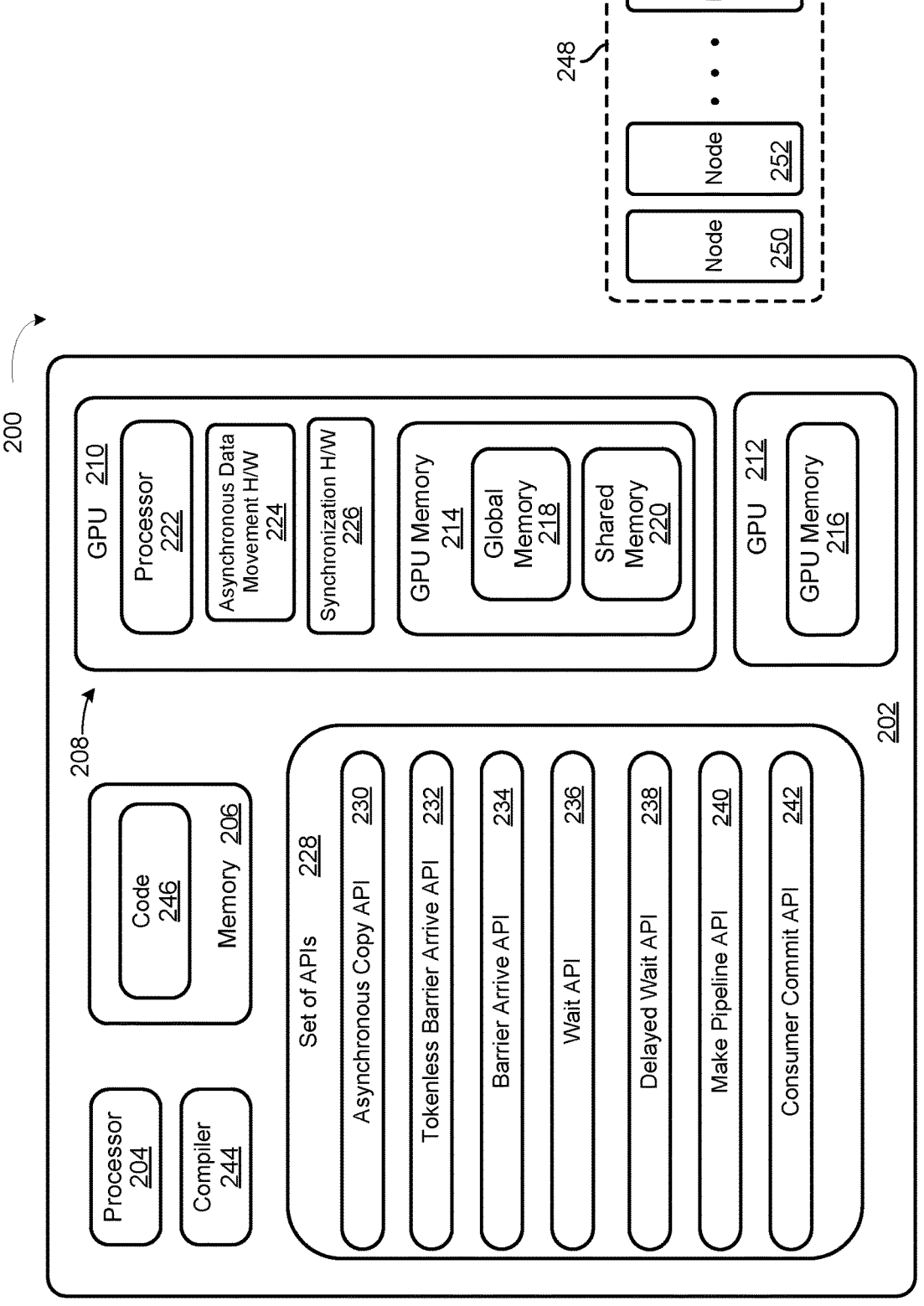
FIG. 2 is a block diagram that illustrates a computing environment, according to at least one embodiment.

FIG. 2 is a block diagram that illustrates a computing environment 200, according to at least one embodiment. In at least one embodiment, a computer system 202 includes a processor 204, a memory 206, and a set of graphics processing units (GPUs) 208. In at least one embodiment, computer system 202 includes one or more components of system 100 of FIG. 1. In at least one embodiment, set of GPUs 208 includes a GPU 210 and a GPU 212. In at least one embodiment, set of GPUs 208 includes a different number of GPUs (e.g., fewer or more than two GPUs). In at least one embodiment, GPU 210 includes a GPU memory 214 and GPU 212 includes a GPU memory 216. In at least one embodiment, GPU memory 214 and/or GPU memory 216 includes more than one level and/or type of memory (e.g., global memory accessible by entire GPU, memory accessible by a subset of processors on GPU, cache memory accessible by an individual processor on GPU, shared memory accessible by a particular group of threads). In at least one embodiment, GPU memory 214 includes global memory 218 and shared memory 220. In at least one embodiment, shared memory 220 includes more than one shared memory.

In at least one embodiment, GPU 210 includes one or more processors 222. In at least one embodiment, GPU 210 includes asynchronous data movement hardware (H/W) 224 (e.g., an NVIDIA tensor memory accelerator (TMA), and/or one or more other suitable asynchronous data movement hardware components). In at least one embodiment, GPU 210 includes synchronization H/W 226 (e.g., an NVIDIA SyncUnit, and/or one or more other suitable synchronization hardware components). In at least one embodiment, GPU 212 includes one or more processors, one or more data movement H/W components, and/or one or more synchronization H/W components, not shown for clarity. In at least one embodiment, a different number of processors (e.g., more than one processor 204) and/or a different number of memories (e.g., more than one memory 206) are included in computer system 202. In at least one embodiment, processor 204 is a central processing unit (CPU). In at least one embodiment, computer system 202 includes one or more other components not shown for clarity (e.g., a network interface card, persistent storage device, one or more input devices, one or more output devices, and/or one or more other suitable components).

In at least one embodiment, processor 204 is a single-core processor. In at least one embodiment, processor 204 is a multi-core processor. In at least one embodiment, processor 204 is an element of a processing system such as processing system 1800 described herein. In at least one embodiment, processor 204 is an element of a computer system such as computer system 1900 described herein. In at least one embodiment, processor 204 is an element of a system such as system 2000 described herein. In at least one embodiment, processor 204 is an element of a computing system such as computing system 2200 described herein. In at least one embodiment, processor 204 is an element of a compute unit such as compute unit 4640 described herein. In at least one embodiment, processor 204 is some other processor shown and/or described herein. In at least one embodiment, one or more GPUs (e.g., GPU 210) in set of GPUs 208 is a graphics processor 2610 described herein. In at least one embodiment, one or more GPUs (e.g., GPU 210) in set of GPUs 208 is a graphics processor 2640 described herein. In at least one embodiment, one or more GPUs (e.g., GPU 210) in set of GPUs 208 is a graphics multiprocessor 2834 described herein. In at least one embodiment, one or more GPUs (e.g., GPU 210) in set of GPUs 208 is a graphics processor 2900 described herein. In at least one embodiment, one or more GPUs (e.g., GPU 210) in set of GPUs 208 is a graphics processor 3108 described herein. In at least one embodiment, one or more GPUs (e.g., GPU 210) in set of GPUs 208 is a GPU 4492 described herein. In at least one embodiment, one or more GPUs (e.g., GPU 210) in set of GPUs 208 is some other GPU shown and/or described herein. In at least one embodiment, computer system 202 includes one or more accelerators (e.g., one or more parallel processing units (PPUs), FPGAs, ASICS, and/or other suitable accelerators) instead of or in addition to GPUs in set of GPUs 208.

In at least one embodiment, computer system 202 includes a set of APIs 228. In at least one embodiment, when one or more APIs are referred to as performing an action or an aspect of a technique, one or more hardware components (e.g., a CPU, GPU, and/or other hardware component) of a computer system running an API perform that action or aspect of technique. In at least one embodiment, set of APIs 228 is a set of APIs for GPUs in set of GPUs 208. In at least one embodiment, one or more operations described with respect to GPUs in set of GPUs 208 and/or APIs in set of APIs 228 are performed by one or more accelerators, not shown for clarity, that are not GPUs. In at least one embodiment, set of APIs 228 is referred to as an API (e.g., a driver API) that includes multiple callable functions. In at least one embodiment, set of APIs 228 is implemented in a dynamic library. In at least one embodiment, set of APIs 228 is a handle-based, imperative API. In at least one embodiment, set of APIs 228 is a parallel processing framework API (e.g., a Compute Unified Device Architecture (CUDA) driver API, a Heterogeneous-Compute Interface for Portability (HIP) API, or some other API). In at least one embodiment, one or more APIs in set of APIs 228 are high-level APIs (e.g., accessed using a high-level programming language such as C++). In at least one embodiment, one or more APIs in set of APIs 228 are low-level APIs (e.g., accessed using instructions of a programming frameworks such as CUDA ptx instructions). In at least one embodiment, one or more APIs of set of APIs 228 can also be implemented as instructions, such as PTX, assembly, x86, GPU instruction set architecture (ISA), or some other suitable type of instructions. In at least one embodiment, set of APIs 228 is a set of APIs for a programming platform. In at least one embodiment, a programming platform may be, but is not limited to, CUDA, Radeon Open Compute Platform ("ROCm"), OpenCL (OpenCL™ is developed by Khronos group), SYCL, or Intel One API. In at least one embodiment, although some aspects of APIs and/or techniques for combining operations are discussed in relation to CUDA, including CUDA APIs and/or CUDA kernels, it should be understood that ROCm, OpenCL, SYCL, One API, and/or any other suitable APIs and/or kernels may be used. In at least one embodiment, one or more APIs in set of APIs 228 are accessed, at least in part, by including a header file in one or more portions of code that defines one or more functions of one or more APIs. In at least one embodiment, one or more APIs in set of APIs are functions (e.g., defined in a function library).

In at least one embodiment, set of APIs 228 includes an asynchronous copy API 230. In at least one embodiment, asynchronous copy API 230 is to perform an asynchronous copy operation using manual transaction accounting. In at least one embodiment, asynchronous copy API 230 is referred to as memcpy_async_tx( ). In at least one embodiment, asynchronous copy API 230 is to copy data from a first memory (e.g., global memory 218) of a GPU (e.g., GPU 210) to a second memory (e.g., shared memory 220) of a GPU. In at least one embodiment, asynchronous copy API 230 is to take one or more arguments as parameters, including one or more arguments that specify a source memory location, one or more destination locations, an identifier of a shape of data to be moved, and/or an identifier of an object (e.g., a thread synchronization object such as a barrier or pipeline) to track move operations of a set of threads. In at least one embodiment, shape of data includes a size of each dimension of data to be moved, a type of data, a total size of data to be moved (e.g., in bytes), and/or other suitable data parameters. In at least one embodiment, performing asynchronous copy API 230 causes asynchronous data movement H/W 224 to move and/or copy data from a first memory to a second memory of GPU 210. In at least one embodiment, asynchronous copy API 230 indicates that asynchronous data movement operation is to use manual transaction accounting. In at least one embodiment, a parameter of API 230 indicates manual transaction accounting is to be used. In at least one embodiment, use of API 230 itself (e.g., using named API known to use manual transaction accounting) indicates manual transaction accounting is to be used without specifically using a parameter of API to so indicate. In at least one embodiment, performing asynchronous copy API 230 causes asynchronous data movement operation to be performed, and indicates that asynchronous data movement operation will use manual transaction accounting. In at least one embodiment, inputs to asynchronous copy API 230 are an identifier of a memory location to which data is to be moved, an identifier of a memory location from which data is to be moved, information that indicates a shape of data to be moved, and an identifier of an object to track move operations of a set of threads (e.g., a pointer to a thread synchronization object such as a barrier or pipeline). In at least one embodiment, asynchronous copy API 230 outputs either no data or data indicating hardware that will perform asynchronous movement operation.

In at least one embodiment, set of APIs 228 includes a tokenless barrier arrive API 232. In at least one embodiment, tokenless barrier arrive API 232 is referred to as _mbarrier_notoken_arrive_tx( ). In at least one embodiment, tokenless barrier arrive API 232 is to indicate that a thread has arrived, or finished a stage of work. In at least one embodiment, that stage of work includes asynchronously moving data (e.g., using asynchronous API 230). In at least one embodiment, tokenless barrier arrive API 232 includes an input argument to manually indicate an expected transaction count when a thread has finished stage of work, which is used to update an object (e.g., a thread synchronization object such as a barrier) that tracks whether all data movement operations for a set of threads are complete. In at least one embodiment, an expected transaction count for tokenless barrier arrive API 232 is a value that indicates (e.g., in bytes, transactions, or another measurement) an amount of data thread caused to move by performing stage of work. In at least one embodiment, object is updated with a new quantity of data to be asynchronously moved by all threads tracked by that data based on expected transaction count. In at least one embodiment, tokenless barrier arrive API 232 is called by threads once they finish a stage of work and, after calling this function, those threads may continue operating and modifying other data. In at least one embodiment, input to tokenless barrier arrive API 232 is an identifier of object (e.g., pointer to a barrier) to which arrive API applies, a count of threads arriving at object, and expected quantity of data for those arriving threads. In at least one embodiment, tokenless barrier arrive API 232 does not have any output (it has a return type of void).

In at least one embodiment, set of APIs 228 includes a barrier arrive API 234. In at least one embodiment, barrier arrive API 234 is referred to as _mbarrier_arrive_tx( ). In at least one embodiment, barrier arrive API 234 is to indicate that a thread has finished a stage of work, similar to tokenless barrier arrive API 232, but instead of not returning any data, barrier arrive API 234 returns a token. In at least one embodiment, token includes data that indicates a current state of an object (e.g., a thread synchronization barrier) that tracks whether all data movement operations for a set of threads are complete. In at least one embodiment, barrier arrive API 234 updates object with a new quantity of data to be asynchronously moved by all threads tracked by object. In at least one embodiment, inputs to barrier arrive API 234 are an identifier of object to which barrier arrive API 234 applies, a count of threads arriving at object, and an expected transaction count (e.g., as discussed with respect to tokenless barrier arrive API 232, above). In at least one embodiment, token includes information that indicates a state and/or phase of barrier. In at least one embodiment, information that indicates state and/or phase of barrier reflects state and/or phase of barrier when (e.g., just before) barrier arrive API 234 is performed.

In at least one embodiment, set of APIs 228 includes a wait API 236. In at least one embodiment, wait API 236 is referred to as mbarrier_try_wait( ) or some other suitable API name. In at least one embodiment, wait API 236 is to indicate whether an object (e.g., a thread synchronization barrier object) that tracks whether all movement operations for a set of threads are complete has a specified state, such as a state indicating that data has been moved and is ready for use after waiting for a specified period of time. In at least one embodiment, wait API 236 is to identify whether object is finished blocking threads from progressing until a set of requirements have been met, such as if a total expected count of data to be moved is equal to an actual count of data moved. In at least one embodiment, one or more users (e.g., threads of application code that called wait API 236) are to perform other operations before a barrier event (e.g., a barrier completion event and/or a barrier phase change event) has been performed (e.g., before wait API 236 returns a response). In at least one embodiment, barrier completion and/or barrier phase change event is to occur when state and/or phase of barrier is different and/or at a next incremental value from barrier state and/or barrier phase indicated by information in token. In at least one embodiment, barrier completion and/or barrier phase change event is to occur when state and/or phase of barrier is same as barrier state and/or barrier phase indicated by information in token. In at least one embodiment, inputs to wait API 236 are a token (e.g., that includes an obfuscated expected parity state value of a barrier, when that barrier is in a state that indicates all asynchronous data movement operations are complete), an identifier of object (e.g., a pointer to a barrier), and a time period to wait before returning a response (e.g., in milliseconds, nanoseconds, or some other suitable time value). In at least one embodiment, wait API 236 outputs a Boolean value indicating whether object has state specified in input (e.g, in information included in token) to wait API 236. In at least one embodiment, token provided as input to wait API 236 is received in response to performing barrier arrive API 234. In at least one embodiment, token is referred to by some other suitable name (e.g., parameter, data structure, encapsulated information, obfuscated information, or some other suitable name). In at least one embodiment, token includes information that indicates a state and/or phase of a barrier. In at least one embodiment, wait API 236 returns a response before delay (e.g., timeout event) specified to wait API 236 if a barrier completion event and/or a barrier phase change event has been performed. In at least one embodiment, wait API 236 does not return a response until timeout event regardless of whether barrier event occurs before timeout event.

In at least one embodiment, set of APIs 228 includes a delayed wait API 238. In at least one embodiment, delayed wait API 238 is referred to as mbarrier_try_wait_parity( ) or some other suitable API name. In at least one embodiment, delayed wait API 238 is to indicate whether an object that tracks whether all movement operations for a set of threads are complete has a specified state after waiting for a specified period of time, similar to wait API 236, but using an expected parity state, and not a token, as an input. In at least one embodiment, performing delayed wait API 238 indicates, after specified period of time, whether object has specified state. In at least one embodiment, one or more users (e.g., threads of application code that called delayed wait API 238) are to perform other operations before a barrier event (e.g., a barrier completion event and/or a barrier phase change event) has been performed (e.g., before delayed wait API 238 returns a response). In at least one embodiment, barrier completion and/or barrier phase change event is to occur when state and/or phase of barrier is different and/or at a next incremental value from barrier state and/or barrier phase indicated by expected parity state. In at least one embodiment, barrier completion and/or barrier phase change event is to occur when state and/or phase of barrier is same as barrier state and/or barrier phase indicated by expected barrier state. In at least one embodiment, inputs to delayed wait API 238 are an expected state, an identifier of object, and a time period to wait before returning a response. In at least one embodiment, delayed wait API 238 outputs a Boolean value indicating whether object has expected state after input time period. In at least one embodiment, delayed wait API 238 returns a response before delay (e.g., timeout event) specified to delayed wait API 238 if a barrier completion event and/or a barrier phase change event has been performed (e.g., looks for, polls, and/or tries to identify barrier completion event until timeout event specified by delay value occurs). In at least one embodiment, delayed wait API 238 does not return a response until timeout event regardless of whether barrier event occurs before timeout event.

In at least one embodiment, set of APIs 228 includes a make pipeline API 240. In at least one embodiment, make pipeline API 240 is referred to as make_pipeline_tx( ). In at least one embodiment, make pipeline API 240 is to generate a synchronization object (referred to as a pipeline) to be used for manual transaction accounting. In at least one embodiment, synchronization object includes data used to manage whether asynchronous data movement operations for a set of threads are complete. In at least one embodiment, performing make pipeline API 240 causes synchronization object to be generated, and that object can then be used in other APIs to track a status of asynchronous data movement operations for a set of threads. In at least one embodiment, inputs to make pipeline API 240 include an identifier of a group of threads, a pointer to a state of identified group of threads, and a number of threads in group that are involved in performing an asynchronous data movement operation. In at least one embodiment, make pipeline API 240 outputs synchronization object (e.g., pipeline to be used with manual transaction accounting).

In at least one embodiment, set of APIs 228 includes a consumer commit API 242. In at least one embodiment, consumer commit API 242 is referred to as consumer_commit( ). In at least one embodiment, consumer commit API 242 is to cause a synchronization object (e.g., a pipeline generated by make pipeline API 240) to be updated with an amount of data that is expected to be moved by an asynchronous data movement operation performed by a group of threads (e.g., threads of pipeline discussed above with respect to make pipeline API 240). In at least one embodiment, input to consumer commit API 242 is amount of data to be moved (e.g., an expected transaction count, such as discussed above). In at least one embodiment, consumer commit API 242 has a return type of void and does have any outputs.

In at least one embodiment, a compiler 244 translates requests received via APIs in set of APIs 228 into instructions (e.g., generates instructions that are part of an instruction set architecture for GPU 210) that can be executed on GPU 210. In at least one embodiment, generated instructions are stored as code 246 that is copied to one or more GPUs in set of GPUs 208 (e.g., GPU 210) to be performed. In at least one embodiment, one or more threads use one or more APIs in set of APIs 228, and can pass one or more arguments to APIs in set of APIs. In at least one embodiment, set of APIs 228 includes one or more APIs that can be used by code implemented at a higher level (e.g., C style implementation) and/or that can be used by code implemented at an intermediate level (e.g., as PTX style instructions).

In at least one embodiment, computer system 202 includes a set of nodes 248. In at least one embodiment, set of nodes 248 includes a node 250, a node 252, and a node 254. In at least one embodiment, set of nodes 248 includes a different number of nodes. In at least one embodiment, nodes in set of nodes 248 include one or more GPUs. In at least one embodiment, kernel information (e.g., based, at least in part, on code 246) is copied to one or more GPUs included in one or more nodes in set of nodes 248. In at least one embodiment, one or more components and/or aspects of computer system 202 and/or set of nodes 248 are implemented with one or more hardware components, one or more software components, one or more circuits, dedicated hardware such as fixed function circuitry, and/or any other suitable type of hardware, software, or combination thereof. In at least one embodiment, one or more aspects shown or described with respect to FIG. 2 are implementations of, or same as, one or more aspects shown or described with respect to FIG. 1. In at least one embodiment, set of APIs 228 is included in API 108 of FIG. 1, GPU 210 is PPU 106 of FIG. 1, asynchronous data movement H/W 224 is asynchronous data movement H/W 114 of FIG. 1, synchronization H/W 226 is synchronization H/W 116 of FIG. 1, processor 204 is CPU 104 of FIG. 1, and/or compiler 244 is compiler 112 of FIG. 1. In at least one embodiment, set of APIs 228 includes one or more other APIs, not shown for clarity (e.g., one or more synchronization APIs such as a wait API and/or a wait priority API, one or more cooperative thread group APIs, one or more pipeline APIs, and/or some other suitable APIs).

In at least one embodiment, as used in any implementation described herein, unless otherwise clear from context or stated explicitly to contrary, terms such as "module" and nominalized verbs (e.g., compiler, and/or other terms) each refers to any combination of software logic, firmware logic, hardware logic, and/or circuitry configured to provide functionality described herein. In at least one embodiment, software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. In at least one embodiment, modules may, collectively or individually, be embodied as circuitry that forms part of a larger system, for example, an integrated circuit (IC), system on-chip (SoC), and so forth.

In at least one embodiment, a processor (e.g., processor 222, processor 204, or some other suitable processor) includes one or more circuits to perform an API (e.g., asynchronous copy API 230) to cause one or more memory transactions to be performed without storing information about one or more memory transactions (e.g., using manual transaction accounting). In at least one embodiment, one or more memory transactions are to be asynchronously performed. In at least one embodiment, one or more memory transactions are to be asynchronously performed between a first memory and a second memory of a GPU. In at least one embodiment, one or more memory transactions include one or more copy operations to be asynchronously performed between a first memory and a second memory of a GPU using manual transaction accounting. In at least one embodiment, one or more memory transactions include one or more copy operations to be asynchronously performed between a global memory and a shared memory of a GPU using manual transaction accounting. In at least one embodiment, processor includes one or more circuits that are to perform an API to cause an asynchronous data movement operation to be performed using manual transaction accounting.

In at least one embodiment, a system (e.g., computer system 202, system 100 of FIG. 1, or some other suitable computer system) includes one or more processors to perform an API (e.g., asynchronous copy API 230) to perform an application programming interface (API) to cause one or more memory transactions to be performed without storing information about one or more memory transactions. In at least one embodiment, one or more memory transactions are to be asynchronously performed. In at least one embodiment, one or more memory transactions are to be asynchronously performed between a first memory and a second memory of a graphics processing unit (GPU) using manual transaction accounting. In at least one embodiment, one or more memory transactions include one or more copy operations to be asynchronously performed between a global memory and a shared memory of a graphics processing unit (GPU) using manual transaction accounting. In at least one embodiment, API is to return an indication of whether asynchronous data movement hardware is to be used to perform one or more memory transactions.

In at least one embodiment, a processor (e.g., processor 222, processor 204, or some other suitable processor) includes one or more circuits to perform an API (e.g., tokenless barrier arrive API 232) to cause information received by API about one or memory transactions to be stored. In at least one embodiment, one or more memory transactions are asynchronous memory transactions, and one or more circuits are to cause information to be stored by updating a thread synchronization object to be updated based, at least in part, on information received by API. In at least one embodiment, one or more memory transactions are asynchronous memory transactions between a first memory and a second memory of a GPU, and one or more circuits are to update a barrier object to indicate that one or more threads have arrived at barrier object based, at least in part, on information received by API. In at least one embodiment, one or more circuits are to update a barrier object to indicate that one or more threads have arrived at barrier object based, at least in part, on an amount of data to be asynchronously moved. In at least one embodiment, one or more circuits are to update a barrier object to indicate that a portion of an asynchronous data movement operation has been performed. In at least one embodiment, API is to be performed without providing a token to indicate a state of a synchronization object. In at least one embodiment, processor includes one or more circuits that are to perform an API to cause a thread synchronization object to be updated based, at least in part, on an amount of data to be asynchronously moved.

In at least one embodiment, a system (e.g., computer system 202, system 100 of FIG. 1, or some other suitable computer system) includes one or more processors to perform an application programming interface (API) to cause information received by API about one or more memory transactions to be stored. In at least one embodiment, one or more memory transactions are asynchronous memory transactions, and one or more processors are to cause information to be stored by updating a thread synchronization object to be updated based, at least in part, on information received by API. In at least one embodiment, one or more memory transactions are asynchronous memory transactions between a first memory and a second memory of a graphics processing unit (GPU), and one or more processors are to cause a thread synchronization object to be updated based, at least in part, on information received by API. In at least one embodiment, one or more memory transactions are asynchronous memory transactions between a first memory and a second memory of a graphics processing unit (GPU), and one or more processors are to update a barrier object to indicate that one or more threads have arrived at barrier object based, at least in part, on information received by API. In at least one embodiment, one or more circuits are to update a barrier object to indicate that one or more threads have arrived at barrier object based, at least in part, on an amount of data to be asynchronously moved. In at least one embodiment, API is to be performed without providing a token to indicate a state of a synchronization object.

In at least one embodiment, a processor (e.g., processor 222, processor 204, or some other suitable processor) includes one or more circuits to perform an API (e.g., barrier arrive API 234) to cause information about one or more memory transactions to be provided to one or more users. In at least one embodiment, one or more memory transactions are asynchronous memory transactions, information includes an indication of a state of thread synchronization object, and one or more circuits are to cause information to be provided based, at least in part, on an amount of data to be asynchronously moved. In at least one embodiment, one or more memory transactions are asynchronous memory transactions between a first memory of a GPU and a second memory of GPU, information includes an indication of a state of a thread synchronization object, one or more users include computer program code operating on GPU, and one or more circuits are to cause information to be provided based, at least in part, on an amount of data to be asynchronously moved. In at least one embodiment, one or more memory transactions are asynchronous data movement transactions. In at least one embodiment, API is to provide a token to indicate state of one or more memory transactions. In at least one embodiment, API is to indicate that one or more threads have finished one or more stages of work involved with one or more memory transactions. In at least one embodiment, processor includes one or more circuits that are to perform an API to generate an indication of a state of a thread synchronization object based, at least in part, on an amount of data to be asynchronously moved.

In at least one embodiment, a system (e.g., computer system 202, system 100 of FIG. 1, or some other suitable computer system) includes one or more processors to perform an application programming interface (API) to cause information about one or more memory transactions to be provided to one or more users. In at least one embodiment, one or more memory transactions are asynchronous memory transactions, information includes an indication of a state of a thread synchronization object, and one or more processors are to cause information to be provided based, at least in part, on an amount of data to be asynchronously moved. In at least one embodiment, one or more memory transactions are asynchronous memory transactions between a first memory of a graphics processing unit (GPU) and a second memory of GPU, information includes an indication of a state of a thread synchronization object, one or more users include computer program code operating on GPU, and one or more processors are to cause information to be provided based, at least in part, on an amount of data to be asynchronously moved. In at least one embodiment, one or more memory transactions are one or more asynchronous data movement transactions. In at least one embodiment, API is to provide a token to indicate state of one or more memory transactions. In at least one embodiment, API is to update a synchronization object with a transaction count.

In at least one embodiment, a processor (e.g., processor 222, processor 204, or some other suitable processor) includes one or more circuits to perform an API (e.g., wait API 236) to check for information provided in a token by one or more users about one or more memory transactions after a first amount of time (e.g., a timeout event) indicated by one or more users. In at least one embodiment, information includes a state of a thread synchronization object, one or more users include computer program code, and one or more memory transactions are asynchronous memory transactions. In at least one embodiment, information includes a state of a thread synchronization object, one or more users include computer program code, and one or more memory transactions are asynchronous memory transactions between a first memory of a GPU and a second memory of GPU. In at least one embodiment, API is to receive token as an input. In at least one embodiment, API is to receive an identifier of a synchronization object as an input. In at least one embodiment, API is to provide an indication of a state of a synchronization object. In at least one embodiment, processor includes one or more circuits that are to perform an API to indicate if a thread synchronization object comprises a state specified to API (e.g., has a parity state specified as an input to API).

In at least one embodiment, a system (e.g., computer system 202, system 100 of FIG. 1, or some other suitable computer system) includes one or more processors to perform an application programming interface (API) to check for information provided in a token by one or more users about one or more memory transactions after a first amount of time (e.g., a timeout event) indicated by one or more users. In at least one embodiment, information includes a state of a thread synchronization object, one or more users include computer program code, and one or more memory transactions are asynchronous memory transactions. In at least one embodiment, information includes a state of a thread synchronization object, one or more users include computer program code, and one or more memory transactions are asynchronous memory transactions between a first memory of a graphics processing unit (GPU) and a second memory of GPU. In at least one embodiment, information includes a parity state of a barrier object, one or more users include computer program code, and one or more memory transactions are asynchronous memory transactions between a first memory of a graphics processing unit (GPU) and a second memory of GPU. In at least one embodiment, API is to receive a pointer to a synchronization object as an input. In at least one embodiment, API is to provide an indication of a state of a synchronization object. In at least one embodiment, wait API 236 returns a response before delay (e.g., timeout event) specified to wait API 236 if a barrier completion event and/or a barrier phase change event has been performed. In at least one embodiment, one or more users (e.g., threads of application code that called wait API 236) are to perform other operations before a barrier event (e.g., a barrier completion event and/or a barrier phase change event) has been performed (e.g., before wait API 236 returns a response).

In at least one embodiment, a processor (e.g., processor 222, processor 204, or some other suitable processor) includes one or more circuits to perform an API (e.g., delayed wait API 238) to check for information provided by one or more users about one or more memory transactions after a timeout event indicated by one or more users. In at least one embodiment, information includes a state of a thread synchronization object, one or more users include computer program code, and one or more memory transactions are asynchronous memory transactions. In at least one embodiment, information includes a state of a thread synchronization object, one or more users include computer program code, and one or more memory transactions are asynchronous memory transactions between a first memory of a GPU and a second memory of GPU. In at least one embodiment, API is to receive a state of a synchronization object as an input. In at least one embodiment, API is to receive an identifier of a synchronization object as an input. In at least one embodiment, API is to provide an indication of a state of a synchronization object. In at least one embodiment, API is to provide information indicating a state of completion of one or more memory transactions. In at least one embodiment, one or more users (e.g., threads of application code that called delayed wait API 238) are to perform other operations before a barrier event (e.g., a barrier completion event and/or a barrier phase change event) has been performed (e.g., before delayed wait API 238 returns a response). In at least one embodiment, processor includes one or more circuits that are to perform an API to indicate, after a delay specified to API, if a thread synchronization object comprises a state specified to API. In at least one embodiment, delayed wait API 238 returns a response before delay (e.g., timeout event) specified to delayed wait API 238 if a barrier completion event and/or a barrier phase change event has been performed.

In at least one embodiment, a system (e.g., computer system 202, system 100 of FIG. 1, or some other suitable computer system) includes one or more processors to perform an application programming interface (API) to check for information provided by one or more users about one or more memory transactions after a timeout event indicated by one or more users. In at least one embodiment, information includes a state of a thread synchronization object, one or more users include computer program code, and one or more memory transactions are asynchronous memory transactions. In at least one embodiment, information includes a state of a thread synchronization object, one or more users include computer program code, and one or more memory transactions are asynchronous memory transactions between a first memory of a graphics processing unit (GPU) and a second memory of GPU. In at least one embodiment, API is to receive a state of a synchronization object as an input. In at least one embodiment, API is to receive a pointer to a synchronization object as an input. In at least one embodiment, API is to provide an indication of a state of a synchronization object.

In at least one embodiment, a processor (e.g., processor 222, processor 204, or some other suitable processor) includes one or more circuits to perform an API (e.g., make pipeline API 240) to cause one or more software objects to indicate whether one or more memory transactions have been performed. In at least one embodiment, one or more software objects include a thread synchronization object to be used to perform manual transaction accounting. In at least one embodiment, one or more memory transactions are asynchronous memory transactions between a first memory of a GPU and a second memory of GPU, and one or more software objects include a pipeline object to be used to perform manual transaction accounting. In at least one embodiment, software object is to be used to perform manual transaction accounting of one or more memory transactions. In at least one embodiment, information of software object is to be accessible via one or more other APIs. In at least one embodiment, API is to receive an identifier of a group of threads to perform one or more memory transactions as an input. In at least one embodiment, API is to receive an indication of a state of a group of threads as an input. In at least one embodiment, processor includes one or more circuits that are to perform an API to cause a synchronization object (e.g., a pipeline object) to be used to perform manual transaction accounting to be generated.

In at least one embodiment, a system (e.g., computer system 202, system 100 of FIG. 1, or some other suitable computer system) includes one or more processors to perform an application programming interface (API) to cause one or more software objects to indicate whether one or more memory transactions have been performed. In at least one embodiment, one or more memory transactions are asynchronous memory transactions, and one or more software objects include a thread synchronization object to be used to perform manual transaction accounting. In at least one embodiment, one or more memory transactions are asynchronous memory transactions between a first memory of a graphics processing unit (GPU and a second memory of GPU, and one or more software objects include a pipeline object to be used to perform manual transaction accounting. In at least one embodiment, software object is to be used to perform manual transaction accounting of one or more memory transactions. In at least one embodiment, API is to receive an identifier of a group of threads to perform one or more memory transactions and a pointer to a state of group of threads as inputs. In at least one embodiment, one or more memory transactions are asynchronous memory transactions, one or more software objects include a thread synchronization object to be used to perform manual transaction accounting, and information of software object is to be accessible via one or more other APIs.

In at least one embodiment, a processor (e.g., processor 222, processor 204, or some other suitable processor) includes one or more circuits to perform an API (e.g., consumer commit API 242) to cause an amount of information to be accessed as a result of one or more memory transactions to be provided to one or more users. In at least one embodiment, one or more memory transactions are asynchronous memory transactions that include data movement operations, and API is to cause amount of information to be accessed to be provided by updating one or more synchronization objects. In at least one embodiment, one or more users comprises a thread to use data to be moved (e.g., a consumer thread) to update a synchronization object. In at least one embodiment, one or more memory transactions comprise one or more asynchronous memory transactions. In at least one embodiment, information is to be accessed by moving information from a first type of memory of a GPU to a second type of memory of GPU. In at least one embodiment, amount of information to be accessed is to be specified using a transaction count. In at least one embodiment, processor includes one or more circuits that are to perform an API to update information that tracks completion of one or more asynchronous data movement operations based, at least in part, on an amount of data to be moved by one or more asynchronous data movement operations.

In at least one embodiment, a system (e.g., computer system 202, system 100 of FIG. 1, or some other suitable computer system) includes one or more processors to perform an application programming interface (API) to cause an amount of information to be accessed as a result of one or more memory transactions to be provided to one or more users. In at least one embodiment, one or more memory transactions are asynchronous memory transactions that include data movement operations, and wherein API is to cause amount of information to be accessed to be provided by updating one or more synchronization objects. In at least one embodiment, one or more users comprises a thread that is to use result, wherein thread is to update a synchronization object using API. In at least one embodiment, one or more memory transactions comprise one or more asynchronous memory transactions. In at least one embodiment, information is to be accessed by moving information from a first type of memory of a graphics processing unit (GPU) to a second type of memory of GPU. In at least one embodiment, amount of information to be accessed is to be specified using a transaction count.

Figure 3:
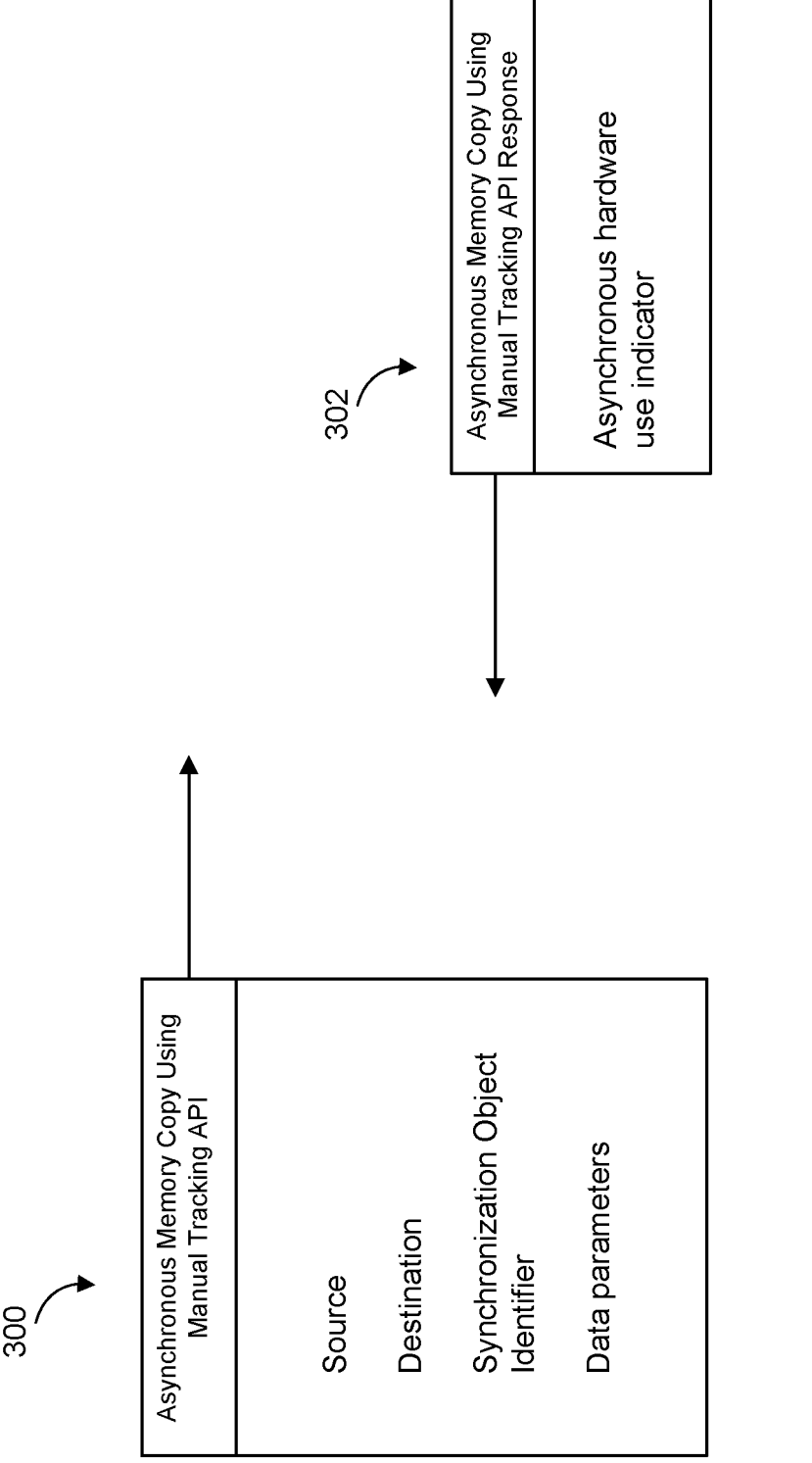
FIG. 3 illustrates performing an API to cause an asyn- chronous memory operation, according to at least one embodiment.

FIG. 3 illustrates performing an API 300 to cause an asynchronous memory operation, according to at least one embodiment. In at least one embodiment, one or more processors of a GPU (e.g., GPU 210 of FIG. 2) are to perform API 300. In at least one embodiment, API 300 is to be performed using manual transaction accounting. In at least one embodiment, API 300 is to be performed using asynchronous copy API 230 of FIG. 2. In at least one embodiment, API 300 includes one or more parameters. In at least one embodiment, parameters of API 300 include an identifier of a source memory location (e.g., a pointer to source memory location), an identifier of a destination memory location (e.g., a pointer to destination memory location), a synchronization object identifier (e.g., an identifier of a barrier or pipeline thread synchronization object), and one or more data parameters (e.g., a shape of data to be moved, a type of data to be moved, a size of data to be moved, and/or some other suitable data parameters). In at least one embodiment, API 300 is referred to as memcpy_async_tx( ).

In at least one embodiment, a response 302 to performing API 300 includes an asynchronous hardware use indicator. In at least one embodiment, asynchronous hardware use indicator indicates whether asynchronous data movement hardware (e.g., asynchronous data movement H/W 224 of FIG. 2) is to be used to perform asynchronous memory copy operation. In at least one embodiment, asynchronous hardware use indicator is a Boolean value, an enumerated value, a data structure, or some other suitable indicator. In at least one embodiment, asynchronous hardware use indicator indicates, if asynchronous data movement hardware is not to be used, a reason why asynchronous data movement hardware is not to be used (e.g., not present on GPU in use, data not properly aligned, or some other suitable reason such as by using a reason code that corresponds to a particular reason). In at least one embodiment, asynchronous hardware use indicator is referred to as an AsyncContractFulfillment data structure or data type, an AsyncContractFulfilled value, or some other suitable name. In at least one embodiment, response 302 provides an operation status in addition to, or instead of, asynchronous hardware use indicator. In at least one embodiment, response 302 is not present (e.g., when API 300 has a void return type).

Figure 4:
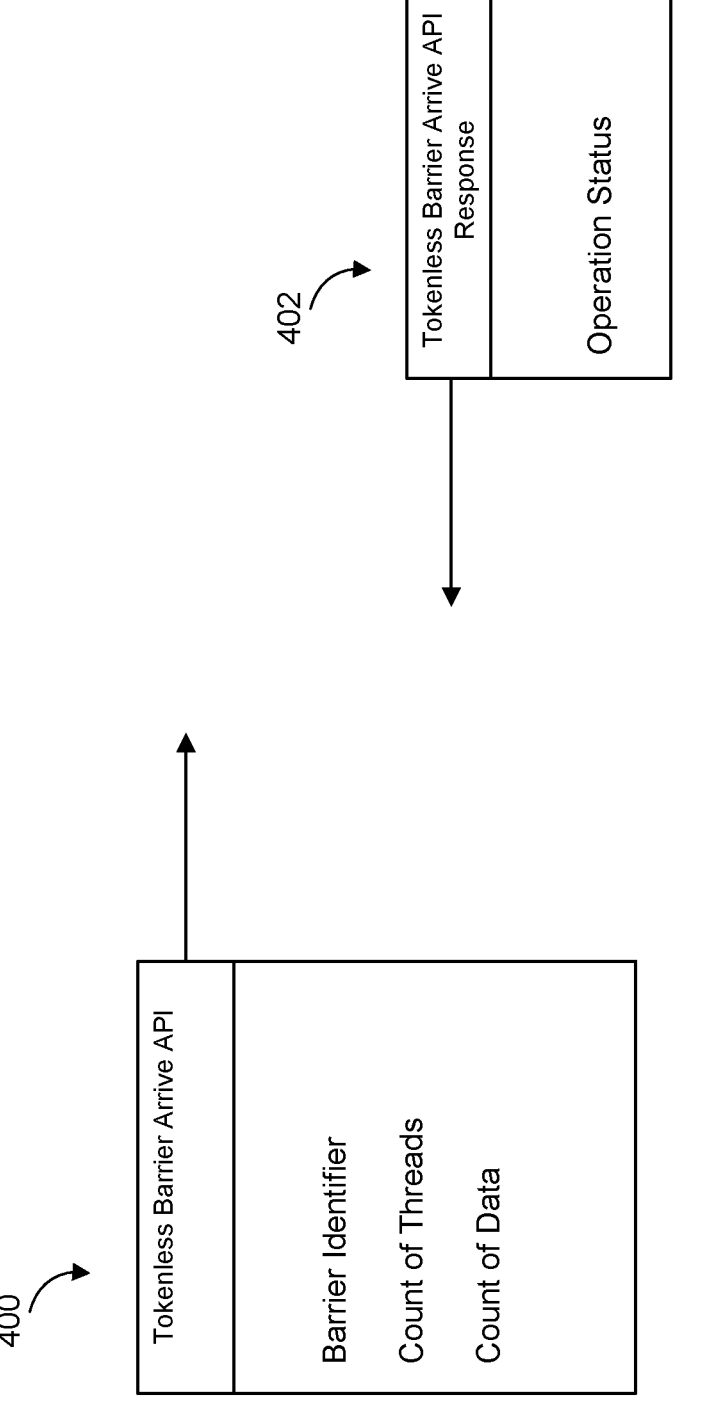
FIG. 4 illustrates performing an API cause an arrival at a barrier without receiving a token, according to at least one embodiment.

FIG. 4 illustrates performing an API 400 to cause an arrival at a barrier without receiving a token, according to at least one embodiment. In at least one embodiment, one or more processors of a GPU (e.g., GPU 210 of FIG. 2) are to perform API 400. In at least one embodiment, API 400 is to be performed using tokenless barrier arrive API 232 of FIG. 2. In at least one embodiment, API 400 includes one or more parameters. In at least one embodiment, parameters of API 400 include an identifier of a barrier, a count of threads, and a count of data (e.g., an expected transaction count). In at least one embodiment, API 400 is to update identified barrier object based, at least in part, on received count of data and received count of threads without returning a token. In at least one embodiment, a tokenless barrier arrive API response 402 is to return an operation status. In at least one embodiment, tokenless barrier arrive API response 402 is not present (e.g., when API 400 has a void return type).

Figure 5:
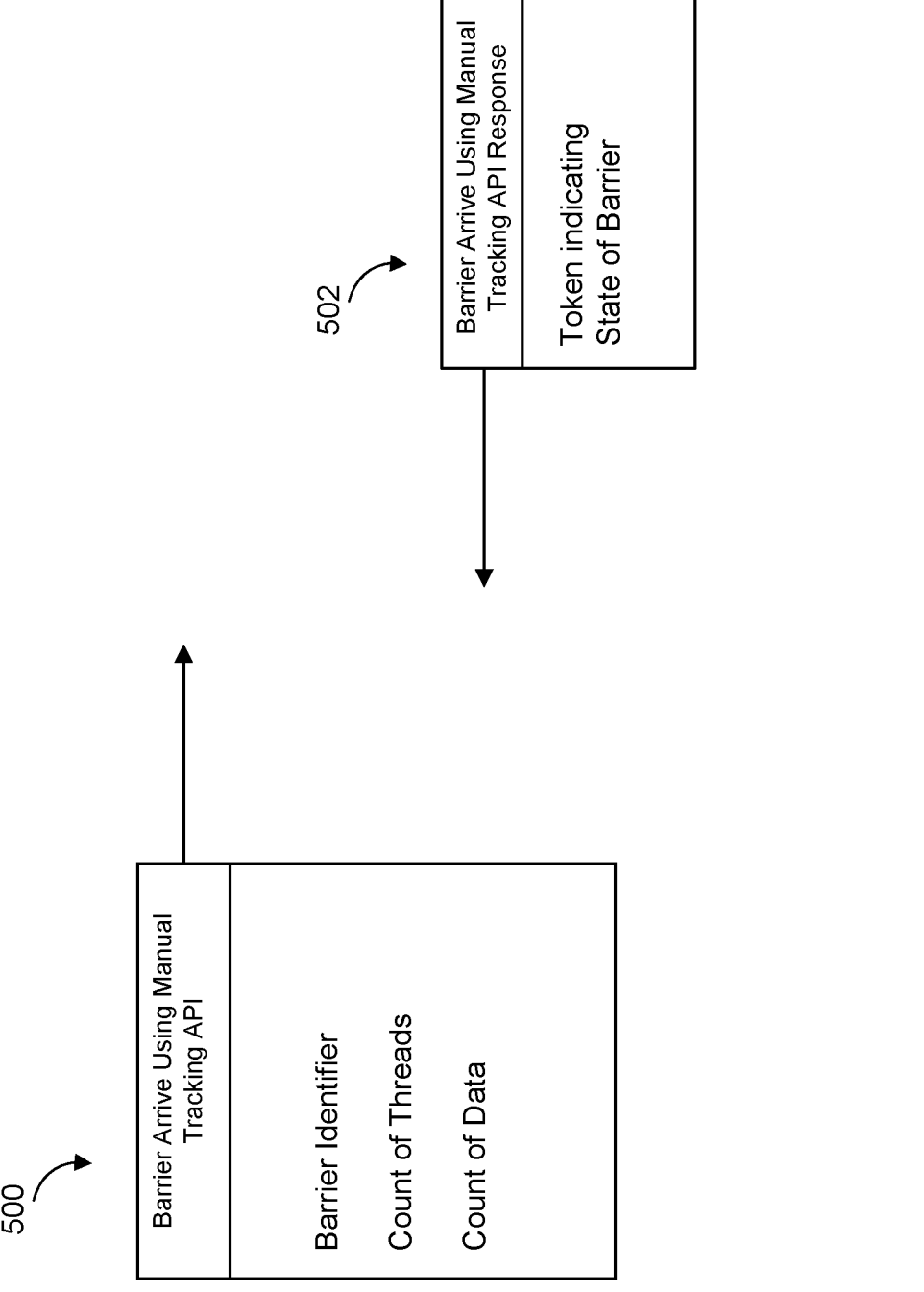
FIG. 5 illustrates performing an API to cause an arrival at a barrier, according to at least one embodiment.

FIG. 5 illustrates performing API 500 to cause an arrival at a barrier using manual tracking, according to at least one embodiment. In at least one embodiment, one or more processors of a GPU (e.g., GPU 210 of FIG. 2) are to perform API 500. In at least one embodiment, API 500 is to be performed using barrier arrive API 234 of FIG. 2. In at least one embodiment, API 500 includes one or more parameters. In at least one embodiment, parameters of API 500 include a barrier identifier, a count of threads, and a count of data (e.g., an expected transaction count). In at least one embodiment, API 500 is to update identified barrier object based, at least in part, on received count of data and received count of threads. In at least one embodiment, a barrier arrive using manual tracking API response 502 is to return a token indicating a state of identified barrier.

Figure 6:
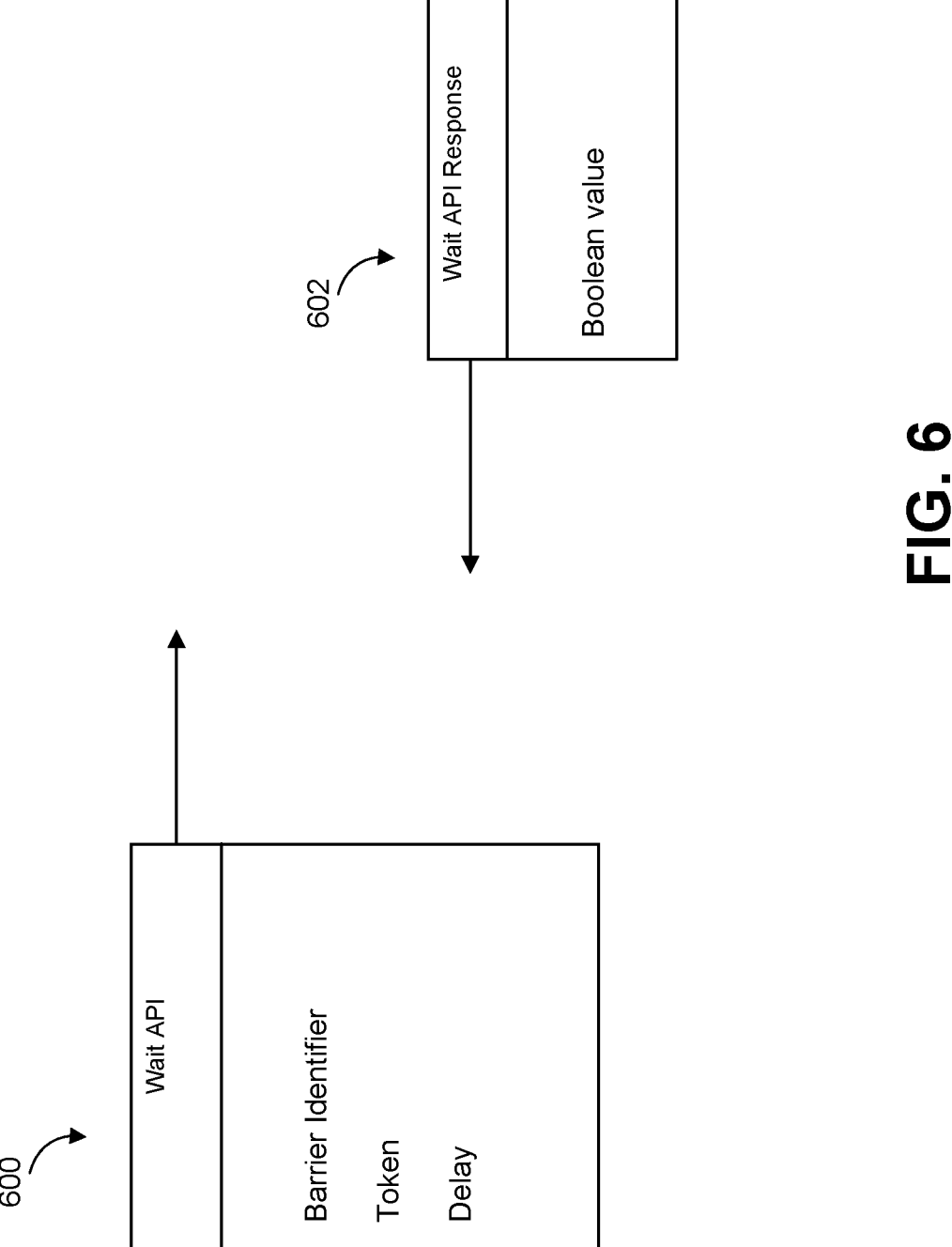
FIG. 6 illustrates performing an API to cause a wait operation, according to at least one embodiment.

FIG. 6 illustrates performing an API 600 to cause a wait operation and receive a response after a delay, according to at least one embodiment. In at least one embodiment, one or more processors of a GPU (e.g., GPU 210 of FIG. 2) are to perform API 600. In at least one embodiment, API 600 is to be performed using wait API 236 of FIG. 2. In at least one embodiment, API 600 includes one or more parameters. In at least one embodiment, parameters include a barrier identifier, a token, and a delay value. In at least one embodiment, token includes an expected phase parity value (e.g., in a manner obfuscated by a structure of token). In at least one embodiment, a wait API response 602 is to return a value (e.g., a Boolean value) that indicates whether barrier identified by barrier identifier is in a state specified by information included in token (e.g., obfuscated expected phase indicator). In at least one embodiment, synchronization hardware (e.g., synchronization H/W 226 of FIG. 2) sets state of barrier based, at least in part, on whether all threads have arrived at barrier, all data to be asynchronously moved has been moved by asynchronous data movement hardware (e.g., asynchronous data movement H/W 226 of FIG. 2), and a sum of expected data to be moved (e.g., provided by threads to API 400 of FIG. 4 and/or API 500 of FIG. 5 when they arrive at barrier) is equal to a sum of data that has been moved.

Figure 7:
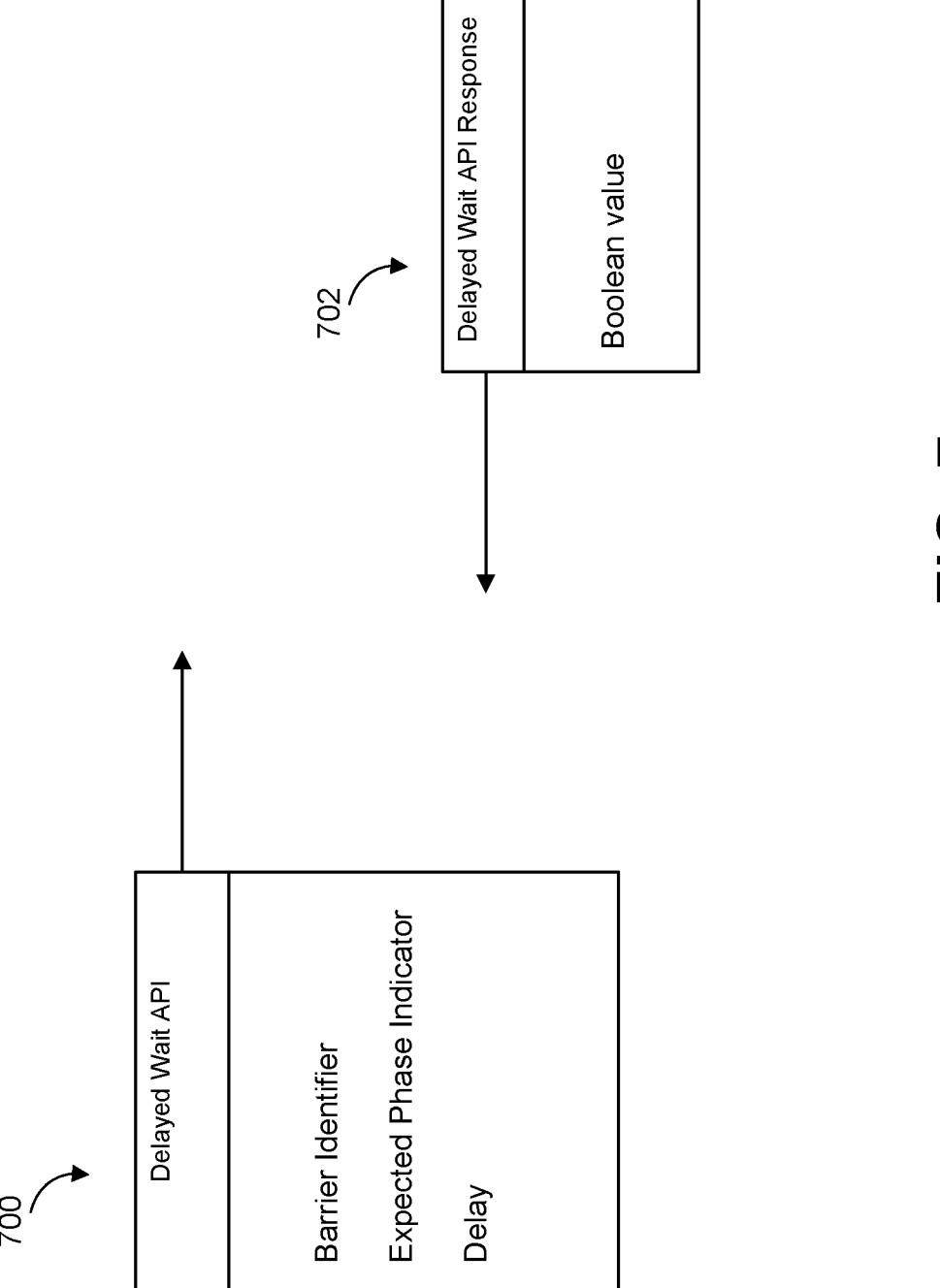
FIG. 7 illustrates performing an API to cause a wait operation and receive a response after a delay, according to at least one embodiment.

FIG. 7 illustrates performing an API 700 to cause a wait operation and receive a response after a delay, according to at least one embodiment. In at least one embodiment, one or more processors of a GPU (e.g., GPU 210 of FIG. 2) are to perform API 700. In at least one embodiment, API 700 is to be performed using delayed wait API 238 of FIG. 2. In at least one embodiment, API 700 includes one or more parameters. In at least one embodiment, parameters include a barrier identifier, an expected phase indicator, and a delay value. In at least one embodiment, a delayed wait API response 702 is to return a value (e.g., a Boolean value) that indicates whether barrier identified by barrier identifier is in a state specified by expected phase indicator after an amount of time specified by delay value has elapsed. In at least one embodiment, synchronization hardware (e.g., synchronization H/W 226 of FIG. 2) sets state of barrier based, at least in part, on whether all threads have arrived at barrier, all data to be asynchronously moved has been moved by asynchronous data movement hardware (e.g., asynchronous data movement H/W 226 of FIG. 2), and a sum of expected data to be moved (e.g., provided by threads to API 400 of FIG. 4 and/or API 500 of FIG. 5 when they arrive at barrier) is equal to a sum of data that has been moved.

Figure 8:
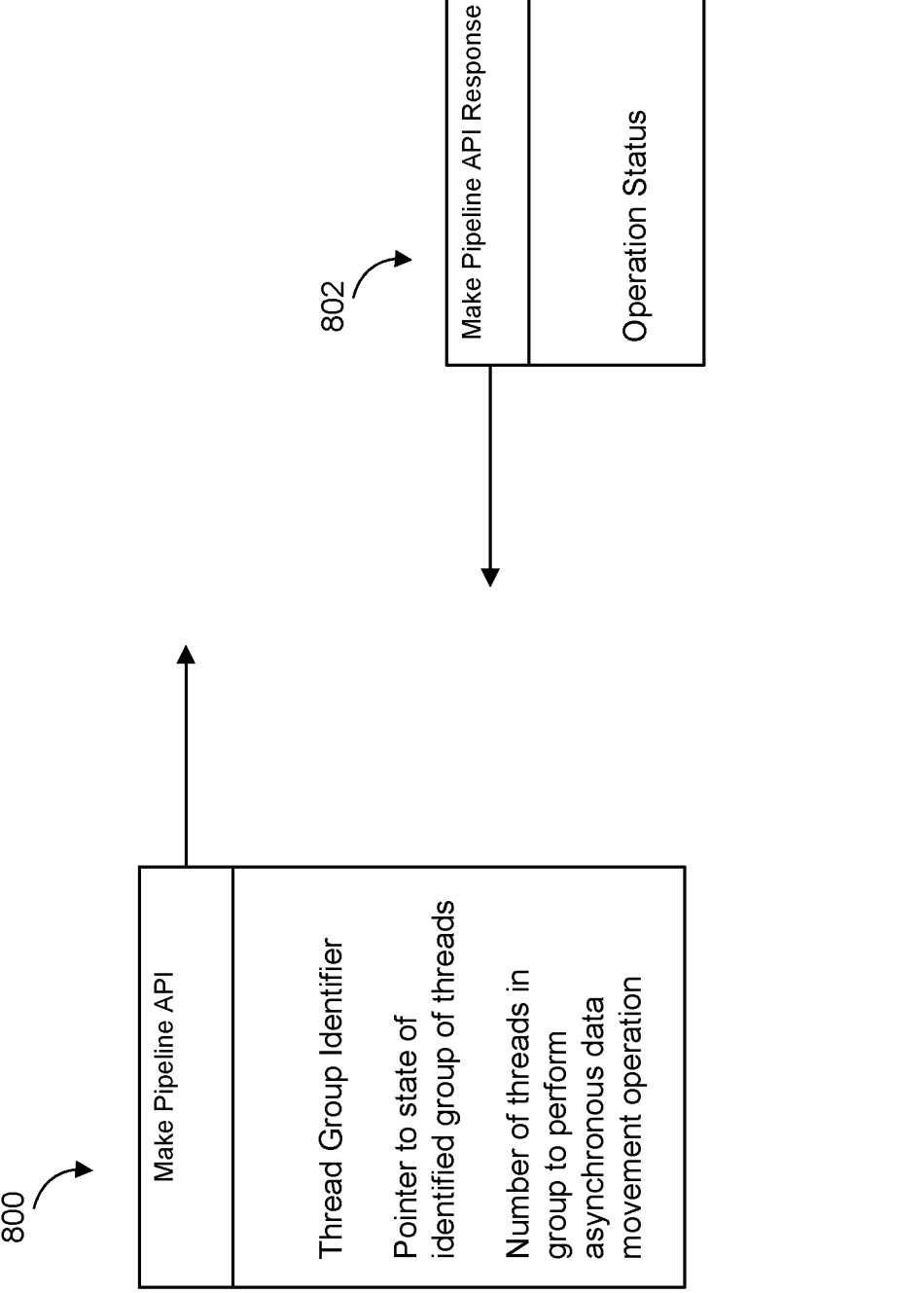
FIG. 8 illustrates performing an API to cause a pipeline to be used with manual transaction accounting to be generated, according to at least one embodiment.

FIG. 8 illustrates performing an API 800 to cause a pipeline to be used with manual transaction accounting to be generated, according to at least one embodiment. In at least one embodiment, one or more processors of a GPU (e.g., GPU 210 of FIG. 2) are to perform API 800. In at least one embodiment, API 800 is to be performed using make pipeline API 240 of FIG. 2. In at least one embodiment, API 800 includes one or more parameters. In at least one embodiment, parameters include a thread group identifier, a pointer to a state of identified group of threads, and a number of threads in group to perform asynchronous data movement operation. In at least one embodiment, API 800 generates and/or creates a pipeline object to be used with manual transaction accounting (e.g., with a consumer commit API that provides an expected transaction count). In at least one embodiment, a make pipeline API response 802 is to return an operation status. In at least one embodiment, make pipeline API response 802 is not present (e.g., when API 800 has a void return type).

Figure 9:
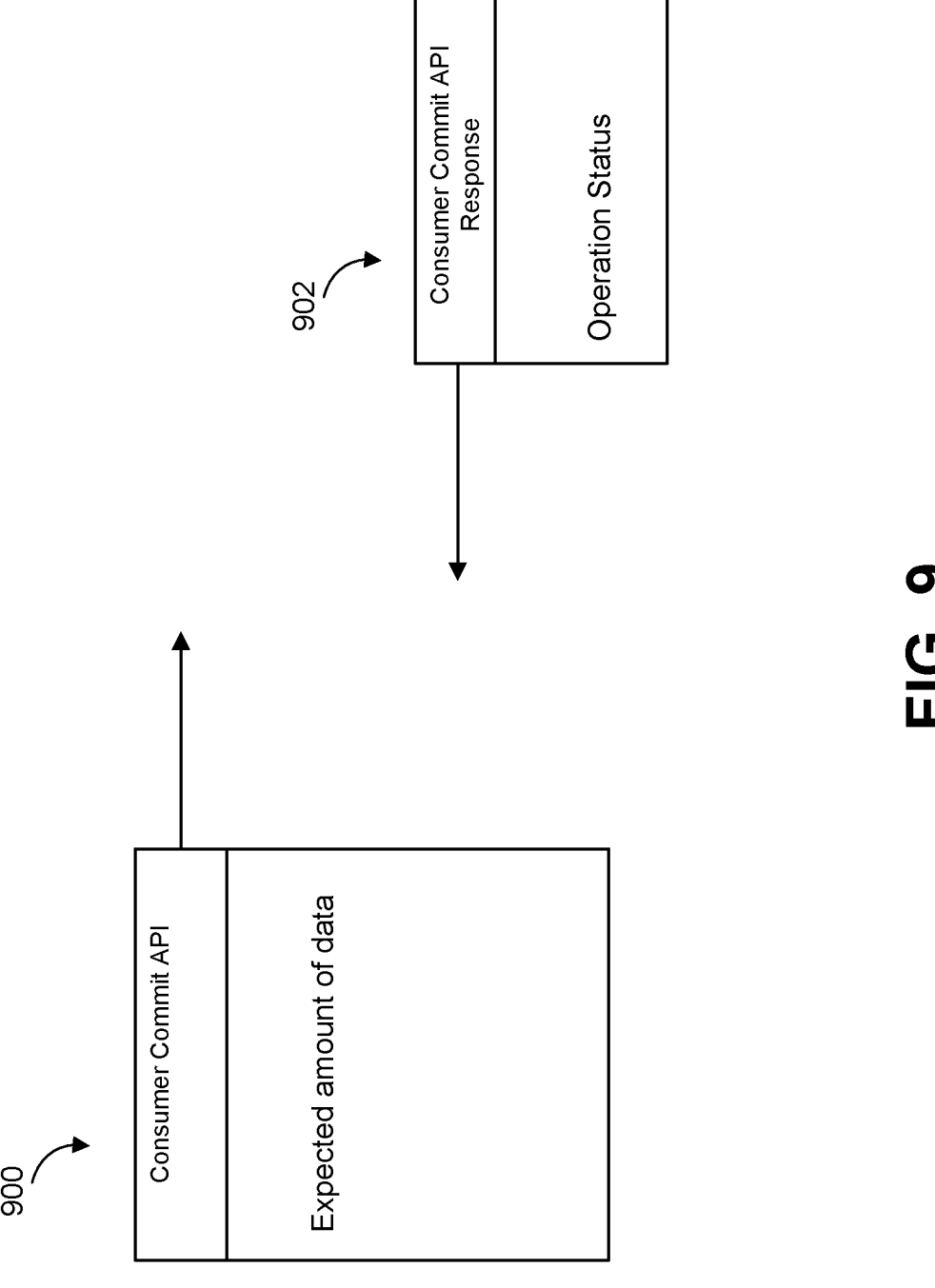
FIG. 9 illustrates performing an API to cause a consumer commit operation using a pipeline, according to at least one embodiment.

FIG. 9 illustrates performing an API 900 to cause a consumer commit operation using a pipeline, according to at least one embodiment. In at least one embodiment, one or more processors of a GPU (e.g., GPU 210 of FIG. 2) are to perform API 900. In at least one embodiment, API 900 is to be performed using consumer commit API 242 of FIG. 2. In at least one embodiment, API 900 includes one or more parameters. In at least one embodiment, expected parameters include an expected amount of data to be asynchronously moved (e.g., in bytes, transactions, or some other suitable count). In at least one embodiment, API 900 is implemented as a member function of a pipeline synchronization object (e.g., created using API 800 of FIG. 8). In at least one embodiment, a consumer thread that is to use data to be moved is to cause API 900 to be performed. In at least one embodiment, performing API 900 causes a synchronization object (e.g., a pipeline created by API 800 of FIG. 8) to be updated based, at least in part, on expected amount of data to be asynchronously moved. In at least one embodiment, a consumer commit API response 902 is to return an operation status. In at least one embodiment, consumer commit API response 902 is not present (e.g., when API 900 has a void return type).

Figure 10:
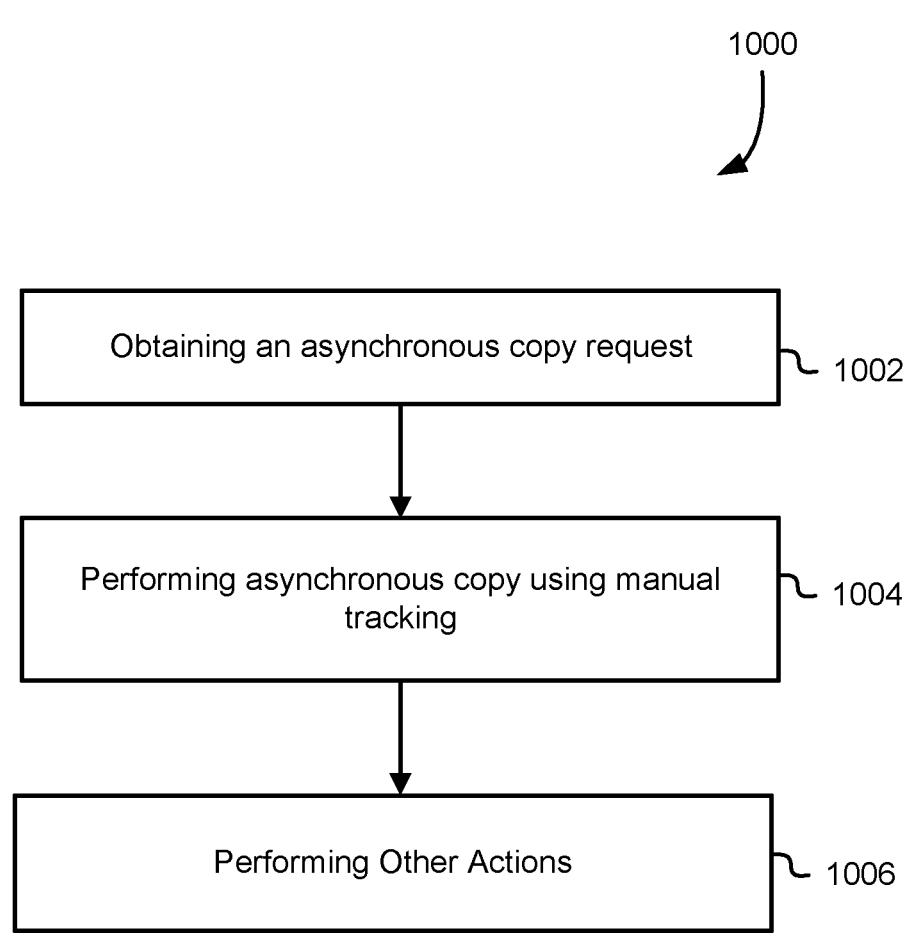
FIG. 10 is a flowchart of a technique of performing an asynchronous memory operation, according to at least one embodiment.

FIG. 10 is a flowchart of a technique 1000 of performing an asynchronous memory operation, according to at least one embodiment. In at least one embodiment, one or more aspects of technique 1000 are performed by one or more aspects shown or described with respect to FIG. 1 and/or FIG. 2 (e.g., CPU 104, PPU 106, API 108, compiler 112 of FIG. 1, asynchronous copy API 230, processor 204, compiler 224, processor 222, asynchronous data movement H/W 224, and/or synchronization H/W 226 of FIG. 2) and/or one or more components, techniques, and/or other aspects shown or described with respect to other figures herein. In at least one embodiment, technique 1000 includes performing one or more aspects of API 300 of FIG. 3. In at least one embodiment, at a block 1002, technique 1000 includes obtaining an asynchronous memory copy using manual transaction accounting request (e.g., via an API such as asynchronous copy API 230 of FIG. 2). In at least one embodiment, at a block 1004, technique 1000 includes performing asynchronous memory copy using manual transaction accounting (e.g., performing asynchronous copy API 230 of FIG. 2 and/or API 300 of FIG. 3). In at least one embodiment, at a block 1006, technique 1000 includes performing other actions (e.g., returning an indication that copy operation was successfully performed and/or returning to block 1002 to obtain another asynchronous memory copy request. In at least one embodiment, performing other actions at block 1006 includes returning an asynchronous hardware use indicator. In at least one embodiment, asynchronous hardware use indicator indicates whether asynchronous data movement hardware (e.g., asynchronous data movement h/w 224 of FIG. 2) is to be used to perform asynchronous memory copy operation. In at least one embodiment, asynchronous hardware use indicator is a Boolean value, an enumerated value, a data structure, or some other suitable indicator. In at least one embodiment, asynchronous hardware use indicator indicates, if asynchronous data movement hardware is not to be used, a reason why asynchronous data movement hardware is not to be used (e.g., not present on GPU in use, data not properly aligned, or some other suitable reason such as by using a reason code that corresponds to a particular reason).

In at least one embodiment, at least one aspect of technique 1000 includes performing an API (e.g., asynchronous copy API 230 of FIG. 2, API 300 of FIG. 3, and/or API 108 of FIG. 1) to cause one or more memory transactions to be performed without storing information about those one or more memory transactions. In at least one embodiment, one or more memory transactions are to be asynchronously performed using manual transaction accounting. In at least one embodiment, one or more memory transactions are to be asynchronously performed using manual transaction accounting, and performing API includes receiving an identifier of a source memory location and an identifier of a destination memory location as inputs. In at least one embodiment, one or more memory transactions are to be asynchronously performed using asynchronous data movement hardware (e.g., asynchronous data movement hardware 224 of FIG. 2) using manual transaction accounting. In at least one embodiment, performing API includes returning an indication of whether asynchronous data movement hardware is to be used to perform one or more asynchronous data movement operations. In at least one embodiment, a non-transitory computer-readable medium having stored thereon a set of instructions, which if performed by one or more processors, cause one or more processors to perform one or more aspects of technique 1000.

Figure 11:
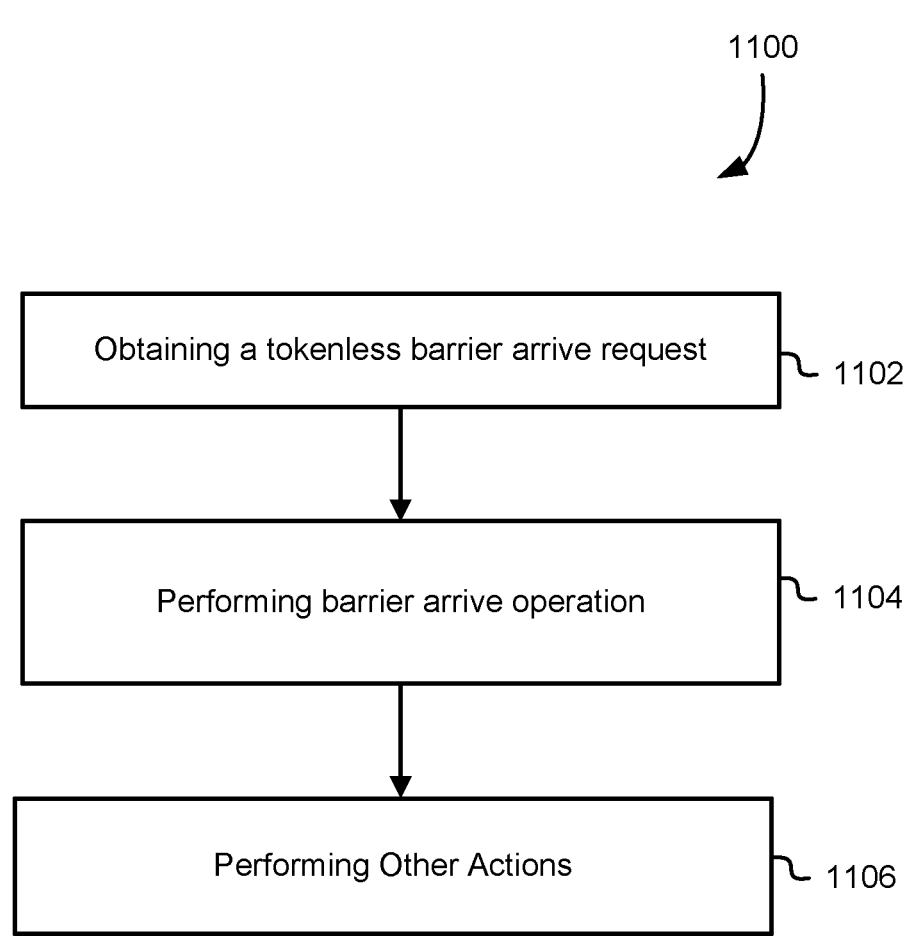
FIG. 11 is a flowchart of a technique of performing an arrival at a barrier without receiving a token, according to at least one embodiment.

FIG. 11 is a flowchart of a technique 1100 of performing an arrival at a barrier without receiving a token, according to at least one embodiment. In at least one embodiment, one or more aspects of technique 1100 are performed by one or more aspects shown or described with respect to FIG. 1 and/or FIG. 2 (e.g., CPU 104, PPU 106, API 108, compiler 112 of FIG. 1, tokenless barrier arrive API 232, processor 204, compiler 224, processor 222, asynchronous data movement H/W 224, and/or synchronization H/W 226 of FIG. 2) and/or one or more components, techniques, and/or other aspects shown or described with respect to other figures herein. In at least one embodiment, technique 1100 includes performing one or more aspects of API 400 of FIG. 4. In at least one embodiment, at a block 1102, technique 1100 includes obtaining a tokenless barrier arrive operation request (e.g., via an API such as tokenless barrier arrive API 232 of FIG. 2). In at least one embodiment, at a block 1104, technique 1100 includes performing one or more tokenless barrier arrive operations (e.g., performing tokenless barrier arrive API 232 of FIG. 2 and/or API 400 of FIG. 4). In at least one embodiment, performing one or more tokenless barrier arrive operations includes updating a barrier based, at least in part, on an expected data movement transaction count (e.g., a manual transaction count in bytes, transactions, or some other suitable amount) without returning a token. In at least one embodiment, at a block 1106, technique 1100 includes performing other actions.

In at least one embodiment, at least one aspect of technique 1100 includes performing an API (e.g., tokenless barrier arrive API 232 of FIG. 2, API 400 of FIG. 4, and/or API 108 of FIG. 1) to cause information received by API about one or more memory transactions to be stored. In at least one embodiment, one or more memory transactions are asynchronous memory transactions, and performing API includes causing information to be stored by updating a thread synchronization object to be updated based, at least in part, on information received by API. In at least one embodiment, one or more memory transactions are asynchronous memory transactions between a first memory and a second memory of a GPU, and performing API includes causing a thread synchronization object to be updated based, at least in part, on information received by API. In at least one embodiment, one or more memory transactions are asynchronous memory transactions between a first memory and a second memory of a GPU, and performing API includes updating a barrier object to indicate that one or more threads have arrived at barrier object based, at least in part, on information received by API. In at least one embodiment, performing API includes updating a barrier object to indicate that one or more threads have arrived at barrier object based, at least in part, on an amount of data to be asynchronously moved. In at least one embodiment, API is to be performed without providing a token to indicate a state of a synchronization object. In at least one embodiment, a non-transitory computer-readable medium having stored thereon a set of instructions, which if performed by one or more processors, cause one or more processors to perform one or more aspects of technique 1100.

Figure 12:
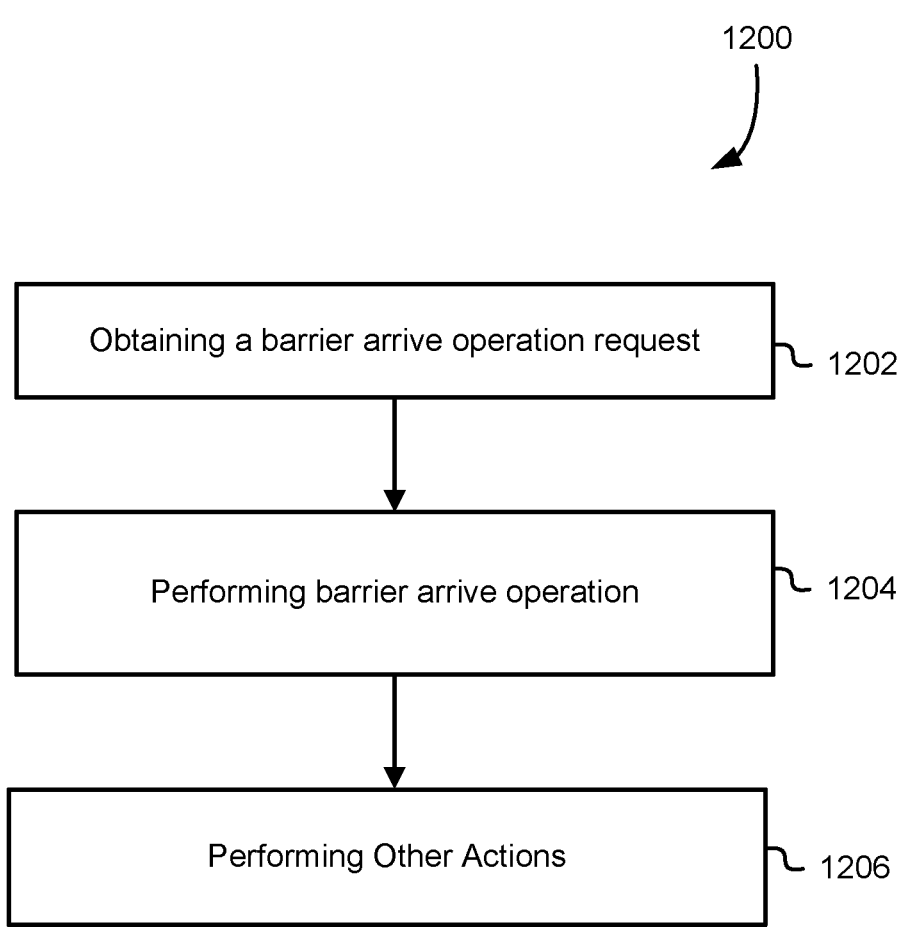
FIG. 12 is a flowchart of a technique of performing an arrival at a barrier, according to at least one embodiment.

FIG. 12 is a flowchart of a technique 1200 of performing an arrival at a barrier, according to at least one embodiment. In at least one embodiment, one or more aspects of technique 1200 are performed by one or more aspects shown or described with respect to FIG. 1 and/or FIG. 2 (e.g., CPU 104, PPU 106, API 108, compiler 112 of FIG. 1, barrier arrive API 234, processor 204, compiler 224, processor 222, asynchronous data movement H/W 224, and/or synchronization H/W 226 of FIG. 2) and/or one or more components, techniques, and/or other aspects shown or described with respect to other figures herein. In at least one embodiment, technique 1200 includes performing one or more aspects of API 500 of FIG. 5. In at least one embodiment, at a block 1202, technique 1200 includes obtaining a barrier arrive operation request (e.g., via an API such as barrier arrive API 234 of FIG. 2). In at least one embodiment, at a block 1204, technique 1200 includes performing one or more barrier arrive operations (e.g., performing barrier arrive API 234 of FIG. 2 and/or API 500 of FIG. 5). In at least one embodiment, performing one or more barrier arrive operations includes updating a barrier based, at least in part, on an expected data movement transaction count (e.g., a manual transaction count in bytes, transactions, or some other suitable amount) specified by a value provided to barrier arrive API. In at least one embodiment, at a block 1206, technique 1200 includes performing other actions. In at least one embodiment, performing other actions at block 1206 includes returning a token that indicates a state of barrier to which barrier arrive operation applied.

In at least one embodiment, at least one aspect of technique 1200 includes performing an API (e.g., barrier arrive API 234 of FIG. 2, API 500 of FIG. 5, and/or API 108 of FIG. 1) to cause information about one or more memory transactions to be provided to one or more users. In at least one embodiment, one or more memory transactions are asynchronous memory transactions, information includes an indication of a state of a thread synchronization object, and performing API includes causing information to be provided based, at least in part, on an amount of data to be asynchronously moved. In at least one embodiment, one or more memory transactions are asynchronous memory transactions between a first memory of a GPU and a second memory of GPU, information includes an indication of a state of a thread synchronization object, one or more users include computer program code operating on GPU, and performing API includes causing information to be provided based, at least in part, on an amount of data to be asynchronously moved. In at least one embodiment, one or more memory transactions are one or more asynchronous data movement transactions. In at least one embodiment, API is to provide a token to indicate state of one or more memory transactions. In at least one embodiment, a non-transitory computer-readable medium having stored thereon a set of instructions, which if performed by one or more processors, cause one or more processors to perform one or more aspects of technique 1200.

Figure 13:
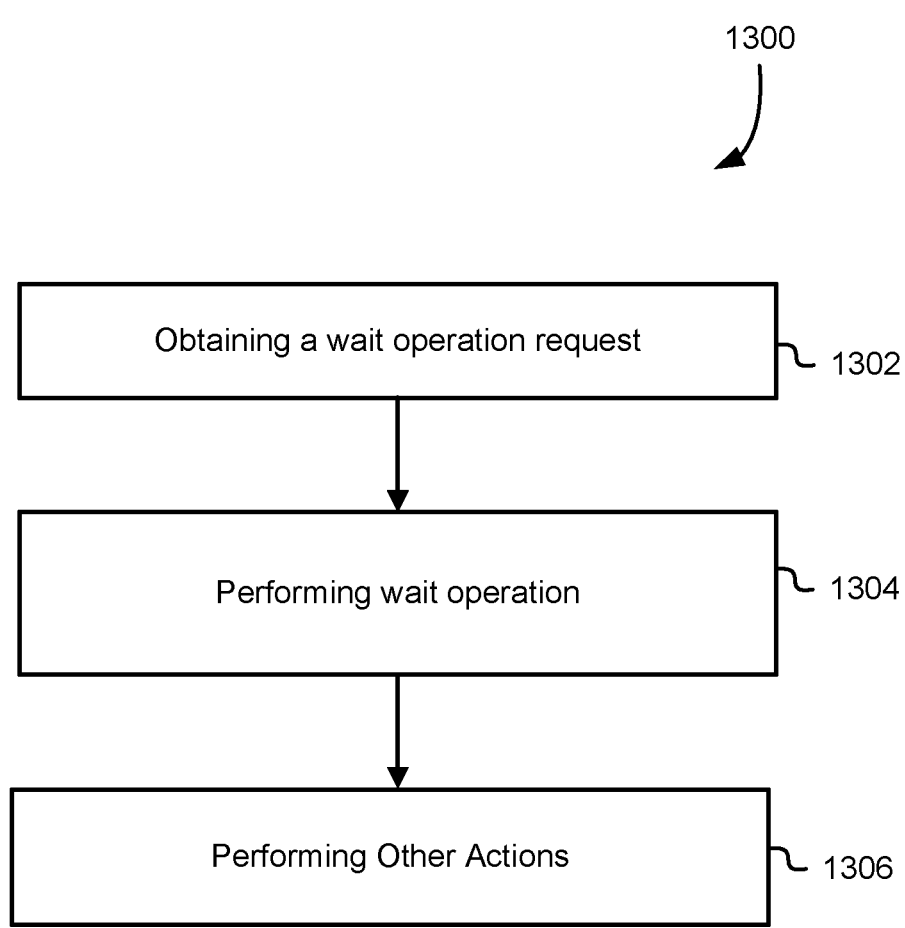
FIG. 13 is a flowchart of a technique of performing a wait operation, according to at least one embodiment.

FIG. 13 is a flowchart of a technique 1300 of performing a wait operation, according to at least one embodiment. In at least one embodiment, one or more aspects of technique 1300 are performed by one or more aspects shown or described with respect to FIG. 1 and/or FIG. 2 (e.g., CPU 104, PPU 106, API 108, compiler 112 of FIG. 1, wait API 236, processor 204, compiler 224, processor 222, asynchronous data movement H/W 224, and/or synchronization H/W 226 of FIG. 2) and/or one or more components, techniques, and/or other aspects shown or described with respect to other figures herein. In at least one embodiment, technique 1300 includes performing one or more aspects of API 600 of FIG. 6. In at least one embodiment, at a block 1302, technique 1300 includes obtaining a wait operation request (e.g., via an API such as wait API 236 of FIG. 2). In at least one embodiment, at a block 1304, technique 1300 includes performing one or more wait operations (e.g., performing wait operation API 236 of FIG. 2 and/or API 600 of FIG. 6). In at least one embodiment, at a block 1306, technique 1300 includes performing other actions. In at least one embodiment, performing other actions at block 1306 includes returning an indication (e.g., a Boolean value) of whether a synchronization object (e.g., a barrier) is in a state specified by a value (e.g., an obfuscated expected parity state) included in a token provided to wait API.

In at least one embodiment, at least one aspect of technique 1300 includes performing an API (e.g., wait API 236 of FIG. 2, API 600 of FIG. 6, and/or API 108 of FIG. 1) to check for information provided in a token by one or more users about one or more memory transactions after a first amount of time indicated by one or more users. In at least one embodiment, information includes a state (e.g., a parity value such as 0 or 1) of a thread synchronization object (e.g., a barrier), one or more users include computer program code, and one or more memory transactions are asynchronous memory transactions (e.g., copy or reduce operations). In at least one embodiment, information includes a state of a thread synchronization object, one or more users include computer program code, and one or more memory transactions are asynchronous memory transactions between a first memory of a GPU and a second memory of GPU. In at least one embodiment, information includes a parity state of a barrier object, one or more users include computer program code, and one or more memory transactions are asynchronous memory transactions between a first memory of a GPU and a second memory of GPU. In at least one embodiment, API is to receive a state of a token (e.g., received in response to performing an arrive API such as barrier arrive API 234 of FIG. 2) as input. In at least one embodiment, API is to provide an indication of a state of a synchronization object (e.g., whether synchronization object has specified parity state). In at least one embodiment, a non-transitory computer-readable medium having stored thereon a set of instructions, which if performed by one or more processors, cause one or more processors to perform one or more aspects of technique 1300.

Figure 14:
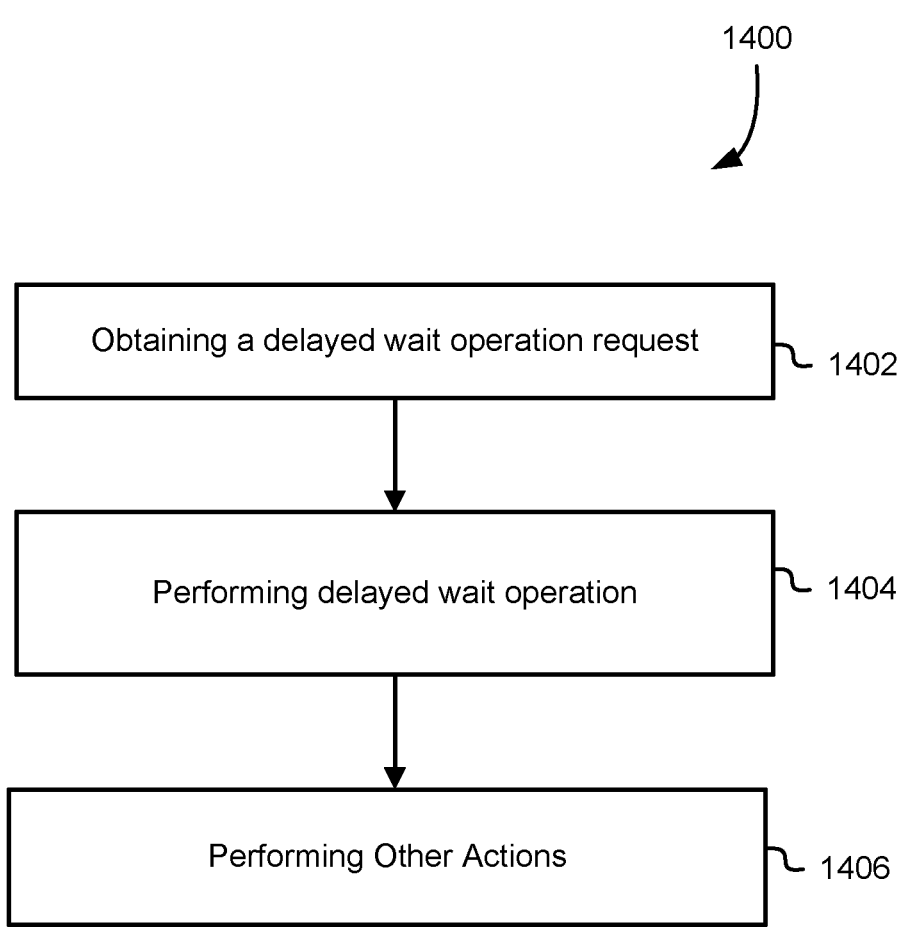
FIG. 14 is a flowchart of a technique of performing a wait operation and receiving a response after a delay, according to at least one embodiment.

FIG. 14 is a flowchart of a technique 1400 of performing a wait operation and receiving a response after a delay, according to at least one embodiment. In at least one embodiment, one or more aspects of technique 1400 are performed by one or more aspects shown or described with respect to FIG. 1 and/or FIG. 2 (e.g., CPU 104, PPU 106, API 108, compiler 112 of FIG. 1, delayed wait API 238, processor 204, compiler 224, processor 222, asynchronous data movement H/W 224, and/or synchronization H/W 226 of FIG. 2) and/or one or more components, techniques, and/or other aspects shown or described with respect to other figures herein. In at least one embodiment, technique 1400 includes performing one or more aspects of API 700 of FIG. 7. In at least one embodiment, at a block 1402, technique 1400 includes obtaining a delayed wait operation request (e.g., via an API such as delayed wait API 238 of FIG. 2). In at least one embodiment, at a block 1404, technique 1400 includes performing one or more delayed wait operations (e.g., performing delayed wait API 238 of FIG. 2 and/or API 700 of FIG. 7). In at least one embodiment, at a block 1406, technique 1400 includes performing other actions. In at least one embodiment, performing other actions at block 1406 includes returning an indication (e.g., a Boolean value) after a specified delay provided to delayed wait API of whether a synchronization object (e.g., a barrier) is in a state specified by a value (e.g., an expected parity state) provided to delayed wait API.

In at least one embodiment, at least one aspect of technique 1400 includes performing an API (e.g., delayed wait API 238 of FIG. 2, API 700 of FIG. 7, and/or API 108 of FIG. 1) to check for information provided by one or more users about one or more memory transactions after a timeout event indicated by one or more users. In at least one embodiment, information includes a state of a thread synchronization object, one or more users include computer program code, and one or more memory transactions are asynchronous memory transactions. In at least one embodiment, information includes a state of a thread synchronization object, one or more users include computer program code, and one or more memory transactions are asynchronous memory transactions between a first memory of a GPU and a second memory of GPU. In at least one embodiment, API is to receive a state of a synchronization object as an input. In at least one embodiment, API is to receive an identifier of a synchronization object as an input. In at least one embodiment, API is to provide information indicating a state of completion of one or more memory transactions. In at least one embodiment, one or more users are to perform other operations before a barrier event (e.g., a barrier completion event and/or a barrier phase change event) has been performed. In at least one embodiment, a non-transitory computer-readable medium having stored thereon a set of instructions, which if performed by one or more processors, cause one or more processors to perform one or more aspects of technique 1400.

Figure 15:
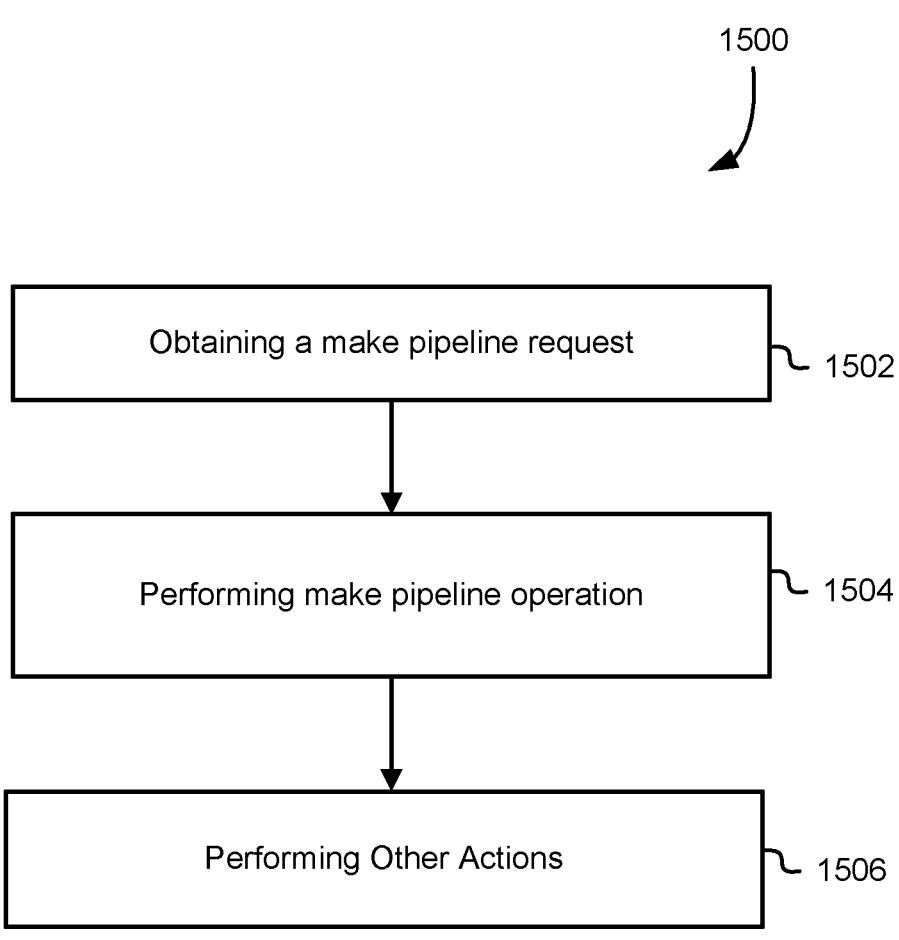
FIG. 15 is a flowchart of a technique of generating a pipeline to be used with manual transaction accounting, according to at least one embodiment.

FIG. 15 is a flowchart of a technique 1500 of generating a pipeline to be used with manual transaction accounting, according to at least one embodiment. In at least one embodiment, one or more aspects of technique 1500 are performed by one or more aspects shown or described with respect to FIG. 1 and/or FIG. 2 (e.g., CPU 104, PPU 106, API 108, compiler 112 of FIG. 1, make pipeline API 240, processor 204, compiler 224, processor 222, asynchronous data movement H/W 224, and/or synchronization H/W 226 of FIG. 2) and/or one or more components, techniques, and/or other aspects shown or described with respect to other figures herein. In at least one embodiment, technique 1500 includes performing one or more aspects of API 800 of FIG. 8. In at least one embodiment, at a block 1502, technique 1500 includes obtaining a make pipeline request (e.g., via an API such as make pipeline API 240 of FIG. 2). In at least one embodiment, at a block 1504, technique 1500 includes performing one or more make pipeline operations (e.g., performing make pipeline API 240 of FIG. 2 and/or API 800 of FIG. 8). In at least one embodiment, performing one or more make pipeline operations at block 1504 includes generating and/or creating a pipeline object to be used with manual transaction accounting. In at least one embodiment, at a block 1506, technique 1500 includes performing other actions.

In at least one embodiment, at least one aspect of technique 1500 includes performing an API (e.g., make pipeline API 240 of FIG. 2, API 800 of FIG. 8, and/or API 108 of FIG. 1) to cause one or more software objects to indicate whether one or more memory transactions have been performed. In at least one embodiment, one or more memory transactions are asynchronous memory transactions, and one or more software objects include a thread synchronization object to be used to perform manual transaction accounting. In at least one embodiment, one or more memory transactions are asynchronous memory transactions between a first memory of a GPU and a second memory of GPU, and one or more software objects include a pipeline object to be used to perform manual transaction accounting. In at least one embodiment, software object is to be used to perform manual transaction accounting of one or more memory transactions. In at least one embodiment, API is to receive an identifier of a group of threads to perform one or more memory transactions, a pointer to a state of that group of threads, and a number of threads in group that are involved in performing an asynchronous data movement operation as inputs. In at least one embodiment, one or more memory transactions are asynchronous memory transactions, one or more software objects include a thread synchronization object to be used to perform manual transaction accounting, and information of software object is to be accessible via one or more other APIs. In at least one embodiment, a non-transitory computer-readable medium having stored thereon a set of instructions, which if performed by one or more processors, cause one or more processors to perform one or more aspects of technique 1500.

Figure 16:
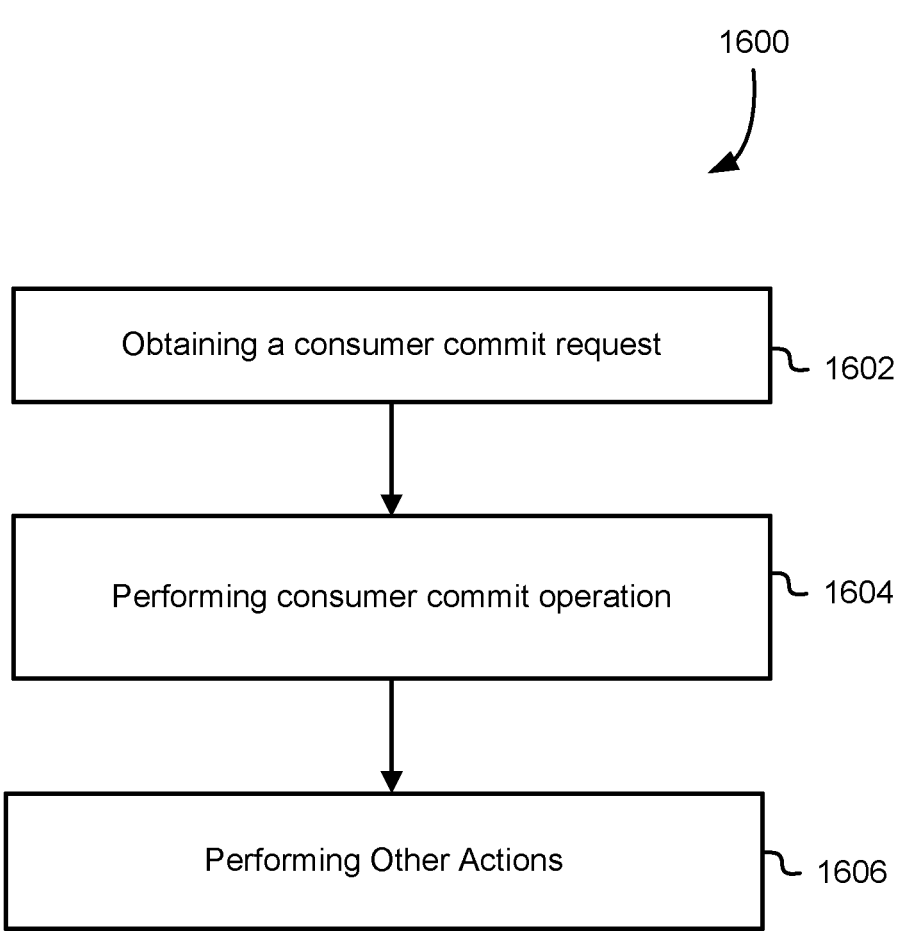
FIG. 16 is a flowchart of a technique of performing a consumer commit operation using a pipeline, according to at least one embodiment.

FIG. 16 is a flowchart of a technique 1600 of performing a consumer commit operation using a pipeline, according to at least one embodiment. In at least one embodiment, one or more aspects of technique 1600 are performed by one or more aspects shown or described with respect to FIG. 1 and/or FIG. 2 (e.g., CPU 104, PPU 106, API 108, compiler 112 of FIG. 1, consumer commit API 242, processor 204, compiler 224, processor 222, asynchronous data movement H/W 224, and/or synchronization H/W 226 of FIG. 2) and/or one or more components, techniques, and/or other aspects shown or described with respect to other figures herein. In at least one embodiment, technique 1600 includes performing one or more aspects of API 900 of FIG. 9. In at least one embodiment, at a block 1602, technique 1600 includes obtaining a consumer commit request (e.g., via an API such as consumer commit API 242 of FIG. 2). In at least one embodiment, at a block 1604, technique 1600 includes performing a consumer commit operation (e.g., performing consumer commit API 242 of FIG. 2 and/or API 900 of FIG. 9). In at least one embodiment, at a block 1606, technique 1600 includes performing other actions.

In at least one embodiment, at least one aspect of technique 1600 includes performing an API (e.g., consumer commit API 242 of FIG. 2, API 900 of FIG. 9, and/or API 108 of FIG. 1) to cause an amount of information to be accessed as a result of one or more memory transactions to be provided to one or more users. In at least one embodiment, one or more memory transactions are asynchronous memory transactions that include data movement operations, and API is to cause amount of information to be accessed to be provided by updating one or more synchronization objects. In at least one embodiment, one or more users includes a thread that is to use result (e.g., a consumer thread), where thread is to update a synchronization object (e.g., a pipeline object) using API. In at least one embodiment, one or more memory transactions include one or more asynchronous memory transactions. In at least one embodiment, information is to be accessed by moving information from a first type of memory of a GPU to a second type of memory of GPU. In at least one embodiment, amount of information to be accessed is to be specified using a transaction count. In at least one embodiment, a non-transitory computer-readable medium having stored thereon a set of instructions, which if performed by one or more processors, cause one or more processors to perform one or more aspects of technique 1600.

In at least one embodiment, one or more aspects shown or described with respect to FIGS. 1-16 are implemented based, at least in part, on one or more aspects described below and/or shown in figures described below.

In at least one embodiment, asynchronous thread execution synchronization (arrive/wait) and thread execution synchronization with asynchronous memory operations (transactions) are supported by SyncUnit barrier operations. In at least one embodiment, SyncUnit is synchronization hardware 116 of FIG. 1 and/or synchronization hardware 226 of FIG. 2. In at least one embodiment, SyncUnit barrier lifetime management (e.g., using CUDA exposure of SyncUnit barrier lifetime management) includes one or more of bootstrapping concurrent initialization of barrier objects, managing concurrent destruction of barrier objects, and/or ensuring validity of barrier objects in SyncUnit cache.

In at least one embodiment, SyncUnit capabilities include one or more of a capability to synchronize threads within a CUDA block cooperative thread array (CTA), a capability to synchronize threads within a CUDA cluster (GPC-CGA), and/or a capability to synchronize threads within a CUDA block (CTA) with asynchronous data transactions to shared memory of that CUDA block.

In at least one embodiment, an asynchronous data movement operation pattern includes manual (e.g., explicit) transaction accounting. In at least one embodiment, asynchronous data movement operation pattern includes multi-stage batching. In at least one embodiment, code manually performs transaction accounting.

In at least one embodiment, with respect to cluster execution, inter-CTA SyncUnit instructions require destination CTA and its shared memory to exist. In at least one embodiment, while CTAs of a cluster are guaranteed to be co-scheduled, a CTA within a cluster may begin executing before a peer CTA in same cluster has begun execution. In at least one embodiment, a cluster's CTAs synchronize prior to accessing peer CTA SyncUnit barriers to ensure that accessed barrier exists and has been initialized.

In at least one embodiment, with respect to cluster distributed shared memory, a SyncUnit barrier is backed by a cluster distributed shared memory (DSMEM) and is identified by that DSMEM address. In at least one embodiment, collective use of per-CTA SyncUnit barriers for cluster-wide thread execution and data transaction synchronization leverages symmetry of shared memory variables. In at least one embodiment, given a barrier variable declaration in shared memory, DSMEM address of that barrier in different CTAs in same Cluster differ only by CTA's rank within Cluster.

In at least one embodiment, cluster cooperative group (e.g., CUDA Cluster Cooperative Group) provides identification and synchronization of CTAs in Cluster and symmetry mapping of shared memory variable addresses among CTAs in Cluster. In at least one embodiment, with respect to reserved shared memory, declaration and at-start initialization of SyncUnit barriers in reserved shared memory is used. In at least one embodiment, with respect to memory model features, SyncUnit barrier bootstrap initialization uses initialization of a barrier before operation of that barrier. In at least one embodiment, a memory ordering relationship is defined to provide a latency-minimizing mechanism for SyncUnit barrier bootstrap initialization.

In at least one embodiment, with respect to a barrier (e.g., a cuda::barrier), each cuda::barrier object is constrained to be a single, unique location in memory. In at least one embodiment, barrier is not permitted to be implemented as a collective object with component parts residing in different locations in memory.

In at least one embodiment, one or more asynchronous data movement operations are to use an asynchronous transaction barrier. In at least one embodiment, an asynchronous transaction barrier is supported by GPU hardware that is to perform and/or track one or more asynchronous operations (e.g., a SyncUnit). In at least one embodiment, asynchronous transaction barrier has a state. In at least one embodiment, state of asynchronous transaction barrier is affected by a phase, an expected arrive count, a pending arrive count, and a transaction count.

In at least one embodiment, with respect to phase, an asynchronous transaction barrier progresses through a sequence of phases $\{0, 1, 2, \ldots\}$. In at least one embodiment, only parity of phase is observable. In at least one embodiment, with respect to expected arrive count, an asynchronous transaction barrier expects threads to explicitly perform a specified count of arrive-on operations within a given phase. In at least one embodiment, expected arrive count is limited to [1 . . . MaxArriveCount]. In at least one embodiment, expected arrive count may monotonically decrease over a lifetime of barrier. In at least one embodiment, pending arrive count is a count of pending explicit arrive-on operations within a given phase. In at least one embodiment, pending arrive count is limited to [0 . . . Expected Arrive Count]. In at least one embodiment, pending arrive count will monotonically decrease during a barrier phase and phase completion resets pending arrive count to expected arrive count. In at least one embodiment, transaction count is a difference between count of completed and expected asynchronous data movement transactions. In at least one embodiment, transaction count is limited to [MinTransactionCount . . . MaxTransactionCount]. In at least one embodiment, transaction count may vary between negative MinTransactionCount and positive MaxTransactionCount throughout a barrier phase. In at least one embodiment, with respect to an error (e.g., a locked error), when an invalid arrive or transaction count update is attempted on an asynchronous transaction barrier, SyncUnit hardware locks that barrier such that subsequent arrive or transaction count update attempts do not modify barrier, and such attempted operations may trigger an error.

In at least one embodiment, one or more operations apply to asynchronous transaction barrier. In at least one embodiment, operations include arrive-on, arrive-on-and-drop, expect-transaction, complete-transaction, complete-phase, wait-for-completion, initialization, primed initialization, and/or invalidation. In at least one embodiment, with respect to an arrive-on operation, a thread explicitly arrives on a barrier with an update count. In at least one embodiment, pending arrive count is atomically decreased by update count. In at least one embodiment, arrive-on operation may complete barrier phase. In at least one embodiment, within a given phase, pending arrive count monotonically decreases to zero at end of phase. In at least one embodiment, with respect to arrive-on-and-drop operation, an arrive-on operation has an option of reducing (dropping) expected arrive count. In at least one embodiment, both pending arrive count and expected arrive count are atomically decreased by update count. In at least one embodiment, arrive-on-and-drop operation may complete barrier phase.

In at least one embodiment, with respect to an expect-transaction operation, a thread explicitly and atomically increases a barrier's transaction count by an update count. In at least one embodiment, expect-transaction operation may complete barrier phase. In at least one embodiment, with respect to a complete-transaction operation, when an asynchronous data movement operation completes. it atomically decreases a barrier's transaction count by an update count. In at least one embodiment, expect-transaction operation may complete barrier phase.

In at least one embodiment, with respect to a complete-phase operation, when an arrive-on, arrive-on-and-drop, expect-transaction, or complete-transaction operation results in both barrier pending arrive count and transaction count to have zero values, complete-phase operation is automatically and atomically triggered. In at least one embodiment, complete-phase operation increments barrier phase (e.g., phase=phase+1) and resets pending arrive count to expected arrive count. In at least one embodiment, with respect to a wait-for-completion operation, a thread explicitly waits for current or previous barrier phase to complete. In at least one embodiment, when a thread waits for current phase to complete, it blocks until complete-phase occurs for that phase. In at least one embodiment, when a thread waits for previous phase to complete, it does not block. In at least one embodiment, wait for completion operation is via phase-parity and/or integer parity of phase.

In at least one embodiment, with respect to an initialization operation, a barrier is initialized with a count at beginning of phase zero. In at least one embodiment initialization includes setting following values:

```
Phase = 0
Expected Arrive Count = Count
Pending Arrive Count = Expected Arrive Count
Transaction Count = 0
```

In at least one embodiment, with respect to a primed initialization operation, a barrier's initialization can be "primed" to be between beginning and end of phase zero. In at least one embodiment, primed initialization specifies all three counts and defines a valid state. In at least one embodiment, primed initialization operation is not a publicly exposed operation. In at least one embodiment, primed initialization includes setting following values:

```
Phase = 0
Expected Arrive Count = Count
Pending Arrive Count = Pending Count; 0 <= Pending
Count <= Expected Arrive Count
Transaction Count = Expected Transaction Count;
0 <= Expected Transaction Count <= MaxTransactionCount
One or both of Pending Count and Expected Transaction
Count are greater than zero.
```

In at least one embodiment, with respect to an invalidation operation, a barrier's memory is explicitly invalidated prior to reuse within a CTA or Cluster. In at least one embodiment, barrier memory is automatically invalidated at end of a CTA's execution. In at least one embodiment, cuda::barrier<thread_scope_block> destructor is responsible for this invalidation operation.

In at least one embodiment, multiple threads participate in operation of a barrier. In at least one embodiment, a thread participates in operation of a barrier if it (1) performs an arrive-on, expect-transaction, or wait-for-completion operation, or (2) initiates an asynchronous data movement operation that results in a complete-transaction operation. In at least one embodiment, an asynchronous transaction barrier's state is initialized prior to arrive-on, expect-transaction, complete-transaction, or wait-for-completion operations. In at least one embodiment, a bootstrap initialization refers to a sequence of (1) initializing a barrier and (2) participating threads synchronizing with initializing operation. In at least one embodiment, while a barrier is intended to be an object through which participating threads synchronize, that barrier object cannot be used to synchronize with an initializing operation. In at least one embodiment, instead a different pre-existing means of synchronization is used (e.g., using another asynchronous transaction barrier or using a built-in barrier).

In at least one embodiment, with respect to synchronizing memory operations, given a barrier, participating threads in scope of barrier, and memory visible to those threads can be further illustrated as follows:

```
thread A performs a memory operation X
then thread A arrives-on barrier phase N
```

-continued

```
then thread B wait-for-completion of barrier phase N
then memory operation X is visible to thread B.
```

In at least one embodiment, synchronization hardware (e.g., SyncUnit) operations are asymmetric with respect to block and cluster thread scope. In at least one embodiment, a cuda::barrier<thread_scope_block> in shared memory can be arrived-on by a thread in same cluster, but wait is to be in same thread block. In at least one embodiment, one or more aspects of SyncUnit can be used with persistent GEMM and/or a convolution warp specialization kernel. In at least one embodiment, one or more aspects of SyncUnit can be used with a cluster-scope persistent kernel.

In at least one embodiment, a group of threads such as a cooperative thread array (CTA) or thread block uses an at-start primed initialization. In at least one embodiment, a CTA at-start initialization may involve a single thread or warp of a CTA performing one or more initialization operations and remaining warps of threads waiting for those operations to complete. In at least one embodiment, for this initialization synchronization, only warp or thread selected for initialization work needs to arrive on a barrier and all threads wait for barrier to complete. In at least one embodiment, in order for that barrier to be subsequently useable for CTA synchronization, it can be initialed in a primed state where only a selected warp or thread needs to arrive to complete phase 0. In at least one embodiment, at-start primed initialization includes initializing as:

```
expected arrive count = CTA size
pending arrive count = CTA size - 1
transaction count = 0
```

In at least one embodiment, selected thread performs its initialization work, arrives to complete phase 0 of barrier, and then waiting threads unblock initialization complete. In at least one embodiment, barrier is subsequently ready for use to synchronize entire CTA.

In at least one embodiment, SyncUnit does not have an explicit capability to flush outstanding operations. In at least one embodiment, software emulation is used for a SyncUnit flush operation. In at least one embodiment, emulation is limited to ordering SyncUnit operations within scope of CTA in which a SyncUnit barrier resides.

In at least one embodiment, barrier objects are initialized prior to first use by any participating thread (bootstrapping concurrent construction) and destroyed after last use by any participating thread (managing concurrent destruction). In at least one embodiment, barrier objects are declared in shared memory and updated by SyncUnit instructions in SyncUnit's cache. In at least one embodiment, updates to shared memory will not invalidate corresponding SyncUnit cache line. In at least one embodiment, barrier operations including construction and destruction manage object's status in cache.

In at least one embodiment, all SyncUnit barrier operations are available to threads in same CTA as barrier resides. In at least one embodiment, a limited number of SyncUnit barrier operations are available to threads in a different CTA than barrier resides. In at least one embodiment, barrier arrive and wait operations are exposed for self CTA. In at least one embodiment, barrier arrive-without-return operation is exposed for peer CTA. In at least one embodiment, arrive operations include explicit transaction updates. In at least one embodiment, interoperation of SyncUnit barriers and asynchronous data movement hardware features can be optimized by manually accounting for transaction updates. In at least one embodiment, this performance optimization uses exposed barrier transaction accounting for self and peer CTA, and observability of whether intended asynchronous data movement hardware is utilized. In at least one embodiment, SyncUnit also supports automatic transaction accounting for self and peer CTA using a software layer.

In at least one embodiment, bootstrap initialization of a SyncUnit barrier (1) initializes barrier value and (2) synchronizes threads which will participate in use of barrier. In at least one embodiment, bootstrap initialization of a SyncUnit barrier for use across a Cluster is:

```
// By one thread:
compute initValue
SYNCS.EXCH [bar], initValue, &wr=K;
// downstream sync; e.g., entire cluster:
UCGABAR_ARV &req=K;
UCGABAR_WAIT
```

In at least one embodiment, CGABAR is an example; any potentially synchronizing action has this scoreboard-dependency relationship.

In at least one embodiment, one or more SyncUnit operations are supported across CTAs within a Cluster. In at least one embodiment, these operations use DSMEM addressing to access SyncUnit barriers in both initiating thread's self-CTA shared memory and a peer-CTA's shared memory. In at least one embodiment, a SyncUnit operation to a peer-CTA SyncUnit barrier expects peer-CTA to have initialized that barrier prior to issuing operation. In at least one embodiment, SyncUnit barriers bootstrap initialization prior to first use: a thread issuing a SyncUnit operation first synchronizes with thread which has initialized barrier.

In at least one embodiment, UCGABAR facility, as exposed through CUDA cooperative groups, performs bootstrap initialization of at least first SyncUnit barrier. In at least one embodiment, this can be represented as follows:

```
auto cluster_group = this_cluster( );
cluster_group.sync( ); // Synchronize cluster via UCGABAR
```

In at least one embodiment, a peer-CTA's SyncUnit barrier address can be obtained by leveraging DSMEM symmetry. In at least one embodiment, given a self-CTA shared memory address, it is inexpensive to obtain corresponding address in peer-CTA shared memory.

In at least one embodiment, DSMEM addresses are mapped among Cluster CTAs through CUDA cooperative groups. In at least one embodiment, given DSMEM pointers 'ptrX' and 'ptrY', this includes querying Cluster rank of 'ptrX' and mapping 'ptrY' to that Cluster rank. In at least one embodiment, this can be represented as follows:

```
rank_in_cluster = cluster_group.query_shared_rank(ptrX);
ptrY_mapped = cluster_group.map_shared_rank(ptrY,
    rank_in_cluster);
```

In at least one embodiment, given DSMEM pointer 'ptrX' and bit mask of CTA ranks within that Cluster, generated a Cluster multicast pointer. In at least one embodiment, this can be represented as follows:

```
multi_ptr = cluster_group.map_shared_multicast(ptrX,
    cta_rank_mask);
```

In at least one embodiment, one or more APIs (e.g., CUDA APIs) for SyncUnit features are implemented with inline PTX which lower to one or more SASS instructions. In at least one embodiment, one or more 'C' style APIs provide a 'C' conformal API which are minimal wrappers for inline asm PTX instructions (e.g., using asm( ) function call).

In at least one embodiment, producer to consumer asynchronous data operations are tracked and synchronized with SyncUnit barriers residing in consumer CTA's shared memory. In at least one embodiment, asynchronous data operations (store and reduce) happen-before an accompanying update of a barrier's transaction count. In at least one embodiment, completion of a barrier phase occurs when simultaneously an expected number of thread arrivals has occurred, and transaction count is zero.

In at least one embodiment, when an asynchronous data operation completes a specified barrier's transaction count is increased by an operation-dependent amount. In at least one embodiment, within a given phase of barrier, threads decrease transaction count by a cumulatively equal amount. In at least one embodiment, transaction accounting is represented by:

$$0 = \sum_J threadExpectedTransactionCount_J -$$
$$\sum_K asyncOpCompletionTransactionCount_K$$

In at least one embodiment, in each phase all threads' transaction count updates happen before, or atomically happen when, last thread performs an arrive operation on barrier.

In at least one embodiment, a software layer (e.g., a CUDA software layer) includes automatic and manual transaction accounting approaches using one or more APIs. In at least one embodiment, in automatic transaction accounting approach, transaction counts are never exposed to user-developer. In at least one embodiment, this approach provides a user with a convenience of being unconcerned with when, how, and by how much transaction count is modified. In at least one embodiment, this convenience comes at an expense of CUDA software tracking counts and likely issuing more than a minimal number of transaction update instructions. In at least one embodiment, in manual transaction accounting approach, transaction counts are explicitly managed by user-developer (e.g., in application code). In at least one embodiment, this approach allows a user (e.g., application code) to issue a minimal number of transaction update instructions at an expense of having to be aware of how much transaction count is modified by each asynchronous data operation, accumulating that modification count, and manually issuing a transaction count update for that accumulated value.

In at least one embodiment, asynchronous data movement operations utilize GPU hardware features that implement those operations asynchronously. In at least one embodiment, for example, an asynchronous copy function (e.g., memcpy_async_tx of asynchronous copy API 230 of FIG. 2) is used such that a copy operation is submitted without blocking an invoking thread, and that copy operation progresses concurrently (asynchronously) with respect to invoking thread.

In at least one embodiment, asynchronous data movement operations have two contracts with a user: (1) a functional contract and (2) an intended performance contract. In at least one embodiment, functional contract is for data movement operation to be performed (e.g., memcpy_async_tx of asynchronous copy API 230 of FIG. 2 copies data to specified memory). In at least one embodiment, intended performance contract is that intended hardware feature is used, (e.g., operation uses asynchronous hardware according to its performance potential).

In at least one embodiment violation of functional contract results in an error observable in user's code. In at least one embodiment, violation of intended performance contract is weaker in that user is able to observe that intended hardware was not used according to its performance potential, but such an observation is an opt-in which can be ignored without functional error. In at least one embodiment, a test suite that uses intended performance contract observes whether application's data structures and algorithms utilize asynchronous data movement as intended. In at least one embodiment, such a test suite can provide targeted, early-warning to performance regressions without having to utilize sophisticated performance analysis tools.

In at least one embodiment, each asynchronous data operation update of a transaction count clearly specifies whether it performs automatic or manual accounting. In at least one embodiment, a consistent API pattern across a suite of operations is used. In at least one embodiment, an automatic accounting API pattern is used with respect to LDGSTS exposure. In at least one embodiment, API calls using this pattern can be represented as follows:

```
void memcpy_async( dst, src, shape, sync_obj );
void memcpy_async( group, dst, src, shape, sync_obj );
```

In at least one embodiment, if "conditions are right" with arguments, LDGSTS hardware is used, otherwise implementation has a fallback to use load-store hardware.

In at least one embodiment, an API pattern includes both observability of performance contract and option for exposed manual transaction accounting (e.g., in units of bytes). In at least one embodiment, one or more API patterns can be represented as follows:

```
AsyncContractFulfillment operation_async
( arguments . . . , sync_obj ); // automatic accounting
AsyncContractFulfillment operation_async
( group, arguments . . . , sync_obj ); // automatic
AsyncContractFulfillment operation_async_tx
( arguments . . . , sync_obj ); // manual accounting
AsyncContractFulfillment operation_async_tx
( group, arguments . . . , sync_obj ); // manual
```

In at least one embodiment, one or more of AsyncContractFulfillment type and AsyncContractFulfilled value can use some other suitable name. In at least one embodiment, AsyncContractFulfillment type can be a Boolean value, an enum, a struct, or some other suitable type. In at least one embodiment, AsyncContractFulfillment is a TrivialType that is EqualityComparable and small (e.g., 4 byte). In at least one embodiment, it can be checked for whether function was able to fulfill asynchronous performance contract by comparison with an AsyncContractFulfilled value. In at least one embodiment, a return anything other than AsyncContractFulfilled indicates intended asynchronous performance contract was not fully fulfilled, even while operation fulfilled functional contract. In at least one embodiment, AsyncContractFulfilled is a return value returned by asynchronous copy API 230 of FIG. 2, API 300 of FIG. 3 as asynchronous hardware use indicator of response 302, and/or by technique 1000 of FIG. 10.

In at least one embodiment, a return value other than AsyncContractFulfilled indicates that performance contract was not met. In at least one embodiment, return value can be one or more values with specifics of non-compliance. In at least one embodiment, when returned AsyncContractFulfillment value is not observed (is discarded) then inlined code which generated that value is expected to be elided.

In at least one embodiment, with respect to multicast, tensor memory accelerator (TMA) (e.g., asynchronous data movement hardware 114 of FIG. 1 and/or asynchronous data movement hardware 224 of FIG. 2) Bulk and TMA Tensor features include multicasting copy operations from global to shared memory. In at least one embodiment, an asynchronous copy multicasting to multiple destinations and potential 'sync_obj' is specified with a destination multi-pointer within this API pattern. In at least one embodiment, this is represented by following:

```
AsyncContractFulfillment memcpy_async( multi_dst_ptr, src, shape,
multi_sync_obj_ptr );
AsyncContractFulfillment memcpy_async( group, multi_dst_ptr, src,
shape, multi_sync_obj_ptr );
```

In at least one embodiment, with respect to manual accounting, asynchronous data movement hardware updates SyncUnit barrier transaction counts by a number of bytes moved, or some other suitable metric for data movement. In at least one embodiment, an operation_async_tx API has a functional contract to update a sync_obj by number of bytes moved and requires that application explicitly balance a transaction equation by this number of bytes. In at least one embodiment, number of bytes is either clearly present in function arguments, or easily obtained from function arguments such as by querying a number of bytes moved when using a TMA descriptor.

In at least one embodiment, a "_tx" suffix is used to indicate a manual transaction accounting variant of an API. In at least one embodiment, "tx" is used to represent "transaction accounting," as such using "_async_tx" to denote manual accounting vs. "_async" for automatic accounting. In at least one embodiment, some other suitable suffix is used (e.g., _txbytes, _bytestx, _bytes, or _bytex).

In at least one embodiment, with respect to inconsistencies in performance contract, an asynchronous operation function uses a non-asynchronous implementation if conditions are not right to use an asynchronous instruction. In at least one embodiment, a memcpy_async function uses LDGSTS if destination memory is shared, source memory is global, and shape has 4, 8, or 16 byte alignment. In at least one embodiment, transaction balancing equation used in transaction accounting is:

$$0 = \sum_J threadExpectedTransactionCount_J - \sum_K asyncOpCompletionTransactionCount_K$$

In at least one embodiment, with automatic accounting API, a use, or not, of an asynchronous instruction is transparent to user-developer. In at least one embodiment, if an asynchronous instruction is used then implementation automatically balances transaction count via one or more thread-ExpectedTransactionCount$_J$ contributions, and if a non-asynchronous instruction is used then balancing is not necessary.

In at least one embodiment, with manual accounting API, an implementation that does not use a byte-counted asynchronous operation patches up barrier's transaction count equation with one or more faux asycOpCompletionTransactionCount$_K$ contributions, which are contributions to this side of balance equation that are not generated from asynchronous data movement hardware. In at least one embodiment, one or more implementations include a fallback to load(LD)/store(ST) and use of ARRIVES.LDGSTSBAR which increments transaction count by one instead of number of bytes moved.

In at least one embodiment, an implementation which patches up transaction count, even when it is able to partially leverage asynchronous data movement hardware, returns a non-zero value to indicate that intended hardware was not used according to its performance potential. For example, if some asynchronous data movement operations to memory range could leverage hardware but leading or trailing range of memory had to fallback to LD/ST.

In at least one embodiment, a barrier (e.g., a CUDA barrier) specialization for a hardware unit (e.g., a SyncUnit) is barrier<thread_scope_block> residing in shared memory. In at least one embodiment, one or more techniques are to use SyncUnit hardware (HW) and APIs to perform transaction operations and inter-CTA arrive-on operations. In at least one embodiment, a pipeline (e.g., a CUDA pipeline) is to establish a spatial-temporal "pipeline network" among CTAs within a Cluster and option to perform manual transaction accounting.

In at least one embodiment, one or more pipeline specializations can be further illustrated as follows:

```
pipeline<thread_scope_cluster>
pipeline_tx<thread_scope_thread>
pipeline_tx<thread_scope_block>
pipeline_tx<thread_scope_cluster>
// Specialization to enable non-portable Cluster size
// or optimization for statically known small Cluster size
pipeline<thread_scope_cluster, MaxThreadBlocks>
```

In at least one embodiment, one or more techniques are to, at construction, specify via CTA-mask which CTAs of Cluster are participating and in what roles: are producer/consumer, producer-only, consumer-only.

In at least one embodiment, pipeline_tx<thread_scope_thread>, performs single thread synchronization and uses manual accounting via consumer commit. In at least one embodiment, manual accounting used by pipeline_tx<thread_scope_thread> is referred to as faux manual accounting. In at least one embodiment, pipeline_tx<thread_scope_thread>, does not use shared state in shared memory, does not use barriers, and/or is to sync TMA operations via UTMACMDFLUSH.

In at least one embodiment, pipeline_tx<thread_scope_block>, performs up to entire CTA synchronization. In at least one embodiment, pipeline_tx<thread_scope_block>, uses unified producer/consumer or warp-specialized split producer to consumer, uses manual transaction accounting via 'consumer_commit' (e.g., consumer commit API 242 of FIG. 2 and/or API 900 of FIG. 9), uses shared state in shared memory, and uses an array of barriers.

In at least one embodiment, pipeline_tx<thread_scope_cluster>, performs up to entire Cluster (GPC-CGA) synchronization. In at least one embodiment, pipeline_tx<thread_scope_cluster>, uses unified producer/consumer, warp-specialized split producer to consumer, and/or block-specialized split producer to consumer. In at least one embodiment, pipeline_tx<thread_scope_cluster>, uses manual transaction accounting via each consumer CTA invoking 'consumer_commit', uses symmetric shared state in distributed shared memory, and uses an array of barriers.

In at least one embodiment, pipeline<thread_scope_cluster, MaxThreadBlocks=8/*default portable size*/>, performs up to entire Cluster (GPC-CGA) synchronization. In at least one embodiment, pipeline<thread_scope_cluster, MaxThreadBlocks=8/*default portable size*/>, uses unified producer/consumer, warp-specialized split producer to consumer, and/or block-specialized split producer to consumer. In at least one embodiment, pipeline<thread_scope_cluster, MaxThreadBlocks=8/*default portable size*/>, uses automatic transaction accounting via 'producer_commit'. In at least one embodiment, pipeline<thread_scope_cluster, MaxThreadBlocks=8/*default portable size*/>, is used where each thread is to have an internal array of MaxBlocks integers to locally accumulate transaction updates for each CTA in Cluster. In at least one embodiment, pipeline<thread_scope_cluster, MaxThreadBlocks=8/*default portable size*/>, uses symmetric shared state in distributed shared memory, and uses an array of barriers.

In at least one embodiment, an atomic exchange (EXCH) operation sets an initial barrier value in SyncUnit cache with a shared memory address for backing storage. In at least one embodiment, SyncUnit EXCH operation is to use warp-wide uniform registers. In at least one embodiment, this can be further represented as follows:

```
// SASS
@up SYNCS.EXCH URz, [barAddr], value, &wr=K ;
```

In at least one embodiment, '@up' predicate selects which thread invokes EXCH instruction. In at least one embodiment, '&wr=K' write scoreboard is cleared when exchange is complete. In at least one embodiment, invoking thread's synchronization with participating threads is to '&req=K' this scoreboard. In at least one embodiment, a subsequent synchronization operation performed by this thread must require this scoreboard to indicate prior operations tracked by this scoreboard have completed.

In at least one embodiment, participating threads synchronize with initialization operation. In at least one embodiment, participating threads within a CTA synchronize as:

```
// SASS
@up SYNCS.EXCH URz, [barAddr], value, &wr=K ;
BAR.SYNC 0 &req=K
```

In at least one embodiment, a mechanism for participating threads at Cluster scope to synchronize is via a hardware barrier (e.g., a UCGABAR hardware barrier). In at least one embodiment, this can be further represented as follows:

```
SYNCS.EXCH URz, [barAddr], value &wr=K ;
UCGABAR_ARV &req=K ;
UCCGABAR_WAIT ;
```

In at least one embodiment, issue of cluster barrier arrive 'UCGABAR_ARV' is dependent upon completion of barrier initialization. In at least one embodiment, once initialization of any barriers is complete, cluster barrier wait 'UCGABAR_WAIT' unblocks.

In at least one embodiment, with respect to a limited need for memory ordering, SyncUnit barriers, and their backing shared memory, are not cached among CTAs within a Cluster; as such when bootstrap initialization uses UCGABAR{_ARV/_WAIT}, that barrier is ready for use by threads within Cluster and a MEMBAR is not needed. In at least one embodiment, one or more techniques use a particular exposure of UCGABAR_ARV that omits usually required MEMBAR.VC. In at least one embodiment, this approach provides one or more advantages over legacy techniques where conventional use of Cluster's UCGABAR{_ARV/_WAIT} requires at least a MEMBAR.VC to guarantee that arbitrary memory operations performed by a thread before arrive-on operations are visible to any other thread in Cluster after it performs wait operation.

In at least one embodiment, any potentially synchronizing operation such as BAR.SYNC, UCGABAR_ARV, ATOM, or ST-not-weak sequenced after a SYNCS.EXCH is an implicit memory order release of "SYNCS.EXCH . . . &wr=K;" operation. In at least one embodiment, those potentially synchronizing operations are not reordered before SYNCS.EXCH and perform "&req=K".

In at least one embodiment, with respect to permissible spurious failure to observe phase completion, barrier phase completion is observed by SYNCS.PHASECHK operations, which can observe ordering violations of arrive-on operations performed by threads within a Cluster. In at least one embodiment, a SYNCS.PHASECHK operation is permitted to spuriously fail by observing that phase has not changed when, according to memory operation ordering, phase should have changed. In at least one embodiment, duration of such a spurious failure is "brief" such that when a thread retries observation, correct phase change will soon be observed.

In at least one embodiment, with respect to SyncUnit flush emulation and non-public CAS/EXCH/LD, SyncUnit instructions issued within self-CTA where a SyncUnit barrier resides can be flushed with MEMBAR.CTA. In at least one embodiment, at Cluster scope, usage restrictions are imposed such that local-CTA flush via MEMBAR.CTA is sufficient. In at least one embodiment, a principle is to restrict publicly exposed usage such that violations of memory model ordering cannot be observed. In at least one embodiment, this can be further illustrated as follows:

| Thread 0 in CTA 0 with bar | Thread 1 in CTA 1 |
| --- | --- |
| SYNCS.opA [bar] | SYNCS.opB [bar] |
| UCGABAR_ARV/WAIT | |
| SYNCS.opX [bar] | SYNCS.opY [bar] |

In at least one embodiment, it cannot be observed opX or opY happening before opA or opB. In at least one embodiment, SYNCS instructions that can be issued by a peer-CTA are limited to arrive operations and instructions that can observe a barrier's state are limited to instructions that are issued by self-CTA. In at least one embodiment, it is sufficient to restrict usage of SYNCS instructions that can observe out of order peer-CTA arrive operations.

In at least one embodiment, with respect to non-public CAS/EXCH/LD, SYNCS CAS/EXCH/LD operations observe a complete state of a barrier. In at least one embodiment, these operations are restricted to non-public use. In at least one embodiment, a semi-exception is use of SYNCS.EXCH to initialize a barrier, in which case a prior state is known to be ignored.

In at least one embodiment, one or more PTX instructions are mapped to a SyncUnit barrier. In at least one embodiment, one or more PTX instructions cover SyncUnit barrier instructions. In at least one embodiment, one or more PTX instructions are implemented using an instruction set architecture (ISA) for MEMBAR, SYNCS, UCGABAR, and ARRIVES.

In at least one embodiment, a PTX instruction that covers a barrier cluster arrive can be represented as:

barrier.cluster.arrive;

Om at least one embodiment, PTX instruction is a barrier arrive with release semantics. In at least one embodiment, implementation includes MEMBAR.CTA, to release-fence SYNCS operations, MEMBAR.VC, to release-fence all other operations to Cluster (GPC) scope and UCGABAR_ARV, to arrive on barrier.

In at least one embodiment, a PTX instruction that covers a relaxed barrier cluster arrive can be represented as:

barrier.cluster.arrive.relaxed;

In at least one embodiment, PTX instruction is a barrier arrive without traditional "full" release-fence semantics. In at least one embodiment, implementation is limited to UCGABAR_ARV &req=K where &req=K is an implementation of dependency of this arrive operation on a specified set "S" of memory operations.

In at least one embodiment, a PTX instruction that covers a barrier arrive can be represented as:

mbarrier.arrive{.shared}.b64 state, [addr], count;

In at least one embodiment, PTX instruction uses self-CTA and appropriate memory ordering. In at least one embodiment, this PTX instruction is to be translated to a lower-level instruction (e.g., a SASS instruction) that can be represented as:

SYNCS.ARRIVE.TRANS64.OLDSTATE.ART0 state, [addr], count

In at least one embodiment, a PTX instruction that covers a barrier arrive can be represented as:

mbarrier.arrive{.shared}.b64_, [addr], count;

In at least one embodiment, PTX instruction is permitted by any CTA in Cluster. In at least one embodiment, PTX instruction uses appropriate memory ordering. In at least one embodiment, this PTX instruction is to be translated to a lower-level instruction (e.g., a SASS instruction) that can be represented as:

SYNCS.ARRIVE.TRANS64.RED.ART0 state, [addr], count

In at least one embodiment, a PTX arrive instruction to be used with manual transaction accounting can be represented as:

mbarrier.arrive.expect_tx{.shared}.b64 state, [addr], count;

In at least one embodiment, this instruction is to use self-CTA and appropriate memory ordering. In at least one embodiment, this instruction is to be translated to a lower-level instruction (e.g., a SASS instruction) that can be represented as:

SYNCS.ARRIVE.TRANS64.OLDSTATE.A1TR state, [addr], count

In at least one embodiment, another PTX arrive instruction to be used with manual transaction accounting can be represented as:

mbarrier.arrive.expect_tx{.shared}.b64_, [addr], count;

In at least one embodiment, this instruction is permitted by any CTA in Cluster and is to use appropriate memory ordering. In at least one embodiment, this instruction is to be translated to a lower-level instruction (e.g., a SASS instruction) that can be represented as:

SYNCS. ARRIVE.TRANS64.RED.A1TR Rz, [addr], count

In at least one embodiment, another PTX arrive instruction to be used with manual transaction accounting can be represented as:

mbarrier.expect_tx{.shared}.b64_, [addr], count;

In at least one embodiment, this instruction is permitted by any CTA in Cluster. In at least one embodiment, this instruction is to be translated to a lower-level instruction (e.g., a SASS instruction) that can be represented as:

SYNCS.ARRIVE.TRANS64.RED.A0TR Rz, [addr], count

In at least one embodiment, another PTX arrive instruction to be used with manual transaction accounting can be represented as:

mbarrier.arrive_drop{.shared}.b64_, [addr], count;

In at least one embodiment, this instruction is permitted by any CTA in Cluster and is to use appropriate memory ordering. In at least one embodiment, this PTX instruction is to be translated to a lower-level instruction (e.g., a SASS instruction) that can be represented as:

SYNCS.ARRIVE.TRANS64.RED.OPTOUT.ART0 state, [addr], count

In at least one embodiment, a PTX wait instruction to be used with manual transaction accounting can be represented as:

mbarrier.test_wait.parity{.shared}.b64 waitComplete, [addr], parity;

In at least one embodiment, this instruction is to use self-CTA. In at least one embodiment, this PTX instruction is to be translated to a lower-level instruction (e.g., a SASS instruction) that can be represented as:

SYNCS.PHASECHK.TRANS64.ONCE waitComplete, [addr], val where "val" is an appropriate encoded value from parity.

In at least one embodiment, another PTX wait instruction to be used with manual transaction accounting can be represented as:

mbarrier.try_wait.parity.shared.b64 waitComplete, [addr], parity;

In at least one embodiment, this instruction is to use self-CTA. In at least one embodiment, this PTX instruction is to be translated to a lower-level instruction (e.g., a SASS instruction) that can be represented as:

SYNCS.PHASECHK.TRANS64.TRYWAIT waitComplete, [addr], val where "val" is an appropriate encoded value from parity.

In at least one embodiment, another PTX wait instruction to be used with manual transaction accounting can be represented as:

mbarrier.try_wait.parity.shared.b64 waitComplete, [addr], parity, maxSleep;

In at least one embodiment, this instruction is to use self-CTA. In at least one embodiment, this PTX instruction is to be translated to one or more lower-level instructions (e.g., SASS instructions) that can be represented as:

```
SYNCS.PHASECHK.TRANS64.TRYWAIT waitComplete, [addr], val;
@!waitComplete NANOSLEEP.SYNCS maxSleep;
@!waitComplete SYNCS.PHASECHK.TRANS64.TRYWAIT
waitComplete, [addr], val;
```

In at least one embodiment, a PTX asynchronous copy instruction that uses a barrier, to be used with manual transaction accounting, can be represented as:

cp.async.mbarrier.tx{.shared}.b64 [addr];

In at least one embodiment, this instruction is to perform an unbalanced transaction on barrier. In at least one embodiment, this PTX instruction is to be translated to a lower-level instruction (e.g., a SASS instruction) that can be represented as:

ARRIVES.LDGSTSBAR.64.TRANSCNT [addr]

In at least one embodiment, a PTX barrier instruction to be used with manual transaction accounting can be represented as:

mbarrier.tx{.shared}.b64_, [addr], count;

In at least one embodiment, this instruction is to be used inline-asm-PTX to support emulating an asynchronous data operation's update of a barrier, with that emulation also referred to as an artificial async-op transaction update. In at least one embodiment, this instruction is permitted by any CTA in Cluster. In at least one embodiment, this PTX instruction is to be translated to a lower-level instruction (e.g., a SASS instruction) that can be represented as:

SYNCS.ARRIVE.TRANS64.RED.A0TX Rz, [addr], count

In at least one embodiment, one or more techniques are to use one or more C-Style APIs. In at least one embodiment, commented sections show corresponding PTX instructions to be used in various conditions. In at least one embodiment, intent is when function arguments have literal values, such as 0 for txCount, that compiler will elide implementation's if-else-if blocks to statically determined clause. In at least one embodiment, a C-style API to be used in an arrival at a barrier, and that returns a token (e.g., barrier arrive API 234 of FIG. 2 and/or API 500 of FIG. 5), can be represented as follows:

```
__mbarrier_token_t__mbarrier_arrive_tx(__mbarrier_t* bar,
uint32_t arvCount, uint32_t txCount);
    // if( 0 == txCount )
    //    PTX: mbarrier.arrive token, [bar], arvCount;
    // else if ( 1 == arvCount )
    //    PTX: mbarrier.arrive.expect_tx token, [bar], txCount;
    // else {
    //    PTX: mbarrier.expect_tx _,[bar],txCount;
    //    PTX: mbarrier.arrive token,[bar],arvCount;
    // }
```

In at least one embodiment, a C-style API to be used in an arrival at a barrier, and that does not return a token (e.g., tokenless barrier arrive API 232 of FIG. 2 and/or API 400 of FIG. 4), can be represented as follows:

```
void __mbarrier_notoken_arrive_tx( mbarrier_t* bar,
uint32_t arvCount, uint32_t txCount);
    // if( 0 == txCount )
    //    PTX: mbarrier.arrive _, [bar], arvCount;
    // else if ( 1 == arvCount )
    //    PTX: mbarrier.arrive.expect_tx _, [bar], txCount;
```

-continued

```
// else {
//   PTX: mbarrier.expect_tx _,[bar],txCount;
//   PTX: mbarrier.arrive _,[bar],arvCount;
// }
```

In at least one embodiment, a C-style API to be used as a wait call at a barrier can be represented as follows:

```
bool __mbarrier_test_wait_parity(__mbarrier_t* bar, bool
phase_parity);
// PTX: mbarrier.test_wait.parity flag,[bar],phase_parity;
```

In at least one embodiment, another C-style API to be used as a wait call at a barrier (e.g., delayed wait API 238 of FIG. 2 and/or API 700 of FIG. 7), can be represented as follows:

```
bool __mbarrier_try_wait_parity( __mbarrier_t* bar, bool phase_parity,
uint32_t maxSleepNanosec );
// PTX: mbarrier.try_wait.parity flag,[bar],phase_parity,maxSleepNanosec;
```

In at least one embodiment, one or more techniques perform one or more operations with respect to a barrier (e.g., a CUDA Barrier) utilizing synchronization hardware (e.g., a SyncUnit). In at least one embodiment, a cuda:: barrier<thread_scope_block> specialization for objects residing in a CTA's shared memory uses SyncUnit features from participating threads in Cluster containing that CTA. In at least one embodiment, one or more operations are restricted to participating threads residing in same CTA as barrier object. In at least one embodiment, one or more techniques use one or more of two kinds of extensions: (1) Functional extension for waiting via phase parity and arriving with transaction balance; (2) Constraint extension for operations that can be performed by threads in peer CTA in Cluster (e.g., operations that are exceptions to normal thread_scope participation rules).

In at least one embodiment, with respect to an extension of barrier<thread_scope_block> objects in shared memory, non-static member functions expect to be invoked by threads that reside in same thread_scope_block as shared memory in which barrier object resides. In at least one embodiment, non-member functions that act upon barrier<thread_scope_block> objects may be invoked by threads that reside in same thread_scope_cluster as distributed shared memory in which barrier object resides.

In at least one embodiment, one or more aspects of barrier<thread_scope_block> can be further described with respect to following:

```
template<>
class barrier<thread_scope_block> {
public:
    static constexpr ptrdiff_t max( );
    friend void init( barrier *, ptrdiff_t );
    using arrival_token = /* implementation defined */ ;
    [[nodiscard]] __host__ __device__ arrival_token arrive(
ptrdiff_t = 1 );
    __host__ __device__ void wait( arrival_token && ) const ;
    __host__ __device__ void arrive_and_wait( );
    __host__ __device__ void arrive_and_drop( ptrdiff_t );
```

-continued

```
/* added functions */
template<class Rep, class Period>
__host__ __device__
[[nodiscard]] bool try_wait_for( arrival_token && , const
chrono::duration<Rep, Period>& );
template<class Clock, class Duration>
__host__ __device__
[[nodiscard]] bool try_wait_until( arrival_token && , const
chrono::time_point<Clock, Duration>& );
__host__ __device__
[[nodiscard]] arrival_token arrive_tx( ptrdiff_t arrive_count , ptrdiff_t
expect_tx_count );
__host__ __device__
void wait_parity( bool phase_parity ) const;
template<class Rep, class Period>
__host__ __device__
[[nodiscard]] bool try_wait parity_for( bool phase_parity , const
chrono::duration<Rep, Period>& );
template<class Clock, class Duration>
__host__ __device__
[[nodiscard]] bool try_wait_parity_until( bool phase_parity , const
chrono::time_point<Clock, Duration>& );
friend void barrier_arrive( barrier & , ptrdiff_t arrive_count );
friend void barrier_arrive_tx( barrier &, ptrdiff_t arrive_count, ptrdiff_t
expect_tx_count );
};
```

In at least one embodiment, one or more aspects referred to as expects contracts are for barrier<thread_scope_block> specializations for barriers that reside in distributed shared memory. In at least one embodiment, in this context, a term referred to as, "expects" clarifies whether memory is CTA-local (PTX isspacep.shared::cta, CUDA_isShared) or Cluster-distributed (PTX isspacep.shared::cluster).

In at least one embodiment, with respect to a barrier arrive, asynchronous data operations use manual transaction accounting where kernel code that calls barrier arrive function is to accumulate transaction counts and apply accumulated count to balance barrier. In at least one embodiment, a member function (e.g., a CUDA-extension member function) is to arrive with both an arrive count and expected transaction count update. In at least one embodiment, barrier arrive is further explained with respect to following:

```
barrier<thread_scope_block>::arrival_token
barrier<thread_scope_block>::arrive_tx( ptrdiff_t arrive_count,
ptrdiff_t expect_tx_count );
    Expects __isShared(this), arrive_count and expect_tx_count are non-
negative.
    Implementation invokes PTX:
    if ( arrive_count == 1 ) { /* special fused barrier update */
        mbarrier.arrive.expect_tx token, [&bar], expect_tx_count;
    }
    else {
        if ( expect_tx_count ) mbarrier.expect_tx [&bar], expect_tx_count;
        if ( arrive_count ) mbarrier.arrive token, [&bar], arrive_count;
    }
```

In at least one embodiment, SyncUnit is to output a token for isspacep.shared::cta.

In at least one embodiment, with respect to a barrier wait via phase parity, barrier wait is further explained with respect to following:

```
    void barrier<thread_scope_block>::wait_parity( bool phase_parity );
        template<class Rep, class Period>
        [[nodiscard]] bool barrier<thread_scope_block>::wait_parity
try_wait_parity_for(bool phase_parity , const chrono::duration<Rep,
Period>& );
        template<class Clock, class Duration>
        [[nodiscard]] bool barrier<thread_scope_block>::wait_parity
try_wait_parity_until(bool phase_parity , const chrono::time_point<Clock,
Duration>& );
            Expects __isShared(this).
            When duration == 0 then invoke PTX:
            mbarrier.test_wait.parity waitComplete, [this], phase_parity ;
            Otherwise, place within a wait-until-complete loop implementation
invokes PTX:
            mbarrier.try_wait.parity waitComplete, [this], phase_parity,
maxSleep ;
```

In at least one embodiment, PTX instruction has an efficient/fast wake-up built-in waiting mechanism. In at least one embodiment, built-in mechanism waits up to maxSleep for completion. In at least one embodiment, mechanism may spuriously wait up before maxSleep and with waitComplete=false. In at least one embodiment, outer wait-until-complete uses maxSleep to implement an exponential backoff scheme.

In at least one embodiment, a CUDA barrier of thread_scope_block in a CTA's shared memory can be arrived on and used to synchronize asynchronous data operations issued by a peer CTA within same Cluster. In at least one embodiment, peer CTA is given an address of destination barrier. In a least one embodiment, when used by a peer CTA, arrive operation cannot return a valid token and wait operation is unavailable. In at least one embodiment, all other operations are performed by threads within same thread_scope. In at least one embodiment, these operations have an exception in that they may be invoked by threads within same Cluster even when not within same thread_scope_block. In at least one embodiment, these operations do not introduce barrier-update data races when invoked by any thread within a Cluster on any barrier object defined within a CTA of that Cluster's shared memory. In at least one embodiment, bootstrap initialization of such a barrier includes synchronization at Cluster scope instead of just CTA scope to guarantee barrier is initialized before first use. In at least one embodiment, barrier arrive using manual transaction accounting can be further illustrated as follows:

```
    __host__ __device__
    void barrier_arrive_tx( barrier<thread_scope_block> & bar,
        ptrdiff_t arrive_count, ptrdiff_t expect_tx_count );
    Expects (PTX) isspacep.shared::cluster [this], arrive_count and
expect_tx_count are non-negative.
```

Pseudo code reflecting runtime logic and invocation of PTX:

```
    if ( arrive_count == 1 ) { /* special fused barrier update */
        mbarrier.arrive.expect_tx _, [&bar], expect_tx_count;
    }
    else {
        if ( expect_tx_count ) mbarrier.expect_tx [&bar], expect_tx_count;
        if ( arrive_count ) mbarrier.arrive _, [&bar], arrive_count;
    }
```

In at least one embodiment, with respect to LDGSTS usage and automatic accounting, one or more operations are to return AsyncContractFillfilled when copy operation fully accomplished with LDGSTS, otherwise return a value != AsyncContractFillfilled. In at least one embodiment, this can be further illustrated as follows:

```
    template< class T, class Shape >
    __host__ __device__
    AsyncContractFulfillment memcpy_async( T*dst, const T*src, Shape
shape, barrier<thread_scope_block> & sync );
```

In at least one embodiment, when _isShared (&sync), _isShared(dst), _isGlobal(src), and appropriate size and alignment of dst and src use LDGSTS. In at least one embodiment, depending upon size and alignment maps to UBLKCP.S.G instead of LDGSTS. In at least one embodiment, after issuing one or more LDGSTS uses self-balancing instruction, which increments transaction count and upon LDGSTS completion decrements transaction count. In at least one embodiment, implementation invokes PTX:

```
        cp.async.shared.global . . . ; // as many LDGSTS as
        required to cover shape
        cp.async.mbarrier. arrive [&sync];
```

In at least one embodiment, with respect to LDGSTS usage and manual transaction accounting, one or more operations can be further illustrated as follows:

```
        template< class T, class Shape >
        __host__ __device__
        AsyncContractFulfillment memcpy_async_tx( T*dst, const T*src, Shape
shape, barrier<thread_scope_block> & sync );
```

In at least one embodiment, when _isShared (&sync), _isShared(dst), _isGlobal(src), and appropriate size and alignment of dst and src use LDGSTS. In at least one embodiment, depending upon size and alignment maps to UBLKCP.S.G instead of LDGSTS, see TMA Bulk PLC. In at least one embodiment, maps to UBLKCP.S.G instead of LDGSTS depending upon size and alignment. In at least one embodiment, after issuing one or more LDGSTS, use non-balancing instruction, which upon LDGSTS completion decrements transaction count. In at least one embodiment, issue faux-transaction count update so that subsequent manual balancing has units of bytes. In at least one embodiment, implementation invokes PTX:

```
        cp.async.shared.global ... ; // as many LDGSTS as required to cover shape
        cp.async.mbarrier.tx [&sync];
        mbarrier.tx [&sync], (shape−1);
```

In at least one embodiment, return a value !=AsyncContractFillfilled. In at least one embodiment, this copy operation was not performed purely via LDGSTS.

In at least one embodiment, one or more techniques perform one or more operations with respect to a pipeline (e.g., a CUDA Pipeline) utilizing synchronization hardware (e.g., a SyncUnit. In at least one embodiment, one or more techniques are to perform manual transaction accounting based, at least in part, on a consumer commit API and/or consumer commit operation. In at least one embodiment, pipeline pattern and its operations are optimized through manual transaction accounting where instead of all producer threads accumulating and committing transaction counts (e.g., using automatic transaction accounting), only one selected consumer thread in each consuming CTA commits total count. In at least one embodiment, this optimization replaces all producer to consumer transaction accumulation (e.g., used in automatic transaction accounting) and many SYNCS.ARRIVE operations with a single consumer-invoked SYNCS.ARRIVE operation. In at least one embodiment, this is further illustrated as follows:

```
                                sequence: tail = head = 0
while ( iterating ) {
  if ( ProducerThread ) {
    pipe.producer_acquire( );       Collectively acquire stage = head++
    operation_async_tx(args...,pipe); Submit 0+ async-copy-transaction to stage
                                    = head }
  else { /* ConsumerThread */
    if ( selected_thread_per_CTA ) { One thread commit manually accounted
      pipe.consumer_commit(txbytes);  transaction count
    }
    pipe.consumer_wait( );          Collectively wait for stage = tail to
                                    complete
                                    Collectively compute on memory
                                    copied in stage = tail
    pipe.consumer_release( );       Collectively release stage = tail ; ++tail ;
  }
}
```

In at least one embodiment, a pipeline at cluster scope defines an all-to-all spatial-temporal pipeline network where any thread may submit asynchronous operations to any CTA within cluster. In at least one embodiment, this submission includes TMA multicast operations. In at least one embodiment, transaction accounting/balancing is still performed within each CTA. In at least one embodiment, for manual accounting, each consumer CTA is to know asynchronous transaction bytes that CTA received and, consumer_commit that value.

In at least one embodiment, a pipeline_tx API uses a 'consumer_commit' in API (e.g., consumer commit API 242 of FIG. 2 and/or API 900 of FIG. 9) for manual transaction accounting. In at least one embodiment, pipeline_tx implementation leverages SyncUnit functionality and interoperates with TMA functionality. In at least one embodiment, in addition to asynchronous GMEM to SMEM memory movement, TMA provides a capability to asynchronously move memory from SMEM to GMEM. In at least one embodiment, for this feature, pipeline implementation is enhanced to wait for SMEM read completion, allowing SMEM to be safely reused even if corresponding GMEM updates have not completed. In at least one embodiment, one or more aspects of using one or more pipeline APIs with manual transaction accounting can be further illustrated as follows:

```
namespace cuda {   inline namespace CUDA_ABI_VERSION {
enum thread_scope {
   thread_scope_system,
   thread_scope_device,
   thread_scope_cluster /* *NEW* */,
   thread_scope_block,
   thread_scope_thread
};
template< thread_scope Sco,
unsigned MaxBlocks = Sco == thread_scope_cluster ? DefaultMaxBlocksPerCluster :
1 > >
   class pipeline ;
   template< thread_scope Sco >
   class pipeline_tx ;
   template< thread_scope Sco, unsigned numStage>
   using pipeline_shared_state = /* implementation defined */ ;
   /* collective construction */
   pipeline<thread_scope_thread> make_pipeline( );
   template< class Group, thread_scope Sco, unsigned numStage>
   __host__ __device__
   pipeline<Sco> make_pipeline( const Group &,
pipeline_shared_state<Sco,NumStage> * );
   template< class Group, thread_scope Sco, unsigned numStage>
   __host__ __device__
   pipeline_tx<Sco> make_pipeline_tx( const Group &,
pipeline_shared_state<Sco,NumStage> * );
   template< class Group, thread_scope Sco, unsigned numStage>
   __host__ __device__
   pipeline<Sco>
   make_pipeline( const Group &, pipeline_shared_state<Sco,NumStage> *, size_t
producer_count );
   template< class Group, thread_scope Sco, unsigned numStage>
   __host__ __device__
   pipeline_tx<Sco>
   make_pipeline_tx( const Group &, pipeline_shared_state<Sco,NumStage> *, size_t
producer_count );
   enum class pipeline_role { producer, consumer };
   template< class Group, thread_scope Sco, unsigned numStage>
   __host__ __device__
   pipeline<Sco>
   make_pipeline( const Group &, pipeline_shared_state<Sco,NumStage> *,
pipeline_role role );
```

-continued

```
template< class Group, thread_scope Sco, unsigned numStage>
__host__ __device__
pipeline_tx<Sco>
make_pipeline_tx( const Group &, pipeline_shared_state<Sco,NumStage> *,
pipeline_role role );
  /* class pipeline */
  template< thread_scope Sco, unsigned MaxBlocks >
  class pipeline {
  public:
    /* construction/destruction operations */
    pipeline( const pipeline & ) = delete;
    pipeline & operator=( pipeline && ) = delete;
    pipeline & operator=( const pipeline & ) = delete;
    pipeline( pipeline && );
    template<unsigned M> pipline( pipeline<Sco,M> &&);
    __host__ __device__ ~pipeline( );
    __host__ __device__ bool quit( );
    /* producer operations */
    __host__ __device__ void producer_acquire( );
    __host__ __device__ void producer_commit( );
    /* consumer operations */
    __host__ __device__ void consumer_wait( );
    __host__ __device__ void consumer_release( );
    template<class Rep, class Period>
    __host__ __device__
    bool consumer_wait_for( const chrono::duration<Rep,Period> &);
    template<class Clock, class Duration>
    __host__ __device__
    bool consumer_wait_until( const chrono::time_point<Clock, Duration> const&
abs_time);
  private:
    int tail, head, txCnt[MaxBlocks] ; /* exposition only */
  };
  template< thread_scope Sco >
  class pipeline_tx {
  public:
    /* construction/destruction operations */
    pipeline_tx( const pipeline & ) = delete;
    pipeline_tx & operator=( pipeline_tx && ) = delete;
    pipeline_tx & operator=( const pipeline_tx & ) = delete;
    pipeline_tx( pipeline_tx && ) = default ;
    __host__ __device__ ~pipeline_tx( );
    __host__ __device__ bool quit( );
    /* producer operations */
    __host__ __device__ void producer_acquire( );
    __host__ __device__ void producer_consu( );
    /* consumer operations */
    __host__ __device__ void consumer_commit( ptrdiff_t expect_tx );
    __host__ __device__ void consumer_wait( );
    __host__ __device__ void consumer_release( );
    template<class Rep, class Period>
    __host__ __device__
    bool consumer_wait_for( const chrono::duration<Rep,Period> &);
    template<class Clock, class Duration>
    __host__ __device__
    bool consumer_wait_until( const chrono::time_point<Clock, Duration> const&
abs_time);
  private:
    int tail, head ; /* exposition only */
  };
  /* single-thread specializations */
  template<unsigned Nth>
  __host__ __device__
  void pipeline_consumer_wait_prior( pipeline<thread_scope_thread> & );
  template< thread_scope Sco >
  __host__ __device__
  void pipeline_producer_commit( pipeline<thread_scope_thread> & , barrier<Sco> &
);
  }}
```

In at least one embodiment, with respect to pipeline MaxBlocks template parameter and Cluster MaxBlocks, for pipeline that is not thread_scope_cluster, maximum number of blocks is one, any other value is irrelevant. In at least one embodiment, a Cluster has a maximum portable block size of eight. In at least one embodiment, an application may explicitly opt-out of this maximum and use a non-portable larger size, or may use a smaller size. In at least one embodiment, in addition, an application may set a kernel attribute with a statically defined size or upper bound. In at least one embodiment, this is further illustrated as follows:

```
__launch_bounds__(maxThreadsPerBlock,
minBlocksPerMultiprocessor, maxBlocksPerCluster)
__cudaAttrClusterDimSpec__(numBlocksPerCluster,1,1)
```

In at least one embodiment, if an application opts-out of portable maximum cluster size, it should declare a launch bounds with maxBlocksPerCluster. In at least one embodiment, when launch bounds or dimension attributes are used, that value should also be provided to pipeline<thread_scope_cluster,MaxBlocks> instantiation through Max-Blocks template parameter.

In at least one embodiment, with respect to collective construction cluster scope, collective construction of pipeline<thread_scope_cluster,MaxBlocks> uses a Cluster-symmetric set of a pipeline_shared_state<thread_scope_cluster,NumStages> objects residing in shared memory of participating CTAs. In at least one embodiment, DSMEM addresses of these objects have following relationship:

```
auto cg = cooperative_groups.this_cluster( );
ptrPeerState = cg.map_shared_rank( &state, peer_rank );
// is same DSMEM ptrPeerState pointer value for any CTA in Cluster
```

In at least one embodiment, when state is a statically declared shared memory variable, Cluster-symmetry is guaranteed. In at least one embodiment, when state resides in dynamic shared memory, then kernel developer is to satisfy this condition (e.g., in kernel code). In at least one embodiment, cluster-symmetric pipeline_shared_state objects is used for TMA multicast operations and implicit determination of address of peer-CTA's asynchronous transaction barriers. In at least one embodiment, this is further illustrated as follows:

```
__shared__ pipeline_shared_state<thread_scope_cluster,NumStages>
state ;
auto pipe = make_pipeline_tx( cooperative_groups::this_cluster( ),
&state );
```

In at least one embodiment, implementation can leverage bootstrap initialization by initializing self-CTA barriers directly with 'mbarrier.init.shared' and synchronizing cluster with 'barrier.cluster.arrive.relaxed' and 'barrier.cluster.wait'. In at least one embodiment, make_pipeline_tx (e.g., of make pipeline API 240 of FIG. 2 and/or API 900 of FIG. 9) creation operation returns a pipeline object which references a pipeline shared state when scope is not thread_scope_thread. In at least one embodiment, this temporary returned pipeline object is moved to pipeline object declared in a thread. In at least one embodiment, this is further illustrated as follows:

pipeline_tx(pipeline_tx &&);

In at least one embodiment, with respect to asynchronous operation transaction accounting, for pipeline<thread_scope_block> and pipeline<thread_scope_cluster> and LDGSTS automatic accounting, memcpy_async API lowers to issuing LDGSTS when destination is shared, source is global, trivially copyable data type of appropriate size, and properly aligned data. In at least one embodiment, this can be further illustrated as follows:

```
template< class T, class Shape, thread_scope Sco, unsigned
MaxBlocks >
__host__ __device__
AsyncContractFulfillment memcpy_async( T*dst, const T*src, Shape
shape, pipeline<Sco,MaxBlocks> & pipe );
```

In at least one embodiment, this uses _isShared (dst), _isGlobal(src), and appropriate size and alignment. In at least one embodiment, maps to UBLKCP.S.G instead of LDGSTS. In at least one embodiment, when one or more LDGSTS is issued then update:

pipe.txCnt[0]|=01;

to track that at least one LDGSTS was issued and is to be balanced in commit. In at least one embodiment, return AsyncContractFulfilled if copy operation fully implemented with LDGSTS, otherwise return value !=AsyncContractFulfilled.

In at least one embodiment, with respect to LDGSTS manual accounting, one or more aspects can be further illustrated as follows:

```
template< class T, class Shape, thread_scope Sco >
__host__ __device__
AsyncContractFulfillment memcpy_async_tx( T*dst, const T*src,
Shape shape, pipeline_tx<Sco> & sync );
```

In at least one embodiment, this uses _isShared (dst), _isGlobal(src), and appropriate size and alignment. In at least one embodiment, maps to UBLKCP.S.G instead of LDGSTS. In at least one embodiment, after issuing one or more LDGSTS use non-balancing instruction, which upon LDGSTS completion decrements transaction count. In at least one embodiment, also issue faux-transaction count update so that subsequent manual balancing has units of bytes. In at least one embodiment, one or more aspects can be further illustrated as follows:

```
cp.async.mbarrier.tx [this->barArray + this->tail];
mbarrier.tx [this->barArray + this->tail], (shape-1);
Return value != AsyncContractFulfilled.
```

In at least one embodiment, with respect to STAS, REDAS, UBLK*, and/or UTMA* manual accounting, when a producer performs an asynchronous memory operation it does not update transaction count corresponding to consumer CTA. In at least one embodiment, an STS asynchronous store to a peer CTA's shared memory at 'ptrDst' using pipeline network as follows:

```
dstCtaRank = __query_cluster_shared_rank( ptrDst );
/* requires Cluster-symmetric pipeline_shared_state objects: */
ptrBar = __map_cluster_shared_rank( this->barArray + this->head ,
dstCtaRank );
st.async.size [ptrBar], [ptrDst], value ;
```

In at least one embodiment, with respect to consumer commit, manual accounting, pipeline_tx<thread_scope_block>, and pipeline_tx<thread_scope_cluster>, consumer_commit member function is invoked once per consumer block per pipeline stage to manually account for manually accounted asynchronous transactions submitted to that block. In at least one embodiment, this can be further illustrated as follows:

```
void pipeline_tx<thread_scope_cluster>::consumer_commit( ptrdiff_t
expect_tx );
void pipeline_tx<thread_scope_block>::consumer_commit( ptrdiff_t
expect_tx );
ptrBar = this->barArray + this->tail ;
mbarrier.arrive.expect_tx.shared.64 _, [ptrBar], expect_tx ;
```

In at least one embodiment, with respect to consumer wait, pipeline<thread_scope_block>, and pipeline<thread_scope_cluster>, for SyncUnit barriers, wait can use a more efficient trywait operation. In at least one embodiment, this can be further illustrated as follows:

```
template<class Rep, class Period>
__host__ __device__
bool pipeline_tx<thread_scope_block>
    ::consumer_wait_for( const chrono::duration<Rep,Period> &
    maxDelay);
```

In at least one embodiment, 'maxDelay' argument specifies a maximum duration for which pipeline consumer should wait for completion of pipeline state. In at least one embodiment, consumer_wait_for function returns 'true' as soon as consumer can observe stage to be complete. In at least one embodiment, if 'maxDelay' has transpired and stage is not complete, then consumer_wait_for function returns false.

In at least one embodiment, implementation is remapped to use:

```
ptrBar = this->barArray + this->tail ;
// while waiting for duration hint:
mbarrier.try_wait.parity.b64 waitComplete, [ptrBar], parity,
maxDelayPartial;
``` where maxDelayPartial is determined with an attempt to satisfy input maxDelay duration. In at least one embodiment, consumer_wait_for retains wait-loop as actual delay in a failed-to-complete try_wait that may be shorter duration than maxDelayPartial. In at least one embodiment, when maxDelayPartial has a statically known zero value, underlying implementation can have lower latency.

In at least one embodiment, with respect to producer acquire and shared memory read completion, when using a TMA Bulk or TMA Tensor operation that reads from local CTA shared share memory and writes to either global memory or peer CTA shared memory, and that operation was committed by this thread's producer_commit, producer acquire operation is enhanced to wait for those TMA operations to complete their shared memory reads.

In at least one embodiment, one or more technique are to use a barrier (e.g., CUDA Barrier) fallback when not using synchronization hardware (e.g., SyncUnit). In at least one embodiment, for cuda::barrier specializations other than for cuda::barrier<thread_scope_block> residing in distributed shared memory, one or more fallbacks that fulfill functional contract are to be used. In at least one embodiment, one or more of these fallback implementations use atomic operations. In at least one embodiment, with respect to asynchronous data movement operations, an invoking thread blocks until intended-asynchronous data movement operations are complete. In at least one embodiment, this is a fallback when asynchronous data movement hardware is unavailable for a given operation.

In at least one embodiment, fallback operations ignore manual transaction accounting manual transaction accounting such that expect_tx_count argument to arrive_tx or barrier_arrive_tx has no effect. In at least one embodiment, fallback operations enforce manual transaction accounting such that barrier object contains a transaction count, transaction count is increased by intended-asynchronous data movement operations, transaction count is decreased by txbyte_count argument to barrier_arrive_tx, and a wait operation results in an error when pending arrive count is zero and transaction count is non-zero.

In at least one embodiment, one or more techniques are to use a pipeline (e.g., CUDA pipeline) fallback when not using synchronization hardware (e.g., SyncUnit). In at least one embodiment cuda::pipeline<thread_scope_block> and cuda::pipeline<thread_scope_cluster> are collectively constructed with pipeline_shared_state object(s) residing in shared memory. In at least one embodiment, there is no fallback for these. In at least one embodiment, for cuda:: pipeline<thread_scope_thread> in device code, cuda:: pipeline<thread_scope_thread> does not use SyncUnit. In at least one embodiment, within device code it uses scoreboard-based mechanisms to wait for completion of asynchronous data movement operations. In at least one embodiment, for cuda::pipeline<thread_scope_thread> in host code, within host code all intended-asynchronous data movement operations are blocking until complete. In at least one embodiment, for cuda::pipeline<thread_scope_device> and cuda::pipeline<thread_scope_system>, these instantiations with shared state reside in memory accessible to all participating threads. In at least one embodiment, shared state only contains two cuda::barriers of same scope, one barrier for producer to consumer synchronization and a second barrier for consumer to producer synchronization in case it is used within a split producer-consumer algorithm. In at least one embodiment, all intended-asynchronous data movement operations are blocking until complete; therefore, shared state NumStages parameter is irrelevant. In at least one embodiment, manual transaction accounting balance and NumStages pipeline depth are enforced.

In at least one embodiment, an indication of async contract fulfillment is returned by one or more APIs to reflect whether asynchronous data movement hardware is to be used to perform an operation. In at least one embodiment, AsyncContractFulfillment type and AsyncContractFulfilled value names can be further illustrated as follows:

```
/* AsyncContractFulfillment */
class info_async_utilization { /* TrivialType and EqualityComparable */ };
/* AsyncContractFulfilled */
constexpr info_async_utilization info_async_fully = /* implementation
defined */ ;
static_assert( is_trivial_v<info_async_utilization> );
```

In at least one embodiment, an 8 byte portion of reserved shared memory in a statically known location is set aside for a SyncUnit barrier value. In at least one embodiment, this value is initialized at CTA entry to ensure a valid value and avoid potential error when operating upon that barrier for emulated flush operation. In at least one embodiment, location is in DSMEM with self-CTA id and offset zero.

In at least one embodiment, kernels are given at-entry code segments which are immediately before user kernel code so that at-entry code segment is included in kernel's i-cache prefetch. In at least one embodiment, emulation's zero-update of a barrier's transaction count is valid and will not generate errors when applied to a barrier with a zero value. In at least one embodiment, a sufficient and minimal at-start initialization is to set reserved location to zero, which can be further illustrated as follows:

STS.64 [reservedAddr], Rz

In at least one embodiment, barrier at this reserved location is functionally inactive due to zero expected arrival count. In at least one embodiment, reserved location remains a Syn-cUnit barrier for architectures which require SW emulation of a SyncUnit flush operation. In at least one embodiment, reserved barrier is functionally active if initialized with a non-zero expected arrival count.

In the following description, numerous specific details are set forth to provide a more thorough understanding of at least one embodiment. However, it will be apparent to one skilled in the art that the inventive concepts may be practiced without one or more of these specific details.

Data Center

The following figure sets forth, without limitation, exemplary data center systems that can be used to implement at least one embodiment. In at least one embodiment, one or more data center components of following figure can implement one or more aspects of an embodiment described with respect to one or more of FIGS. 1-16. In at least one embodiment, one or more data center components include one or more components of system 100 of FIG. 1 (e.g., CPU 104, PPU 106, compiler 112, API 108), computer system 202 of FIG. 2 (e.g., processor 204, memory 206, set of APIs 228, compiler 244, code 246, GPU 210, and/or one or more components of set of nodes 248. In at least one embodiment, one or more data center components perform one or more aspects of API 300 of FIG. 3, API 400 of FIG. 4, API 500 of FIG. 5, API 600 of FIG. 6, API 700 of FIG. 7, API 800 of FIG. 8, and/or API 900 of FIG. 9. In at least one embodiment, one or more data center components perform one or more aspects of technique 1000 of FIG. 10, technique 1100 of FIG. 11, technique 1200 of FIG. 12, technique 1300 of FIG. 13, technique 1400 of FIG. 14, technique 1500 of FIG. 15, and/or technique 1600 of FIG. 16.

FIG. 17 illustrates an exemplary data center 1700, in accordance with at least one embodiment. In at least one embodiment, data center 1700 includes, without limitation, a data center infrastructure layer 1710, a framework layer 1720, a software layer 1730 and an application layer 1740.

In at least one embodiment, as shown in FIG. 17, data center infrastructure layer 1710 may include a resource orchestrator 1712, grouped computing resources 1714, and node computing resources ("node C.R.s") 1716(1)-1716(N), where "N" represents any whole, positive integer. In at least one embodiment, node C.R.s 1716(1)-1716(N) may include, but are not limited to, any number of central processing units ("CPUs") or other processors (including accelerators, field programmable gate arrays ("FPGAs"), data processing units ("DPUs") in network devices, graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 1716(1)-1716(N) may be a server having one or more of above-mentioned computing resources.

In at least one embodiment, grouped computing resources 1714 may include separate groupings of node C.R.s housed within one or more racks (not shown), or many racks housed in data centers at various geographical locations (also not shown). Separate groupings of node C.R.s within grouped computing resources 1714 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 1712 may configure or otherwise control one or more node C.R.s 1716(1)-1716(N) and/or grouped computing resources 1714. In at least one embodiment, resource orchestrator 1712 may include a software design infrastructure ("SDI") management entity for data center 1700. In at least one embodiment, resource orchestrator 1712 may include hardware, software or some combination thereof.

In at least one embodiment, as shown in FIG. 17, framework layer 1720 includes, without limitation, a job scheduler 1732, a configuration manager 1734, a resource manager 1736 and a distributed file system 1738. In at least one embodiment, framework layer 1720 may include a framework to support software 1752 of software layer 1730 and/or one or more application(s) 1742 of application layer 1740. In at least one embodiment, software 1752 or application(s) 1742 may respectively include web-based service software or applications, such as those provided by Amazon Web Services, Google Cloud and Microsoft Azure. In at least one embodiment, framework layer 1720 may be, but is not limited to, a type of free and open-source software web application framework such as Apache Spark™ (hereinafter "Spark") that may utilize distributed file system 1738 for large-scale data processing (e.g., "big data"). In at least one embodiment, job scheduler 1732 may include a Spark driver to facilitate scheduling of workloads supported by various layers of data center 1700. In at least one embodiment, configuration manager 1734 may be capable of configuring different layers such as software layer 1730 and framework layer 1720, including Spark and distributed file system 1738 for supporting large-scale data processing. In at least one embodiment, resource manager 1736 may be capable of managing clustered or grouped computing resources mapped to or allocated for support of distributed file system 1738 and job scheduler 1732. In at least one embodiment, clustered or grouped computing resources may include grouped computing resource 1714 at data center infrastructure layer 1710. In at least one embodiment, resource manager 1736 may coordinate with resource orchestrator 1712 to manage these mapped or allocated computing resources.

In at least one embodiment, software 1752 included in software layer 1730 may include software used by at least portions of node C.R.s 1716(1)-1716(N), grouped computing resources 1714, and/or distributed file system 1738 of framework layer 1720. One or more types of software may include, but are not limited to, Internet web page search software, e-mail virus scan software, database software, and streaming video content software.

In at least one embodiment, application(s) 1742 included in application layer 1740 may include one or more types of applications used by at least portions of node C.R.s 1716(1)-1716(N), grouped computing resources 1714, and/or distributed file system 1738 of framework layer 1720. In at least one or more types of applications may include, without limitation, CUDA applications.

In at least one embodiment, any of configuration manager 1734, resource manager 1736, and resource orchestrator

1712 may implement any number and type of self-modifying actions based on any amount and type of data acquired in any technically feasible fashion. In at least one embodiment, self-modifying actions may relieve a data center operator of data center 1700 from making possibly bad configuration decisions and possibly avoiding underutilized and/or poor performing portions of a data center.

Computer-Based Systems

The following figures set forth, without limitation, exemplary computer-based systems that can be used to implement at least one embodiment. In at least one embodiment, one or more computer-based systems of following figures can implement one or more aspects of an embodiment described with respect to one or more of FIGS. 1-16. In at least one embodiment, one or more computer-based systems include one or more components of system 100 of FIG. 1 (e.g., CPU 104, PPU 106, compiler 112, API 108), computer system 202 of FIG. 2 (e.g., processor 204, memory 206, set of APIs 228, compiler 244, code 246, GPU 210, and/or one or more components of set of nodes 248. In at least one embodiment, one or more computer-based systems perform one or more aspects of API 300 of FIG. 3, API 400 of FIG. 4, API 500 of FIG. 5, API 600 of FIG. 6, API 700 of FIG. 7, API 800 of FIG. 8, and/or API 900 of FIG. 9. In at least one embodiment, one or more computer-based systems perform one or more aspects of technique 1000 of FIG. 10, technique 1100 of FIG. 11, technique 1200 of FIG. 12, technique 1300 of FIG. 13, technique 1400 of FIG. 14, technique 1500 of FIG. 15, and/or technique 1600 of FIG. 16.

Figure 18:
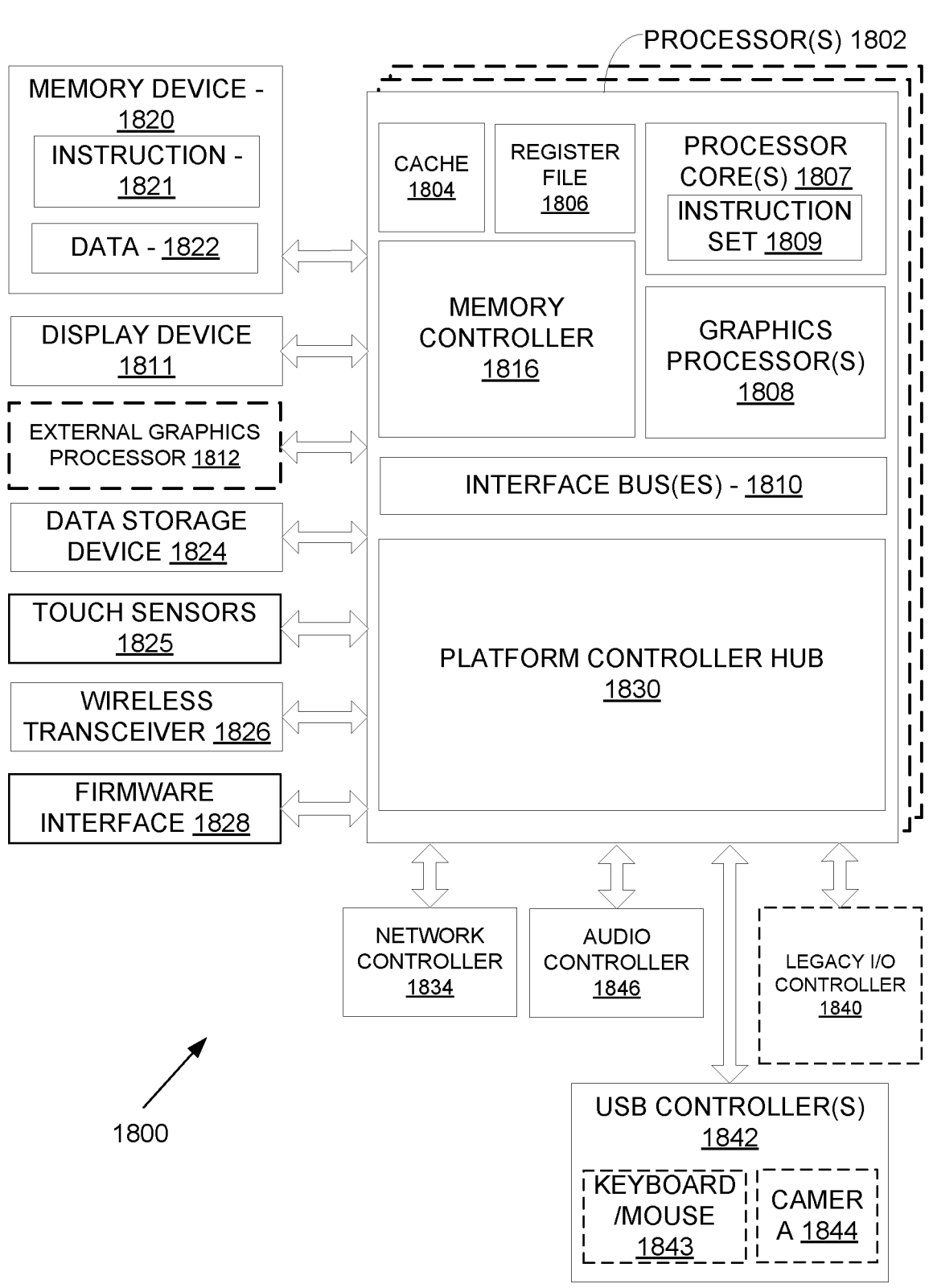
FIG. 18 illustrates a processing system, in accordance with at least one embodiment.

FIG. 18 illustrates a processing system 1800, in accordance with at least one embodiment. In at least one embodiment, processing system 1800 includes one or more processors 1802 and one or more graphics processors 1808, and may be a single processor desktop system, a multiprocessor workstation system, or a server system having a large number of processors 1802 or processor cores 1807. In at least one embodiment, processing system 1800 is a processing platform incorporated within a system-on-a-chip ("SoC") integrated circuit for use in mobile, handheld, or embedded devices. In at least one embodiment, a processors core 1807 is referred to as a computing unit or compute unit.

In at least one embodiment, processing system 1800 can include, or be incorporated within a server-based gaming platform, a game console, a media console, a mobile gaming console, a handheld game console, or an online game console. In at least one embodiment, processing system 1800 is a mobile phone, smart phone, tablet computing device or mobile Internet device. In at least one embodiment, processing system 1800 can also include, couple with, or be integrated within a wearable device, such as a smart watch wearable device, smart eyewear device, augmented reality device, or virtual reality device. In at least one embodiment, processing system 1800 is a television or set top box device having one or more processors 1802 and a graphical interface generated by one or more graphics processors 1808.

In at least one embodiment, one or more processors 1802 each include one or more processor cores 1807 to process instructions which, when executed, perform operations for system and user software. In at least one embodiment, each of one or more processor cores 1807 is configured to process a specific instruction set 1809. In at least one embodiment, instruction set 1809 may facilitate Complex Instruction Set Computing ("CISC"), Reduced Instruction Set Computing ("RISC"), or computing via a Very Long Instruction Word ("VLIW"). In at least one embodiment, processor cores 1807 may each process a different instruction set 1809, which may include instructions to facilitate emulation of other instruction sets. In at least one embodiment, processor core 1807 may also include other processing devices, such as a digital signal processor ("DSP").

In at least one embodiment, processor 1802 includes cache memory ('cache") 1804. In at least one embodiment, processor 1802 can have a single internal cache or multiple levels of internal cache. In at least one embodiment, cache memory is shared among various components of processor 1802. In at least one embodiment, processor 1802 also uses an external cache (e.g., a Level 3 ("L3") cache or Last Level Cache ("LLC")) (not shown), which may be shared among processor cores 1807 using known cache coherency techniques. In at least one embodiment, register file 1806 is additionally included in processor 1802 which may include different types of registers for storing different types of data (e.g., integer registers, floating point registers, status registers, and an instruction pointer register). In at least one embodiment, register file 1806 may include general-purpose registers or other registers.

In at least one embodiment, one or more processor(s) 1802 are coupled with one or more interface bus(es) 1810 to transmit communication signals such as address, data, or control signals between processor 1802 and other components in processing system 1800. In at least one embodiment interface bus 1810, in one embodiment, can be a processor bus, such as a version of a Direct Media Interface ("DMI") bus. In at least one embodiment, interface bus 1810 is not limited to a DMI bus, and may include one or more Peripheral Component Interconnect buses (e.g., "PCI," PCI Express ("PCIe")), memory buses, or other types of interface buses. In at least one embodiment processor(s) 1802 include an integrated memory controller 1816 and a platform controller hub 1830. In at least one embodiment, memory controller 1816 facilitates communication between a memory device and other components of processing system 1800, while platform controller hub ("PCH") 1830 provides connections to Input/Output ("I/O") devices via a local I/O bus.

In at least one embodiment, memory device 1820 can be a dynamic random access memory ("DRAM") device, a static random access memory ("SRAM") device, flash memory device, phase-change memory device, or some other memory device having suitable performance to serve as processor memory. In at least one embodiment memory device 1820 can operate as system memory for processing system 1800, to store data 1822 and instructions 1821 for use when one or more processors 1802 executes an application or process. In at least one embodiment, memory controller 1816 also couples with an optional external graphics processor 1812, which may communicate with one or more graphics processors 1808 in processors 1802 to perform graphics and media operations. In at least one embodiment, a display device 1811 can connect to processor(s) 1802. In at least one embodiment display device 1811 can include one or more of an internal display device, as in a mobile electronic device or a laptop device or an external display device attached via a display interface (e.g., DisplayPort, etc.). In at least one embodiment, display device 1811 can include a head mounted display ("HMD") such as a stereoscopic display device for use in virtual reality ("VR") applications or augmented reality ("AR") applications.

In at least one embodiment, platform controller hub 1830 enables peripherals to connect to memory device 1820 and processor 1802 via a high-speed I/O bus. In at least one embodiment, I/O peripherals include, but are not limited to, an audio controller 1846, a network controller 1834, a firmware interface 1828, a wireless transceiver 1826, touch sensors 1825, a data storage device 1824 (e.g., hard disk drive, flash memory, etc.). In at least one embodiment, data storage device 1824 can connect via a storage interface (e.g., SATA) or via a peripheral bus, such as PCI, or PCIe. In at least one embodiment, touch sensors 1825 can include touch screen sensors, pressure sensors, or fingerprint sensors. In at least one embodiment, wireless transceiver 1826 can be a Wi-Fi transceiver, a Bluetooth transceiver, or a mobile network transceiver such as a 3G, 4G, or Long Term Evolution ("LTE") transceiver. In at least one embodiment, firmware interface 1828 enables communication with system firmware, and can be, for example, a unified extensible firmware interface ("UEFI"). In at least one embodiment, network controller 1834 can enable a network connection to a wired network. In at least one embodiment, a high-performance network controller (not shown) couples with interface bus 1810. In at least one embodiment, audio controller 1846 is a multi-channel high definition audio controller. In at least one embodiment, processing system 1800 includes an optional legacy I/O controller 1840 for coupling legacy (e.g., Personal System 2 ("PS/2")) devices to processing system 1800. In at least one embodiment, platform controller hub 1830 can also connect to one or more Universal Serial Bus ("USB") controllers 1842 connect input devices, such as keyboard and mouse 1843 combinations, a camera 1844, or other USB input devices.

In at least one embodiment, an instance of memory controller 1816 and platform controller hub 1830 may be integrated into a discreet external graphics processor, such as external graphics processor 1812. In at least one embodiment, platform controller hub 1830 and/or memory controller 1816 may be external to one or more processor(s) 1802. For example, in at least one embodiment, processing system 1800 can include an external memory controller 1816 and platform controller hub 1830, which may be configured as a memory controller hub and peripheral controller hub within a system chipset that is in communication with processor(s) 1802.

Figure 19:
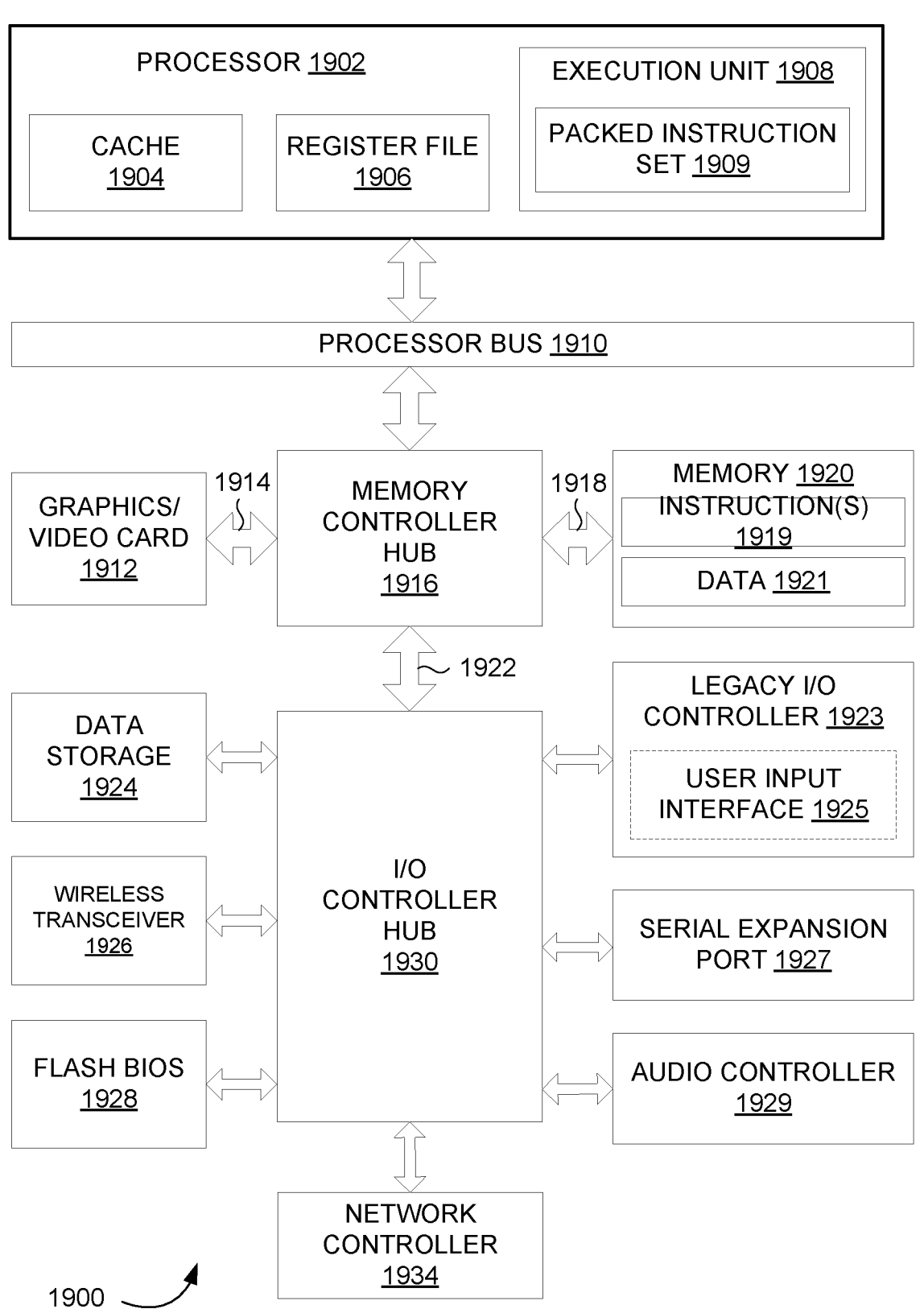
FIG. 19 illustrates a computer system, in accordance with at least one embodiment.

FIG. 19 illustrates a computer system 1900, in accordance with at least one embodiment. In at least one embodiment, computer system 1900 may be a system with interconnected devices and components, an SOC, or some combination. In at least on embodiment, computer system 1900 is formed with a processor 1902 that may include execution units to execute an instruction. In at least one embodiment, computer system 1900 may include, without limitation, a component, such as processor 1902 to employ execution units including logic to perform algorithms for processing data. In at least one embodiment, computer system 1900 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 1900 may execute a version of WINDOWS' operating system available from Microsoft Corporation of Redmond, Wash., although other operating systems (UNIX and Linux for example), embedded software, and/or graphical user interfaces, may also be used.

In at least one embodiment, computer system 1900 may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor (DSP), an SoC, network computers ("NetPCs"), set-top boxes, network hubs, wide area network ("WAN") switches, or any other system that may perform one or more instructions.

In at least one embodiment, computer system 1900 may include, without limitation, processor 1902 that may include, without limitation, one or more execution units 1908 that may be configured to execute a Compute Unified Device Architecture ("CUDA") (CUDA® is developed by NVIDIA Corporation of Santa Clara, CA) program. In at least one embodiment, a CUDA program is at least a portion of a software application written in a CUDA programming language. In at least one embodiment, computer system 1900 is a single processor desktop or server system. In at least one embodiment, computer system 1900 may be a multiprocessor system. In at least one embodiment, processor 1902 may include, without limitation, a CISC microprocessor, a RISC microprocessor, a VLIW microprocessor, a processor implementing a combination of instruction sets, or any other processor device, such as a digital signal processor, for example. In at least one embodiment, processor 1902 may be coupled to a processor bus 1910 that may transmit data signals between processor 1902 and other components in computer system 1900.

In at least one embodiment, processor 1902 may include, without limitation, a Level 1 ("L1") internal cache memory ("cache") 1904. In at least one embodiment, processor 1902 may have a single internal cache or multiple levels of internal cache. In at least one embodiment, cache memory may reside external to processor 1902. In at least one embodiment, processor 1902 may also include a combination of both internal and external caches. In at least one embodiment, a register file 1906 may store different types of data in various registers including, without limitation, integer registers, floating point registers, status registers, and instruction pointer register.

In at least one embodiment, execution unit 1908, including, without limitation, logic to perform integer and floating point operations, also resides in processor 1902. Processor 1902 may also include a microcode ("ucode") read only memory ("ROM") that stores microcode for certain macro instructions. In at least one embodiment, execution unit 1908 may include logic to handle a packed instruction set 1909. In at least one embodiment, by including packed instruction set 1909 in an instruction set of a general-purpose processor 1902, along with associated circuitry to execute instructions, operations used by many multimedia applications may be performed using packed data in a general-purpose processor 1902. In at least one embodiment, many multimedia applications may be accelerated and executed more efficiently by using full width of a processor's data bus for performing operations on packed data, which may eliminate a need to transfer smaller units of data across a processor's data bus to perform one or more operations one data element at a time.

In at least one embodiment, execution unit 1908 may also be used in microcontrollers, embedded processors, graphics devices, DSPs, and other types of logic circuits. In at least one embodiment, computer system 1900 may include, without limitation, a memory 1920. In at least one embodiment, memory 1920 may be implemented as a DRAM device, an SRAM device, flash memory device, or other memory device. Memory 1920 may store instruction(s) 1919 and/or data 1921 represented by data signals that may be executed by processor 1902.

In at least one embodiment, a system logic chip may be coupled to processor bus 1910 and memory 1920. In at least one embodiment, the system logic chip may include, without limitation, a memory controller hub ("MCH") 1916, and processor 1902 may communicate with MCH 1916 via processor bus 1910. In at least one embodiment, MCH 1916 may provide a high bandwidth memory path 1918 to memory 1920 for instruction and data storage and for storage of graphics commands, data and textures. In at least one embodiment, MCH 1916 may direct data signals between processor 1902, memory 1920, and other components in computer system 1900 and to bridge data signals between processor bus 1910, memory 1920, and a system I/O 1922. In at least one embodiment, system logic chip may provide a graphics port for coupling to a graphics controller. In at least one embodiment, MCH 1916 may be coupled to memory 1920 through high bandwidth memory path 1918 and graphics/video card 1912 may be coupled to MCH 1916 through an Accelerated Graphics Port ("AGP") interconnect 1914.

In at least one embodiment, computer system 1900 may use system I/O 1922 that is a proprietary hub interface bus to couple MCH 1916 to I/O controller hub ("ICH") 1930. In at least one embodiment, ICH 1930 may provide direct connections to some I/O devices via a local I/O bus. In at least one embodiment, local I/O bus may include, without limitation, a high-speed I/O bus for connecting peripherals to memory 1920, a chipset, and processor 1902. Examples may include, without limitation, an audio controller 1929, a firmware hub ("flash BIOS") 1928, a wireless transceiver 1926, a data storage 1924, a legacy I/O controller 1923 containing a user input interface 1925 and a keyboard interface, a serial expansion port 1927, such as a USB, and a network controller 1934. Data storage 1924 may comprise a hard disk drive, a floppy disk drive, a CD-ROM device, a flash memory device, or other mass storage device.

In at least one embodiment, FIG. 19 illustrates a system, which includes interconnected hardware devices or "chips." In at least one embodiment, FIG. 19 may illustrate an exemplary SoC. In at least one embodiment, devices illustrated in FIG. 19 may be interconnected with proprietary interconnects, standardized interconnects (e.g., PCIe), or some combination thereof. In at least one embodiment, one or more components of system 1900 are interconnected using compute express link ("CXL") interconnects.

Figure 20:
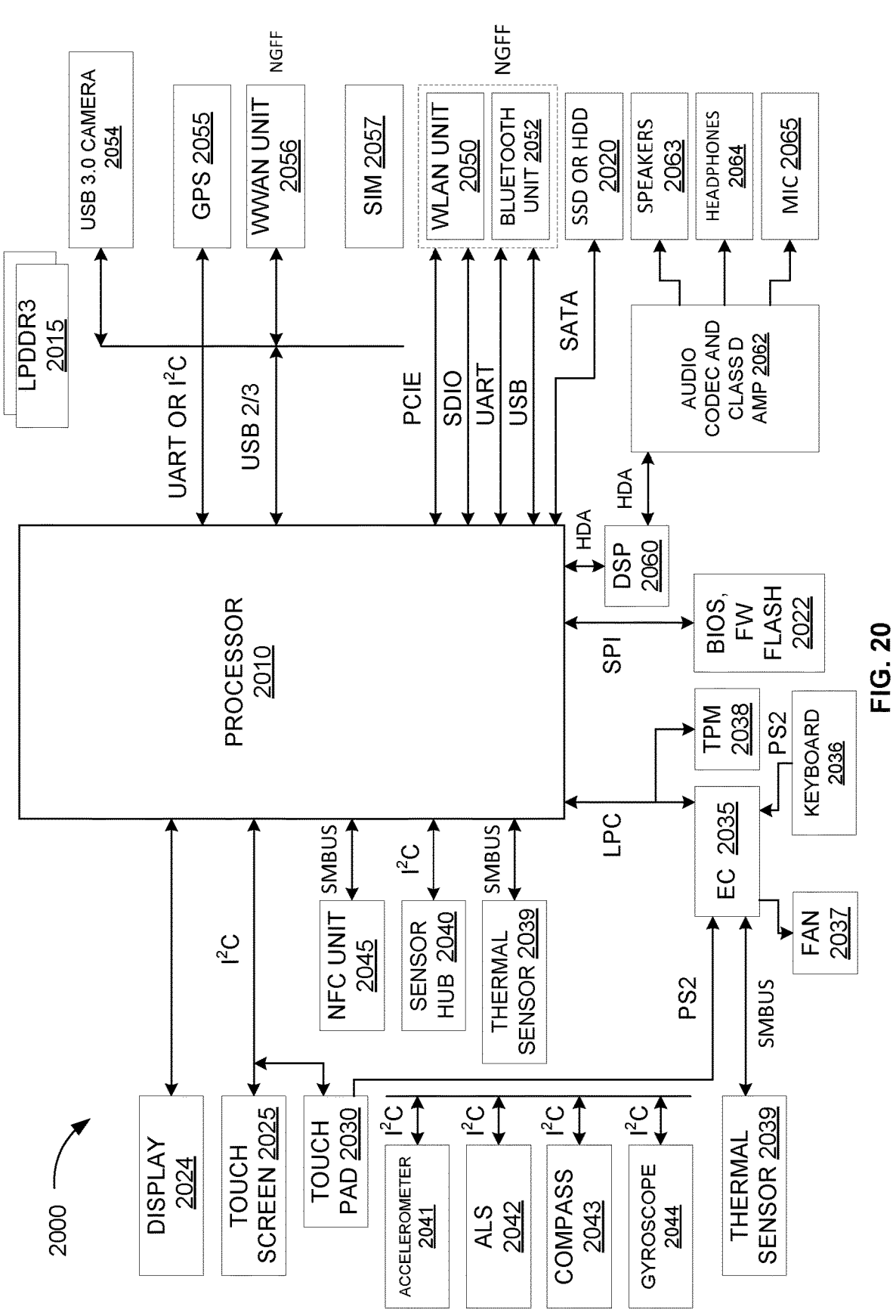
FIG. 20 illustrates a system, in accordance with at least one embodiment.

FIG. 20 illustrates a system 2000, in accordance with at least one embodiment. In at least one embodiment, system 2000 is an electronic device that utilizes a processor 2010. In at least one embodiment, system 2000 may be, for example and without limitation, a notebook, a tower server, a rack server, a blade server, an edge device communicatively coupled to one or more on-premise or cloud service providers, a laptop, a desktop, a tablet, a mobile device, a phone, an embedded computer, or any other suitable electronic device.

In at least one embodiment, system 2000 may include, without limitation, processor 2010 communicatively coupled to any suitable number or kind of components, peripherals, modules, or devices. In at least one embodiment, processor 2010 is coupled using a bus or interface, such as an I²C bus, a System Management Bus ("SMBus"), a Low Pin Count ("LPC") bus, a Serial Peripheral Interface ("SPI"), a High Definition Audio ("HDA") bus, a Serial Advance Technology Attachment ("SATA") bus, a USB (versions 1, 2, 3), or a Universal Asynchronous Receiver/Transmitter ("UART") bus. In at least one embodiment, FIG. 20 illustrates a system which includes interconnected hardware devices or "chips." In at least one embodiment, FIG. 20 may illustrate an exemplary SoC. In at least one embodiment, devices illustrated in FIG. 20 may be interconnected with proprietary interconnects, standardized interconnects (e.g., PCIe) or some combination thereof. In at least one embodiment, one or more components of FIG. 20 are interconnected using CXL interconnects.

In at least one embodiment, FIG. 20 may include a display 2024, a touch screen 2025, a touch pad 2030, a Near Field Communications unit ("NFC") 2045, a sensor hub 2040, a thermal sensor 2046, an Express Chipset ("EC") 2035, a Trusted Platform Module ("TPM") 2038, BIOS/firmware/flash memory ("BIOS, FW Flash") 2022, a DSP 2060, a Solid State Disk ("SSD") or Hard Disk Drive ("HDD") 2020, a wireless local area network unit ("WLAN") 2050, a Bluetooth unit 2052, a Wireless Wide Area Network unit ("WWAN") 2056, a Global Positioning System ("GPS") 2055, a camera ("USB 3.0 camera") 2054 such as a USB 3.0 camera, or a Low Power Double Data Rate ("LPDDR") memory unit ("LPDDR3") 2015 implemented in, for example, LPDDR3 standard. These components may each be implemented in any suitable manner.

In at least one embodiment, other components may be communicatively coupled to processor 2010 through components discussed above. In at least one embodiment, an accelerometer 2041, an Ambient Light Sensor ("ALS") 2042, a compass 2043, and a gyroscope 2044 may be communicatively coupled to sensor hub 2040. In at least one embodiment, a thermal sensor 2039, a fan 2037, a keyboard 2036, and a touch pad 2030 may be communicatively coupled to EC 2035. In at least one embodiment, a speaker 2063, a headphones 2064, and a microphone ("mic") 2065 may be communicatively coupled to an audio unit ("audio codec and class d amp") 2062, which may in turn be communicatively coupled to DSP 2060. In at least one embodiment, audio unit 2062 may include, for example and without limitation, an audio coder/decoder ("codec") and a class D amplifier. In at least one embodiment, a SIM card ("SIM") 2057 may be communicatively coupled to WWAN unit 2056. In at least one embodiment, components such as WLAN unit 2050 and Bluetooth unit 2052, as well as WWAN unit 2056 may be implemented in a Next Generation Form Factor ("NGFF").

Figure 21:
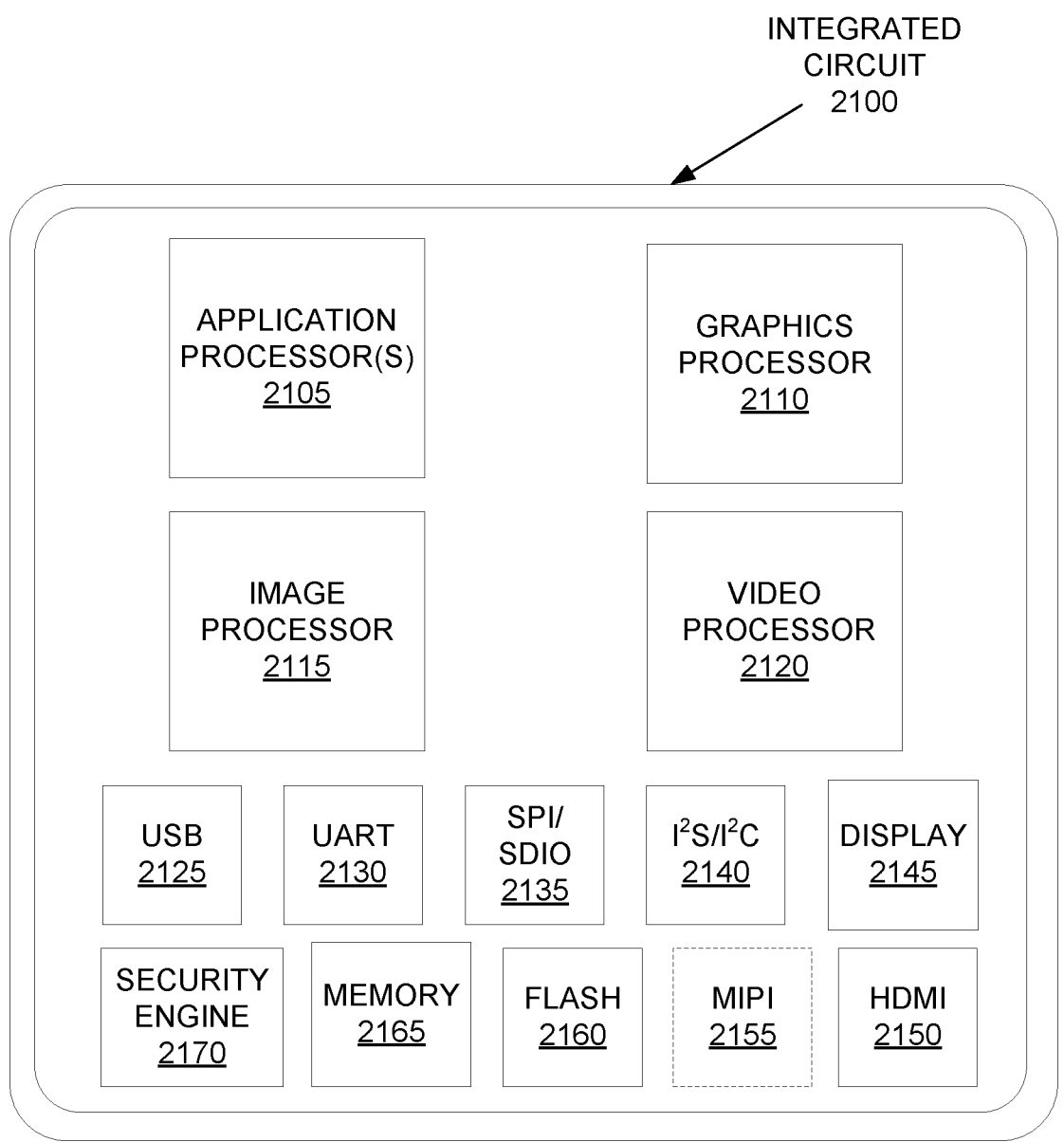
FIG. 21 illustrates an exemplary integrated circuit, in accordance with at least one embodiment.

FIG. 21 illustrates an exemplary integrated circuit 2100, in accordance with at least one embodiment. In at least one embodiment, exemplary integrated circuit 2100 is an SoC that may be fabricated using one or more IP cores. In at least one embodiment, integrated circuit 2100 includes one or more application processor(s) 2105 (e.g., CPUs, DPUs), at least one graphics processor 2110, and may additionally include an image processor 2115 and/or a video processor 2120, any of which may be a modular IP core. In at least one embodiment, integrated circuit 2100 includes peripheral or bus logic including a USB controller 2125, a UART controller 2130, an SPI/SDIO controller 2135, and an I²S/I²C controller 2140. In at least one embodiment, integrated circuit 2100 can include a display device 2145 coupled to one or more of a high-definition multimedia interface ("HDMI") controller 2150 and a mobile industry processor interface ("MIPI") display interface 2155. In at least one embodiment, storage may be provided by a flash memory subsystem 2160 including flash memory and a flash memory controller. In at least one embodiment, a memory interface may be provided via a memory controller 2165 for access to SDRAM or SRAM memory devices. In at least one embodiment, some integrated circuits additionally include an embedded security engine 2170.

Figure 22:
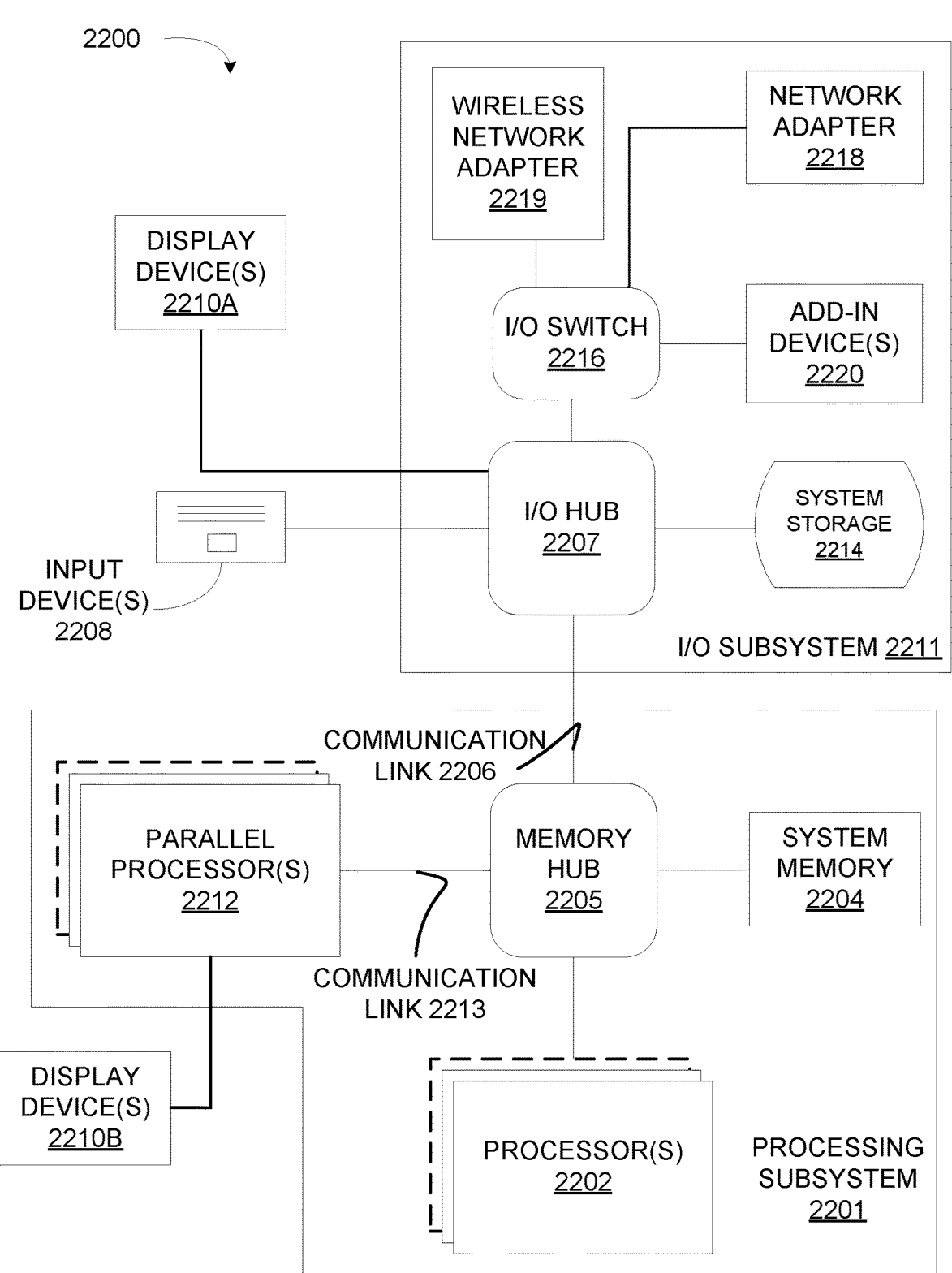
FIG. 22 illustrates a computing system, according to at least one embodiment.

FIG. 22 illustrates a computing system 2200, according to at least one embodiment; In at least one embodiment, computing system 2200 includes a processing subsystem 2201 having one or more processor(s) 2202 and a system memory 2204 communicating via an interconnection path that may include a memory hub 2205. In at least one embodiment, memory hub 2205 may be a separate component within a chipset component or may be integrated within one or more processor(s) 2202. In at least one embodiment, memory hub 2205 couples with an I/O subsystem 2211 via a communication link 2206. In at least one embodiment, I/O subsystem 2211 includes an I/O hub 2207 that can enable computing system 2200 to receive input from one or more input device(s) 2208. In at least one embodiment, I/O hub 2207 can enable a display controller, which may be included in one or more processor(s) 2202, to provide outputs to one or more display device(s) 2210A. In at least one embodiment, one or more display device(s) 2210A coupled with I/O hub 2207 can include a local, internal, or embedded display device.

In at least one embodiment, processing subsystem 2201 includes one or more parallel processor(s) 2212 coupled to memory hub 2205 via a bus or other communication link 2213. In at least one embodiment, communication link 2213 may be one of any number of standards based communication link technologies or protocols, such as, but not limited to PCIe, or may be a vendor specific communications interface or communications fabric. In at least one embodiment, one or more parallel processor(s) 2212 form a computationally focused parallel or vector processing system that can include a large number of processing cores and/or processing clusters, such as a many integrated core processor or compute units. In at least one embodiment, one or more parallel processor(s) 2212 form a graphics processing subsystem that can output pixels to one of one or more display device(s) 2210A coupled via I/O Hub 2207. In at least one embodiment, one or more parallel processor(s) 2212 can also include a display controller and display interface (not shown) to enable a direct connection to one or more display device(s) 2210B.

In at least one embodiment, a system storage unit 2214 can connect to I/O hub 2207 to provide a storage mechanism for computing system 2200. In at least one embodiment, an I/O switch 2216 can be used to provide an interface mechanism to enable connections between I/O hub 2207 and other components, such as a network adapter 2218 and/or wireless network adapter 2219 that may be integrated into a platform, and various other devices that can be added via one or more add-in device(s) 2220. In at least one embodiment, network adapter 2218 can be an Ethernet adapter or another wired network adapter. In at least one embodiment, wireless network adapter 2219 can include one or more of a Wi-Fi, Bluetooth, NFC, or other network device that includes one or more wireless radios.

In at least one embodiment, computing system 2200 can include other components not explicitly shown, including USB or other port connections, optical storage drives, video capture devices, and the like, that may also be connected to I/O hub 2207. In at least one embodiment, communication paths interconnecting various components in FIG. 22 may be implemented using any suitable protocols, such as PCI based protocols (e.g., PCIe), or other bus or point-to-point communication interfaces and/or protocol(s), such as NVLink high-speed interconnect, or interconnect protocols.

In at least one embodiment, one or more parallel processor(s) 2212 incorporate circuitry optimized for graphics and video processing, including, for example, video output circuitry, and constitutes a graphics processing unit ("GPU"). In at least one embodiment, one or more parallel processor(s) 2212 incorporate circuitry optimized for general purpose processing. In at least embodiment, components of computing system 2200 may be integrated with one or more other system elements on a single integrated circuit. For example, in at least one embodiment, one or more parallel processor(s) 2212, memory hub 2205, processor(s) 2202, and I/O hub 2207 can be integrated into an SoC integrated circuit. In at least one embodiment, components of computing system 2200 can be integrated into a single package to form a system in package ("SIP") configuration. In at least one embodiment, at least a portion of the components of computing system 2200 can be integrated into a multi-chip module ("MCM"), which can be interconnected with other multi-chip modules into a modular computing system. In at least one embodiment, I/O subsystem 2211 and display devices 2210B are omitted from computing system 2200.

Processing Systems

The following figures set forth, without limitation, exemplary processing systems that can be used to implement at least one embodiment. In at least one embodiment, one or more processing systems of following figures can implement one or more aspects of an embodiment described with respect to one or more of FIGS. 1-16. In at least one embodiment, one or more processing systems include one or more components of system 100 of FIG. 1 (e.g., CPU 104, PPU 106, compiler 112, API 108), computer system 202 of FIG. 2 (e.g., processor 204, memory 206, set of APIs 228, compiler 244, code 246, GPU 210, and/or one or more components of set of nodes 248. In at least one embodiment, one or more processing systems perform one or more aspects of API 300 of FIG. 3, API 400 of FIG. 4, API 500 of FIG. 5, API 600 of FIG. 6, API 700 of FIG. 7, API 800 of FIG. 8, and/or API 900 of FIG. 9. In at least one embodiment, one or more processing systems perform one or more aspects of technique 1000 of FIG. 10, technique 1100 of FIG. 11, technique 1200 of FIG. 12, technique 1300 of FIG. 13, technique 1400 of FIG. 14, technique 1500 of FIG. 15, and/or technique 1600 of FIG. 16.

Figure 23:
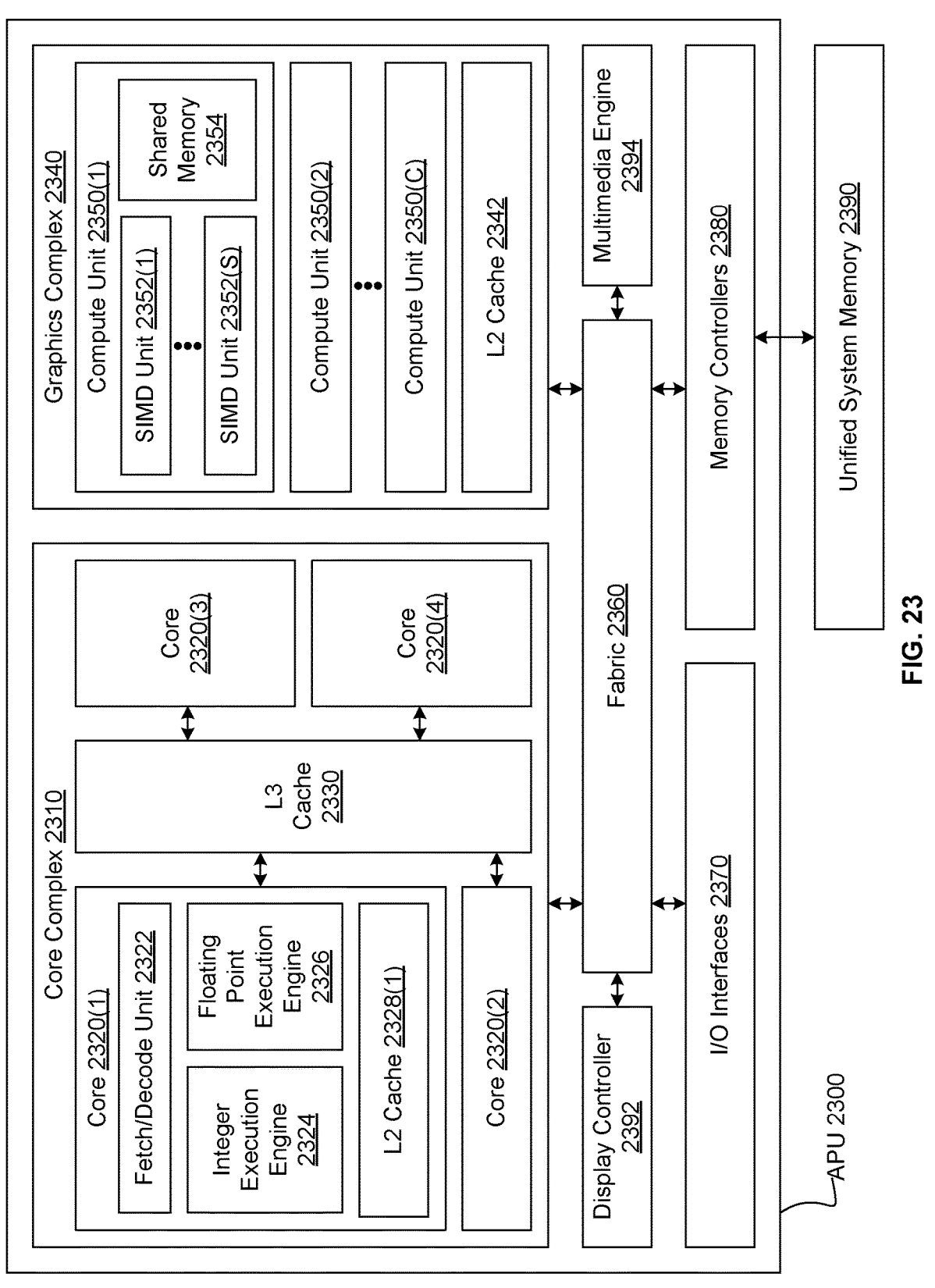
FIG. 23 illustrates an APU, in accordance with at least one embodiment.

FIG. 23 illustrates an accelerated processing unit ("APU") 2300, in accordance with at least one embodiment. In at least one embodiment, APU 2300 is developed by AMD Corporation of Santa Clara, CA. In at least one embodiment, APU 2300 can be configured to execute an application program, such as a CUDA program. In at least one embodiment, APU 2300 includes, without limitation, a core complex 2310, a graphics complex 2340, fabric 2360, I/O interfaces 2370, memory controllers 2380, a display controller 2392, and a multimedia engine 2394. In at least one embodiment, APU 2300 may include, without limitation, any number of core complexes 2310, any number of graphics complexes 2350, any number of display controllers 2392, and any number of multimedia engines 2394 in any combination. For explanatory purposes, multiple instances of like objects are denoted herein with reference numbers identifying the object and parenthetical numbers identifying the instance where needed.

In at least one embodiment, core complex 2310 is a CPU, graphics complex 2340 is a GPU, and APU 2300 is a processing unit that integrates, without limitation, 2310 and 2340 onto a single chip. In at least one embodiment, some tasks may be assigned to core complex 2310 and other tasks may be assigned to graphics complex 2340. In at least one embodiment, core complex 2310 is configured to execute main control software associated with APU 2300, such as an operating system. In at least one embodiment, core complex 2310 is the master processor of APU 2300, controlling and coordinating operations of other processors. In at least one embodiment, core complex 2310 issues commands that control the operation of graphics complex 2340. In at least one embodiment, core complex 2310 can be configured to execute host executable code derived from CUDA source code, and graphics complex 2340 can be configured to execute device executable code derived from CUDA source code.

In at least one embodiment, core complex 2310 includes, without limitation, cores 2320(1)-2320(4) and an L3 cache 2330. In at least one embodiment, core complex 2310 may include, without limitation, any number of cores 2320 and any number and type of caches in any combination. In at least one embodiment, cores 2320 are configured to execute instructions of a particular instruction set architecture ("ISA"). In at least one embodiment, each core 2320 is a CPU core. In at least one embodiment, core 2320 is referred to as a computing unit or compute unit.

In at least one embodiment, each core 2320 includes, without limitation, a fetch/decode unit 2322, an integer execution engine 2324, a floating point execution engine 2326, and an L2 cache 2328. In at least one embodiment, fetch/decode unit 2322 fetches instructions, decodes such instructions, generates micro-operations, and dispatches separate micro-instructions to integer execution engine 2324 and floating point execution engine 2326. In at least one embodiment, fetch/decode unit 2322 can concurrently dispatch one micro-instruction to integer execution engine 2324 and another micro-instruction to floating point execution engine 2326. In at least one embodiment, integer execution engine 2324 executes, without limitation, integer and memory operations. In at least one embodiment, floating point engine 2326 executes, without limitation, floating point and vector operations. In at least one embodiment, fetch-decode unit 2322 dispatches micro-instructions to a single execution engine that replaces both integer execution engine 2324 and floating point execution engine 2326.

In at least one embodiment, each core **2320(*i*), where i is an integer representing a particular instance of core 2320, may access L2 cache 2328(*i*) included in core 2320(*i*). In at least one embodiment, each core 2320 included in core complex 2310(*j*), where j is an integer representing a particular instance of core complex 2310, is connected to other cores 2320 included in core complex 2310(*j*) via L3 cache 2330(*j*) included in core complex 2310(*j*). In at least one embodiment, cores 2320 included in core complex 2310(*j*), where j is an integer representing a particular instance of core complex 2310, can access all of L3 cache 2330(*j*) included in core complex 2310(*j*). In at least one embodiment, L3 cache 2330** may include, without limitation, any number of slices.

In at least one embodiment, graphics complex 2340 can be configured to perform compute operations in a highly-parallel fashion. In at least one embodiment, graphics complex 2340 is configured to execute graphics pipeline operations such as draw commands, pixel operations, geometric computations, and other operations associated with rendering an image to a display. In at least one embodiment, graphics complex 2340 is configured to execute operations unrelated to graphics. In at least one embodiment, graphics complex 2340 is configured to execute both operations related to graphics and operations unrelated to graphics.

In at least one embodiment, graphics complex 2340 includes, without limitation, any number of compute units 2350 and an L2 cache 2342. In at least one embodiment, compute units 2350 share L2 cache 2342. In at least one embodiment, L2 cache 2342 is partitioned. In at least one embodiment, graphics complex 2340 includes, without limitation, any number of compute units 2350 and any number (including zero) and type of caches. In at least one embodiment, graphics complex 2340 includes, without limitation, any amount of dedicated graphics hardware.

In at least one embodiment, each compute unit 2350 includes, without limitation, any number of SIMD units 2352 and a shared memory 2354. In at least one embodiment, each SIMD unit 2352 implements a STMD architecture and is configured to perform operations in parallel. In at least one embodiment, each compute unit 2350 may execute any number of thread blocks, but each thread block executes on a single compute unit 2350. In at least one embodiment, a thread block includes, without limitation, any number of threads of execution. In at least one embodiment, a workgroup is a thread block. In at least one embodiment, each SIMD unit 2352 executes a different warp. In at least one embodiment, a warp is a group of threads (e.g., 16 threads), where each thread in the warp belongs to a single thread block and is configured to process a different set of data based on a single set of instructions. In at least one embodiment, predication can be used to disable one or more threads in a warp. In at least one embodiment, a lane is a thread. In at least one embodiment, a work item is a thread. In at least one embodiment, a wavefront is a warp. In at least one embodiment, different wavefronts in a thread block may synchronize together and communicate via shared memory 2354.

In at least one embodiment, fabric 2360 is a system interconnect that facilitates data and control transmissions across core complex 2310, graphics complex 2340, I/O interfaces 2370, memory controllers 2380, display controller 2392, and multimedia engine 2394. In at least one embodiment, APU 2300 may include, without limitation, any amount and type of system interconnect in addition to or instead of fabric 2360 that facilitates data and control transmissions across any number and type of directly or indirectly linked components that may be internal or external to APU 2300. In at least one embodiment, I/O interfaces 2370 are representative of any number and type of I/O interfaces (e.g., PCI, PCI-Extended ("PCI-X"), PCIe, gigabit Ethernet ("GBE"), USB, etc.). In at least one embodiment, various types of peripheral devices are coupled to I/O interfaces 2370 In at least one embodiment, peripheral devices that are coupled to I/O interfaces 2370 may include, without limitation, keyboards, mice, printers, scanners, joysticks or other types of game controllers, media recording devices, external storage devices, network interface cards, and so forth.

In at least one embodiment, display controller AMD92 displays images on one or more display device(s), such as a liquid crystal display ("LCD") device. In at least one embodiment, multimedia engine 2394 includes, without limitation, any amount and type of circuitry that is related to multimedia, such as a video decoder, a video encoder, an image signal processor, etc. In at least one embodiment, memory controllers 2380 facilitate data transfers between APU 2300 and a unified system memory 2390. In at least one embodiment, core complex 2310 and graphics complex 2340 share unified system memory 2390.

In at least one embodiment, APU 2300 implements a memory subsystem that includes, without limitation, any amount and type of memory controllers 2380 and memory devices (e.g., shared memory 2354) that may be dedicated to one component or shared among multiple components. In at least one embodiment, APU 2300 implements a cache subsystem that includes, without limitation, one or more cache memories (e.g., L2 caches 2428, L3 cache 2330, and L2 cache 2342) that may each be private to or shared between any number of components (e.g., cores 2320, core complex 2310, SIMD units 2352, compute units 2350, and graphics complex 2340).

Figure 24:
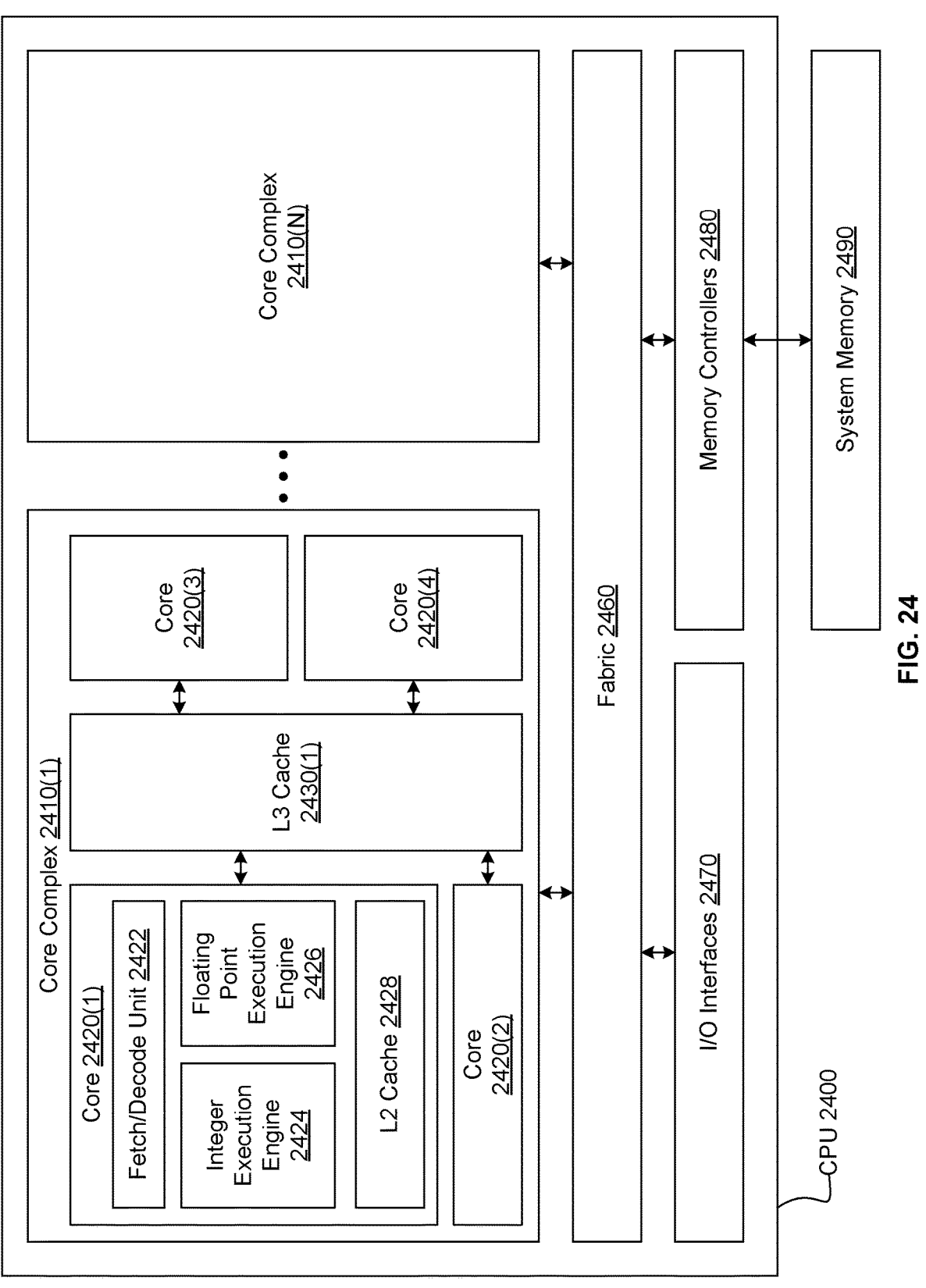
FIG. 24 illustrates a CPU, in accordance with at least one embodiment.

FIG. 24 illustrates a CPU 2400, in accordance with at least one embodiment. In at least one embodiment, CPU 2400 is developed by AMD Corporation of Santa Clara, CA. In at least one embodiment, CPU 2400 can be configured to execute an application program. In at least one embodiment, CPU 2400 is configured to execute main control software, such as an operating system. In at least one embodiment, CPU 2400 issues commands that control the operation of an external GPU (not shown). In at least one embodiment, CPU 2400 can be configured to execute host executable code derived from CUDA source code, and an external GPU can be configured to execute device executable code derived from such CUDA source code. In at least one embodiment, CPU 2400 includes, without limitation, any number of core complexes 2410, fabric 2460, I/O interfaces 2470, and memory controllers 2480.

In at least one embodiment, core complex 2410 includes, without limitation, cores 2420(1)-2420(4) and an L3 cache 2430. In at least one embodiment, core complex 2410 may include, without limitation, any number of cores 2420 and any number and type of caches in any combination. In at least one embodiment, cores 2420 are configured to execute instructions of a particular ISA. In at least one embodiment, each core 2420 is a CPU core.

In at least one embodiment, each core 2420 includes, without limitation, a fetch/decode unit 2422, an integer execution engine 2424, a floating point execution engine 2426, and an L2 cache 2428. In at least one embodiment, fetch/decode unit 2422 fetches instructions, decodes such instructions, generates micro-operations, and dispatches separate micro-instructions to integer execution engine 2424 and floating point execution engine 2426. In at least one embodiment, fetch/decode unit 2422 can concurrently dispatch one micro-instruction to integer execution engine 2424 and another micro-instruction to floating point execution engine 2426. In at least one embodiment, integer execution engine 2424 executes, without limitation, integer and memory operations. In at least one embodiment, floating point engine 2426 executes, without limitation, floating point and vector operations. In at least one embodiment, fetch-decode unit 2422 dispatches micro-instructions to a single execution engine that replaces both integer execution engine 2424 and floating point execution engine 2426.

In at least one embodiment, each core 2420(*i*), where i is an integer representing a particular instance of core 2420, may access L2 cache 2428(*i*) included in core 2420(*i*). In at least one embodiment, each core 2420 included in core complex 2410(*j*), where j is an integer representing a particular instance of core complex 2410, is connected to other cores 2420 in core complex 2410(*j*) via L3 cache 2430(*j*) included in core complex 2410(*j*). In at least one embodiment, cores 2420 included in core complex 2410(*j*), where j is an integer representing a particular instance of core complex 2410, can access all of L3 cache 2430(*j*) included in core complex 2410(*j*). In at least one embodiment, L3 cache 2430 may include, without limitation, any number of slices.

In at least one embodiment, fabric 2460 is a system interconnect that facilitates data and control transmissions across core complexes 2410(1)-2410(N) (where N is an integer greater than zero), I/O interfaces 2470, and memory controllers 2480. In at least one embodiment, CPU 2400 may include, without limitation, any amount and type of system interconnect in addition to or instead of fabric 2460 that facilitates data and control transmissions across any number and type of directly or indirectly linked components that may be internal or external to CPU 2400. In at least one embodiment, I/O interfaces 2470 are representative of any number and type of I/O interfaces (e.g., PCI, PCI-X, PCIe, GBE, USB, etc.). In at least one embodiment, various types of peripheral devices are coupled to I/O interfaces 2470 In at least one embodiment, peripheral devices that are coupled to I/O interfaces 2470 may include, without limitation, displays, keyboards, mice, printers, scanners, joysticks or other types of game controllers, media recording devices, external storage devices, network interface cards, and so forth.

In at least one embodiment, memory controllers 2480 facilitate data transfers between CPU 2400 and a system memory 2490. In at least one embodiment, core complex 2410 and graphics complex 2440 share system memory 2490. In at least one embodiment, CPU 2400 implements a memory subsystem that includes, without limitation, any amount and type of memory controllers 2480 and memory devices that may be dedicated to one component or shared among multiple components. In at least one embodiment, CPU 2400 implements a cache subsystem that includes, without limitation, one or more cache memories (e.g., L2 caches 2428 and L3 caches 2430) that may each be private to or shared between any number of components (e.g., cores 2420 and core complexes 2410).

Figure 25:
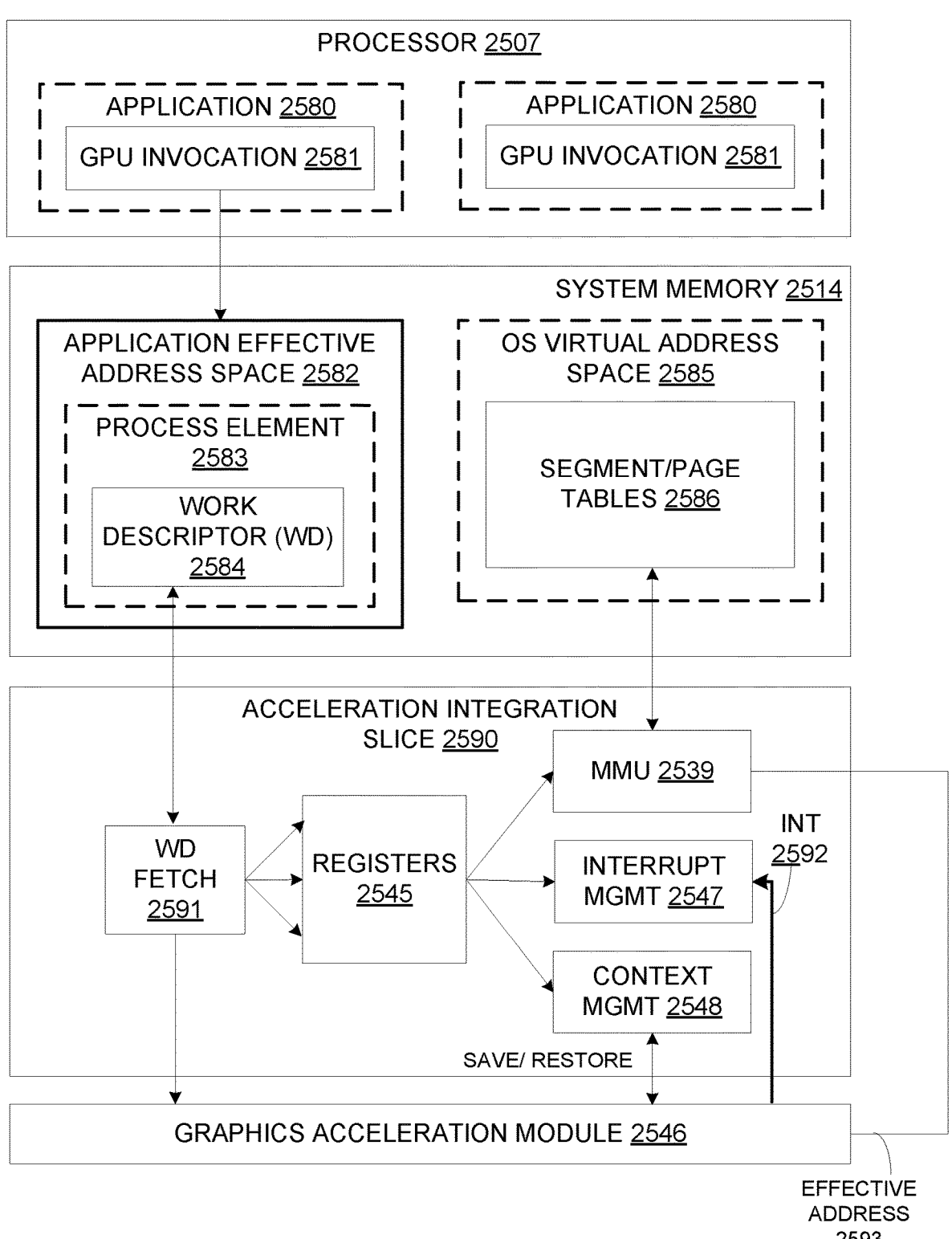
FIG. 25 illustrates an exemplary accelerator integration slice, in accordance with at least one embodiment.

FIG. 25 illustrates an exemplary accelerator integration slice 2590, in accordance with at least one embodiment. As used herein, a "slice" comprises a specified portion of processing resources of an accelerator integration circuit. In at least one embodiment, the accelerator integration circuit provides cache management, memory access, context management, and interrupt management services on behalf of multiple graphics processing engines included in a graphics acceleration module. The graphics processing engines may each comprise a separate GPU. Alternatively, the graphics processing engines may comprise different types of graphics processing engines within a GPU such as graphics execution units, media processing engines (e.g., video encoders/decoders), samplers, and blit engines. In at least one embodiment, the graphics acceleration module may be a GPU with multiple graphics processing engines. In at least one embodiment, the graphics processing engines may be individual GPUs integrated on a common package, line card, or chip.

An application effective address space 2582 within system memory 2514 stores process elements 2583. In one embodiment, process elements 2583 are stored in response to GPU invocations 2581 from applications 2580 executed on processor 2507. A process element 2583 contains process state for corresponding application 2580. A work descriptor ("WD") 2584 contained in process element 2583 can be a single job requested by an application or may contain a pointer to a queue of jobs. In at least one embodiment, WD 2584 is a pointer to a job request queue in application effective address space 2582.

Graphics acceleration module 2546 and/or individual graphics processing engines can be shared by all or a subset of processes in a system. In at least one embodiment, an infrastructure for setting up process state and sending WD 2584 to graphics acceleration module 2546 to start a job in a virtualized environment may be included.

In at least one embodiment, a dedicated-process programming model is implementation-specific. In this model, a single process owns graphics acceleration module 2546 or an individual graphics processing engine. Because graphics acceleration module 2546 is owned by a single process, a hypervisor initializes an accelerator integration circuit for an owning partition and an operating system initializes accelerator integration circuit for an owning process when graphics acceleration module 2546 is assigned.

In operation, a WD fetch unit 2591 in accelerator integration slice 2590 fetches next WD 2584 which includes an indication of work to be done by one or more graphics processing engines of graphics acceleration module 2546. Data from WD 2584 may be stored in registers 2545 and used by a memory management unit ("MMU") 2539, interrupt management circuit 2547 and/or context management circuit 2548 as illustrated. For example, one embodiment of MMU 2539 includes segment/page walk circuitry for accessing segment/page tables 2586 within OS virtual address space 2585. Interrupt management circuit 2547 may process interrupt events ("INT") 2592 received from graphics acceleration module 2546. When performing graphics operations, an effective address 2593 generated by a graphics processing engine is translated to a real address by MMU 2539.

In one embodiment, a same set of registers 2545 are duplicated for each graphics processing engine and/or graphics acceleration module 2546 and may be initialized by a hypervisor or operating system. Each of these duplicated registers may be included in accelerator integration slice 2590. Exemplary registers that may be initialized by a hypervisor are shown in Table 1.

TABLE 1

| Hypervisor Initialized Registers |
| --- |
| 1  Slice Control Register |
| 2  Real Address (RA) Scheduled Processes Area Pointer |
| 3  Authority Mask Override Register |
| 4  Interrupt Vector Table Entry Offset |
| 5  Interrupt Vector Table Entry Limit |
| 6  State Register |
| 7  Logical Partition ID |
| 8  Real address (RA) Hypervisor Accelerator Utilization Record Pointer |
| 9  Storage Description Register |

Exemplary registers that may be initialized by an operating system are shown in Table 2.

TABLE 2

| Operating System Initialized Registers |
| --- |
| 1  Process and Thread Identification |
| 2  Effective Address (EA) Context Save/Restore Pointer |
| 3  Virtual Address (VA) Accelerator Utilization Record Pointer |
| 4  Virtual Address (VA) Storage Segment Table Pointer |
| 5  Authority Mask |
| 6  Work descriptor |

In one embodiment, each WD 2584 is specific to a particular graphics acceleration module 2546 and/or a particular graphics processing engine. It contains all information required by a graphics processing engine to do work or it can be a pointer to a memory location where an application has set up a command queue of work to be completed.

Figure 26A:
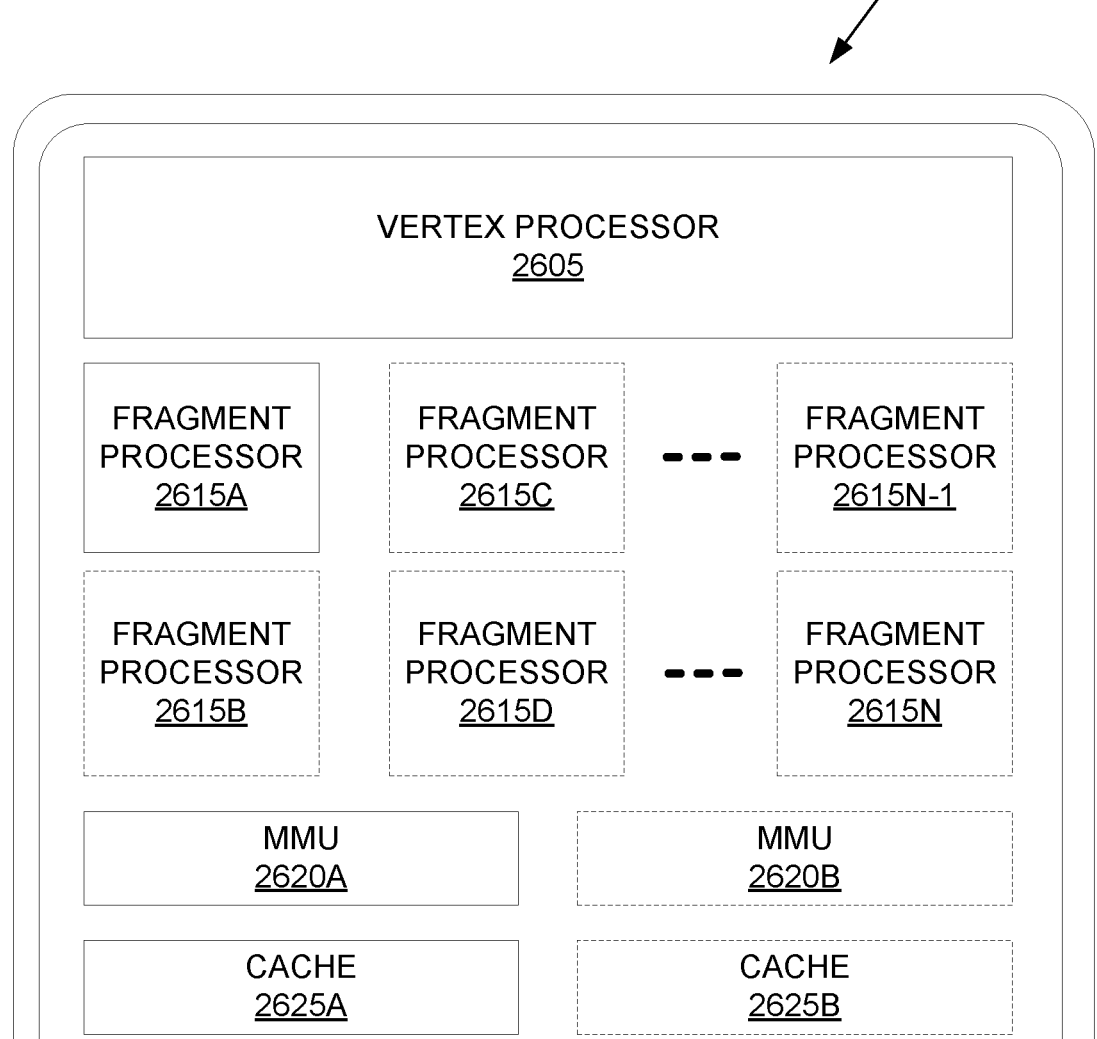
FIGS. 26A-26B illustrate exemplary graphics processors, in accordance with at least one embodiment.
Figure 26B:
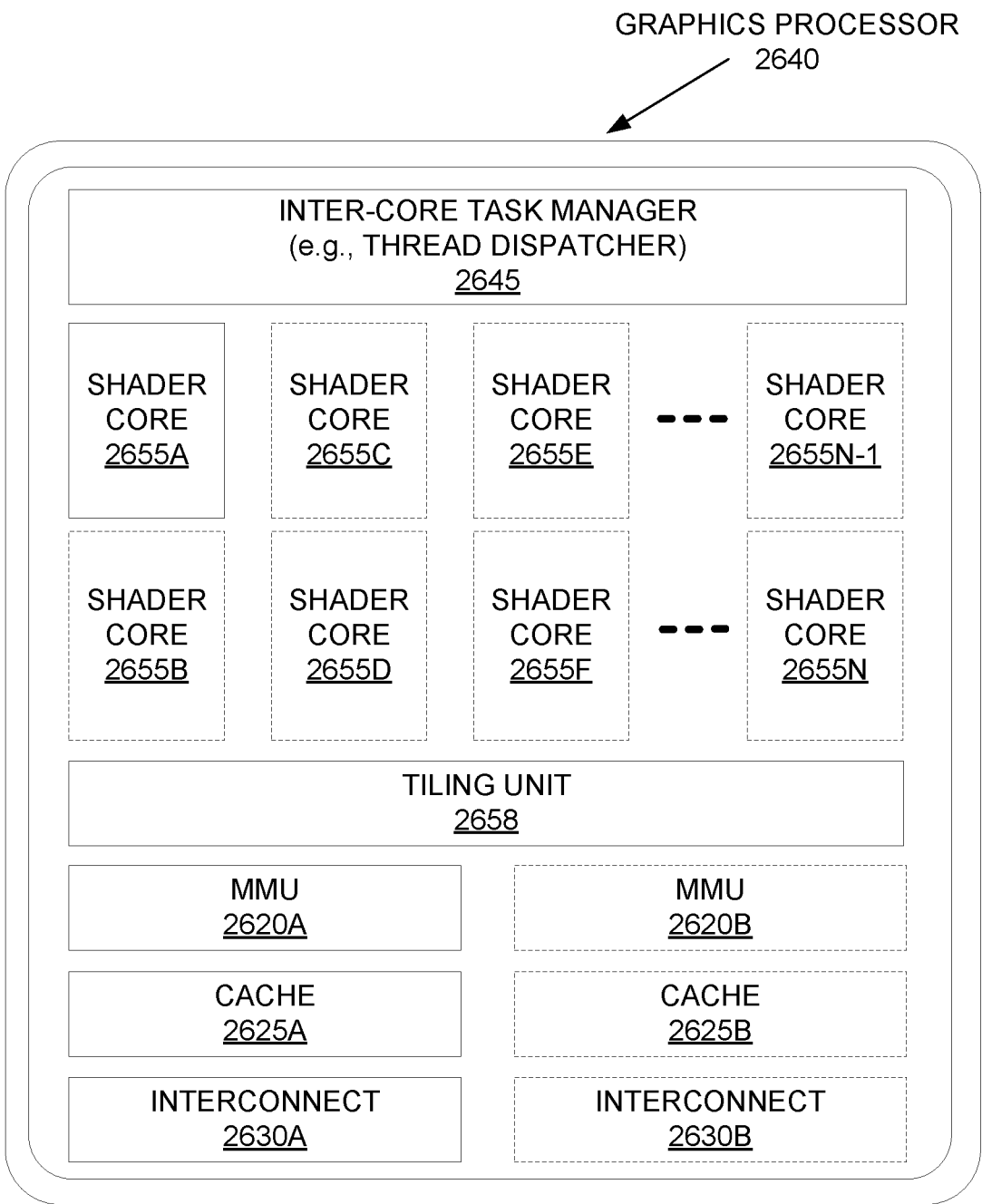

FIGS. 26A-26B illustrate exemplary graphics processors, in accordance with at least one embodiment. In at least one embodiment, any of the exemplary graphics processors may be fabricated using one or more IP cores. In addition to what is illustrated, other logic and circuits may be included in at least one embodiment, including additional graphics processors/cores, peripheral interface controllers, or general-purpose processor cores. In at least one embodiment, the exemplary graphics processors are for use within an SoC.

FIG. 26A illustrates an exemplary graphics processor 2610 of an SoC integrated circuit that may be fabricated using one or more IP cores, in accordance with at least one embodiment. FIG. 26B illustrates an additional exemplary graphics processor 2640 of an SoC integrated circuit that may be fabricated using one or more IP cores, in accordance with at least one embodiment. In at least one embodiment, graphics processor 2610 of FIG. 26A is a low power graphics processor core. In at least one embodiment, graphics processor 2640 of FIG. 26B is a higher performance graphics processor core. In at least one embodiment, each of graphics processors 2610, 2640 can be variants of graphics processor 2110 of FIG. 21.

In at least one embodiment, graphics processor 2610 includes a vertex processor 2605 and one or more fragment processor(s) 2615A-2615N (e.g., 2615A, 2615B, 2615C, 2615D, through 2615N-1, and 2615N). In at least one embodiment, graphics processor 2610 can execute different shader programs via separate logic, such that vertex processor 2605 is optimized to execute operations for vertex shader programs, while one or more fragment processor(s) 2615A-2615N execute fragment (e.g., pixel) shading operations for fragment or pixel shader programs. In at least one embodiment, vertex processor 2605 performs a vertex processing stage of a 3D graphics pipeline and generates primitives and vertex data. In at least one embodiment, fragment processor(s) 2615A-2615N use primitive and vertex data generated by vertex processor 2605 to produce a framebuffer that is displayed on a display device. In at least one embodiment, fragment processor(s) 2615A-2615N are optimized to execute fragment shader programs as provided for in an OpenGL API, which may be used to perform similar operations as a pixel shader program as provided for in a Direct 3D API.

In at least one embodiment, graphics processor 2610 additionally includes one or more MMU(s) 2620A-2620B, cache(s) 2625A-2625B, and circuit interconnect(s) 2630A-2630B. In at least one embodiment, one or more MMU(s) 2620A-2620B provide for virtual to physical address mapping for graphics processor 2610, including for vertex processor 2605 and/or fragment processor(s) 2615A-2615N, which may reference vertex or image/texture data stored in memory, in addition to vertex or image/texture data stored in one or more cache(s) 2625A-2625B. In at least one embodiment, one or more MMU(s) 2620A-2620B may be synchronized with other MMUs within a system, including one or more MMUs associated with one or more application processor(s) 2105, image processors 2115, and/or video processors 2120 of FIG. 21, such that each processor 2105-2120 can participate in a shared or unified virtual memory system. In at least one embodiment, one or more circuit interconnect(s) 2630A-2630B enable graphics processor 2610 to interface with other IP cores within an SoC, either via an internal bus of the SoC or via a direct connection. In at least one embodiment, graphics processor 2640 includes one or more MMU(s) 2620A-2620B, caches 2625A-2625B, and circuit interconnects 2630A-2630B of graphics processor 2610 of FIG. 26A. In at least one embodiment, graphics processor 2640 includes one or more shader core(s) 2655A-2655N (e.g., 2655A, 2655B, 2655C, 2655D, 2655E, 2655F, through 2655N-1, and 2655N), which provides for a unified shader core architecture in which a single core or type or core can execute all types of programmable shader code, including shader program code to implement vertex shaders, fragment shaders, and/or compute shaders. In at least one embodiment, a number of shader cores can vary. In at least one embodiment, graphics processor 2640 includes an inter-core task manager 2645, which acts as a thread dispatcher to dispatch execution threads to one or more shader cores 2655A-2655N and a tiling unit 2658 to accelerate tiling operations for tile-based rendering, in which rendering operations for a scene are subdivided in image space, for example to exploit local spatial coherence within a scene or to optimize use of internal caches.

Figure 27A:
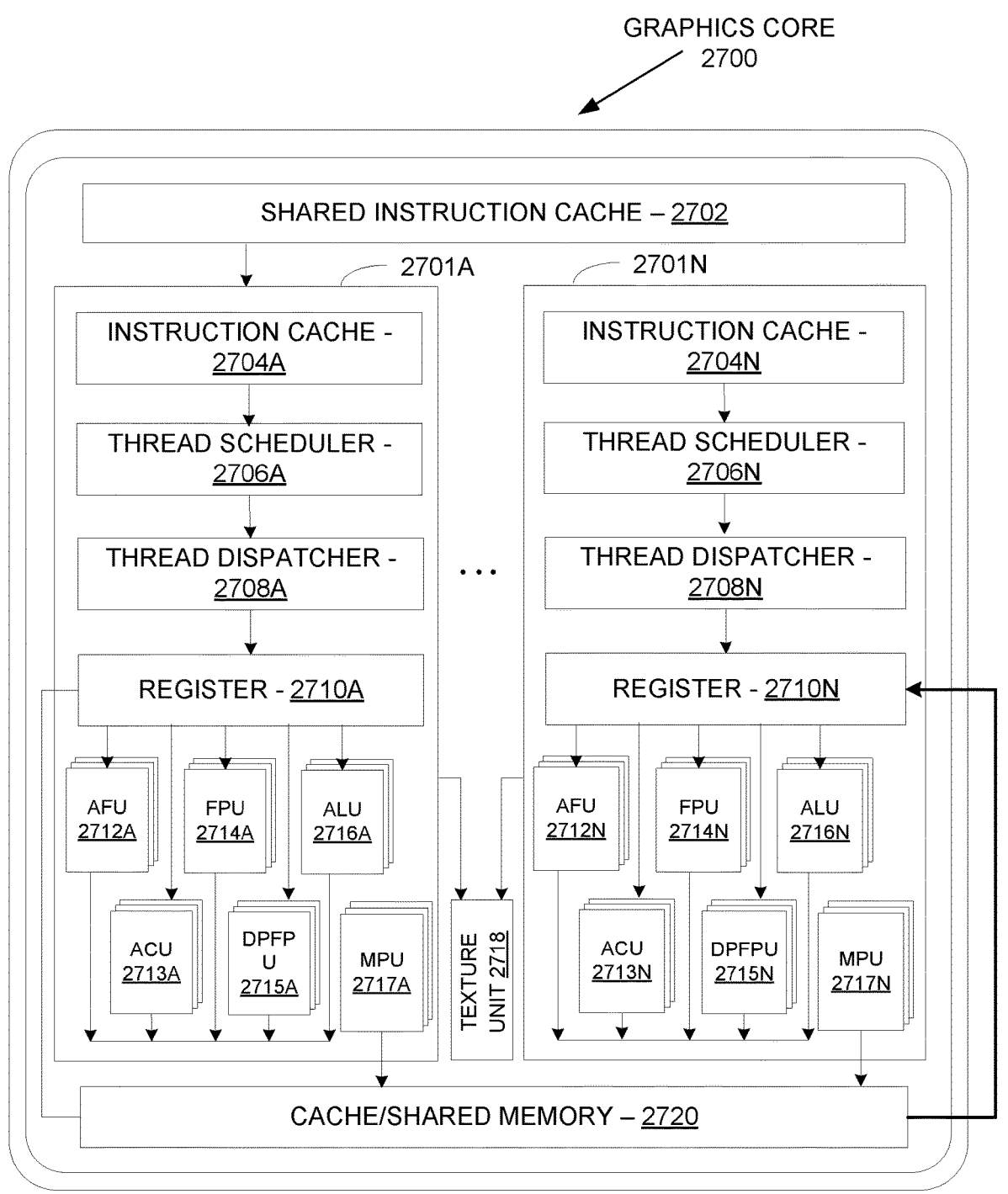
FIG. 27A illustrates a graphics core, in accordance with at least one embodiment.

FIG. 27A illustrates a graphics core 2700, in accordance with at least one embodiment. In at least one embodiment, graphics core 2700 may be included within graphics processor 2110 of FIG. 21. In at least one embodiment, graphics core 2700 may be a unified shader core 2655A-2655N as in FIG. 26B. In at least one embodiment, graphics core 2700 includes a shared instruction cache 2702, a texture unit 2718, and a cache/shared memory 2720 that are common to execution resources within graphics core 2700. In at least one embodiment, graphics core 2700 can include multiple slices 2701A-2701N or partition for each core, and a graphics processor can include multiple instances of graphics core 2700. Slices 2701A-2701N can include support logic including a local instruction cache 2704A-2704N, a thread scheduler 2706A-2706N, a thread dispatcher 2708A-2708N, and a set of registers 2710A-2710N. In at least one embodiment, slices 2701A-2701N can include a set of additional function units ("AFUs") 2712A-2712N, floating-point units ("FPUs") 2714A-2714N, integer arithmetic logic units ("ALUs") 2716-2716N, address computational units ("ACUs") 2713A-2713N, double-precision floating-point units ("DPFPUs") 2715A-2715N, and matrix processing units ("MPUs") 2717A-2717N. In at least one embodiment, a graphics core 2700 is referred to as a compute unit or computing unit.

In at least one embodiment, FPUs 2714A-2714N can perform single-precision (32-bit) and half-precision (16-bit) floating point operations, while DPFPUs 2715A-2715N perform double precision (64-bit) floating point operations. In at least one embodiment, ALUs 2716A-2716N can perform variable precision integer operations at 8-bit, 16-bit, and 32-bit precision, and can be configured for mixed precision operations. In at least one embodiment, MPUs 2717A-2717N can also be configured for mixed precision matrix operations, including half-precision floating point and 8-bit integer operations. In at least one embodiment, MPUs 2717-2717N can perform a variety of matrix operations to accelerate CUDA programs, including enabling support for accelerated general matrix to matrix multiplication ("GEMM"). In at least one embodiment, AFUs 2712A-2712N can perform additional logic operations not supported by floating-point or integer units, including trigonometric operations (e.g., Sine, Cosine, etc.).

Figure 27B:
FIG. 27B illustrates a GPGPU, in accordance with at least one embodiment.

FIG. 27B illustrates a general-purpose graphics processing unit ("GPGPU") 2730, in accordance with at least one embodiment. In at least one embodiment, GPGPU 2730 is highly-parallel and suitable for deployment on a multi-chip module. In at least one embodiment, GPGPU 2730 can be configured to enable highly-parallel compute operations to be performed by an array of GPUs. In at least one embodiment, GPGPU 2730 can be linked directly to other instances of GPGPU 2730 to create a multi-GPU cluster to improve execution time for CUDA programs. In at least one embodiment, GPGPU 2730 includes a host interface 2732 to enable a connection with a host processor. In at least one embodiment, host interface 2732 is a PCIe interface. In at least one embodiment, host interface 2732 can be a vendor specific communications interface or communications fabric. In at least one embodiment, GPGPU 2730 receives commands from a host processor and uses a global scheduler 2734 to distribute execution threads associated with those commands to a set of compute clusters 2736A-2736H. In at least one embodiment, compute clusters 2736A-2736H share a cache memory 2738. In at least one embodiment, cache memory 2738 can serve as a higher-level cache for cache memories within compute clusters 2736A-2736H.

In at least one embodiment, GPGPU 2730 includes memory 2744A-2744B coupled with compute clusters 2736A-2736H via a set of memory controllers 2742A-2742B. In at least one embodiment, memory 2744A-2744B can include various types of memory devices including DRAM or graphics random access memory, such as synchronous graphics random access memory ("SGRAM"), including graphics double data rate ("GDDR") memory.

In at least one embodiment, compute clusters 2736A-2736H each include a set of graphics cores, such as graphics core 2700 of FIG. 27A, which can include multiple types of integer and floating point logic units that can perform computational operations at a range of precisions including suited for computations associated with CUDA programs. For example, in at least one embodiment, at least a subset of floating point units in each of compute clusters 2736A-2736H can be configured to perform 16-bit or 32-bit floating point operations, while a different subset of floating point units can be configured to perform 64-bit floating point operations.

In at least one embodiment, multiple instances of GPGPU 2730 can be configured to operate as a compute cluster. Compute clusters 2736A-2736H may implement any technically feasible communication techniques for synchronization and data exchange. In at least one embodiment, multiple instances of GPGPU 2730 communicate over host interface 2732. In at least one embodiment, GPGPU 2730 includes an I/O hub 2739 that couples GPGPU 2730 with a GPU link 2740 that enables a direct connection to other instances of GPGPU 2730. In at least one embodiment, GPU link 2740 is coupled to a dedicated GPU-to-GPU bridge that enables communication and synchronization between multiple instances of GPGPU 2730. In at least one embodiment GPU link 2740 couples with a high speed interconnect to transmit and receive data to other GPGPUs 2730 or parallel processors. In at least one embodiment, multiple instances of GPGPU 2730 are located in separate data processing systems and communicate via a network device that is accessible via host interface 2732. In at least one embodiment GPU link 2740 can be configured to enable a connection to a host processor in addition to or as an alternative to host interface 2732. In at least one embodiment, GPGPU 2730 can be configured to execute a CUDA program.

Figure 28A:
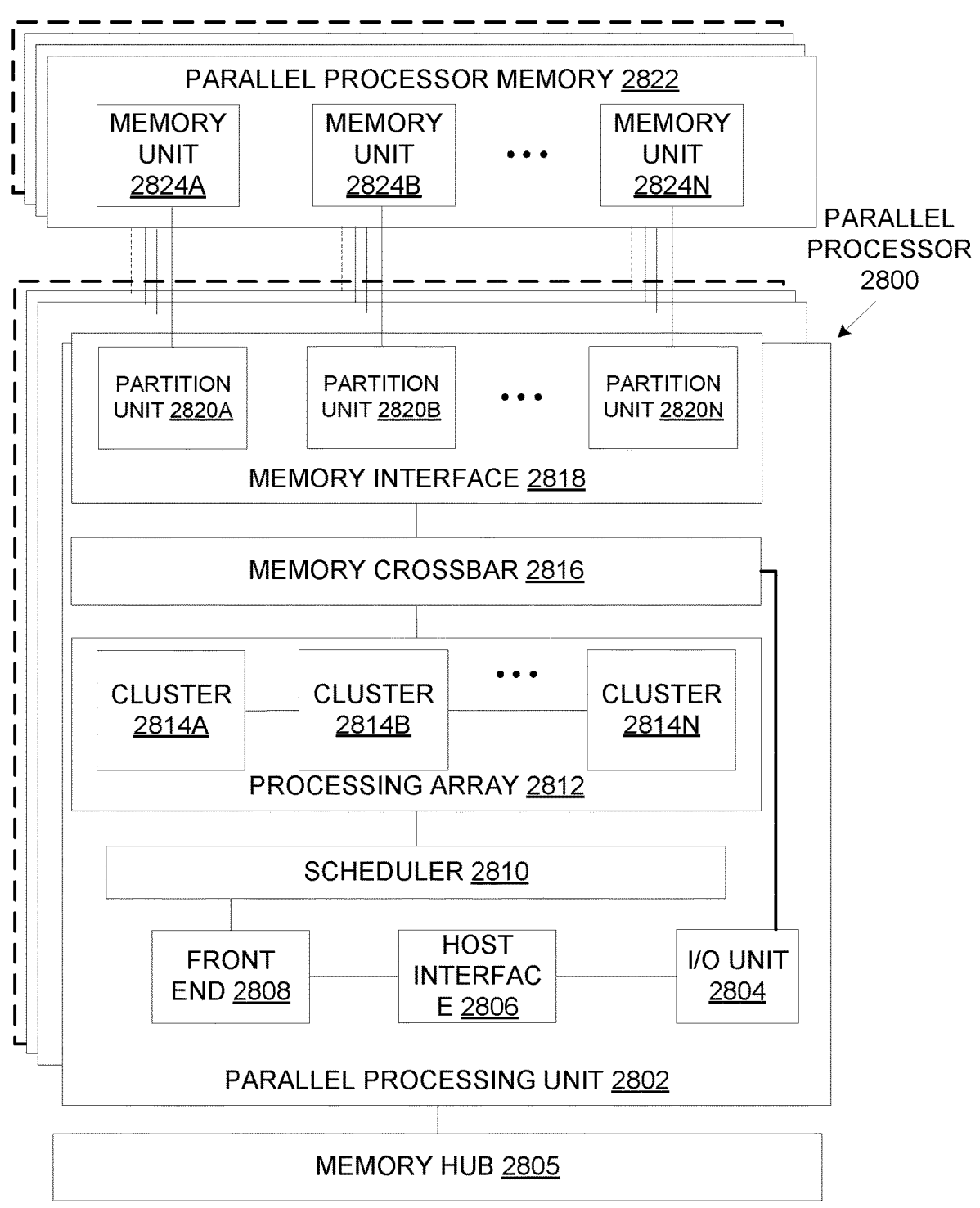
FIG. 28A illustrates a parallel processor, in accordance with at least one embodiment.

FIG. 28A illustrates a parallel processor 2800, in accordance with at least one embodiment. In at least one embodiment, various components of parallel processor 2800 may be implemented using one or more integrated circuit devices, such as programmable processors, application specific integrated circuits ("ASICs"), or FPGAs.

In at least one embodiment, parallel processor 2800 includes a parallel processing unit 2802. In at least one embodiment, parallel processing unit 2802 includes an I/O unit 2804 that enables communication with other devices, including other instances of parallel processing unit 2802. In at least one embodiment, I/O unit 2804 may be directly connected to other devices. In at least one embodiment, I/O unit 2804 connects with other devices via use of a hub or switch interface, such as memory hub 2805. In at least one embodiment, connections between memory hub 2805 and I/O unit 2804 form a communication link. In at least one embodiment, I/O unit 2804 connects with a host interface 2806 and a memory crossbar 2816, where host interface 2806 receives commands directed to performing processing operations and memory crossbar 2816 receives commands directed to performing memory operations.

In at least one embodiment, when host interface 2806 receives a command buffer via I/O unit 2804, host interface 2806 can direct work operations to perform those commands to a front end 2808. In at least one embodiment, front end 2808 couples with a scheduler 2810, which is configured to distribute commands or other work items to a processing array 2812. In at least one embodiment, scheduler 2810 ensures that processing array 2812 is properly configured and in a valid state before tasks are distributed to processing array 2812. In at least one embodiment, scheduler 2810 is implemented via firmware logic executing on a microcontroller. In at least one embodiment, microcontroller implemented scheduler 2810 is configurable to perform complex scheduling and work distribution operations at coarse and fine granularity, enabling rapid preemption and context switching of threads executing on processing array 2812. In at least one embodiment, host software can prove workloads for scheduling on processing array 2812 via one of multiple graphics processing doorbells. In at least one embodiment, workloads can then be automatically distributed across processing array 2812 by scheduler 2810 logic within a microcontroller including scheduler 2810.

In at least one embodiment, processing array 2812 can include up to "N" clusters (e.g., cluster 2814A, cluster 2814B, through cluster 2814N). In at least one embodiment, each cluster 2814A-2814N of processing array 2812 can execute a large number of concurrent threads. In at least one embodiment, scheduler 2810 can allocate work to clusters 2814A-2814N of processing array 2812 using various scheduling and/or work distribution algorithms, which may vary depending on the workload arising for each type of program or computation. In at least one embodiment, scheduling can be handled dynamically by scheduler 2810, or can be assisted in part by compiler logic during compilation of program logic configured for execution by processing array 2812. In at least one embodiment, different clusters 2814A-2814N of processing array 2812 can be allocated for processing different types of programs or for performing different types of computations.

In at least one embodiment, processing array 2812 can be configured to perform various types of parallel processing operations. In at least one embodiment, processing array 2812 is configured to perform general-purpose parallel compute operations. For example, in at least one embodiment, processing array 2812 can include logic to execute processing tasks including filtering of video and/or audio data, performing modeling operations, including physics operations, and performing data transformations.

In at least one embodiment, processing array 2812 is configured to perform parallel graphics processing operations. In at least one embodiment, processing array 2812 can include additional logic to support execution of such graphics processing operations, including, but not limited to texture sampling logic to perform texture operations, as well as tessellation logic and other vertex processing logic. In at least one embodiment, processing array 2812 can be configured to execute graphics processing related shader programs such as, but not limited to vertex shaders, tessellation shaders, geometry shaders, and pixel shaders. In at least one embodiment, parallel processing unit 2802 can transfer data from system memory via I/O unit 2804 for processing. In at least one embodiment, during processing, transferred data can be stored to on-chip memory (e.g., a parallel processor memory 2822) during processing, then written back to system memory.

In at least one embodiment, when parallel processing unit 2802 is used to perform graphics processing, scheduler 2810 can be configured to divide a processing workload into approximately equal sized tasks, to better enable distribution of graphics processing operations to multiple clusters 2814A-2814N of processing array 2812. In at least one embodiment, portions of processing array 2812 can be configured to perform different types of processing. For example, in at least one embodiment, a first portion may be configured to perform vertex shading and topology generation, a second portion may be configured to perform tessellation and geometry shading, and a third portion may be configured to perform pixel shading or other screen space operations, to produce a rendered image for display. In at least one embodiment, intermediate data produced by one or more of clusters 2814A-2814N may be stored in buffers to allow intermediate data to be transmitted between clusters 2814A-2814N for further processing.

In at least one embodiment, processing array 2812 can receive processing tasks to be executed via scheduler 2810, which receives commands defining processing tasks from front end 2808. In at least one embodiment, processing tasks can include indices of data to be processed, e.g., surface (patch) data, primitive data, vertex data, and/or pixel data, as well as state parameters and commands defining how data is to be processed (e.g., what program is to be executed). In at least one embodiment, scheduler 2810 may be configured to fetch indices corresponding to tasks or may receive indices from front end 2808. In at least one embodiment, front end 2808 can be configured to ensure processing array 2812 is configured to a valid state before a workload specified by incoming command buffers (e.g., batch-buffers, push buffers, etc.) is initiated.

In at least one embodiment, each of one or more instances of parallel processing unit 2802 can couple with parallel processor memory 2822. In at least one embodiment, parallel processor memory 2822 can be accessed via memory crossbar 2816, which can receive memory requests from processing array 2812 as well as I/O unit 2804. In at least one embodiment, memory crossbar 2816 can access parallel processor memory 2822 via a memory interface 2818. In at least one embodiment, memory interface 2818 can include multiple partition units (e.g., a partition unit 2820A, partition unit 2820B, through partition unit 2820N) that can each couple to a portion (e.g., memory unit) of parallel processor memory 2822. In at least one embodiment, a number of partition units 2820A-2820N is configured to be equal to a number of memory units, such that a first partition unit 2820A has a corresponding first memory unit 2824A, a second partition unit 2820B has a corresponding memory unit 2824B, and an Nth partition unit 2820N has a corresponding Nth memory unit 2824N. In at least one embodiment, a number of partition units 2820A-2820N may not be equal to a number of memory devices.

In at least one embodiment, memory units 2824A-2824N can include various types of memory devices, including DRAM or graphics random access memory, such as SGRAM, including GDDR memory. In at least one embodiment, memory units 2824A-2824N may also include 3D stacked memory, including but not limited to high bandwidth memory ("HBM"). In at least one embodiment, render targets, such as frame buffers or texture maps may be stored across memory units 2824A-2824N, allowing partition units 2820A-2820N to write portions of each render target in parallel to efficiently use available bandwidth of parallel processor memory 2822. In at least one embodiment, a local instance of parallel processor memory 2822 may be excluded in favor of a unified memory design that utilizes system memory in conjunction with local cache memory.

In at least one embodiment, any one of clusters 2814A-2814N of processing array 2812 can process data that will be written to any of memory units 2824A-2824N within parallel processor memory 2822. In at least one embodiment, memory crossbar 2816 can be configured to transfer an output of each cluster 2814A-2814N to any partition unit 2820A-2820N or to another cluster 2814A-2814N, which can perform additional processing operations on an output. In at least one embodiment, each cluster 2814A-2814N can communicate with memory interface 2818 through memory crossbar 2816 to read from or write to various external memory devices. In at least one embodiment, memory crossbar 2816 has a connection to memory interface 2818 to communicate with I/O unit 2804, as well as a connection to a local instance of parallel processor memory 2822, enabling processing units within different clusters 2814A-2814N to communicate with system memory or other memory that is not local to parallel processing unit 2802. In at least one embodiment, memory crossbar 2816 can use virtual channels to separate traffic streams between clusters 2814A-2814N and partition units 2820A-2820N.

In at least one embodiment, multiple instances of parallel processing unit 2802 can be provided on a single add-in card, or multiple add-in cards can be interconnected. In at least one embodiment, different instances of parallel processing unit 2802 can be configured to interoperate even if different instances have different numbers of processing cores, different amounts of local parallel processor memory, and/or other configuration differences. For example, in at least one embodiment, some instances of parallel processing unit 2802 can include higher precision floating point units relative to other instances. In at least one embodiment, systems incorporating one or more instances of parallel processing unit 2802 or parallel processor 2800 can be implemented in a variety of configurations and form factors, including but not limited to desktop, laptop, or handheld personal computers, servers, workstations, game consoles, and/or embedded systems.

Figure 28B:
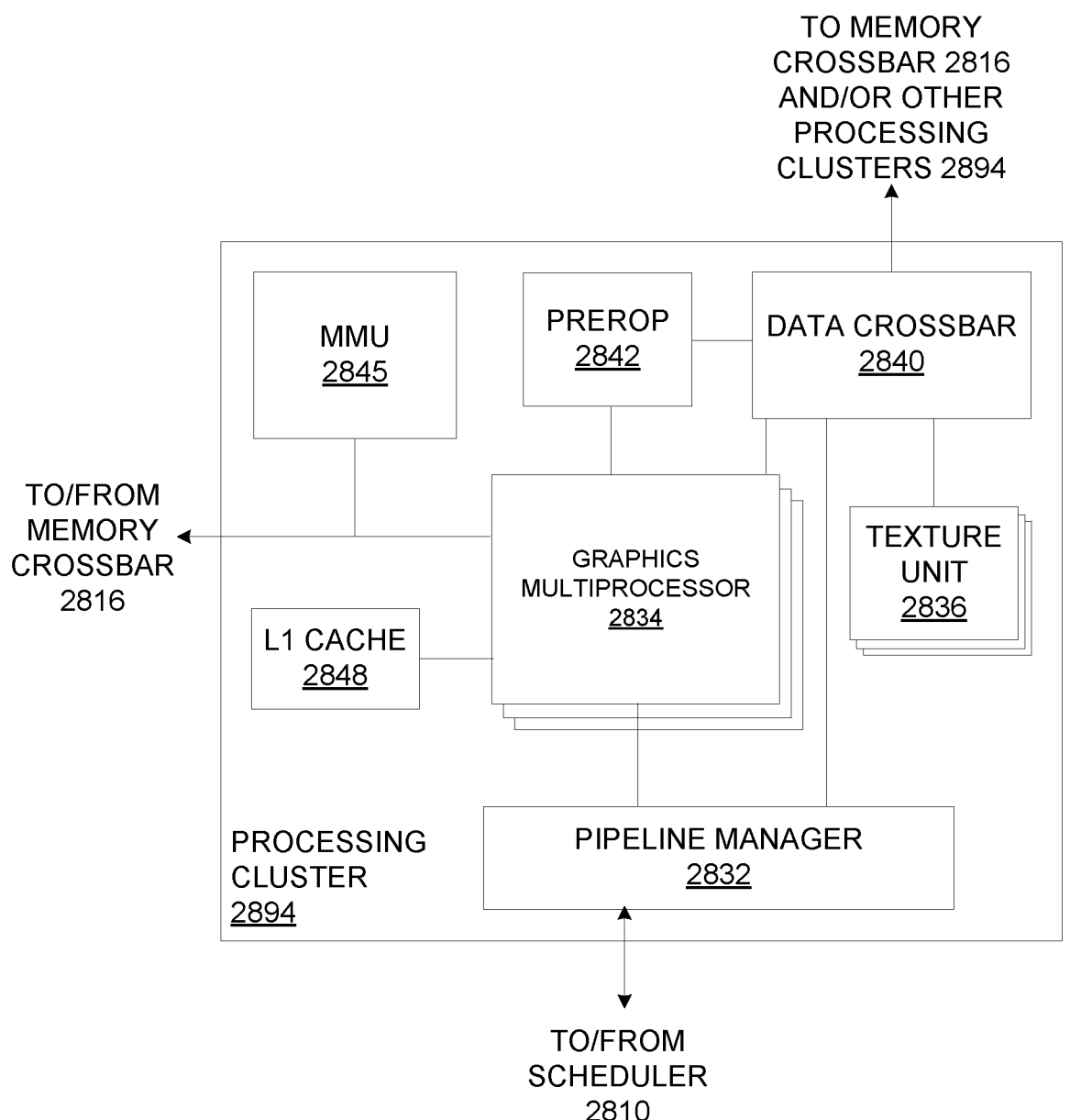
FIG. 28B illustrates a processing cluster, in accordance with at least one embodiment.

FIG. 28B illustrates a processing cluster 2894, in accordance with at least one embodiment. In at least one embodiment, processing cluster 2894 is included within a parallel processing unit. In at least one embodiment, processing cluster 2894 is one of processing clusters 2814A-2814N of FIG. 28. In at least one embodiment, processing cluster 2894 can be configured to execute many threads in parallel, where the term "thread" refers to an instance of a particular program executing on a particular set of input data. In at least one embodiment, single instruction, multiple data ("SIMD") instruction issue techniques are used to support parallel execution of a large number of threads without providing multiple independent instruction units. In at least one embodiment, single instruction, multiple thread ("SIMT") techniques are used to support parallel execution of a large number of generally synchronized threads, using a common instruction unit configured to issue instructions to a set of processing engines within each processing cluster 2894.

In at least one embodiment, operation of processing cluster 2894 can be controlled via a pipeline manager 2832 that distributes processing tasks to SIMT parallel processors. In at least one embodiment, pipeline manager 2832 receives instructions from scheduler 2810 of FIG. 28 and manages execution of those instructions via a graphics multiprocessor 2834 and/or a texture unit 2836. In at least one embodiment, graphics multiprocessor 2834 is an exemplary instance of a SIMT parallel processor. However, in at least one embodiment, various types of SIMT parallel processors of differing architectures may be included within processing cluster 2894. In at least one embodiment, one or more instances of graphics multiprocessor 2834 can be included within processing cluster 2894. In at least one embodiment, graphics multiprocessor 2834 can process data and a data crossbar 2840 can be used to distribute processed data to one of multiple possible destinations, including other shader units. In at least one embodiment, pipeline manager 2832 can facilitate distribution of processed data by specifying destinations for processed data to be distributed via data crossbar 2840.

In at least one embodiment, each graphics multiprocessor 2834 within processing cluster 2894 can include an identical set of functional execution logic (e.g., arithmetic logic units, load/store units ("LSUs"), etc.). In at least one embodiment, functional execution logic can be configured in a pipelined manner in which new instructions can be issued before previous instructions are complete. In at least one embodiment, functional execution logic supports a variety of operations including integer and floating point arithmetic, comparison operations, Boolean operations, bit-shifting, and computation of various algebraic functions. In at least one embodiment, same functional-unit hardware can be leveraged to perform different operations and any combination of functional units may be present.

In at least one embodiment, instructions transmitted to processing cluster 2894 constitute a thread. In at least one embodiment, a set of threads executing across a set of parallel processing engines is a thread group. In at least one embodiment, a thread group executes a program on different input data. In at least one embodiment, each thread within a thread group can be assigned to a different processing engine within graphics multiprocessor 2834. In at least one embodiment, a thread group may include fewer threads than a number of processing engines within graphics multiprocessor 2834. In at least one embodiment, when a thread group includes fewer threads than a number of processing engines, one or more of the processing engines may be idle during cycles in which that thread group is being processed. In at least one embodiment, a thread group may also include more threads than a number of processing engines within graphics multiprocessor 2834. In at least one embodiment, when a thread group includes more threads than the number of processing engines within graphics multiprocessor 2834, processing can be performed over consecutive clock cycles. In at least one embodiment, multiple thread groups can be executed concurrently on graphics multiprocessor 2834.

In at least one embodiment, graphics multiprocessor 2834 includes an internal cache memory to perform load and store operations. In at least one embodiment, graphics multiprocessor 2834 can forego an internal cache and use a cache memory (e.g., L1 cache 2848) within processing cluster 2894. In at least one embodiment, each graphics multiprocessor 2834 also has access to Level 2 ("L2") caches within partition units (e.g., partition units 2820A-2820N of FIG. 28A) that are shared among all processing clusters 2894 and may be used to transfer data between threads. In at least one embodiment, graphics multiprocessor 2834 may also access off-chip global memory, which can include one or more of local parallel processor memory and/or system memory. In at least one embodiment, any memory external to parallel processing unit 2802 may be used as global memory. In at least one embodiment, processing cluster 2894 includes multiple instances of graphics multiprocessor 2834 that can share common instructions and data, which may be stored in L1 cache 2848.

In at least one embodiment, each processing cluster 2894 may include an MMU 2845 that is configured to map virtual addresses into physical addresses. In at least one embodiment, one or more instances of MMU 2845 may reside within memory interface 2818 of FIG. 28. In at least one embodiment, MMU 2845 includes a set of page table entries ("PTEs") used to map a virtual address to a physical address of a tile and optionally a cache line index. In at least one embodiment, MMU 2845 may include address translation lookaside buffers ("TLBs") or caches that may reside within graphics multiprocessor 2834 or L1 cache 2848 or processing cluster 2894. In at least one embodiment, a physical address is processed to distribute surface data access locality to allow efficient request interleaving among partition units. In at least one embodiment, a cache line index may be used to determine whether a request for a cache line is a hit or miss.

In at least one embodiment, processing cluster 2894 may be configured such that each graphics multiprocessor 2834 is coupled to a texture unit 2836 for performing texture mapping operations, e.g., determining texture sample positions, reading texture data, and filtering texture data. In at least one embodiment, texture data is read from an internal texture L1 cache (not shown) or from an L1 cache within graphics multiprocessor 2834 and is fetched from an L2 cache, local parallel processor memory, or system memory, as needed. In at least one embodiment, each graphics multiprocessor 2834 outputs a processed task to data crossbar 2840 to provide the processed task to another processing cluster 2894 for further processing or to store the processed task in an L2 cache, a local parallel processor memory, or a system memory via memory crossbar 2816. In at least one embodiment, a pre-raster operations unit ("preROP") 2842 is configured to receive data from graphics multiprocessor 2834, direct data to ROP units, which may be located with partition units as described herein (e.g., partition units 2820A-2820N of FIG. 28). In at least one embodiment, PreROP 2842 can perform optimizations for color blending, organize pixel color data, and perform address translations.

Figure 28C:
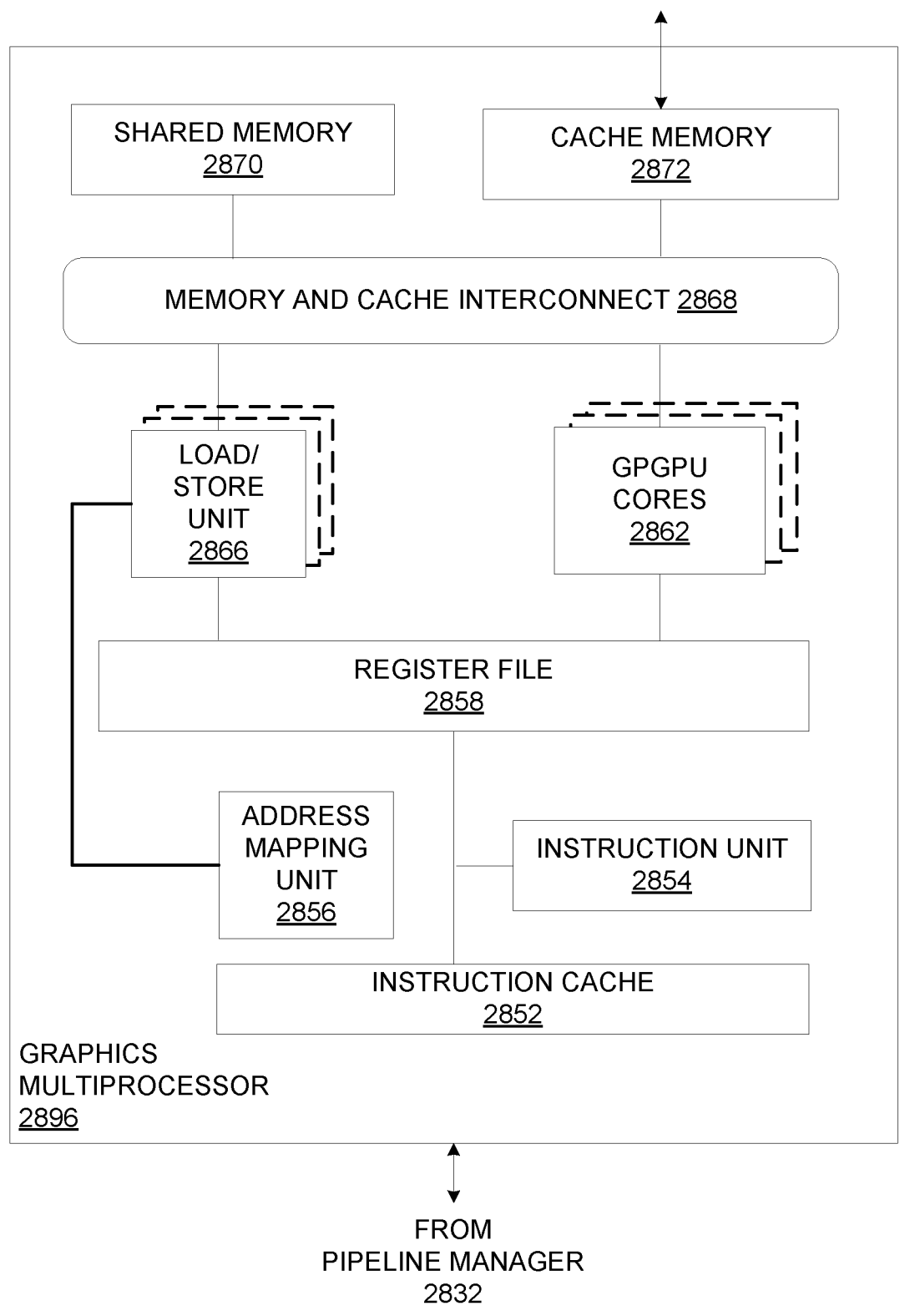
FIG. 28C illustrates a graphics multiprocessor, in accor- dance with at least one embodiment.

FIG. 28C illustrates a graphics multiprocessor 2896, in accordance with at least one embodiment. In at least one embodiment, graphics multiprocessor 2896 is graphics multiprocessor 2834 of FIG. 28B. In at least one embodiment, graphics multiprocessor 2896 couples with pipeline manager 2832 of processing cluster 2894. In at least one embodiment, graphics multiprocessor 2896 has an execution pipeline including but not limited to an instruction cache 2852, an instruction unit 2854, an address mapping unit 2856, a register file 2858, one or more GPGPU cores 2862, and one or more LSUs 2866. GPGPU cores 2862 and LSUs 2866 are coupled with cache memory 2872 and shared memory 2870 via a memory and cache interconnect 2868.

In at least one embodiment, instruction cache 2852 receives a stream of instructions to execute from pipeline manager 2832. In at least one embodiment, instructions are cached in instruction cache 2852 and dispatched for execution by instruction unit 2854. In at least one embodiment, instruction unit 2854 can dispatch instructions as thread groups (e.g., warps), with each thread of a thread group assigned to a different execution unit within GPGPU core 2862. In at least one embodiment, an instruction can access any of a local, shared, or global address space by specifying an address within a unified address space. In at least one embodiment, address mapping unit 2856 can be used to translate addresses in a unified address space into a distinct memory address that can be accessed by LSUs 2866.

In at least one embodiment, register file 2858 provides a set of registers for functional units of graphics multiprocessor 2896. In at least one embodiment, register file 2858 provides temporary storage for operands connected to data paths of functional units (e.g., GPGPU cores 2862, LSUs 2866) of graphics multiprocessor 2896. In at least one embodiment, register file 2858 is divided between each of functional units such that each functional unit is allocated a dedicated portion of register file 2858. In at least one embodiment, register file 2858 is divided between different thread groups being executed by graphics multiprocessor 2896.

In at least one embodiment, GPGPU cores 2862 can each include FPUs and/or integer ALUs that are used to execute instructions of graphics multiprocessor 2896. GPGPU cores 2862 can be similar in architecture or can differ in architecture. In at least one embodiment, a first portion of GPGPU cores 2862 include a single precision FPU and an integer ALU while a second portion of GPGPU cores 2862 include a double precision FPU. In at least one embodiment, FPUs can implement IEEE 754-2008 standard for floating point arithmetic or enable variable precision floating point arithmetic. In at least one embodiment, graphics multiprocessor 2896 can additionally include one or more fixed function or special function units to perform specific functions such as copy rectangle or pixel blending operations. In at least one embodiment one or more of GPGPU cores 2862 can also include fixed or special function logic.

In at least one embodiment, GPGPU cores 2862 include SIMD logic capable of performing a single instruction on multiple sets of data. In at least one embodiment GPGPU cores 2862 can physically execute SIMD4, SIMD8, and SIMD16 instructions and logically execute SIMD1, SIMD2, and SIMD32 instructions. In at least one embodiment, SIMD instructions for GPGPU cores 2862 can be generated at compile time by a shader compiler or automatically generated when executing programs written and compiled for single program multiple data ("SPMD") or SIMT architectures. In at least one embodiment, multiple threads of a program configured for an SIMT execution model can executed via a single SIMD instruction. For example, in at least one embodiment, eight SIMT threads that perform the same or similar operations can be executed in parallel via a single SIMD8 logic unit.

In at least one embodiment, memory and cache interconnect 2868 is an interconnect network that connects each functional unit of graphics multiprocessor 2896 to register file 2858 and to shared memory 2870. In at least one embodiment, memory and cache interconnect 2868 is a crossbar interconnect that allows LSU 2866 to implement load and store operations between shared memory 2870 and register file 2858. In at least one embodiment, register file 2858 can operate at a same frequency as GPGPU cores 2862, thus data transfer between GPGPU cores 2862 and register file 2858 is very low latency. In at least one embodiment, shared memory 2870 can be used to enable communication between threads that execute on functional units within graphics multiprocessor 2896. In at least one embodiment, cache memory 2872 can be used as a data cache for example, to cache texture data communicated between functional units and texture unit 2836. In at least one embodiment, shared memory 2870 can also be used as a program managed cached. In at least one embodiment, threads executing on GPGPU cores 2862 can programmatically store data within shared memory in addition to automatically cached data that is stored within cache memory 2872.

In at least one embodiment, a parallel processor or GPGPU as described herein is communicatively coupled to host/processor cores to accelerate graphics operations, machine-learning operations, pattern analysis operations, and various general purpose GPU (GPGPU) functions. In at least one embodiment, a GPU may be communicatively coupled to host processor/cores over a bus or other interconnect (e.g., a high speed interconnect such as PCIe or NVLink). In at least one embodiment, a GPU may be integrated on the same package or chip as cores and communicatively coupled to cores over a processor bus/interconnect that is internal to a package or a chip. In at least one embodiment, regardless of the manner in which a GPU is connected, processor cores may allocate work to the GPU in the form of sequences of commands/instructions contained in a WD. In at least one embodiment, the GPU then uses dedicated circuitry/logic for efficiently processing these commands/instructions.

Figure 29:
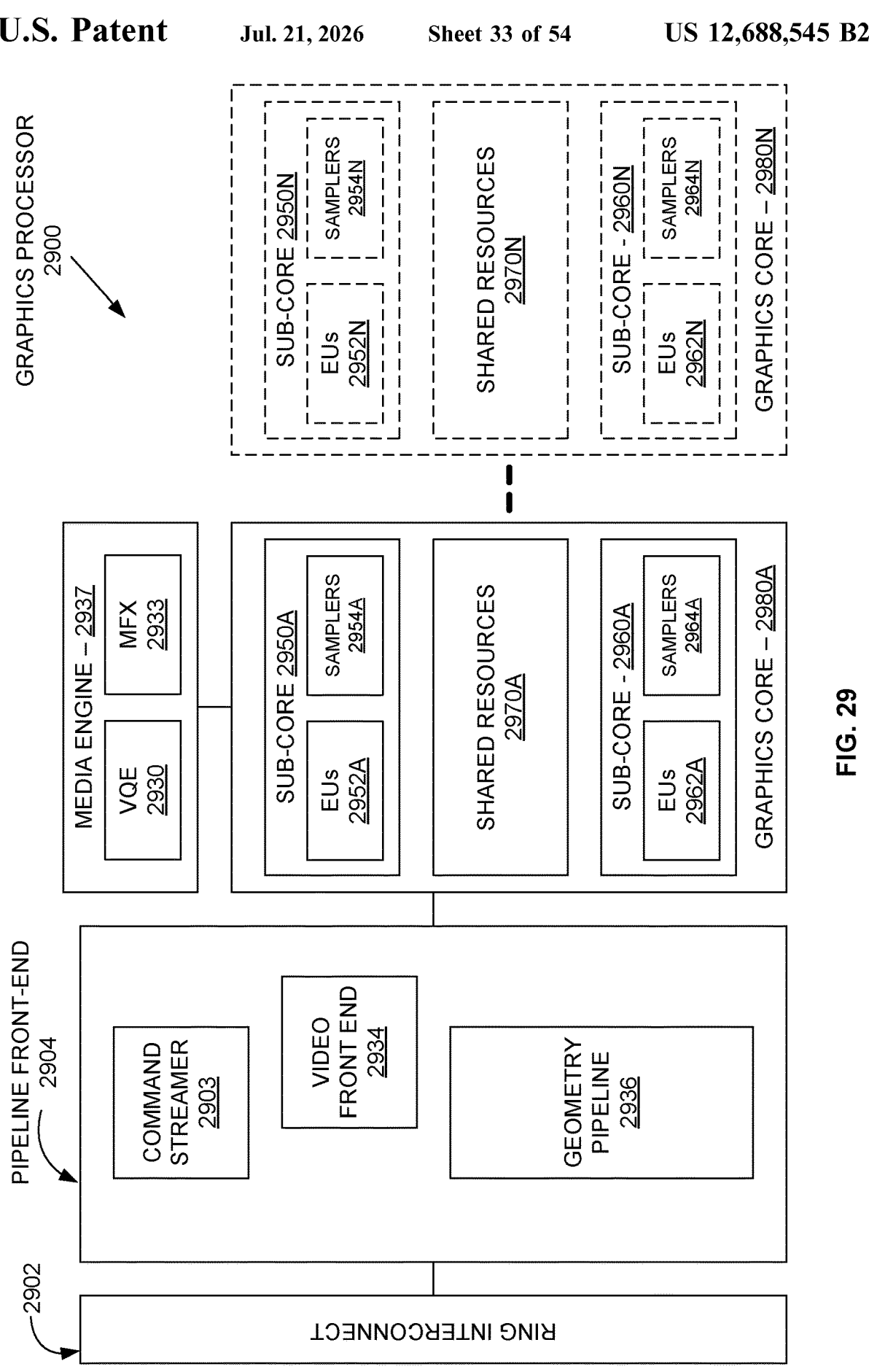
FIG. 29 illustrates a graphics processor, in accordance with at least one embodiment.

FIG. 29 illustrates a graphics processor 2900, in accordance with at least one embodiment. In at least one embodiment, graphics processor 2900 includes a ring interconnect 2902, a pipeline front-end 2904, a media engine 2937, and graphics cores 2980A-2980N. In at least one embodiment, ring interconnect 2902 couples graphics processor 2900 to other processing units, including other graphics processors or one or more general-purpose processor cores. In at least one embodiment, graphics processor 2900 is one of many processors integrated within a multi-core processing system.

In at least one embodiment, graphics processor 2900 receives batches of commands via ring interconnect 2902. In at least one embodiment, incoming commands are interpreted by a command streamer 2903 in pipeline front-end 2904. In at least one embodiment, graphics processor 2900 includes scalable execution logic to perform 3D geometry processing and media processing via graphics core(s) 2980A-2980N. In at least one embodiment, for 3D geometry processing commands, command streamer 2903 supplies commands to geometry pipeline 2936. In at least one embodiment, for at least some media processing commands, command streamer 2903 supplies commands to a video front end 2934, which couples with a media engine 2937. In at least one embodiment, media engine 2937 includes a Video Quality Engine ("VQE") 2930 for video and image post-processing and a multi-format encode/decode ("MFX") engine 2933 to provide hardware-accelerated media data encode and decode. In at least one embodiment, geometry pipeline 2936 and media engine 2937 each generate execution threads for thread execution resources provided by at least one graphics core 2980A.

In at least one embodiment, graphics processor 2900 includes scalable thread execution resources featuring modular graphics cores 2980A-2980N (sometimes referred to as core slices), each having multiple sub-cores 2950A-550N, 2960A-2960N (sometimes referred to as core sub-slices). In at least one embodiment, graphics processor 2900 can have any number of graphics cores 2980A through

2980N. In at least one embodiment, graphics processor 2900 includes a graphics core 2980A having at least a first sub-core 2950A and a second sub-core 2960A. In at least one embodiment, graphics processor 2900 is a low power processor with a single sub-core (e.g., sub-core 2950A). In at least one embodiment, graphics processor 2900 includes multiple graphics cores 2980A-2980N, each including a set of first sub-cores 2950A-2950N and a set of second sub-cores 2960A-2960N. In at least one embodiment, each sub-core in first sub-cores 2950A-2950N includes at least a first set of execution units ("EUs") 2952A-2952N and media/texture samplers 2954A-2954N. In at least one embodiment, each sub-core in second sub-cores 2960A-2960N includes at least a second set of execution units 2962A-2962N and samplers 2964A-2964N. In at least one embodiment, each sub-core 2950A-2950N, 2960A-2960N shares a set of shared resources 2970A-2970N. In at least one embodiment, shared resources 2970 include shared cache memory and pixel operation logic.

Figure 30:
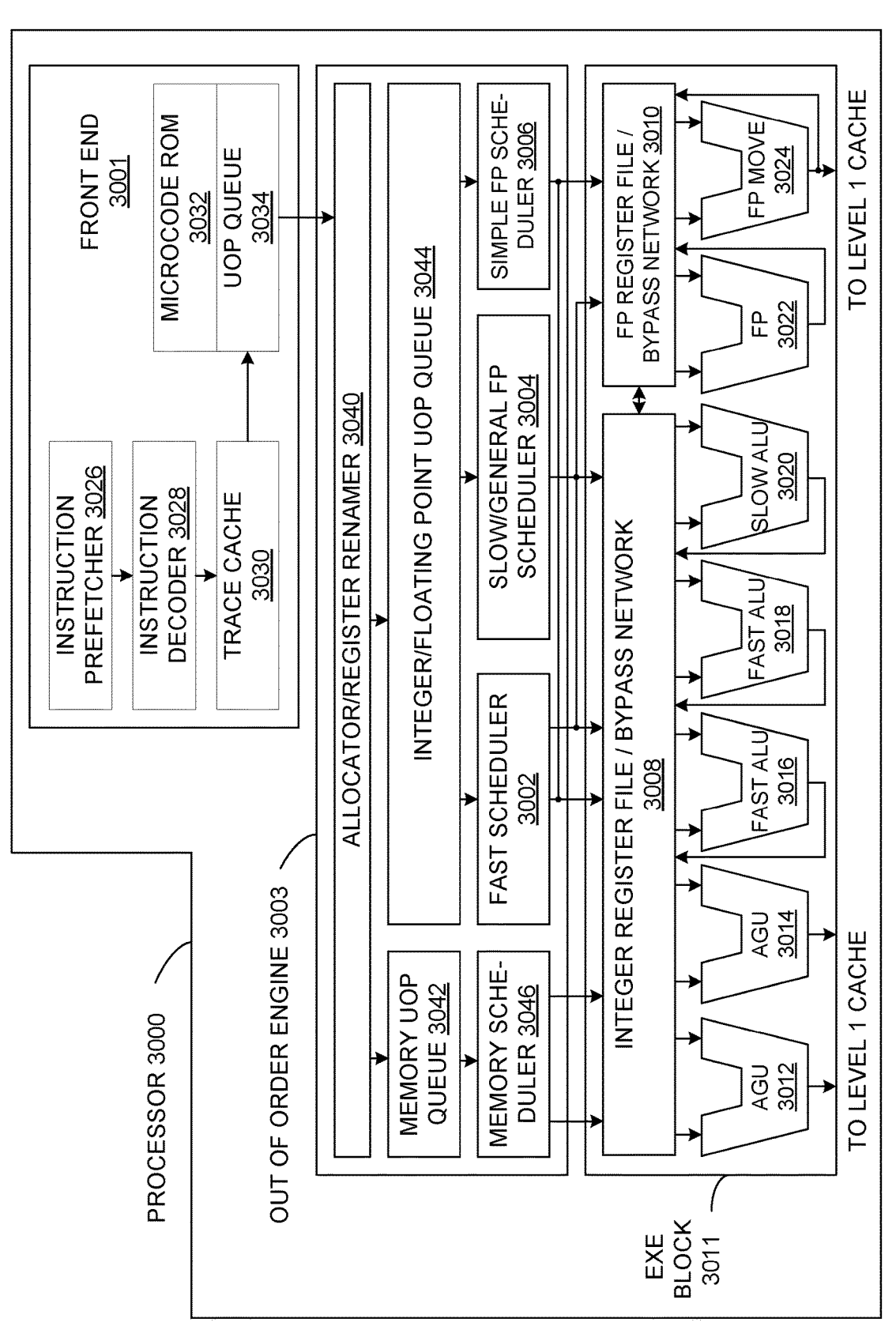
FIG. 30 illustrates a processor, in accordance with at least one embodiment.

FIG. 30 illustrates a processor 3000, in accordance with at least one embodiment. In at least one embodiment, processor 3000 may include, without limitation, logic circuits to perform instructions. In at least one embodiment, processor 3000 may perform instructions, including x86 instructions, ARM instructions, specialized instructions for ASICs, etc. In at least one embodiment, processor 3010 may include registers to store packed data, such as 64-bit wide MMX™ registers in microprocessors enabled with MMX technology from Intel Corporation of Santa Clara, Calif. In at least one embodiment, MMX registers, available in both integer and floating point forms, may operate with packed data elements that accompany SIMD and streaming SIMD extensions ("SSE") instructions. In at least one embodiment, 128-bit wide XMM registers relating to SSE2, SSE3, SSE4, AVX, or beyond (referred to generically as "SSEx") technology may hold such packed data operands. In at least one embodiment, processors 3010 may perform instructions to accelerate CUDA programs.

In at least one embodiment, processor 3000 includes an in-order front end ("front end") 3001 to fetch instructions to be executed and prepare instructions to be used later in processor pipeline. In at least one embodiment, front end 3001 may include several units. In at least one embodiment, an instruction prefetcher 3026 fetches instructions from memory and feeds instructions to an instruction decoder 3028 which in turn decodes or interprets instructions. For example, in at least one embodiment, instruction decoder 3028 decodes a received instruction into one or more operations called "micro-instructions" or "micro-operations" (also called "micro ops" or "uops") for execution. In at least one embodiment, instruction decoder 3028 parses instruction into an opcode and corresponding data and control fields that may be used by micro-architecture to perform operations. In at least one embodiment, a trace cache 3030 may assemble decoded uops into program ordered sequences or traces in a uop queue 3034 for execution. In at least one embodiment, when trace cache 3030 encounters a complex instruction, a microcode ROM 3032 provides uops needed to complete an operation.

In at least one embodiment, some instructions may be converted into a single micro-op, whereas others need several micro-ops to complete full operation. In at least one embodiment, if more than four micro-ops are needed to complete an instruction, instruction decoder 3028 may access microcode ROM 3032 to perform instruction. In at least one embodiment, an instruction may be decoded into a small number of micro-ops for processing at instruction decoder 3028. In at least one embodiment, an instruction may be stored within microcode ROM 3032 should a number of micro-ops be needed to accomplish operation. In at least one embodiment, trace cache 3030 refers to an entry point programmable logic array ("PLA") to determine a correct micro-instruction pointer for reading microcode sequences to complete one or more instructions from microcode ROM 3032. In at least one embodiment, after microcode ROM 3032 finishes sequencing micro-ops for an instruction, front end 3001 of machine may resume fetching micro-ops from trace cache 3030.

In at least one embodiment, out-of-order execution engine ("out of order engine") 3003 may prepare instructions for execution. In at least one embodiment, out-of-order execution logic has a number of buffers to smooth out and re-order the flow of instructions to optimize performance as they go down a pipeline and get scheduled for execution. Out-of-order execution engine 3003 includes, without limitation, an allocator/register renamer 3040, a memory uop queue 3042, an integer/floating point uop queue 3044, a memory scheduler 3046, a fast scheduler 3002, a slow/general floating point scheduler ("slow/general FP scheduler") 3004, and a simple floating point scheduler ("simple FP scheduler") 3006. In at least one embodiment, fast schedule 3002, slow/general floating point scheduler 3004, and simple floating point scheduler 3006 are also collectively referred to herein as "uop schedulers 3002, 3004, 3006." Allocator/register renamer 3040 allocates machine buffers and resources that each uop needs in order to execute. In at least one embodiment, allocator/register renamer 3040 renames logic registers onto entries in a register file. In at least one embodiment, allocator/register renamer 3040 also allocates an entry for each uop in one of two uop queues, memory uop queue 3042 for memory operations and integer/floating point uop queue 3044 for non-memory operations, in front of memory scheduler 3046 and uop schedulers 3002, 3004, 3006. In at least one embodiment, uop schedulers 3002, 3004, 3006, determine when a uop is ready to execute based on readiness of their dependent input register operand sources and availability of execution resources uops need to complete their operation. In at least one embodiment, fast scheduler 3002 of at least one embodiment may schedule on each half of main clock cycle while slow/general floating point scheduler 3004 and simple floating point scheduler 3006 may schedule once per main processor clock cycle. In at least one embodiment, uop schedulers 3002, 3004, 3006 arbitrate for dispatch ports to schedule uops for execution.

In at least one embodiment, execution block 3011 includes, without limitation, an integer register file/bypass network 3008, a floating point register file/bypass network ("FP register file/bypass network") 3010, address generation units ("AGUs") 3012 and 3014, fast ALUs 3016 and 3018, a slow ALU 3020, a floating point ALU ("FP") 3022, and a floating point move unit ("FP move") 3024. In at least one embodiment, integer register file/bypass network 3008 and floating point register file/bypass network 3010 are also referred to herein as "register files 3008, 3010." In at least one embodiment, AGUSs 3012 and 3014, fast ALUs 3016 and 3018, slow ALU 3020, floating point ALU 3022, and floating point move unit 3024 are also referred to herein as "execution units 3012, 3014, 3016, 3018, 3020, 3022, and 3024." In at least one embodiment, an execution block may include, without limitation, any number (including zero) and type of register files, bypass networks, address generation units, and execution units, in any combination.

In at least one embodiment, register files 3008, 3010 may be arranged between uop schedulers 3002, 3004, 3006, and execution units 3012, 3014, 3016, 3018, 3020, 3022, and 3024. In at least one embodiment, integer register file/bypass network 3008 performs integer operations. In at least one embodiment, floating point register file/bypass network 3010 performs floating point operations. In at least one embodiment, each of register files 3008, 3010 may include, without limitation, a bypass network that may bypass or forward just completed results that have not yet been written into register file to new dependent uops. In at least one embodiment, register files 3008, 3010 may communicate data with each other. In at least one embodiment, integer register file/bypass network 3008 may include, without limitation, two separate register files, one register file for low-order thirty-two bits of data and a second register file for high order thirty-two bits of data. In at least one embodiment, floating point register file/bypass network 3010 may include, without limitation, 128-bit wide entries because floating point instructions typically have operands from 64 to 128 bits in width.

In at least one embodiment, execution units 3012, 3014, 3016, 3018, 3020, 3022, 3024 may execute instructions. In at least one embodiment, register files 3008, 3010 store integer and floating point data operand values that micro-instructions need to execute. In at least one embodiment, processor 3000 may include, without limitation, any number and combination of execution units 3012, 3014, 3016, 3018, 3020, 3022, 3024. In at least one embodiment, floating point ALU 3022 and floating point move unit 3024 may execute floating point, MMX, SIMD, AVX and SSE, or other operations. In at least one embodiment, floating point ALU 3022 may include, without limitation, a 64-bit by 64-bit floating point divider to execute divide, square root, and remainder micro ops. In at least one embodiment, instructions involving a floating point value may be handled with floating point hardware. In at least one embodiment, ALU operations may be passed to fast ALUs 3016, 3018. In at least one embodiment, fast ALUS 3016, 3018 may execute fast operations with an effective latency of half a clock cycle. In at least one embodiment, most complex integer operations go to slow ALU 3020 as slow ALU 3020 may include, without limitation, integer execution hardware for long-latency type of operations, such as a multiplier, shifts, flag logic, and branch processing. In at least one embodiment, memory load/store operations may be executed by AGUs 3012, 3014. In at least one embodiment, fast ALU 3016, fast ALU 3018, and slow ALU 3020 may perform integer operations on 64-bit data operands. In at least one embodiment, fast ALU 3016, fast ALU 3018, and slow ALU 3020 may be implemented to support a variety of data bit sizes including sixteen, thirty-two, 128, 256, etc. In at least one embodiment, floating point ALU 3022 and floating point move unit 3024 may be implemented to support a range of operands having bits of various widths. In at least one embodiment, floating point ALU 3022 and floating point move unit 3024 may operate on 128-bit wide packed data operands in conjunction with SIMD and multimedia instructions.

In at least one embodiment, uop schedulers 3002, 3004, 3006 dispatch dependent operations before parent load has finished executing. In at least one embodiment, as uops may be speculatively scheduled and executed in processor 3000, processor 3000 may also include logic to handle memory misses. In at least one embodiment, if a data load misses in a data cache, there may be dependent operations in flight in pipeline that have left a scheduler with temporarily incorrect data. In at least one embodiment, a replay mechanism tracks and re-executes instructions that use incorrect data. In at least one embodiment, dependent operations might need to be replayed and independent ones may be allowed to complete. In at least one embodiment, schedulers and replay mechanisms of at least one embodiment of a processor may also be designed to catch instruction sequences for text string comparison operations.

In at least one embodiment, the term "registers" may refer to on-board processor storage locations that may be used as part of instructions to identify operands. In at least one embodiment, registers may be those that may be usable from outside of a processor (from a programmer's perspective). In at least one embodiment, registers might not be limited to a particular type of circuit. Rather, in at least one embodiment, a register may store data, provide data, and perform functions described herein. In at least one embodiment, registers described herein may be implemented by circuitry within a processor using any number of different techniques, such as dedicated physical registers, dynamically allocated physical registers using register renaming, combinations of dedicated and dynamically allocated physical registers, etc. In at least one embodiment, integer registers store 32-bit integer data. A register file of at least one embodiment also contains eight multimedia SIMD registers for packed data.

Figure 31:
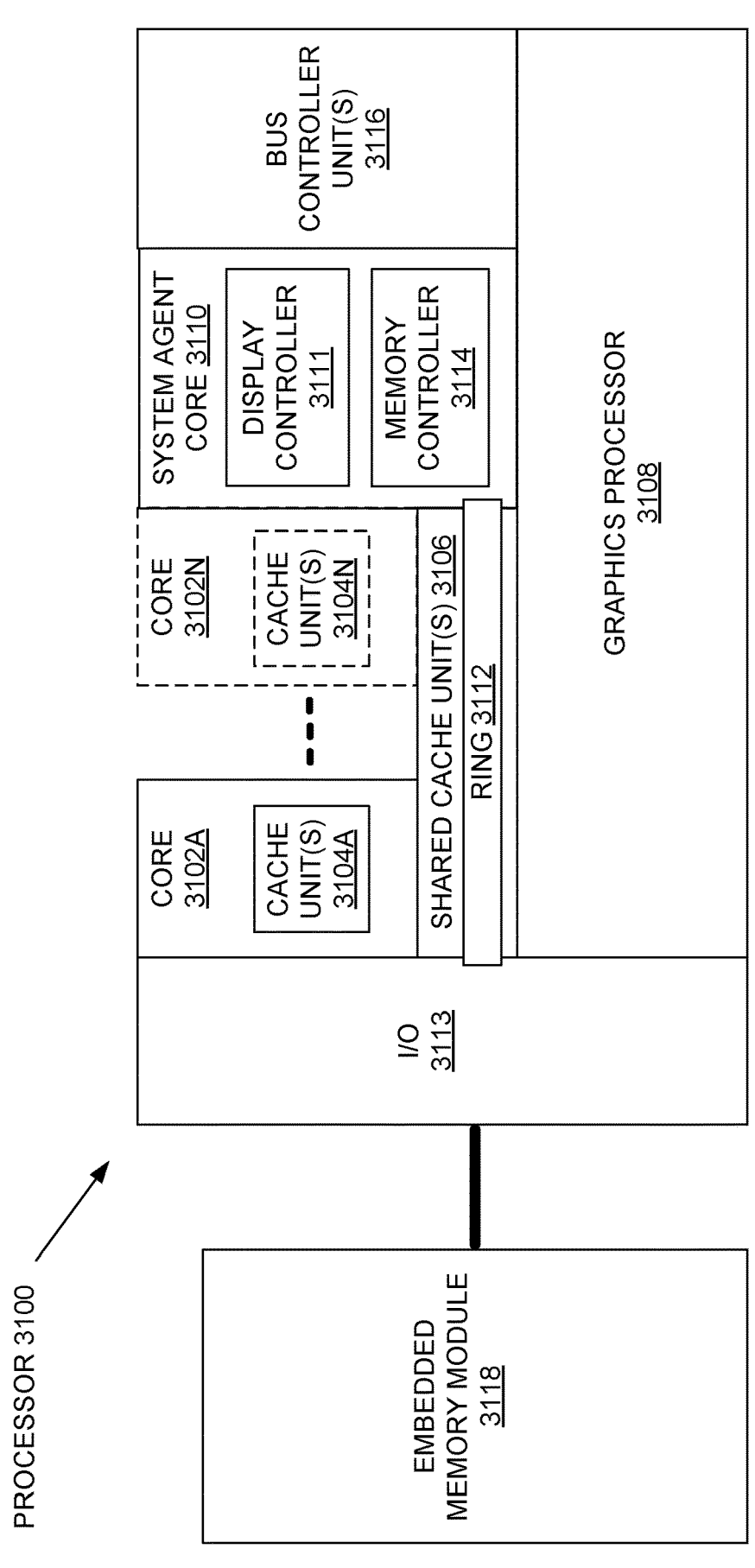
FIG. 31 illustrates a processor, in accordance with at least one embodiment.

FIG. 31 illustrates a processor 3100, in accordance with at least one embodiment. In at least one embodiment, processor 3100 includes, without limitation, one or more processor cores ("cores") 3102A-3102N, an integrated memory controller 3114, and an integrated graphics processor 3108. In at least one embodiment, processor 3100 can include additional cores up to and including additional processor core 3102N represented by dashed lined boxes. In at least one embodiment, each of processor cores 3102A-3102N includes one or more internal cache units 3104A-3104N. In at least one embodiment, each processor core also has access to one or more shared cached units 3106. In at least one embodiment, one or more processor cores 3102A-3102N are referred to as one or more compute units or computing units.

In at least one embodiment, internal cache units 3104A-3104N and shared cache units 3106 represent a cache memory hierarchy within processor 3100. In at least one embodiment, cache memory units 3104A-3104N may include at least one level of instruction and data cache within each processor core and one or more levels of shared mid-level cache, such as an L2, L3, Level 4 ("L4"), or other levels of cache, where a highest level of cache before external memory is classified as an LLC. In at least one embodiment, cache coherency logic maintains coherency between various cache units 3106 and 3104A-3104N.

In at least one embodiment, processor 3100 may also include a set of one or more bus controller units 3116 and a system agent core 3110. In at least one embodiment, one or more bus controller units 3116 manage a set of peripheral buses, such as one or more PCI or PCI express buses. In at least one embodiment, system agent core 3110 provides management functionality for various processor components. In at least one embodiment, system agent core 3110 includes one or more integrated memory controllers 3114 to manage access to various external memory devices (not shown).

In at least one embodiment, one or more of processor cores 3102A-3102N include support for simultaneous multi-threading. In at least one embodiment, system agent core 3110 includes components for coordinating and operating processor cores 3102A-3102N during multi-threaded processing. In at least one embodiment, system agent core 3110 may additionally include a power control unit ("PCU"), which includes logic and components to regulate one or more power states of processor cores 3102A-3102N and graphics processor 3108.

In at least one embodiment, processor 3100 additionally includes graphics processor 3108 to execute graphics processing operations. In at least one embodiment, graphics processor 3108 couples with shared cache units 3106, and system agent core 3110, including one or more integrated memory controllers 3114. In at least one embodiment, system agent core 3110 also includes a display controller 3111 to drive graphics processor output to one or more coupled displays. In at least one embodiment, display controller 3111 may also be a separate module coupled with graphics processor 3108 via at least one interconnect, or may be integrated within graphics processor 3108.

In at least one embodiment, a ring based interconnect unit 3112 is used to couple internal components of processor 3100. In at least one embodiment, an alternative interconnect unit may be used, such as a point-to-point interconnect, a switched interconnect, or other techniques. In at least one embodiment, graphics processor 3108 couples with ring interconnect 3112 via an I/O link 3113.

In at least one embodiment, I/O link 3113 represents at least one of multiple varieties of I/O interconnects, including an on package I/O interconnect which facilitates communication between various processor components and a high-performance embedded memory module 3118, such as an eDRAM module. In at least one embodiment, each of processor cores 3102A-3102N and graphics processor 3108 use embedded memory modules 3118 as a shared LLC.

In at least one embodiment, processor cores 3102A-3102N are homogeneous cores executing a common instruction set architecture. In at least one embodiment, processor cores 3102A-3102N are heterogeneous in terms of ISA, where one or more of processor cores 3102A-3102N execute a common instruction set, while one or more other cores of processor cores 3102A-31-02N executes a subset of a common instruction set or a different instruction set. In at least one embodiment, processor cores 3102A-3102N are heterogeneous in terms of microarchitecture, where one or more cores having a relatively higher power consumption couple with one or more cores having a lower power consumption. In at least one embodiment, processor 3100 can be implemented on one or more chips or as an SoC integrated circuit.

Figure 32:
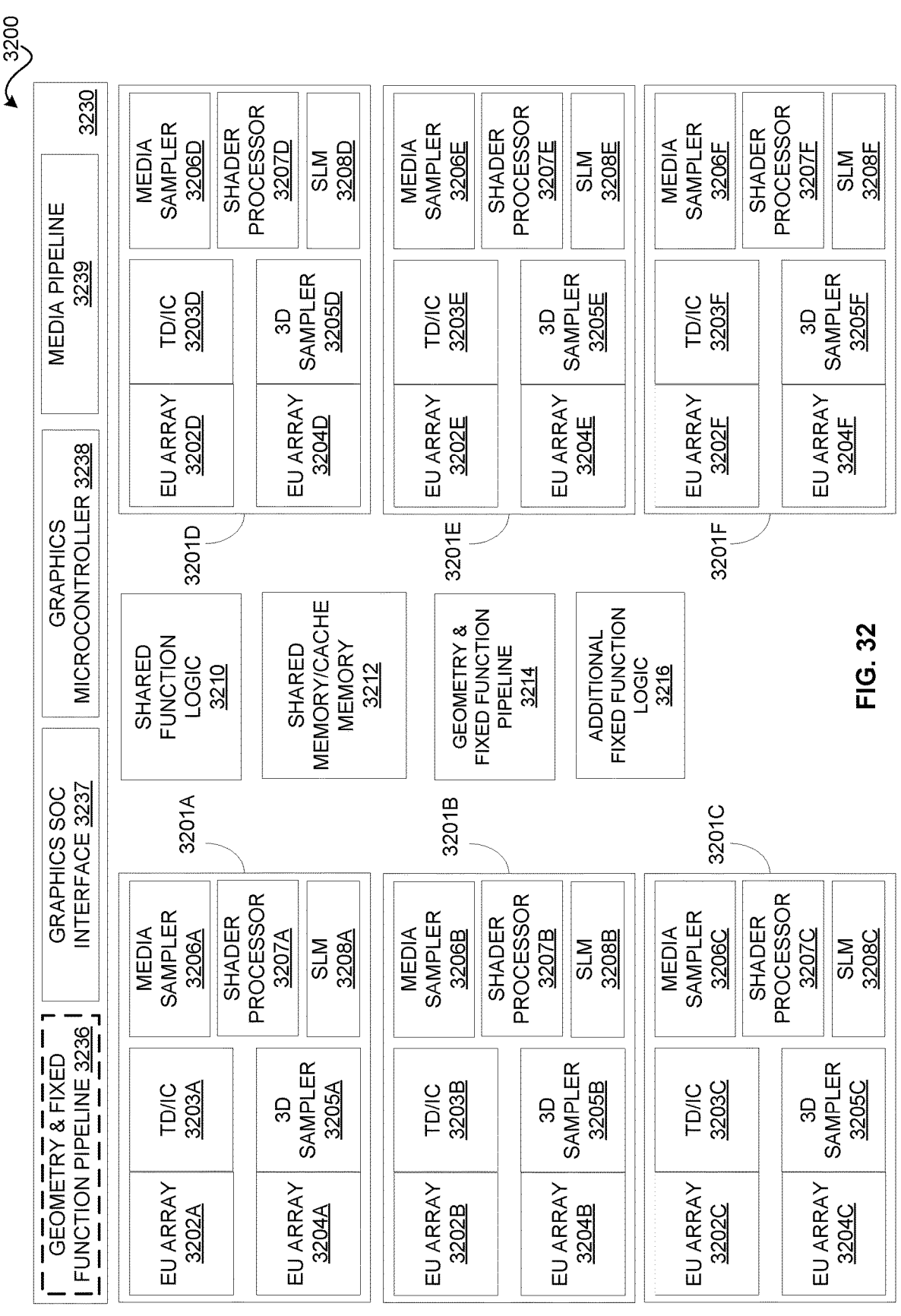
FIG. 32 illustrates a graphics processor core, in accor- dance with at least one embodiment.

FIG. 32 illustrates a graphics processor core 3200, in accordance with at least one embodiment described. In at least one embodiment, graphics processor core 3200 is included within a graphics core array. In at least one embodiment, graphics processor core 3200, sometimes referred to as a core slice, can be one or multiple graphics cores within a modular graphics processor. In at least one embodiment, graphics processor core 3200 is exemplary of one graphics core slice, and a graphics processor as described herein may include multiple graphics core slices based on target power and performance envelopes. In at least one embodiment, each graphics core 3200 can include a fixed function block 3230 coupled with multiple sub-cores 3201A-3201F, also referred to as sub-slices, that include modular blocks of general-purpose and fixed function logic.

In at least one embodiment, fixed function block 3230 includes a geometry/fixed function pipeline 3236 that can be shared by all sub-cores in graphics processor 3200, for example, in lower performance and/or lower power graphics processor implementations. In at least one embodiment, geometry/fixed function pipeline 3236 includes a 3D fixed function pipeline, a video front-end unit, a thread spawner and thread dispatcher, and a unified return buffer manager, which manages unified return buffers.

In at least one embodiment, fixed function block 3230 also includes a graphics SoC interface 3237, a graphics microcontroller 3238, and a media pipeline 3239. Graphics SoC interface 3237 provides an interface between graphics core 3200 and other processor cores within an SoC integrated circuit. In at least one embodiment, graphics microcontroller 3238 is a programmable sub-processor that is configurable to manage various functions of graphics processor 3200, including thread dispatch, scheduling, and pre-emption. In at least one embodiment, media pipeline 3239 includes logic to facilitate decoding, encoding, pre-processing, and/or post-processing of multimedia data, including image and video data. In at least one embodiment, media pipeline 3239 implements media operations via requests to compute or sampling logic within sub-cores 3201-3201F.

In at least one embodiment, SoC interface 3237 enables graphics core 3200 to communicate with general-purpose application processor cores (e.g., CPUs) and/or other components within an SoC, including memory hierarchy elements such as a shared LLC memory, system RAM, and/or embedded on-chip or on-package DRAM. In at least one embodiment, SoC interface 3237 can also enable communication with fixed function devices within an SoC, such as camera imaging pipelines, and enables use of and/or implements global memory atomics that may be shared between graphics core 3200 and CPUs within an SoC. In at least one embodiment, SoC interface 3237 can also implement power management controls for graphics core 3200 and enable an interface between a clock domain of graphic core 3200 and other clock domains within an SoC. In at least one embodiment, SoC interface 3237 enables receipt of command buffers from a command streamer and global thread dispatcher that are configured to provide commands and instructions to each of one or more graphics cores within a graphics processor. In at least one embodiment, commands and instructions can be dispatched to media pipeline 3239, when media operations are to be performed, or a geometry and fixed function pipeline (e.g., geometry and fixed function pipeline 3236, geometry and fixed function pipeline 3214) when graphics processing operations are to be performed.

In at least one embodiment, graphics microcontroller 3238 can be configured to perform various scheduling and management tasks for graphics core 3200. In at least one embodiment, graphics microcontroller 3238 can perform graphics and/or compute workload scheduling on various graphics parallel engines within execution unit (EU) arrays 3202A-3202F, 3204A-3204F within sub-cores 3201A-3201F. In at least one embodiment, host software executing on a CPU core of an SoC including graphics core 3200 can submit workloads one of multiple graphic processor doorbells, which invokes a scheduling operation on an appropriate graphics engine. In at least one embodiment, scheduling operations include determining which workload to run next, submitting a workload to a command streamer, preempting existing workloads running on an engine, monitoring progress of a workload, and notifying host software when a workload is complete. In at least one embodiment, graphics microcontroller 3238 can also facilitate low-power or idle states for graphics core 3200, providing graphics core 3200 with an ability to save and restore registers within graphics core 3200 across low-power state transitions independently from an operating system and/or graphics driver software on a system.

In at least one embodiment, graphics core 3200 may have greater than or fewer than illustrated sub-cores 3201A-3201F, up to N modular sub-cores. For each set of N sub-cores, in at least one embodiment, graphics core 3200 can also include shared function logic 3210, shared and/or cache memory 3212, a geometry/fixed function pipeline 3214, as well as additional fixed function logic 3216 to accelerate various graphics and compute processing operations. In at least one embodiment, shared function logic 3210 can include logic units (e.g., sampler, math, and/or inter-thread communication logic) that can be shared by each N sub-cores within graphics core 3200. Shared and/or cache memory 3212 can be an LLC for N sub-cores 3201A-3201F within graphics core 3200 and can also serve as shared memory that is accessible by multiple sub-cores. In at least one embodiment, geometry/fixed function pipeline 3214 can be included instead of geometry/fixed function pipeline 3236 within fixed function block 3230 and can include same or similar logic units.

In at least one embodiment, graphics core 3200 includes additional fixed function logic 3216 that can include various fixed function acceleration logic for use by graphics core 3200. In at least one embodiment, additional fixed function logic 3216 includes an additional geometry pipeline for use in position only shading. In position-only shading, at least two geometry pipelines exist, whereas in a full geometry pipeline within geometry/fixed function pipeline 3216, 3236, and a cull pipeline, which is an additional geometry pipeline which may be included within additional fixed function logic 3216. In at least one embodiment, cull pipeline is a trimmed down version of a full geometry pipeline. In at least one embodiment, a full pipeline and a cull pipeline can execute different instances of an application, each instance having a separate context. In at least one embodiment, position only shading can hide long cull runs of discarded triangles, enabling shading to be completed earlier in some instances. For example, in at least one embodiment, cull pipeline logic within additional fixed function logic 3216 can execute position shaders in parallel with a main application and generally generates critical results faster than a full pipeline, as a cull pipeline fetches and shades position attribute of vertices, without performing rasterization and rendering of pixels to a frame buffer. In at least one embodiment, a cull pipeline can use generated critical results to compute visibility information for all triangles without regard to whether those triangles are culled. In at least one embodiment, a full pipeline (which in this instance may be referred to as a replay pipeline) can consume visibility information to skip culled triangles to shade only visible triangles that are finally passed to a rasterization phase.

In at least one embodiment, additional fixed function logic 3216 can also include general purpose processing acceleration logic, such as fixed function matrix multiplication logic, for accelerating CUDA programs.

In at least one embodiment, each graphics sub-core 3201A-3201F includes a set of execution resources that may be used to perform graphics, media, and compute operations in response to requests by graphics pipeline, media pipeline, or shader programs. In at least one embodiment, graphics sub-cores 3201A-3201F include multiple EU arrays 3202A-3202F, 3204A-3204F, thread dispatch and inter-thread communication ("TD/IC") logic 3203A-3203F, a 3D (e.g., texture) sampler 3205A-3205F, a media sampler 3206A-3206F, a shader processor 3207A-3207F, and shared local memory ("SLM") 3208A-3208F. EU arrays 3202A-3202F, 3204A-3204F each include multiple execution units, which are GPGPUs capable of performing floating-point and integer/ fixed-point logic operations in service of a graphics, media, or compute operation, including graphics, media, or compute shader programs. In at least one embodiment, TD/IC logic 3203A-3203F performs local thread dispatch and thread control operations for execution units within a sub-core and facilitate communication between threads executing on execution units of a sub-core. In at least one embodiment, 3D sampler 3205A-3205F can read texture or other 3D graphics related data into memory. In at least one embodiment, 3D sampler can read texture data differently based on a configured sample state and texture format associated with a given texture. In at least one embodiment, media sampler 3206A-3206F can perform similar read operations based on a type and format associated with media data. In at least one embodiment, each graphics sub-core 3201A-3201F can alternately include a unified 3D and media sampler. In at least one embodiment, threads executing on execution units within each of sub-cores 3201A-3201F can make use of shared local memory 3208A-3208F within each sub-core, to enable threads executing within a thread group to execute using a common pool of on-chip memory.

Figure 33:
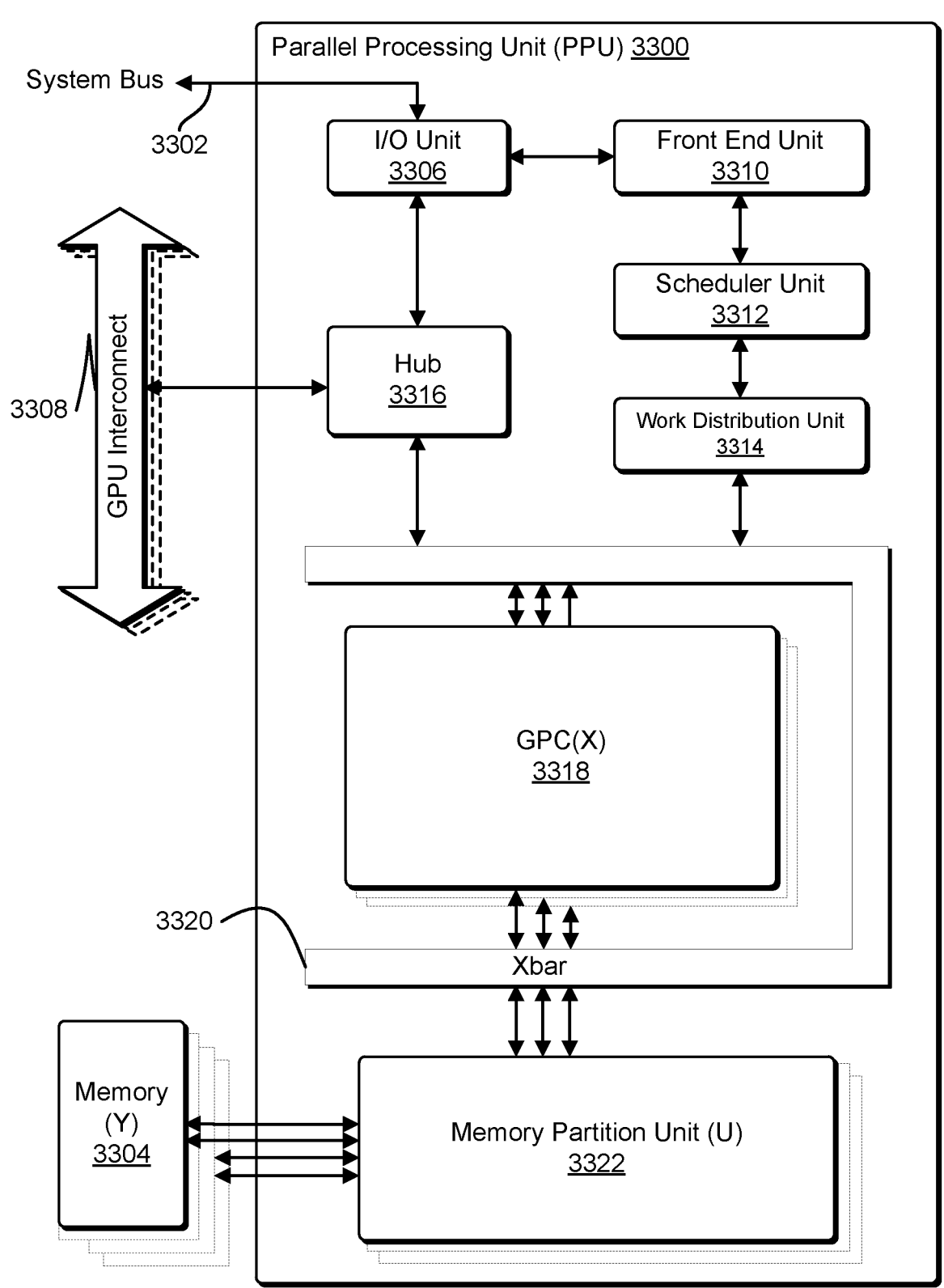
FIG. 33 illustrates a PPU, in accordance with at least one embodiment.

FIG. 33 illustrates a parallel processing unit ("PPU") 3300, in accordance with at least one embodiment. In at least one embodiment, PPU 3300 is configured with machine-readable code that, if executed by PPU 3300, causes PPU 3300 to perform some or all of processes and techniques described herein. In at least one embodiment, PPU 3300 is a multi-threaded processor that is implemented on one or more integrated circuit devices and that utilizes multithreading as a latency-hiding technique designed to process computer-readable instructions (also referred to as machine-readable instructions or simply instructions) on multiple threads in parallel. In at least one embodiment, a thread refers to a thread of execution and is an instantiation of a set of instructions configured to be executed by PPU 3300. In at least one embodiment, PPU 3300 is a GPU configured to implement a graphics rendering pipeline for processing three-dimensional ("3D") graphics data in order to generate two-dimensional ("2D") image data for display on a display device such as an LCD device. In at least one embodiment, PPU 3300 is utilized to perform computations such as linear algebra operations and machine-learning operations. FIG. 33 illustrates an example parallel processor for illustrative purposes only and should be construed as a non-limiting example of a processor architecture that may be implemented in at least one embodiment.

In at least one embodiment, one or more PPUs 3300 are configured to accelerate High Performance Computing ("HPC"), data center, and machine learning applications. In at least one embodiment, one or more PPUs 3300 are configured to accelerate CUDA programs. In at least one embodiment, PPU 3300 includes, without limitation, an I/O unit 3306, a front-end unit 3310, a scheduler unit 3312, a work distribution unit 3314, a hub 3316, a crossbar ("Xbar") 3320, one or more general processing clusters ("GPCs") 3318, and one or more partition units ("memory partition units") 3322. In at least one embodiment, PPU 3300 is connected to a host processor or other PPUs 3300 via one or more high-speed GPU interconnects ("GPU interconnects") 3308. In at least one embodiment, PPU 3300 is connected to a host processor or other peripheral devices via a system bus or interconnect 3302. In at least one embodiment, PPU 3300 is connected to a local memory comprising one or more memory devices ("memory") 3304. In at least one embodiment, memory devices 3304 include, without limitation, one or more dynamic random access memory (DRAM) devices.

In at least one embodiment, one or more DRAM devices are configured and/or configurable as high-bandwidth memory ("HBM") subsystems, with multiple DRAM dies stacked within each device.

In at least one embodiment, high-speed GPU interconnect 3308 may refer to a wire-based multi-lane communications link that is used by systems to scale and include one or more PPUs 3300 combined with one or more CPUs, supports cache coherence between PPUs 3300 and CPUs, and CPU mastering. In at least one embodiment, data and/or commands are transmitted by high-speed GPU interconnect 3308 through hub 3316 to/from other units of PPU 3300 such as one or more copy engines, video encoders, video decoders, power management units, and other components which may not be explicitly illustrated in FIG. 33.

In at least one embodiment, I/O unit 3306 is configured to transmit and receive communications (e.g., commands, data) from a host processor (not illustrated in FIG. 33) over system bus 3302. In at least one embodiment, I/O unit 3306 communicates with host processor directly via system bus 3302 or through one or more intermediate devices such as a memory bridge. In at least one embodiment, I/O unit 3306 may communicate with one or more other processors, such as one or more of PPUs 3300 via system bus 3302. In at least one embodiment, I/O unit 3306 implements a PCIe interface for communications over a PCIe bus. In at least one embodiment, I/O unit 3306 implements interfaces for communicating with external devices.

In at least one embodiment, I/O unit 3306 decodes packets received via system bus 3302. In at least one embodiment, at least some packets represent commands configured to cause PPU 3300 to perform various operations. In at least one embodiment, I/O unit 3306 transmits decoded commands to various other units of PPU 3300 as specified by commands. In at least one embodiment, commands are transmitted to front-end unit 3310 and/or transmitted to hub 3316 or other units of PPU 3300 such as one or more copy engines, a video encoder, a video decoder, a power management unit, etc. (not explicitly illustrated in FIG. 33). In at least one embodiment, I/O unit 3306 is configured to route communications between and among various logical units of PPU 3300.

In at least one embodiment, a program executed by host processor encodes a command stream in a buffer that provides workloads to PPU 3300 for processing. In at least one embodiment, a workload comprises instructions and data to be processed by those instructions. In at least one embodiment, buffer is a region in a memory that is accessible (e.g., read/write) by both a host processor and PPU 3300 a host interface unit may be configured to access buffer in a system memory connected to system bus 3302 via memory requests transmitted over system bus 3302 by I/O unit 3306. In at least one embodiment, a host processor writes a command stream to a buffer and then transmits a pointer to the start of the command stream to PPU 3300 such that front-end unit 3310 receives pointers to one or more command streams and manages one or more command streams, reading commands from command streams and forwarding commands to various units of PPU 3300.

In at least one embodiment, front-end unit 3310 is coupled to scheduler unit 3312 that configures various GPCs 3318 to process tasks defined by one or more command streams. In at least one embodiment, scheduler unit 3312 is configured to track state information related to various tasks managed by scheduler unit 3312 where state information may indicate which of GPCs 3318 a task is assigned to, whether task is active or inactive, a priority level associated with task, and so forth. In at least one embodiment, scheduler unit 3312 manages execution of a plurality of tasks on one or more of GPCs 3318.

In at least one embodiment, scheduler unit 3312 is coupled to work distribution unit 3314 that is configured to dispatch tasks for execution on GPCs 3318. In at least one embodiment, work distribution unit 3314 tracks a number of scheduled tasks received from scheduler unit 3312 and work distribution unit 3314 manages a pending task pool and an active task pool for each of GPCs 3318. In at least one embodiment, pending task pool comprises a number of slots (e.g., 32 slots) that contain tasks assigned to be processed by a particular GPC 3318; active task pool may comprise a number of slots (e.g., 4 slots) for tasks that are actively being processed by GPCs 3318 such that as one of GPCs 3318 completes execution of a task, that task is evicted from active task pool for GPC 3318 and one of other tasks from pending task pool is selected and scheduled for execution on GPC 3318. In at least one embodiment, if an active task is idle on GPC 3318, such as while waiting for a data dependency to be resolved, then the active task is evicted from GPC 3318 and returned to a pending task pool while another task in the pending task pool is selected and scheduled for execution on GPC 3318.

In at least one embodiment, work distribution unit 3314 communicates with one or more GPCs 3318 via XBar 3320. In at least one embodiment, XBar 3320 is an interconnect network that couples many units of PPU 3300 to other units of PPU 3300 and can be configured to couple work distribution unit 3314 to a particular GPC 3318. In at least one embodiment, one or more other units of PPU 3300 may also be connected to XBar 3320 via hub 3316.

In at least one embodiment, tasks are managed by scheduler unit 3312 and dispatched to one of GPCs 3318 by work distribution unit 3314. GPC 3318 is configured to process task and generate results. In at least one embodiment, results may be consumed by other tasks within GPC 3318, routed to a different GPC 3318 via XBar 3320, or stored in memory 3304. In at least one embodiment, results can be written to memory 3304 via partition units 3322, which implement a memory interface for reading and writing data to/from memory 3304. In at least one embodiment, results can be transmitted to another PPU 3304 or CPU via high-speed GPU interconnect 3308. In at least one embodiment, PPU 3300 includes, without limitation, a number U of partition units 3322 that is equal to number of separate and distinct memory devices 3304 coupled to PPU 3300.

In at least one embodiment, a host processor executes a driver kernel that implements an application programming interface ("API") that enables one or more applications executing on host processor to schedule operations for execution on PPU 3300. In at least one embodiment, multiple compute applications are simultaneously executed by PPU 3300 and PPU 3300 provides isolation, quality of service ("QoS"), and independent address spaces for multiple compute applications. In at least one embodiment, an application generates instructions (e.g., in the form of API calls) that cause a driver kernel to generate one or more tasks for execution by PPU 3300 and the driver kernel outputs tasks to one or more streams being processed by PPU 3300. In at least one embodiment, each task comprises one or more groups of related threads, which may be referred to as a warp. In at least one embodiment, a warp comprises a plurality of related threads (e.g., 32 threads) that can be executed in parallel. In at least one embodiment, cooperating threads can refer to a plurality of threads including instructions to perform a task and that exchange data through shared memory.

Figure 34:
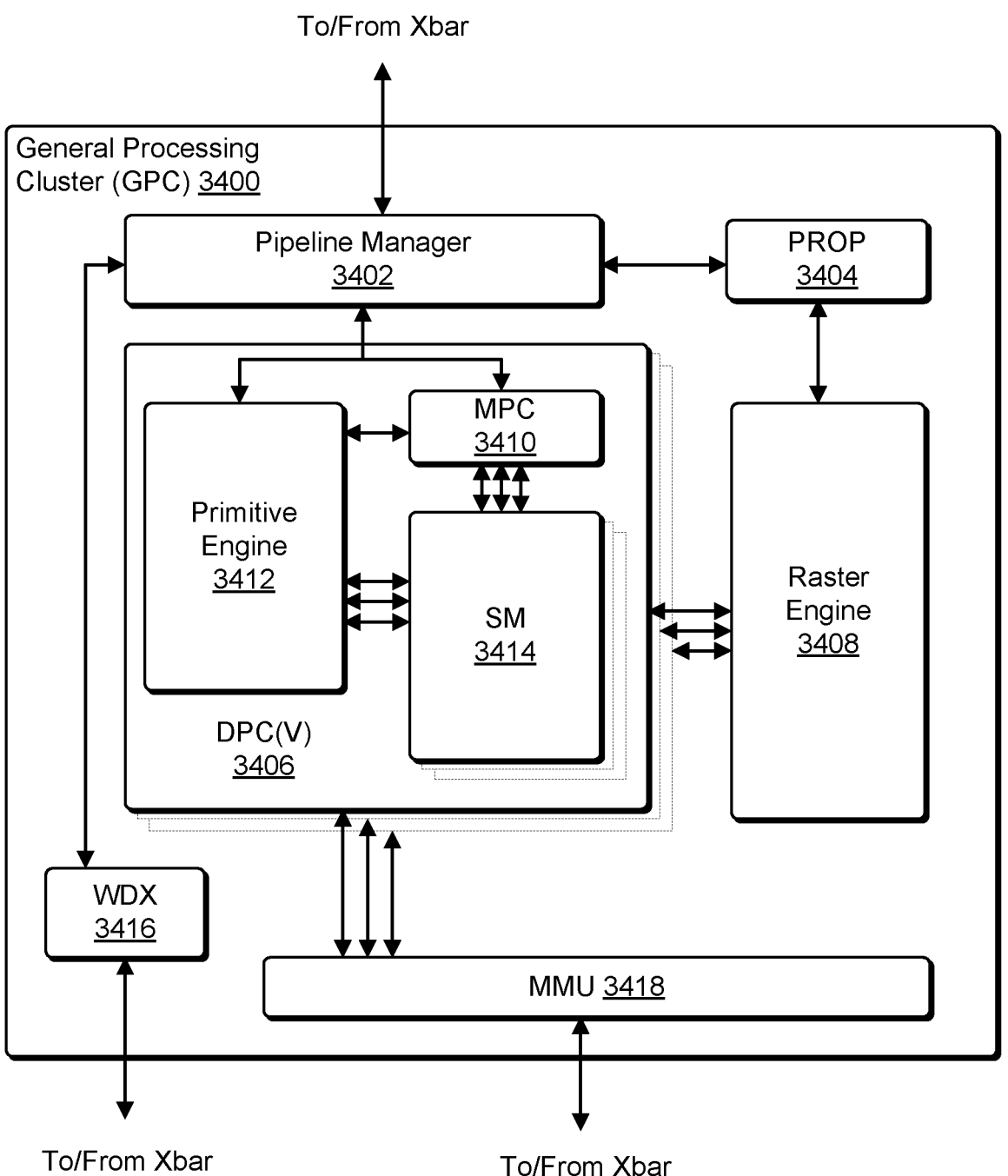
FIG. 34 illustrates a GPC, in accordance with at least one embodiment.

FIG. 34 illustrates a GPC 3400, in accordance with at least one embodiment. In at least one embodiment, GPC 3400 is GPC 3318 of FIG. 33. In at least one embodiment, each GPC 3400 includes, without limitation, a number of hardware units for processing tasks and each GPC 3400 includes, without limitation, a pipeline manager 3402, a pre-raster operations unit ("PROP") 3404, a raster engine 3408, a work distribution crossbar ("WDX") 3416, an MMU 3418, one or more Data Processing Clusters ("DPCs") 3406, and any suitable combination of parts.

In at least one embodiment, operation of GPC 3400 is controlled by pipeline manager 3402. In at least one embodiment, pipeline manager 3402 manages configuration of one or more DPCs 3406 for processing tasks allocated to GPC 3400. In at least one embodiment, pipeline manager 3402 configures at least one of one or more DPCs 3406 to implement at least a portion of a graphics rendering pipeline. In at least one embodiment, DPC 3406 is configured to execute a vertex shader program on a programmable streaming multiprocessor ("SM") 3414. In at least one embodiment, pipeline manager 3402 is configured to route packets received from a work distribution unit to appropriate logical units within GPC 3400 and, in at least one embodiment, some packets may be routed to fixed function hardware units in PROP 3404 and/or raster engine 3408 while other packets may be routed to DPCs 3406 for processing by a primitive engine 3412 or SM 3414. In at least one embodiment, pipeline manager 3402 configures at least one of DPCs 3406 to implement a computing pipeline. In at least one embodiment, pipeline manager 3402 configures at least one of DPCs 3406 to execute at least a portion of a CUDA program.

In at least one embodiment, PROP unit 3404 is configured to route data generated by raster engine 3408 and DPCs 3406 to a Raster Operations ("ROP") unit in a partition unit, such as memory partition unit 3322 described in more detail above in conjunction with FIG. 33. In at least one embodiment, PROP unit 3404 is configured to perform optimizations for color blending, organize pixel data, perform address translations, and more. In at least one embodiment, raster engine 3408 includes, without limitation, a number of fixed function hardware units configured to perform various raster operations and, in at least one embodiment, raster engine 3408 includes, without limitation, a setup engine, a coarse raster engine, a culling engine, a clipping engine, a fine raster engine, a tile coalescing engine, and any suitable combination thereof. In at least one embodiment, a setup engine receives transformed vertices and generates plane equations associated with geometric primitive defined by vertices; plane equations are transmitted to a coarse raster engine to generate coverage information (e.g., an x, y coverage mask for a tile) for a primitive; the output of the coarse raster engine is transmitted to a culling engine where fragments associated with a primitive that fail a z-test are culled, and transmitted to a clipping engine where fragments lying outside a viewing frustum are clipped. In at least one embodiment, fragments that survive clipping and culling are passed to a fine raster engine to generate attributes for pixel fragments based on plane equations generated by a setup engine. In at least one embodiment, the output of raster engine 3408 comprises fragments to be processed by any suitable entity such as by a fragment shader implemented within DPC 3406.

In at least one embodiment, each DPC 3406 included in GPC 3400 comprise, without limitation, an M-Pipe Controller ("MPC") 3410; primitive engine 3412; one or more SMs 3414; and any suitable combination thereof. In at least one embodiment, MPC 3410 controls operation of DPC 3406, routing packets received from pipeline manager 3402 to appropriate units in DPC 3406. In at least one embodiment, packets associated with a vertex are routed to primitive engine 3412, which is configured to fetch vertex attributes associated with vertex from memory; in contrast, packets associated with a shader program may be transmitted to SM 3414.

In at least one embodiment, SM 3414 comprises, without limitation, a programmable streaming processor that is configured to process tasks represented by a number of threads. In at least one embodiment, SM 3414 is multi-threaded and configured to execute a plurality of threads (e.g., 32 threads) from a particular group of threads concurrently and implements a STMD architecture where each thread in a group of threads (e.g., a warp) is configured to process a different set of data based on same set of instructions. In at least one embodiment, all threads in group of threads execute same instructions. In at least one embodiment, SM 3414 implements a STMT architecture wherein each thread in a group of threads is configured to process a different set of data based on same set of instructions, but where individual threads in group of threads are allowed to diverge during execution. In at least one embodiment, a program counter, a call stack, and an execution state is maintained for each warp, enabling concurrency between warps and serial execution within warps when threads within a warp diverge. In another embodiment, a program counter, a call stack, and an execution state is maintained for each individual thread, enabling equal concurrency between all threads, within and between warps. In at least one embodiment, an execution state is maintained for each individual thread and threads executing the same instructions may be converged and executed in parallel for better efficiency. At least one embodiment of SM 3414 is described in more detail in conjunction with FIG. 35.

In at least one embodiment, MMU 3418 provides an interface between GPC 3400 and a memory partition unit (e.g., partition unit 3322 of FIG. 33) and MMU 3418 provides translation of virtual addresses into physical addresses, memory protection, and arbitration of memory requests. In at least one embodiment, MMU 3418 provides one or more translation lookaside buffers (TLBs) for performing translation of virtual addresses into physical addresses in memory.

Figure 35:
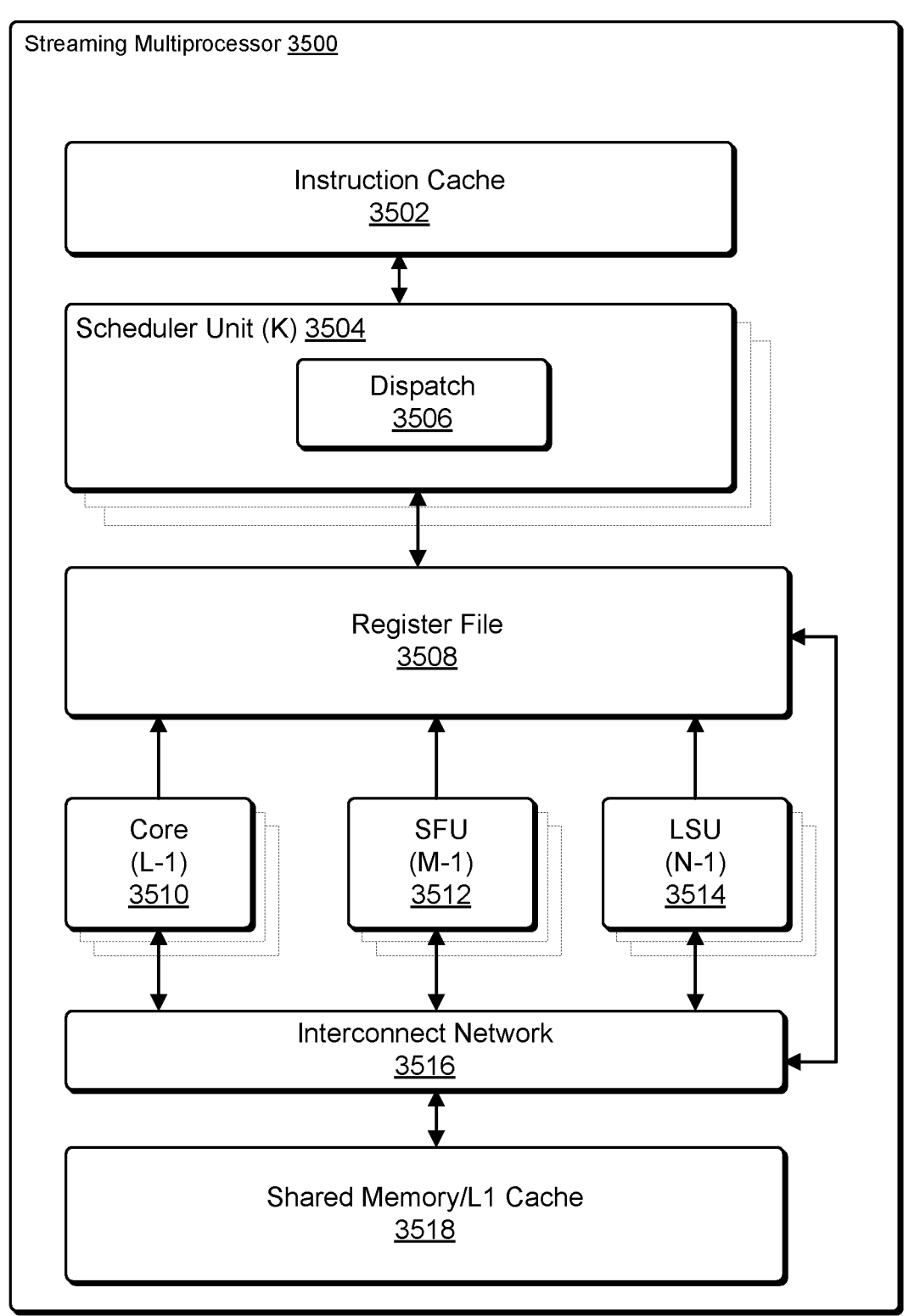
FIG. 35 illustrates a streaming multiprocessor, in accor- dance with at least one embodiment.

FIG. 35 illustrates a streaming multiprocessor ("SM") 3500, in accordance with at least one embodiment. In at least one embodiment, SM 3500 is SM 3414 of FIG. 34. In at least one embodiment, SM 3500 includes, without limitation, an instruction cache 3502; one or more scheduler units 3504; a register file 3508; one or more processing cores ("cores") 3510; one or more special function units ("SFUs") 3512; one or more LSUs 3514; an interconnect network 3516; a shared memory/L1 cache 3518; and any suitable combination thereof. In at least one embodiment, a work distribution unit dispatches tasks for execution on GPCs of parallel processing units (PPUs) and each task is allocated to a particular Data Processing Cluster (DPC) within a GPC and, if a task is associated with a shader program, then the task is allocated to one of SMs 3500. In at least one embodiment, scheduler unit 3504 receives tasks from a work distribution unit and manages instruction scheduling for one or more thread blocks assigned to SM 3500. In at least one embodiment, scheduler unit 3504 schedules thread blocks for execution as warps of parallel threads, wherein each thread block is allocated at least one warp. In at least one embodiment, each warp executes threads. In at least one embodiment, scheduler unit 3504 manages a plurality of different thread blocks, allocating warps to different thread blocks and then dispatching instructions from a plurality of different cooperative groups to various functional units (e.g., processing cores 3510, SFUs 3512, and LSUs 3514) during each clock cycle.

In at least one embodiment, "cooperative groups" may refer to a programming model for organizing groups of communicating threads that allows developers to express granularity at which threads are communicating, enabling expression of richer, more efficient parallel decompositions. In at least one embodiment, cooperative launch APIs support synchronization amongst thread blocks for execution of parallel algorithms. In at least one embodiment, APIs of conventional programming models provide a single, simple construct for synchronizing cooperating threads: a barrier across all threads of a thread block (e.g., syncthreads( ) function). However, in at least one embodiment, programmers may define groups of threads at smaller than thread block granularities and synchronize within defined groups to enable greater performance, design flexibility, and software reuse in the form of collective group-wide function interfaces. In at least one embodiment, cooperative groups enable programmers to define groups of threads explicitly at sub-block and multi-block granularities, and to perform collective operations such as synchronization on threads in a cooperative group. In at least one embodiment, a sub-block granularity is as small as a single thread. In at least one embodiment, a programming model supports clean composition across software boundaries, so that libraries and utility functions can synchronize safely within their local context without having to make assumptions about convergence. In at least one embodiment, cooperative group primitives enable new patterns of cooperative parallelism, including, without limitation, producer-consumer parallelism, opportunistic parallelism, and global synchronization across an entire grid of thread blocks.

In at least one embodiment, a dispatch unit 3506 is configured to transmit instructions to one or more of functional units and scheduler unit 3504 includes, without limitation, two dispatch units 3506 that enable two different instructions from same warp to be dispatched during each clock cycle. In at least one embodiment, each scheduler unit 3504 includes a single dispatch unit 3506 or additional dispatch units 3506.

In at least one embodiment, each SM 3500, in at least one embodiment, includes, without limitation, register file 3508 that provides a set of registers for functional units of SM 3500. In at least one embodiment, register file 3508 is divided between each of the functional units such that each functional unit is allocated a dedicated portion of register file 3508. In at least one embodiment, register file 3508 is divided between different warps being executed by SM 3500 and register file 3508 provides temporary storage for operands connected to data paths of functional units. In at least one embodiment, each SM 3500 comprises, without limitation, a plurality of L processing cores 3510. In at least one embodiment, SM 3500 includes, without limitation, a large number (e.g., 128 or more) of distinct processing cores 3510. In at least one embodiment, each processing core 3510 includes, without limitation, a fully-pipelined, single-precision, double-precision, and/or mixed precision processing unit that includes, without limitation, a floating point arithmetic logic unit and an integer arithmetic logic unit. In at least one embodiment, floating point arithmetic logic units implement IEEE 754-2008 standard for floating point arithmetic. In at least one embodiment, processing cores 3510 include, without limitation, 64 single-precision (32-bit) floating point cores, 64 integer cores, 32 double-precision (64-bit) floating point cores, and 8 tensor cores.

In at least one embodiment, tensor cores are configured to perform matrix operations. In at least one embodiment, one or more tensor cores are included in processing cores 3510. In at least one embodiment, tensor cores are configured to perform deep learning matrix arithmetic, such as convolution operations for neural network training and inferencing. In at least one embodiment, each tensor core operates on a 4×4 matrix and performs a matrix multiply and accumulate operation D=A×B+C, where A, B, C, and D are 4×4 matrices.

In at least one embodiment, matrix multiply inputs A and B are 16-bit floating point matrices and accumulation matrices C and D are 16-bit floating point or 32-bit floating point matrices. In at least one embodiment, tensor cores operate on 16-bit floating point input data with 32-bit floating point accumulation. In at least one embodiment, 16-bit floating point multiply uses 64 operations and results in a full precision product that is then accumulated using 32-bit floating point addition with other intermediate products for a 4×4×4 matrix multiply. Tensor cores are used to perform much larger two-dimensional or higher dimensional matrix operations, built up from these smaller elements, in at least one embodiment. In at least one embodiment, an API, such as a CUDA-C++ API, exposes specialized matrix load, matrix multiply and accumulate, and matrix store operations to efficiently use tensor cores from a CUDA-C++ program. In at least one embodiment, at the CUDA level, a warp-level interface assumes 16×16 size matrices spanning all 32 threads of a warp.

In at least one embodiment, each SM 3500 comprises, without limitation, M SFUs 3512 that perform special functions (e.g., attribute evaluation, reciprocal square root, and like). In at least one embodiment, SFUs 3512 include, without limitation, a tree traversal unit configured to traverse a hierarchical tree data structure. In at least one embodiment, SFUs 3512 include, without limitation, a texture unit configured to perform texture map filtering operations. In at least one embodiment, texture units are configured to load texture maps (e.g., a 2D array of texels) from memory and sample texture maps to produce sampled texture values for use in shader programs executed by SM 3500. In at least one embodiment, texture maps are stored in shared memory/L1 cache 3518. In at least one embodiment, texture units implement texture operations such as filtering operations using mip-maps (e.g., texture maps of varying levels of detail). In at least one embodiment, each SM 3500 includes, without limitation, two texture units.

In at least one embodiment, each SM 3500 comprises, without limitation, N LSUs 3514 that implement load and store operations between shared memory/L1 cache 3518 and register file 3508. In at least one embodiment, each SM 3500 includes, without limitation, interconnect network 3516 that connects each of the functional units to register file 3508 and LSU 3514 to register file 3508 and shared memory/L1 cache 3518. In at least one embodiment, interconnect network 3516 is a crossbar that can be configured to connect any of the functional units to any of the registers in register file 3508 and connect LSUs 3514 to register file 3508 and memory locations in shared memory/L1 cache 3518.

In at least one embodiment, shared memory/L1 cache 3518 is an array of on-chip memory that allows for data storage and communication between SM 3500 and a primitive engine and between threads in SM 3500. In at least one embodiment, shared memory/L1 cache 3518 comprises, without limitation, 128 KB of storage capacity and is in a path from SM 3500 to a partition unit. In at least one embodiment, shared memory/L1 cache 3518 is used to cache reads and writes. In at least one embodiment, one or more of shared memory/L1 cache 3518, L2 cache, and memory are backing stores.

In at least one embodiment, combining data cache and shared memory functionality into a single memory block provides improved performance for both types of memory accesses. In at least one embodiment, capacity is used or is usable as a cache by programs that do not use shared memory, such as if shared memory is configured to use half of capacity, texture and load/store operations can use remaining capacity. In at least one embodiment, integration within shared memory/L1 cache 3518 enables shared memory/L1 cache 3518 to function as a high-throughput conduit for streaming data while simultaneously providing high-bandwidth and low-latency access to frequently reused data. In at least one embodiment, when configured for general purpose parallel computation, a simpler configuration can be used compared with graphics processing. In at least one embodiment, fixed function GPUs are bypassed, creating a much simpler programming model. In at least one embodiment and in a general purpose parallel computation configuration, a work distribution unit assigns and distributes blocks of threads directly to DPCs. In at least one embodiment, threads in a block execute the same program, using a unique thread ID in a calculation to ensure each thread generates unique results, using SM 3500 to execute a program and perform calculations, shared memory/L1 cache 3518 to communicate between threads, and LSU 3514 to read and write global memory through shared memory/L1 cache 3518 and a memory partition unit. In at least one embodiment, when configured for general purpose parallel computation, SM 3500 writes commands that scheduler unit 3504 can use to launch new work on DPCs.

In at least one embodiment, PPU is included in or coupled to a desktop computer, a laptop computer, a tablet computer, servers, supercomputers, a smart-phone (e.g., a wireless, hand-held device), a PDA, a digital camera, a vehicle, a head mounted display, a hand-held electronic device, and more. In at least one embodiment, PPU is embodied on a single semiconductor substrate. In at least one embodiment, PPU is included in an SoC along with one or more other devices such as additional PPUs, memory, a RISC CPU, an MMU, a digital-to-analog converter ("DAC"), and like.

In at least one embodiment, PPU may be included on a graphics card that includes one or more memory devices. In at least one embodiment, a graphics card may be configured to interface with a PCIe slot on a motherboard of a desktop computer. In at least one embodiment, PPU may be an integrated GPU ("iGPU") included in chipset of motherboard.

Software Constructs for General-Purpose Computing

The following figures set forth, without limitation, exemplary software constructs for implementing at least one embodiment.

Figure 36:
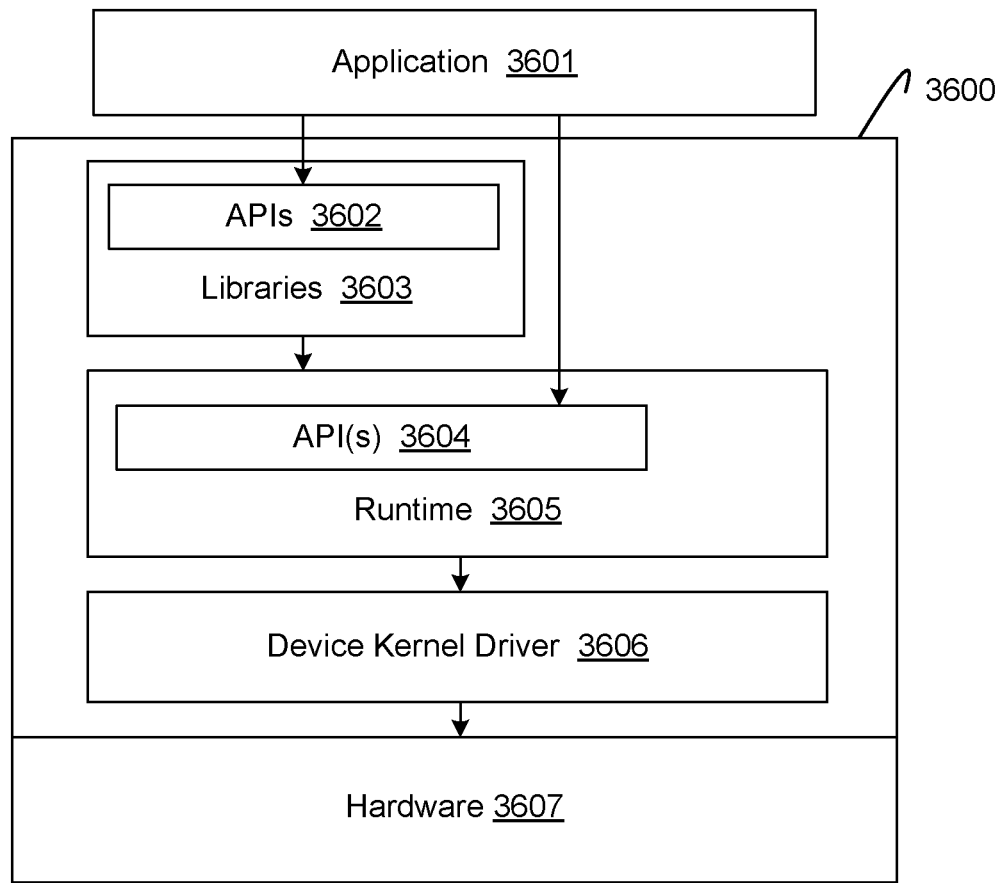
FIG. 36 illustrates a software stack of a programming platform, in accordance with at least one embodiment.

FIG. 36 illustrates a software stack of a programming platform, in accordance with at least one embodiment. In at least one embodiment, a programming platform is a platform for leveraging hardware on a computing system to accelerate computational tasks. A programming platform may be accessible to software developers through libraries, compiler directives, and/or extensions to programming languages, in at least one embodiment. In at least one embodiment, a programming platform may be, but is not limited to, CUDA, Radeon Open Compute Platform ("ROCm"), OpenCL (OpenCL™ is developed by Khronos group), SYCL, or Intel One API.

In at least one embodiment, a software stack 3600 of a programming platform provides an execution environment for an application 3601. In at least one embodiment, application 3601 may include any computer software capable of being launched on software stack 3600. In at least one embodiment, application 3601 may include, but is not limited to, an artificial intelligence ("AI")/machine learning ("ML") application, a high performance computing ("HPC") application, a virtual desktop infrastructure ("VDI"), or a data center workload.

In at least one embodiment, application 3601 and software stack 3600 run on hardware 3607. Hardware 3607 may include one or more GPUs, CPUs, FPGAs, A1 engines, and/or other types of compute devices that support a programming platform, in at least one embodiment. In at least one embodiment, such as with CUDA, software stack 3600 may be vendor specific and compatible with only devices from particular vendor(s). In at least one embodiment, such as in with OpenCL, software stack 3600 may be used with devices from different vendors. In at least one embodiment, hardware 3607 includes a host connected to one more devices that can be accessed to perform computational tasks via application programming interface ("API") calls. A device within hardware 3607 may include, but is not limited to, a GPU, FPGA, A1 engine, or other compute device (but may also include a CPU) and its memory, as opposed to a host within hardware 3607 that may include, but is not limited to, a CPU (but may also include a compute device) and its memory, in at least one embodiment.

In at least one embodiment, software stack 3600 of a programming platform includes, without limitation, a number of libraries 3603, a runtime 3605, and a device kernel driver 3606. Each of libraries 3603 may include data and programming code that can be used by computer programs and leveraged during software development, in at least one embodiment. In at least one embodiment, libraries 3603 may include, but are not limited to, pre-written code and sub-routines, classes, values, type specifications, configuration data, documentation, help data, and/or message templates. In at least one embodiment, libraries 3603 include functions that are optimized for execution on one or more types of devices. In at least one embodiment, libraries 3603 may include, but are not limited to, functions for performing mathematical, deep learning, and/or other types of operations on devices. In at least one embodiment, libraries 3603 are associated with corresponding APIs 3602, which may include one or more APIs, that expose functions implemented in libraries 3603.

In at least one embodiment, application 3601 is written as source code that is compiled into executable code, as discussed in greater detail below in conjunction with FIGS. 41-43. Executable code of application 3601 may run, at least in part, on an execution environment provided by software stack 3600, in at least one embodiment. In at least one embodiment, during execution of application 3601, code may be reached that needs to run on a device, as opposed to a host. In such a case, runtime 3605 may be called to load and launch requisite code on the device, in at least one embodiment. In at least one embodiment, runtime 3605 may include any technically feasible runtime system that is able to support execution of application S01.

In at least one embodiment, runtime 3605 is implemented as one or more runtime libraries associated with corresponding APIs, which are shown as API(s) 3604. One or more of such runtime libraries may include, without limitation, functions for memory management, execution control, device management, error handling, and/or synchronization, among other things, in at least one embodiment. In at least one embodiment, memory management functions may include, but are not limited to, functions to allocate, deallocate, and copy device memory, as well as transfer data between host memory and device memory. In at least one embodiment, execution control functions may include, but are not limited to, functions to launch a function (sometimes referred to as a "kernel" when a function is a global function callable from a host) on a device and set attribute values in a buffer maintained by a runtime library for a given function to be executed on a device.

Runtime libraries and corresponding API(s) 3604 may be implemented in any technically feasible manner, in at least one embodiment. In at least one embodiment, one (or any number of) API may expose a low-level set of functions for fine-grained control of a device, while another (or any number of) API may expose a higher-level set of such functions. In at least one embodiment, a high-level runtime API may be built on top of a low-level API. In at least one embodiment, one or more of runtime APIs may be language-specific APIs that are layered on top of a language-independent runtime API.

In at least one embodiment, device kernel driver 3606 is configured to facilitate communication with an underlying device. In at least one embodiment, device kernel driver 3606 may provide low-level functionalities upon which APIs, such as API(s) 3604, and/or other software relies. In at least one embodiment, device kernel driver 3606 may be configured to compile intermediate representation ("IR") code into binary code at runtime. For CUDA, device kernel driver 3606 may compile Parallel Thread Execution ("PTX") IR code that is not hardware specific into binary code for a specific target device at runtime (with caching of compiled binary code), which is also sometimes referred to as "finalizing" code, in at least one embodiment. Doing so may permit finalized code to run on a target device, which may not have existed when source code was originally compiled into PTX code, in at least one embodiment. Alternatively, in at least one embodiment, device source code may be compiled into binary code offline, without requiring device kernel driver 3606 to compile IR code at runtime.

Figure 37:
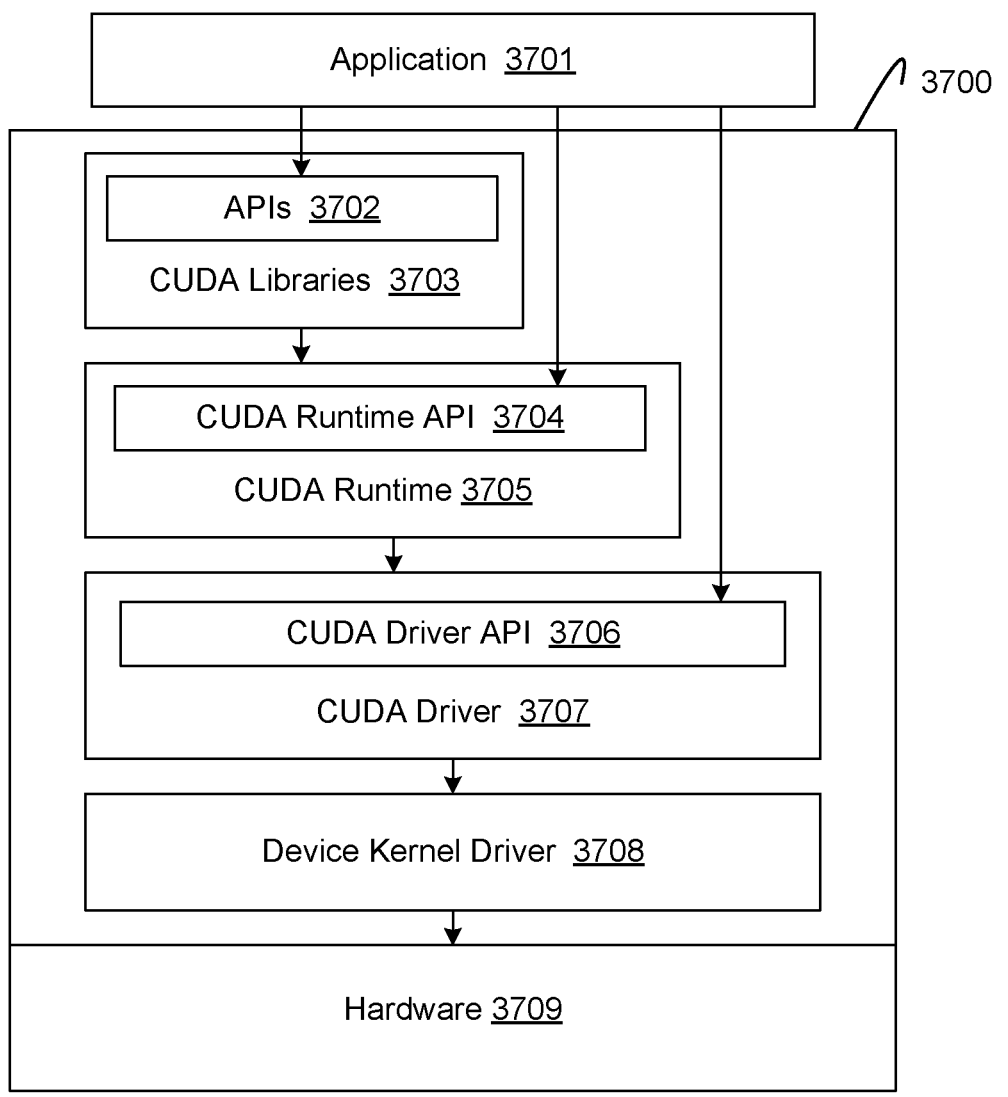
FIG. 37 illustrates a CUDA implementation of a software stack of FIG. 36, in accordance with at least one embodi- ment.

FIG. 37 illustrates a CUDA implementation of software stack 3600 of FIG. 36, in accordance with at least one embodiment. In at least one embodiment, a CUDA software stack 3700, on which an application 3701 may be launched, includes CUDA libraries 3703, a CUDA runtime 3705, a CUDA driver 3707, and a device kernel driver 3708. In at least one embodiment, CUDA software stack 3700 executes on hardware 3709, which may include a GPU that supports CUDA and is developed by NVIDIA Corporation of Santa Clara, CA.

In at least one embodiment, application 3701, CUDA runtime 3705, and device kernel driver 3708 may perform similar functionalities as application 3601, runtime 3605, and device kernel driver 3606, respectively, which are described above in conjunction with FIG. 36. In at least one embodiment, CUDA driver 3707 includes a library (libcuda.so) that implements a CUDA driver API 3706. Similar to a CUDA runtime API 3704 implemented by a CUDA runtime library (cudart), CUDA driver API 3706 may, without limitation, expose functions for memory management, execution control, device management, error handling, synchronization, and/or graphics interoperability, among other things, in at least one embodiment. In at least one embodiment, CUDA driver API 3706 differs from CUDA runtime API 3704 in that CUDA runtime API 3704 simplifies device code management by providing implicit initialization, context (analogous to a process) management, and module (analogous to dynamically loaded libraries) management. In contrast to high-level CUDA runtime API 3704, CUDA driver API 3706 is a low-level API providing more fine-grained control of the device, particularly with respect to contexts and module loading, in at least one embodiment. In at least one embodiment, CUDA driver API 3706 may expose functions for context management that are not exposed by CUDA runtime API 3704. In at least one embodiment, CUDA driver API 3706 is also language-independent and supports, e.g., OpenCL in addition to CUDA runtime API 3704. Further, in at least one embodiment, development libraries, including CUDA runtime 3705, may be considered as separate from driver components, including user-mode CUDA driver 3707 and kernel-mode device driver 3708 (also sometimes referred to as a "display" driver).

In at least one embodiment, CUDA libraries 3703 may include, but are not limited to, mathematical libraries, deep learning libraries, parallel algorithm libraries, and/or signal/image/video processing libraries, which parallel computing applications such as application 3701 may utilize. In at least one embodiment, CUDA libraries 3703 may include mathematical libraries such as a cuBLAS library that is an implementation of Basic Linear Algebra Subprograms ("BLAS") for performing linear algebra operations, a cuFFT library for computing fast Fourier transforms ("FFTs"), and a cuRAND library for generating random numbers, among others. In at least one embodiment, CUDA libraries 3703 may include deep learning libraries such as a cuDNN library of primitives for deep neural networks and a TensorRT platform for high-performance deep learning inference, among others.

Figure 38:
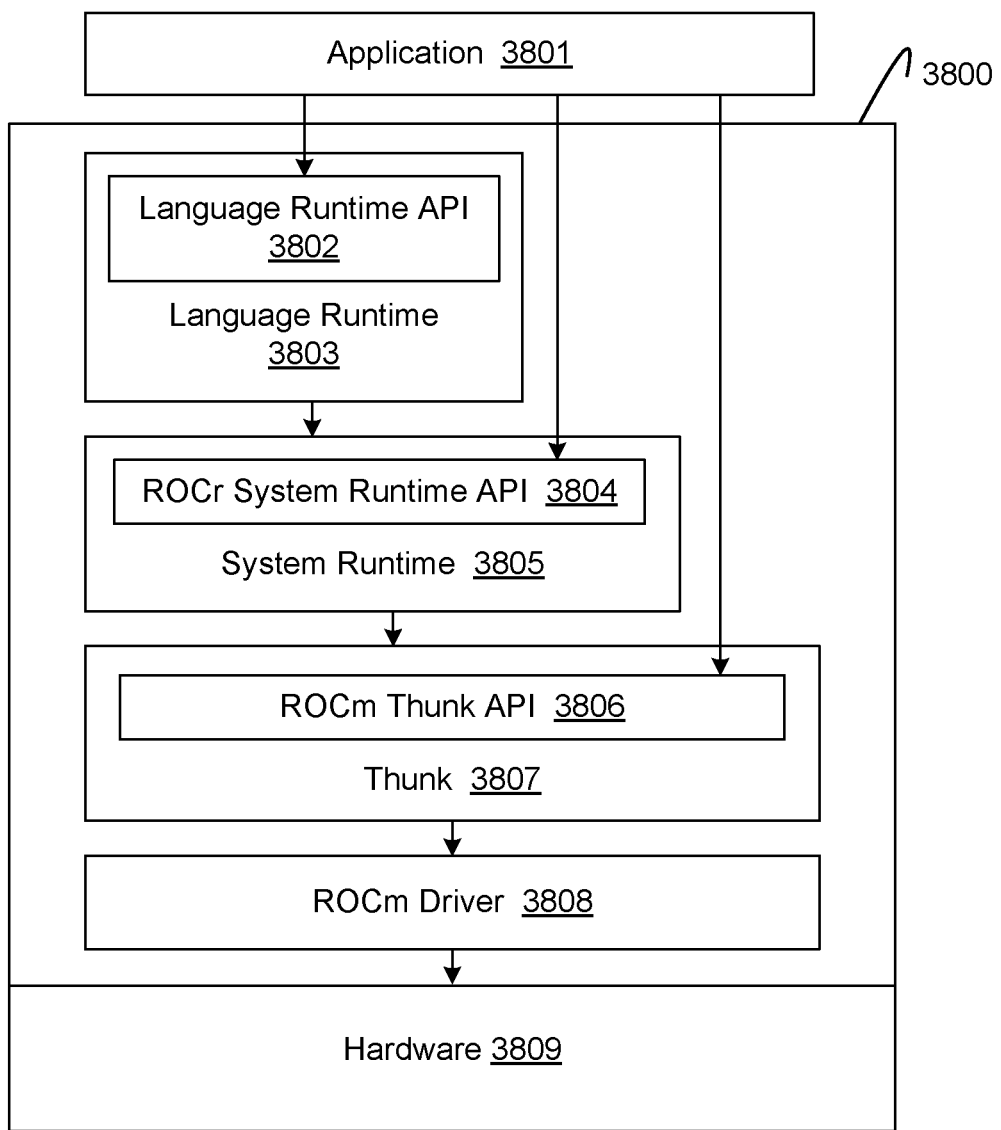
FIG. 38 illustrates a ROCm implementation of a software stack of FIG. 36, in accordance with at least one embodi- ment.

FIG. 38 illustrates a ROCm implementation of software stack 3600 of FIG. 36, in accordance with at least one embodiment. In at least one embodiment, a ROCm software stack 3800, on which an application 3801 may be launched, includes a language runtime 3803, a system runtime 3805, a thunk 3807, and a ROCm kernel driver 3808. In at least one embodiment, ROCm software stack 3800 executes on hardware 3809, which may include a GPU that supports ROCm and is developed by AMD Corporation of Santa Clara, CA.

In at least one embodiment, application 3801 may perform similar functionalities as application 3601 discussed above in conjunction with FIG. 36. In addition, language runtime 3803 and system runtime 3805 may perform similar functionalities as runtime 3605 discussed above in conjunction with FIG. 36, in at least one embodiment. In at least one embodiment, language runtime 3803 and system runtime 3805 differ in that system runtime 3805 is a language-independent runtime that implements a ROCr system runtime API 3804 and makes use of a Heterogeneous System Architecture ("HSA") Runtime API. HSA runtime API is a thin, user-mode API that exposes interfaces to access and interact with an AMD GPU, including functions for memory management, execution control via architected dispatch of kernels, error handling, system and agent information, and runtime initialization and shutdown, among other things, in at least one embodiment. In contrast to system runtime 3805, language runtime 3803 is an implementation of a language-specific runtime API 3802 layered on top of ROCr system runtime API 3804, in at least one embodiment. In at least one embodiment, language runtime API may include, but is not limited to, a Heterogeneous compute Interface for Portability ("HIP") language runtime API, a Heterogeneous Compute Compiler ("HCC") language runtime API, or an OpenCL API, among others. HIP language in particular is an extension of C++ programming language with functionally similar versions of CUDA mechanisms, and, in at least one embodiment, a HIP language runtime API includes functions that are similar to those of CUDA runtime API 3704 discussed above in conjunction with FIG. 37, such as functions for memory management, execution control, device management, error handling, and synchronization, among other things.

In at least one embodiment, thunk (ROCt) 3807 is an interface 3806 that can be used to interact with underlying ROCm driver 3808. In at least one embodiment, ROCm driver 3808 is a ROCk driver, which is a combination of an AMDGPU driver and a HSA kernel driver (amdkfd). In at least one embodiment, AMDGPU driver is a device kernel driver for GPUs developed by AMD that performs similar functionalities as device kernel driver 3606 discussed above in conjunction with FIG. 36. In at least one embodiment, HSA kernel driver is a driver permitting different types of processors to share system resources more effectively via hardware features.

In at least one embodiment, various libraries (not shown) may be included in ROCm software stack 3800 above language runtime 3803 and provide functionality similarity to CUDA libraries 3703, discussed above in conjunction with FIG. 37. In at least one embodiment, various libraries may include, but are not limited to, mathematical, deep learning, and/or other libraries such as a hipBLAS library that implements functions similar to those of CUDA cuBLAS, a rocFFT library for computing FFTs that is similar to CUDA cuFFT, among others.

Figure 39:
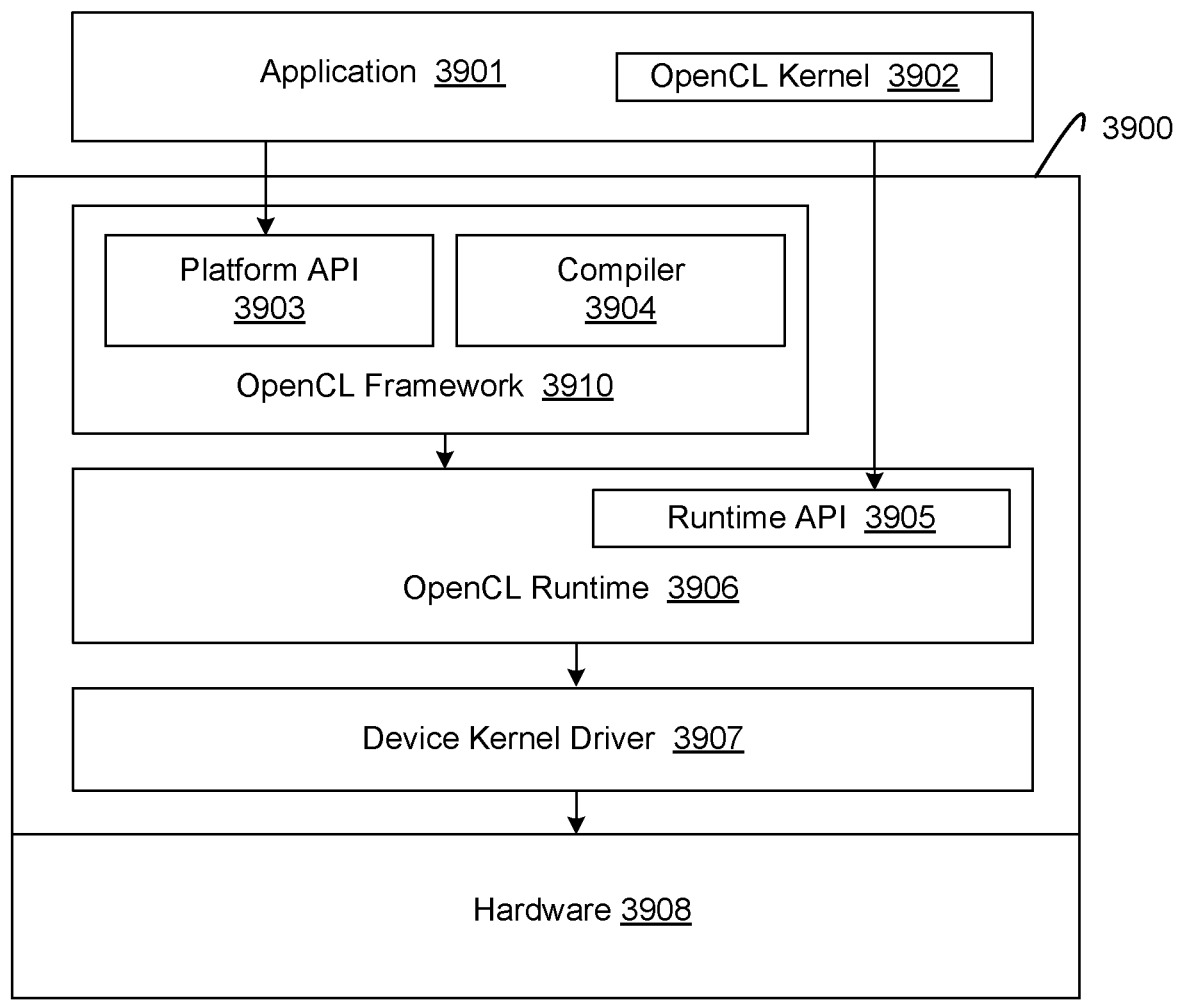
FIG. 39 illustrates an OpenCL implementation of a soft- ware stack of FIG. 36, in accordance with at least one embodiment.

FIG. 39 illustrates an OpenCL implementation of software stack 3600 of FIG. 36, in accordance with at least one embodiment. In at least one embodiment, an OpenCL software stack 3900, on which an application 3901 may be launched, includes an OpenCL framework 3910, an OpenCL runtime 3906, and a driver 3907. In at least one embodiment, OpenCL software stack 3900 executes on hardware 3709 that is not vendor-specific. As OpenCL is supported by devices developed by different vendors, specific OpenCL drivers may be required to interoperate with hardware from such vendors, in at least one embodiment.

In at least one embodiment, application 3901, OpenCL runtime 3906, device kernel driver 3907, and hardware 3908 may perform similar functionalities as application 3601, runtime 3605, device kernel driver 3606, and hardware 3607, respectively, that are discussed above in conjunction with FIG. 36. In at least one embodiment, application 3901 further includes an OpenCL kernel 3902 with code that is to be executed on a device.

In at least one embodiment, OpenCL defines a "platform" that allows a host to control devices connected to the host. In at least one embodiment, an OpenCL framework provides a platform layer API and a runtime API, shown as platform API 3903 and runtime API 3905. In at least one embodiment, runtime API 3905 uses contexts to manage execution of kernels on devices. In at least one embodiment, each identified device may be associated with a respective context, which runtime API 3905 may use to manage command queues, program objects, and kernel objects, share memory objects, among other things, for that device. In at least one embodiment, platform API 3903 exposes functions that permit device contexts to be used to select and initialize devices, submit work to devices via command queues, and enable data transfer to and from devices, among other things. In addition, OpenCL framework provides various built-in functions (not shown), including math functions, relational functions, and image processing functions, among others, in at least one embodiment.

In at least one embodiment, a compiler 3904 is also included in OpenCL frame-work 3910. Source code may be compiled offline prior to executing an application or online during execution of an application, in at least one embodiment. In contrast to CUDA and ROCm, OpenCL applications in at least one embodiment may be compiled online by compiler 3904, which is included to be representative of any number of compilers that may be used to compile source code and/or IR code, such as Standard Portable Intermediate Representation ("SPIR-V") code, into binary code. Alternatively, in at least one embodiment, OpenCL ap-plications may be compiled offline, prior to execution of such applications.

Figure 40:
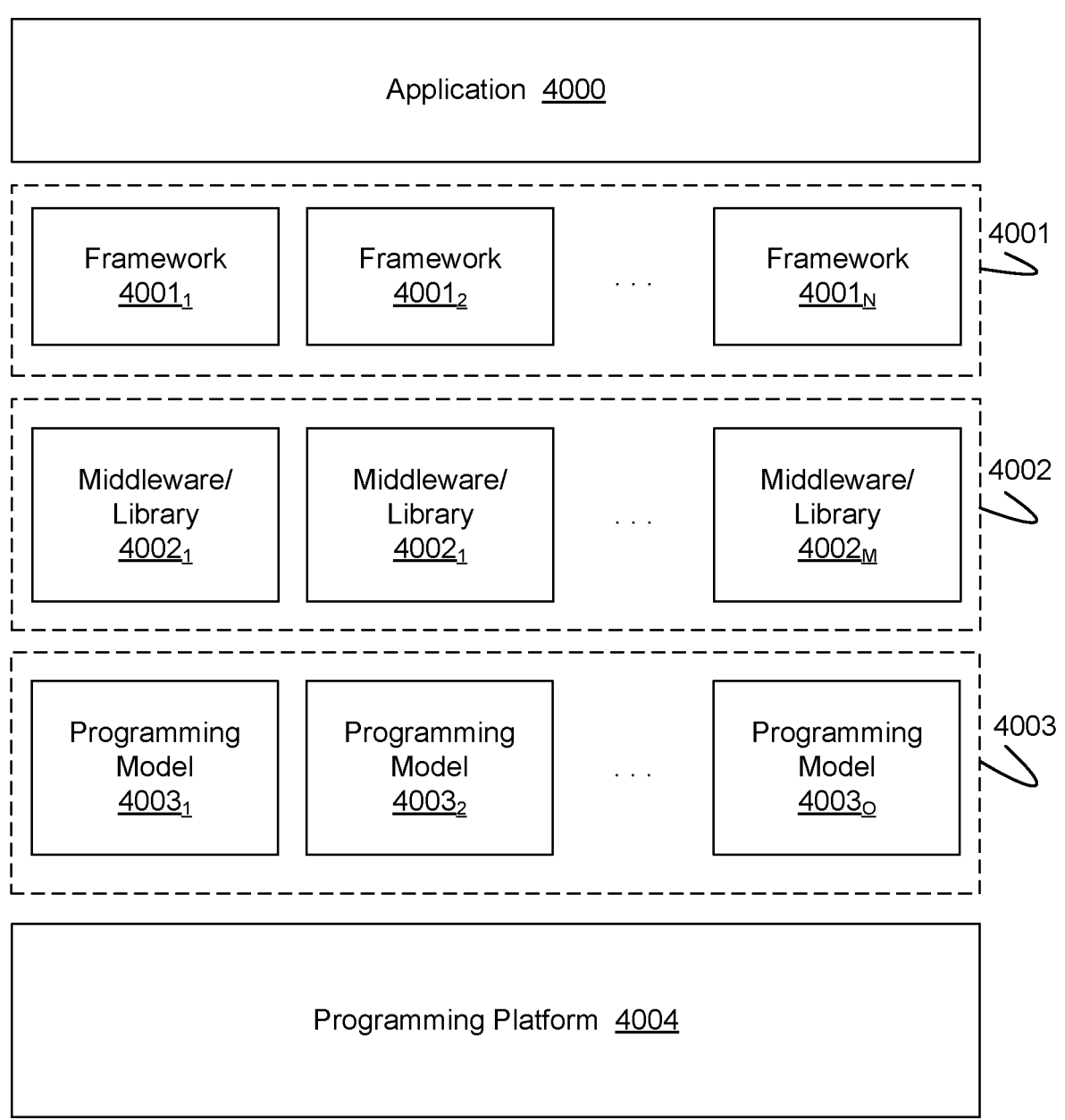
FIG. 40 illustrates software that is supported by a pro- gramming platform, in accordance with at least one embodi- ment.

FIG. 40 illustrates software that is supported by a pro-gramming platform, in accordance with at least one embodi-ment. In at least one embodiment, a programming platform 4004 is configured to support various programming models 4003, middlewares and/or libraries 4002, and frameworks 4001 that an application 4000 may rely upon. In at least one embodiment, application 4000 may be an AI/ML application implemented using, for example, a deep learning framework such as MXNet, PyTorch, or TensorFlow, which may rely on libraries such as cuDNN, NVIDIA Collective Communica-tions Library ("NCCL"), and/or NVIDA Developer Data Loading Library ("DALI") CUDA libraries to provide accel-erated computing on underlying hardware.

In at least one embodiment, programming platform 4004 may be one of a CUDA, ROCm, or OpenCL platform described above in conjunction with FIG. 37, FIG. 38, and FIG. 39, respectively. In at least one embodiment, program-ming platform 4004 supports multiple programming models 4003, which are abstractions of an underlying computing system permitting expressions of algorithms and data struc-tures. Programming models 4003 may expose features of underlying hardware in order to improve performance, in at least one embodiment. In at least one embodiment, program-ming models 4003 may include, but are not limited to, CUDA, HIP, OpenCL, C++ Accelerated Massive Parallel-ism ("C++ AMP"), Open Multi-Processing ("OpenMP"), Open Accelerators ("OpenACC"), and/or Vulcan Compute.

In at least one embodiment, libraries and/or middlewares 4002 provide implementations of abstractions of program-ming models 4004. In at least one embodiment, such librar-ies include data and programming code that may be used by computer programs and leveraged during software develop-ment. In at least one embodiment, such middlewares include software that provides services to applications beyond those available from programming platform 4004. In at least one embodiment, libraries and/or middlewares 4002 may include, but are not limited to, cuBLAS, cuFFT, cuRAND, and other CUDA libraries, or rocBLAS, rocFFT, rocRAND, and other ROCm libraries. In addition, in at least one embodiment, libraries and/or middlewares 4002 may include NCCL and ROCm Communication Collectives Library ("RCCL") libraries providing communication rou-tines for GPUs, a MIOpen library for deep learning accel-eration, and/or an Eigen library for linear algebra, matrix and vector operations, geometrical transformations, numeri-cal solvers, and related algorithms.

In at least one embodiment, application frameworks 4001 depend on libraries and/or middlewares 4002. In at least one embodiment, each of application frameworks 4001 is a software framework used to implement a standard structure of application software. Returning to the AI/ML example discussed above, an AI/ML application may be implemented using a framework such as Caffe, Caffe2, TensorFlow, Keras, PyTorch, or MxNet deep learning frameworks, in at least one embodiment.

Figure 41:
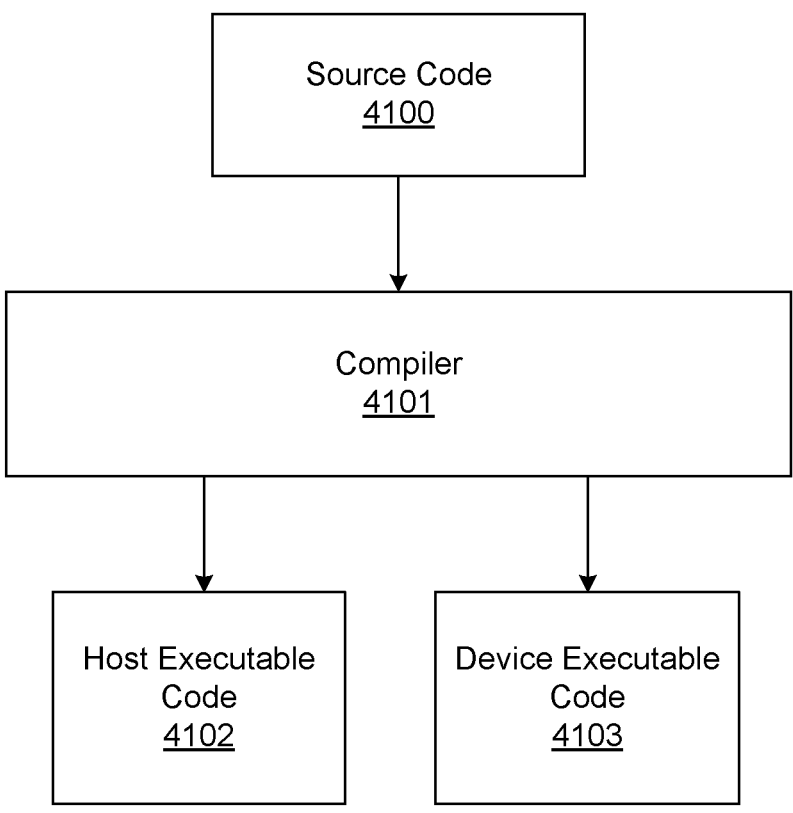
FIG. 41 illustrates compiling code to execute on programming platforms of FIGS. 36-39, in accordance with at least one embodiment.

FIG. 41 illustrates compiling code to execute on one of programming platforms of FIGS. 36-39, in accordance with at least one embodiment. In at least one embodiment, a compiler 4101 receives source code 4100 that includes both host code as well as device code. In at least one embodiment, complier 4101 is configured to convert source code 4100 into host executable code 4102 for execution on a host and device executable code 4103 for execution on a device. In at least one embodiment, source code 4100 may either be compiled offline prior to execution of an application, or online during execution of an application.

In at least one embodiment, source code 4100 may include code in any programming language supported by compiler 4101, such as C++, C, Fortran, etc. In at least one embodiment, source code 4100 may be included in a single-source file having a mixture of host code and device code, with locations of device code being indicated therein. In at least one embodiment, a single-source file may be a .cu file that includes CUDA code or a .hip.cpp file that includes HIP code. Alternatively, in at least one embodiment, source code 4100 may include multiple source code files, rather than a single-source file, into which host code and device code are separated.

In at least one embodiment, compiler 4101 is configured to compile source code 4100 into host executable code 4102 for execution on a host and device executable code 4103 for execution on a device. In at least one embodiment, compiler 4101 performs operations including parsing source code 4100 into an abstract system tree (AST), performing opti-mizations, and generating executable code. In at least one embodiment in which source code 4100 includes a single-source file, compiler 4101 may separate device code from host code in such a single-source file, compile device code and host code into device executable code 4103 and host executable code 4102, respectively, and link device execut-able code 4103 and host executable code 4102 together in a single file, as discussed in greater detail below with respect to FIG. 42.

In at least one embodiment, host executable code 4102 and device executable code 4103 may be in any suitable format, such as binary code and/or IR code. In the case of CUDA, host executable code 4102 may include native object code and device executable code 4103 may include code in PTX intermediate representation, in at least one embodiment. In the case of ROCm, both host executable code 4102 and device executable code 4103 may include target binary code, in at least one embodiment.

Figure 42:
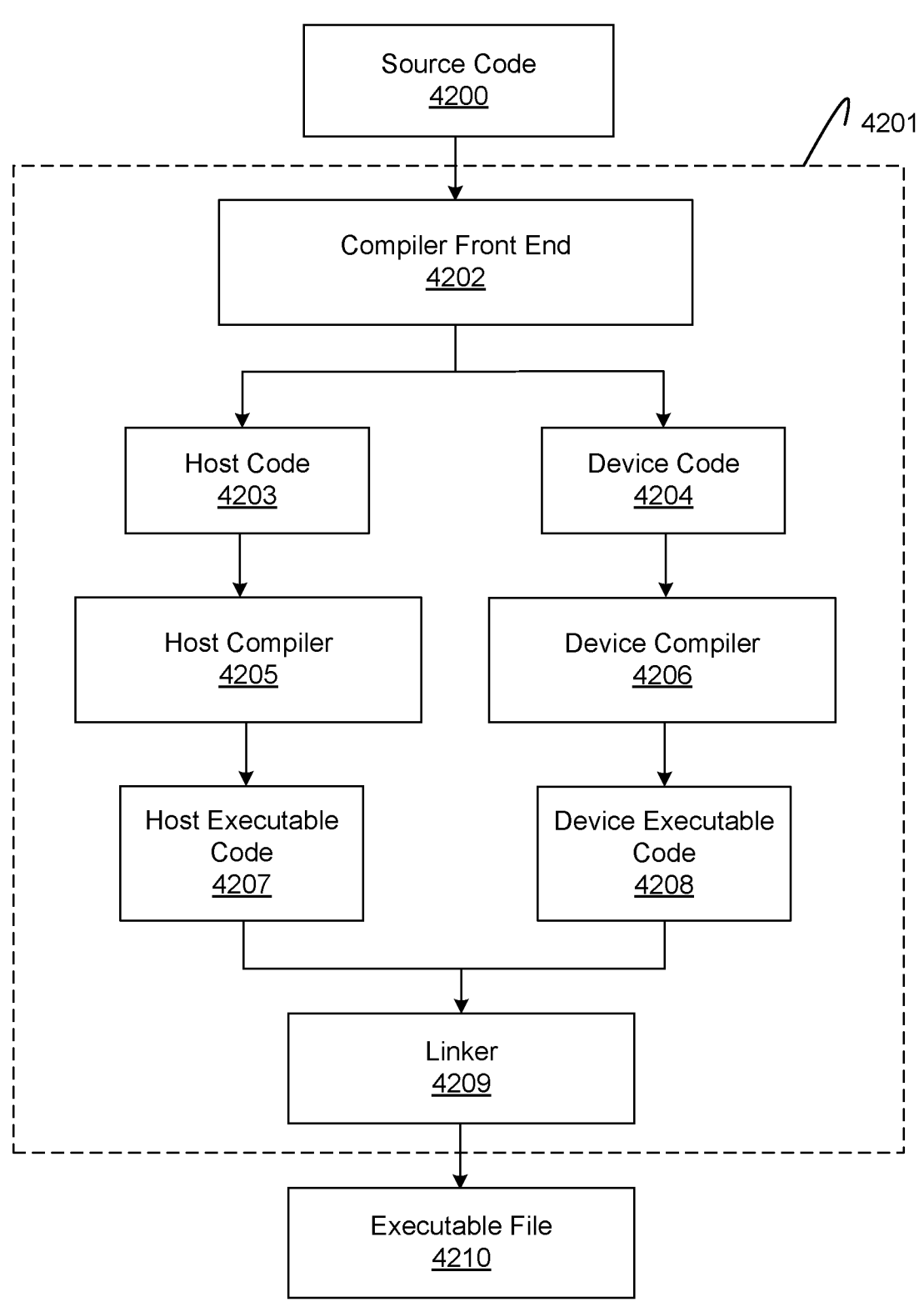
FIG. 42 illustrates in greater detail compiling code to execute on programming platforms of FIGS. 36-39, in accordance with at least one embodiment.

FIG. 42 is a more detailed illustration of compiling code to execute on one of programming platforms of FIGS. 36-39, in accordance with at least one embodiment. In at least one embodiment, a compiler 4201 is configured to receive source code 4200, compile source code 4200, and output an executable file 4210. In at least one embodiment, source code 4200 is a single-source file, such as a .cu file, a .hip.cpp file, or a file in another format, that includes both host and device code. In at least one embodiment, compiler 4201 may be, but is not limited to, an NVIDIA CUDA compiler ("NVCC") for compiling CUDA code in .cu files, or a HCC compiler for compiling HIP code in .hip.cpp files.

In at least one embodiment, compiler 4201 includes a compiler front end 4202, a host compiler 4205, a device compiler 4206, and a linker 4209. In at least one embodiment, compiler front end 4202 is configured to separate device code 4204 from host code 4203 in source code 4200. Device code 4204 is compiled by device compiler 4206 into device executable code 4208, which as described may include binary code or IR code, in at least one embodiment. Separately, host code 4203 is compiled by host compiler 4205 into host executable code 4207, in at least one embodiment. For NVCC, host compiler 4205 may be, but is not limited to, a general purpose C/C++ compiler that outputs native object code, while device compiler 4206 may be, but is not limited to, a Low Level Virtual Machine ("LLVM")-based compiler that forks a LLVM compiler infrastructure and outputs PTX code or binary code, in at least one embodiment. For HCC, both host compiler 4205 and device compiler 4206 may be, but are not limited to, LLVM-based compilers that output target binary code, in at least one embodiment.

Subsequent to compiling source code 4200 into host executable code 4207 and device executable code 4208, linker 4209 links host and device executable code 4207 and 4208 together in executable file 4210, in at least one embodiment. In at least one embodiment, native object code for a host and PTX or binary code for a device may be linked together in an Executable and Linkable Format ("ELF") file, which is a container format used to store object code.

Figure 43:
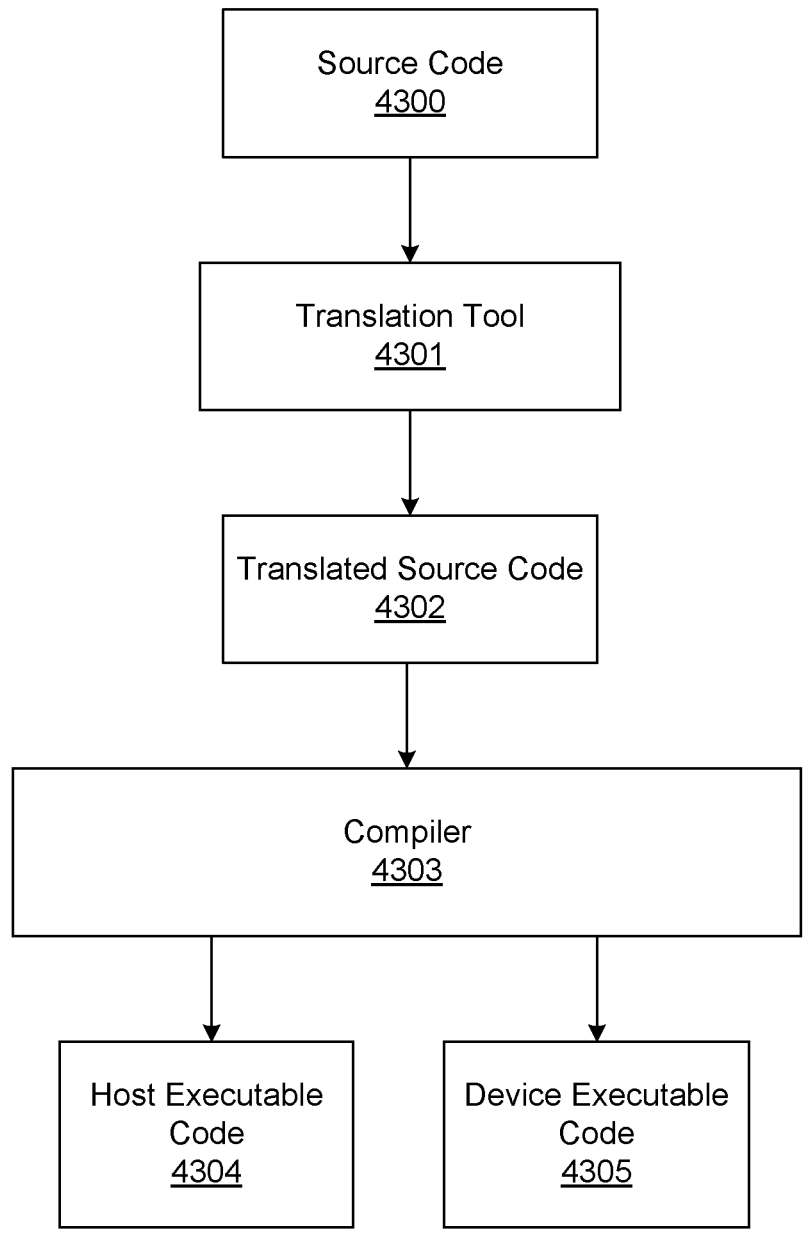
FIG. 43 illustrates translating source code prior to compiling source code, in accordance with at least one embodiment.

FIG. 43 illustrates translating source code prior to compiling source code, in accordance with at least one embodiment. In at least one embodiment, source code 4300 is passed through a translation tool 4301, which translates source code 4300 into translated source code 4302. In at least one embodiment, a compiler 4303 is used to compile translated source code 4302 into host executable code 4304 and device executable code 4305 in a process that is similar to compilation of source code 4100 by compiler 4101 into host executable code 4102 and device executable 4103, as discussed above in conjunction with FIG. 41.

In at least one embodiment, a translation performed by translation tool 4301 is used to port source 4300 for execution in a different environment than that in which it was originally intended to run. In at least one embodiment, translation tool 4301 may include, but is not limited to, a HIP translator that is used to "hipify" CUDA code intended for a CUDA platform into HIP code that can be compiled and executed on a ROCm platform. In at least one embodiment, translation of source code 4300 may include parsing source code 4300 and converting calls to API(s) provided by one programming model (e.g., CUDA) into corresponding calls to API(s) provided by another programming model (e.g., HIP), as discussed in greater detail below in conjunction with FIGS. 44A-45. Returning to the example of hipifying CUDA code, calls to CUDA runtime API, CUDA driver API, and/or CUDA libraries may be converted to corresponding HIP API calls, in at least one embodiment. In at least one embodiment, automated translations performed by translation tool 4301 may sometimes be incomplete, requiring additional, manual effort to fully port source code 4300.

Configuring GPUs for General-Purpose Computing

The following figures set forth, without limitation, exemplary architectures for compiling and executing compute source code, in accordance with at least one embodiment.

Figure 44A:
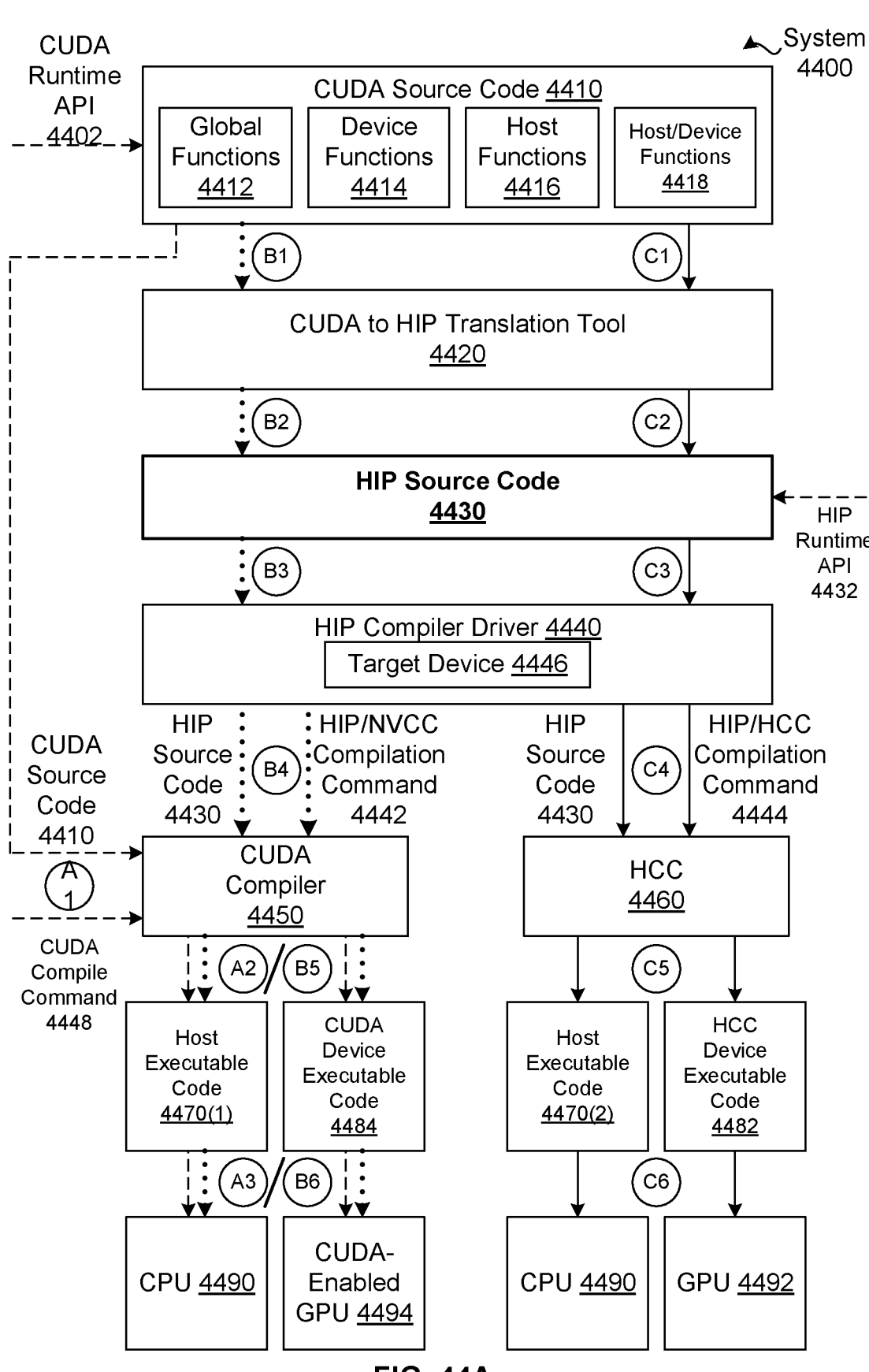
FIG. 44A illustrates a system configured to compile and execute CUDA source code using different types of processing units, in accordance with at least one embodiment.

FIG. 44A illustrates a system 4400 configured to compile and execute CUDA source code 4410 using different types of processing units, in accordance with at least one embodiment. In at least one embodiment, system 4400 includes, without limitation, CUDA source code 4410, a CUDA compiler 4450, host executable code 4470(1), host executable code 4470(2), CUDA device executable code 4484, a CPU 4490, a CUDA-enabled GPU 4494, a GPU 4492, a CUDA to HIP translation tool 4420, HIP source code 4430, a HIP compiler driver 4440, an HCC 4460, and HCC device executable code 4482.

In at least one embodiment, CUDA source code 4410 is a collection of human-readable code in a CUDA programming language. In at least one embodiment, CUDA code is human-readable code in a CUDA programming language. In at least one embodiment, a CUDA programming language is an extension of the C++ programming language that includes, without limitation, mechanisms to define device code and distinguish between device code and host code. In at least one embodiment, device code is source code that, after compilation, is executable in parallel on a device. In at least one embodiment, a device may be a processor that is optimized for parallel instruction processing, such as CUDA-enabled GPU 4490, GPU 44192, or another GPGPU, etc. In at least one embodiment, host code is source code that, after compilation, is executable on a host. In at least one embodiment, a host is a processor that is optimized for sequential instruction processing, such as CPU 4490.

In at least one embodiment, CUDA source code 4410 includes, without limitation, any number (including zero) of global functions 4412, any number (including zero) of device functions 4414, any number (including zero) of host functions 4416, and any number (including zero) of host/device functions 4418. In at least one embodiment, global functions 4412, device functions 4414, host functions 4416, and host/device functions 4418 may be mixed in CUDA source code 4410. In at least one embodiment, each of global functions 4412 is executable on a device and callable from a host. In at least one embodiment, one or more of global functions 4412 may therefore act as entry points to a device. In at least one embodiment, each of global functions 4412 is a kernel. In at least one embodiment and in a technique known as dynamic parallelism, one or more of global functions 4412 defines a kernel that is executable on a device and callable from such a device. In at least one embodiment, a kernel is executed N (where N is any positive integer) times in parallel by N different threads on a device during execution.

In at least one embodiment, each of device functions 4414 is executed on a device and callable from such a device only. In at least one embodiment, each of host functions 4416 is executed on a host and callable from such a host only. In at least one embodiment, each of host/device functions 4416 defines both a host version of a function that is executable on a host and callable from such a host only and a device version of the function that is executable on a device and callable from such a device only.

In at least one embodiment, CUDA source code 4410 may also include, without limitation, any number of calls to any number of functions that are defined via a CUDA runtime API 4402. In at least one embodiment, CUDA runtime API 4402 may include, without limitation, any number of functions that execute on a host to allocate and deallocate device memory, transfer data between host memory and device memory, manage systems with multiple devices, etc. In at least one embodiment, CUDA source code 4410 may also include any number of calls to any number of functions that are specified in any number of other CUDA APIs. In at least one embodiment, a CUDA API may be any API that is designed for use by CUDA code. In at least one embodiment, CUDA APIs include, without limitation, CUDA runtime API 4402, a CUDA driver API, APIs for any number of CUDA libraries, etc. In at least one embodiment and relative to CUDA runtime API 4402, a CUDA driver API is a lower-level API but provides finer-grained control of a device. In at least one embodiment, examples of CUDA libraries include, without limitation, cuBLAS, cuFFT, cuRAND, cuDNN, etc.

In at least one embodiment, CUDA compiler 4450 compiles input CUDA code (e.g., CUDA source code 4410) to generate host executable code 4470(1) and CUDA device executable code 4484. In at least one embodiment, CUDA compiler 4450 is NVCC. In at least one embodiment, host executable code 4470(1) is a compiled version of host code included in input source code that is executable on CPU 4490. In at least one embodiment, CPU 4490 may be any processor that is optimized for sequential instruction processing.

In at least one embodiment, CUDA device executable code 4484 is a compiled version of device code included in input source code that is executable on CUDA-enabled GPU 4494. In at least one embodiment, CUDA device executable code 4484 includes, without limitation, binary code. In at least one embodiment, CUDA device executable code 4484 includes, without limitation, IR code, such as PTX code, that is further compiled at runtime into binary code for a specific target device (e.g., CUDA-enabled GPU 4494) by a device driver. In at least one embodiment, CUDA-enabled GPU 4494 may be any processor that is optimized for parallel instruction processing and that supports CUDA. In at least one embodiment, CUDA-enabled GPU 4494 is developed by NVIDIA Corporation of Santa Clara, CA.

In at least one embodiment, CUDA to HIP translation tool 4420 is configured to translate CUDA source code 4410 to functionally similar HIP source code 4430. In a least one embodiment, HIP source code 4430 is a collection of human-readable code in a HIP programming language. In at least one embodiment, HIP code is human-readable code in a HIP programming language. In at least one embodiment, a HIP programming language is an extension of the C++ programming language that includes, without limitation, functionally similar versions of CUDA mechanisms to define device code and distinguish between device code and host code. In at least one embodiment, a HIP programming language may include a subset of functionality of a CUDA programming language. In at least one embodiment, for example, a HIP programming language includes, without limitation, mechanism(s) to define global functions 4412, but such a HIP programming language may lack support for dynamic parallelism and therefore global functions 4412 defined in HIP code may be callable from a host only.

In at least one embodiment, HIP source code 4430 includes, without limitation, any number (including zero) of global functions 4412, any number (including zero) of device functions 4414, any number (including zero) of host functions 4416, and any number (including zero) of host/device functions 4418. In at least one embodiment, HIP source code 4430 may also include any number of calls to any number of functions that are specified in a HIP runtime API 4432. In at least one embodiment, HIP runtime API 4432 includes, without limitation, functionally similar versions of a subset of functions included in CUDA runtime API 4402. In at least one embodiment, HIP source code 4430 may also include any number of calls to any number of functions that are specified in any number of other HIP APIs. In at least one embodiment, a HIP API may be any API that is designed for use by HIP code and/or ROCm. In at least one embodiment, HIP APIs include, without limitation, HIP runtime API 4432, a HIP driver API, APIs for any number of HIP libraries, APIs for any number of ROCm libraries, etc.

In at least one embodiment, CUDA to HIP translation tool 4420 converts each kernel call in CUDA code from a CUDA syntax to a HIP syntax and converts any number of other CUDA calls in CUDA code to any number of other functionally similar HIP calls. In at least one embodiment, a CUDA call is a call to a function specified in a CUDA API, and a HIP call is a call to a function specified in a HIP API. In at least one embodiment, CUDA to HIP translation tool 4420 converts any number of calls to functions specified in CUDA runtime API 4402 to any number of calls to functions specified in HIP runtime API 4432.

In at least one embodiment, CUDA to HIP translation tool 4420 is a tool known as hipify-perl that executes a text-based translation process. In at least one embodiment, CUDA to HIP translation tool 4420 is a tool known as hipify-clang that, relative to hipify-perl, executes a more complex and more robust translation process that involves parsing CUDA code using clang (a compiler front-end) and then translating resulting symbols. In at least one embodiment, properly converting CUDA code to HIP code may require modifications (e.g., manual edits) in addition to those performed by CUDA to HIP translation tool 4420.

In at least one embodiment, HIP compiler driver 4440 is a front end that determines a target device 4446 and then configures a compiler that is compatible with target device 4446 to compile HIP source code 4430. In at least one embodiment, target device 4446 is a processor that is optimized for parallel instruction processing. In at least one embodiment, HIP compiler driver 4440 may determine target device 4446 in any technically feasible fashion.

In at least one embodiment, if target device 4446 is compatible with CUDA (e.g., CUDA-enabled GPU 4494), then HIP compiler driver 4440 generates a HIP/NVCC compilation command 4442. In at least one embodiment and as described in greater detail in conjunction with FIG. 44B, HIP/NVCC compilation command 4442 configures CUDA compiler 4450 to compile HIP source code 4430 using, without limitation, a HIP to CUDA translation header and a CUDA runtime library. In at least one embodiment and in response to HIP/NVCC compilation command 4442, CUDA compiler 4450 generates host executable code 4470(1) and CUDA device executable code 4484.

In at least one embodiment, if target device 4446 is not compatible with CUDA, then HIP compiler driver 4440 generates a HIP/HCC compilation command 4444. In at least one embodiment and as described in greater detail in conjunction with FIG. 44C, HIP/HCC compilation command 4444 configures HCC 4460 to compile HIP source code 4430 using, without limitation, an HCC header and a HIP/HCC runtime library. In at least one embodiment and in response to HIP/HCC compilation command 4444, HCC 4460 generates host executable code 4470(2) and HCC device executable code 4482. In at least one embodiment, HCC device executable code 4482 is a compiled version of device code included in HIP source code 4430 that is executable on GPU 4492. In at least one embodiment, GPU 4492 may be any processor that is optimized for parallel instruction processing, is not compatible with CUDA, and is compatible with HCC. In at least one embodiment, GPU 4492 is developed by AMD Corporation of Santa Clara, CA. In at least one embodiment GPU, 4492 is a non-CUDA-enabled GPU 4492.

For explanatory purposes only, three different flows that may be implemented in at least one embodiment to compile CUDA source code 4410 for execution on CPU 4490 and different devices are depicted in FIG. 44A. In at least one embodiment, a direct CUDA flow compiles CUDA source code 4410 for execution on CPU 4490 and CUDA-enabled GPU 4494 without translating CUDA source code 4410 to HIP source code 4430. In at least one embodiment, an indirect CUDA flow translates CUDA source code 4410 to HIP source code 4430 and then compiles HIP source code 4430 for execution on CPU 4490 and CUDA-enabled GPU 4494. In at least one embodiment, a CUDA/HCC flow translates CUDA source code 4410 to HIP source code 4430 and then compiles HIP source code 4430 for execution on CPU 4490 and GPU 4492.

A direct CUDA flow that may be implemented in at least one embodiment is depicted via dashed lines and a series of bubbles annotated A1-A3. In at least one embodiment and as depicted with bubble annotated A1, CUDA compiler 4450 receives CUDA source code 4410 and a CUDA compile command 4448 that configures CUDA compiler 4450 to compile CUDA source code 4410. In at least one embodiment, CUDA source code 4410 used in a direct CUDA flow is written in a CUDA programming language that is based on a programming language other than C++ (e.g., C, Fortran, Python, Java, etc.). In at least one embodiment and in response to CUDA compile command 4448, CUDA compiler 4450 generates host executable code 4470(1) and CUDA device executable code 4484 (depicted with bubble annotated A2). In at least one embodiment and as depicted with bubble annotated A3, host executable code 4470(1) and CUDA device executable code 4484 may be executed on, respectively, CPU 4490 and CUDA-enabled GPU 4494. In at least one embodiment, CUDA device executable code 4484 includes, without limitation, binary code. In at least one embodiment, CUDA device executable code 4484 includes, without limitation, PTX code and is further compiled into binary code for a specific target device at runtime.

An indirect CUDA flow that may be implemented in at least one embodiment is depicted via dotted lines and a series of bubbles annotated B1-B6. In at least one embodiment and as depicted with bubble annotated B1, CUDA to HIP translation tool 4420 receives CUDA source code 4410. In at least one embodiment and as depicted with bubble annotated B2, CUDA to HIP translation tool 4420 translates CUDA source code 4410 to HIP source code 4430. In at least one embodiment and as depicted with bubble annotated B3, HIP compiler driver 4440 receives HIP source code 4430 and determines that target device 4446 is CUDA-enabled.

In at least one embodiment and as depicted with bubble annotated B4, HIP compiler driver 4440 generates HIP/NVCC compilation command 4442 and transmits both HIP/NVCC compilation command 4442 and HIP source code 4430 to CUDA compiler 4450. In at least one embodiment and as described in greater detail in conjunction with FIG. 44B, HIP/NVCC compilation command 4442 configures CUDA compiler 4450 to compile HIP source code 4430 using, without limitation, a HIP to CUDA translation header and a CUDA runtime library. In at least one embodiment and in response to HIP/NVCC compilation command 4442, CUDA compiler 4450 generates host executable code 4470 (1) and CUDA device executable code 4484 (depicted with bubble annotated B5). In at least one embodiment and as depicted with bubble annotated B6, host executable code 4470(1) and CUDA device executable code 4484 may be executed on, respectively, CPU 4490 and CUDA-enabled GPU 4494. In at least one embodiment, CUDA device executable code 4484 includes, without limitation, binary code. In at least one embodiment, CUDA device executable code 4484 includes, without limitation, PTX code and is further compiled into binary code for a specific target device at runtime.

A CUDA/HCC flow that may be implemented in at least one embodiment is depicted via solid lines and a series of bubbles annotated C1-C6. In at least one embodiment and as depicted with bubble annotated C1, CUDA to HIP translation tool 4420 receives CUDA source code 4410. In at least one embodiment and as depicted with bubble annotated C2, CUDA to HIP translation tool 4420 translates CUDA source code 4410 to HIP source code 4430. In at least one embodiment and as depicted with bubble annotated C3, HIP compiler driver 4440 receives HIP source code 4430 and determines that target device 4446 is not CUDA-enabled.

In at least one embodiment, HIP compiler driver 4440 generates HIP/HCC compilation command 4444 and transmits both HIP/HCC compilation command 4444 and HIP source code 4430 to HCC 4460 (depicted with bubble annotated C4). In at least one embodiment and as described in greater detail in conjunction with FIG. 44C, HIP/HCC compilation command 4444 configures HCC 4460 to compile HIP source code 4430 using, without limitation, an HCC header and a HIP/HCC runtime library. In at least one embodiment and in response to HIP/HCC compilation command 4444, HCC 4460 generates host executable code 4470(2) and HCC device executable code 4482 (depicted with bubble annotated C5). In at least one embodiment and as depicted with bubble annotated C6, host executable code 4470(2) and HCC device executable code 4482 may be executed on, respectively, CPU 4490 and GPU 4492.

In at least one embodiment, after CUDA source code 4410 is translated to HIP source code 4430, HIP compiler driver 4440 may subsequently be used to generate executable code for either CUDA-enabled GPU 4494 or GPU 4492 without re-executing CUDA to HIP translation tool 4420. In at least one embodiment, CUDA to HIP translation tool 4420 translates CUDA source code 4410 to HIP source code 4430 that is then stored in memory. In at least one embodiment, HIP compiler driver 4440 then configures HCC 4460 to generate host executable code 4470(2) and HCC device executable code 4482 based on HIP source code 4430. In at least one embodiment, HIP compiler driver 4440 subsequently configures CUDA compiler 4450 to generate host executable code 4470(1) and CUDA device executable code 4484 based on stored HIP source code 4430.

Figure 44B:
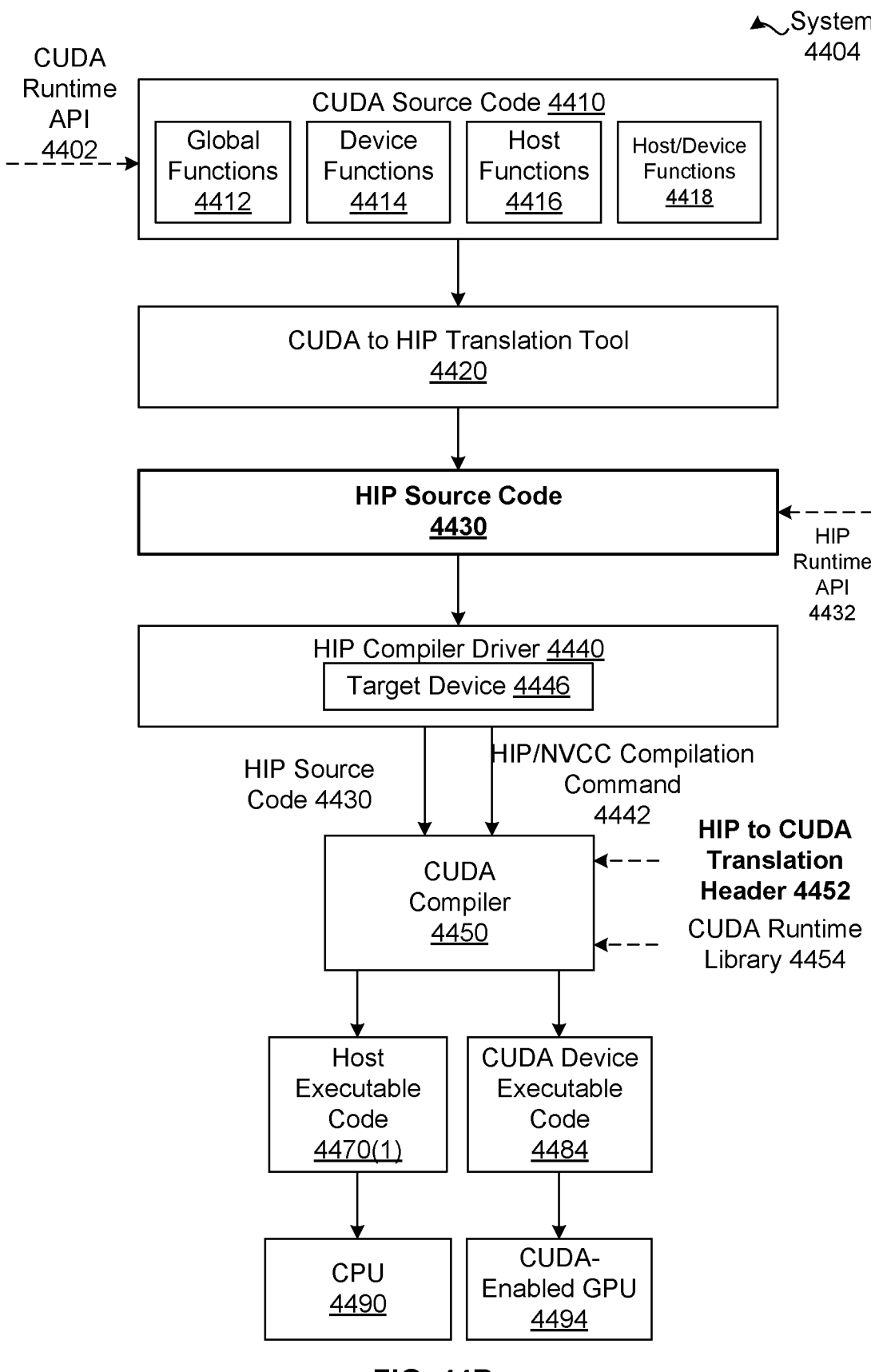
FIG. 44B illustrates a system configured to compile and execute CUDA source code of FIG. 44A using a CPU and a CUDA-enabled GPU, in accordance with at least one embodiment.

FIG. 44B illustrates a system 4404 configured to compile and execute CUDA source code 4410 of FIG. 44A using CPU 4490 and CUDA-enabled GPU 4494, in accordance with at least one embodiment. In at least one embodiment, system 4404 includes, without limitation, CUDA source code 4410, CUDA to HIP translation tool 4420, HIP source code 4430, HIP compiler driver 4440, CUDA compiler 4450, host executable code 4470(1), CUDA device executable code 4484, CPU 4490, and CUDA-enabled GPU 4494.

In at least one embodiment and as described previously herein in conjunction with FIG. 44A, CUDA source code 4410 includes, without limitation, any number (including zero) of global functions 4412, any number (including zero) of device functions 4414, any number (including zero) of host functions 4416, and any number (including zero) of host/device functions 4418. In at least one embodiment, CUDA source code 4410 also includes, without limitation, any number of calls to any number of functions that are specified in any number of CUDA APIs.

In at least one embodiment, CUDA to HIP translation tool 4420 translates CUDA source code 4410 to HIP source code 4430. In at least one embodiment, CUDA to HIP translation tool 4420 converts each kernel call in CUDA source code 4410 from a CUDA syntax to a HIP syntax and converts any number of other CUDA calls in CUDA source code 4410 to any number of other functionally similar HIP calls.

In at least one embodiment, HIP compiler driver 4440 determines that target device 4446 is CUDA-enabled and generates HIP/NVCC compilation command 4442. In at least one embodiment, HIP compiler driver 4440 then configures CUDA compiler 4450 via HIP/NVCC compilation command 4442 to compile HIP source code 4430. In at least one embodiment, HIP compiler driver 4440 provides access to a HIP to CUDA translation header 4452 as part of configuring CUDA compiler 4450. In at least one embodiment, HIP to CUDA translation header 4452 translates any number of mechanisms (e.g., functions) specified in any number of HIP APIs to any number of mechanisms specified in any number of CUDA APIs. In at least one embodiment, CUDA compiler 4450 uses HIP to CUDA translation header 4452 in conjunction with a CUDA runtime library 4454 corresponding to CUDA runtime API 4402 to generate host executable code 4470(1) and CUDA device executable code 4484. In at least one embodiment, host executable code 4470(1) and CUDA device executable code 4484 may then be executed on, respectively, CPU 4490 and CUDA-enabled GPU 4494. In at least one embodiment, CUDA device executable code 4484 includes, without limitation, binary code. In at least one embodiment, CUDA device executable code 4484 includes, without limitation, PTX code and is further compiled into binary code for a specific target device at runtime.

Figure 44C:
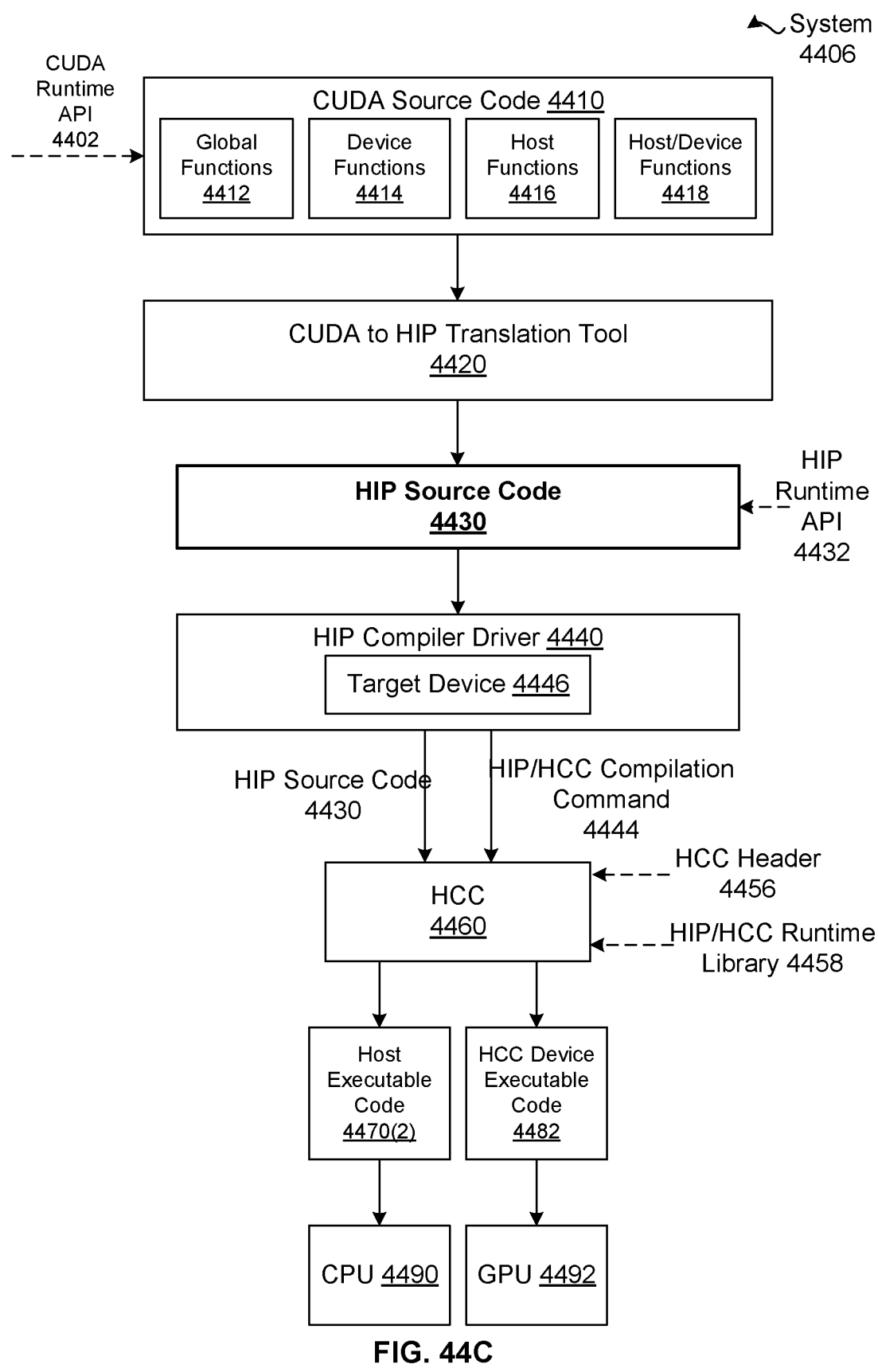
FIG. 44C illustrates a system configured to compile and execute CUDA source code of FIG. 44A using a CPU and a non-CUDA-enabled GPU, in accordance with at least one embodiment.

FIG. 44C illustrates a system 4406 configured to compile and execute CUDA source code 4410 of FIG. 44A using CPU 4490 and non-CUDA-enabled GPU 4492, in accordance with at least one embodiment. In at least one embodiment, system 4406 includes, without limitation, CUDA source code 4410, CUDA to HIP translation tool 4420, HIP source code 4430, HIP compiler driver 4440, HCC 4460, host executable code 4470(2), HCC device executable code 4482, CPU 4490, and GPU 4492.

In at least one embodiment and as described previously herein in conjunction with FIG. 44A, CUDA source code 4410 includes, without limitation, any number (including zero) of global functions 4412, any number (including zero) of device functions 4414, any number (including zero) of host functions 4416, and any number (including zero) of host/device functions 4418. In at least one embodiment, CUDA source code 4410 also includes, without limitation, any number of calls to any number of functions that are specified in any number of CUDA APIs.

In at least one embodiment, CUDA to HIP translation tool 4420 translates CUDA source code 4410 to HIP source code 4430. In at least one embodiment, CUDA to HIP translation tool 4420 converts each kernel call in CUDA source code 4410 from a CUDA syntax to a HIP syntax and converts any number of other CUDA calls in source code 4410 to any number of other functionally similar HIP calls.

In at least one embodiment, HIP compiler driver 4440 subsequently determines that target device 4446 is not CUDA-enabled and generates HIP/HCC compilation command 4444. In at least one embodiment, HIP compiler driver 4440 then configures HCC 4460 to execute HIP/HCC compilation command 4444 to compile HIP source code 4430. In at least one embodiment, HIP/HCC compilation command 4444 configures HCC 4460 to use, without limitation, a HIP/HCC runtime library 4458 and an HCC header 4456 to generate host executable code 4470(2) and HCC device executable code 4482. In at least one embodiment, HIP/HCC runtime library 4458 corresponds to HIP runtime API 4432. In at least one embodiment, HCC header 4456 includes, without limitation, any number and type of interoperability mechanisms for HIP and HCC. In at least one embodiment, host executable code 4470(2) and HCC device executable code 4482 may be executed on, respectively, CPU 4490 and GPU 4492.

FIG. 45 illustrates an exemplary kernel translated by CUDA-to-HIP translation tool 4420 of FIG. 44C, in accordance with at least one embodiment. In at least one embodiment, CUDA source code 4410 partitions an overall problem that a given kernel is designed to solve into relatively coarse sub-problems that can independently be solved using thread blocks. In at least one embodiment, each thread block includes, without limitation, any number of threads. In at least one embodiment, each sub-problem is partitioned into relatively fine pieces that can be solved cooperatively in parallel by threads within a thread block. In at least one embodiment, threads within a thread block can cooperate by sharing data through shared memory and by synchronizing execution to coordinate memory accesses.

In at least one embodiment, CUDA source code 4410 organizes thread blocks associated with a given kernel into a one-dimensional, a two-dimensional, or a three-dimensional grid of thread blocks. In at least one embodiment, each thread block includes, without limitation, any number of threads, and a grid includes, without limitation, any number of thread blocks.

In at least one embodiment, a kernel is a function in device code that is defined using a "global" declaration specifier. In at least one embodiment, the dimension of a grid that executes a kernel for a given kernel call and associated streams are specified using a CUDA kernel launch syntax 4510. In at least one embodiment, CUDA kernel launch syntax 4510 is specified as "KernelName<<<GridSize, BlockSize, SharedMemorySize, Stream>>>(KernelArguments);". In at least one embodiment, an execution configuration syntax is a "<<< . . . >>>" construct that is inserted between a kernel name ("KernelName") and a parenthesized list of kernel arguments ("KernelArguments"). In at least one embodiment, CUDA kernel launch syntax 4510 includes, without limitation, a CUDA launch function syntax instead of an execution configuration syntax.

In at least one embodiment, "GridSize" is of a type dim3 and specifies the dimension and size of a grid. In at least one embodiment, type dim3 is a CUDA-defined structure that includes, without limitation, unsigned integers x, y, and z. In at least one embodiment, if z is not specified, then z defaults to one. In at least one embodiment, if y is not specified, then y defaults to one. In at least one embodiment, the number of thread blocks in a grid is equal to the product of GridSize.x, GridSize.y, and GridSize.z. In at least one embodiment, "BlockSize" is of type dim3 and specifies the dimension and size of each thread block. In at least one embodiment, the number of threads per thread block is equal to the product of BlockSize.x, BlockSize.y, and BlockSize.z. In at least one embodiment, each thread that executes a kernel is given a unique thread ID that is accessible within the kernel through a built-in variable (e.g., "threadIdx").

In at least one embodiment and with respect to CUDA kernel launch syntax 4510, "SharedMemorySize" is an optional argument that specifies a number of bytes in a shared memory that is dynamically allocated per thread block for a given kernel call in addition to statically allocated memory. In at least one embodiment and with respect to CUDA kernel launch syntax 4510, SharedMemorySize defaults to zero. In at least one embodiment and with respect to CUDA kernel launch syntax 4510, "Stream" is an optional argument that specifies an associated stream and defaults to zero to specify a default stream. In at least one embodiment, a stream is a sequence of commands (possibly issued by different host threads) that execute in order. In at least one embodiment, different streams may execute commands out of order with respect to one another or concurrently.

In at least one embodiment, CUDA source code 4410 includes, without limitation, a kernel definition for an exemplary kernel "MatAdd" and a main function. In at least one embodiment, main function is host code that executes on a host and includes, without limitation, a kernel call that causes kernel MatAdd to execute on a device. In at least one embodiment and as shown, kernel MatAdd adds two matrices A and B of size N×N, where N is a positive integer, and stores the result in a matrix C. In at least one embodiment, main function defines a threadsPerBlock variable as 16 by 16 and a numBlocks variable as N/16 by N/16. In at least one embodiment, main function then specifies kernel call "MatAdd<<<numBlocks, threadsPerBlock>>>(A, B, C);". In at least one embodiment and as per CUDA kernel launch syntax 4510, kernel MatAdd is executed using a grid of thread blocks having a dimension N/16 by N/16, where each thread block has a dimension of 16 by 16. In at least one embodiment, each thread block includes 256 threads, a grid is created with enough blocks to have one thread per matrix element, and each thread in such a grid executes kernel MatAdd to perform one pair-wise addition.

In at least one embodiment, while translating CUDA source code 4410 to HIP source code 4430, CUDA to HIP translation tool 4420 translates each kernel call in CUDA source code 4410 from CUDA kernel launch syntax 4510 to a HIP kernel launch syntax 4520 and converts any number of other CUDA calls in source code 4410 to any number of other functionally similar HIP calls. In at least one embodiment, HIP kernel launch syntax 4520 is specified as "hipLaunchKernelGGL(KernelName,GridSize, BlockSize, SharedMemorySize, Stream, KernelArguments);". In at least one embodiment, each of KernelName, GridSize, BlockSize, ShareMemorySize, Stream, and KernelArguments has the same meaning in HIP kernel launch syntax 4520 as in CUDA kernel launch syntax 4510 (described previously herein). In at least one embodiment, arguments SharedMemorySize and Stream are required in HIP kernel launch syntax 4520 and are optional in CUDA kernel launch syntax 4510.

In at least one embodiment, a portion of HIP source code 4430 depicted in FIG. 45 is identical to a portion of CUDA source code 4410 depicted in FIG. 45 except for a kernel call that causes kernel MatAdd to execute on a device. In at least one embodiment, kernel MatAdd is defined in HIP source code 4430 with the same "_global_" declaration specifier with which kernel MatAdd is defined in CUDA source code 4410. In at least one embodiment, a kernel call in HIP source code 4430 is "hipLaunchKernelGGL(MatAdd, numBlocks, threadsPerBlock, 0, 0, A, B, C);", while a corresponding kernel call in CUDA source code 4410 is "MatAdd<<<numBlocks, threadsPerBlock>>>(A, B, C);".

Figure 46:
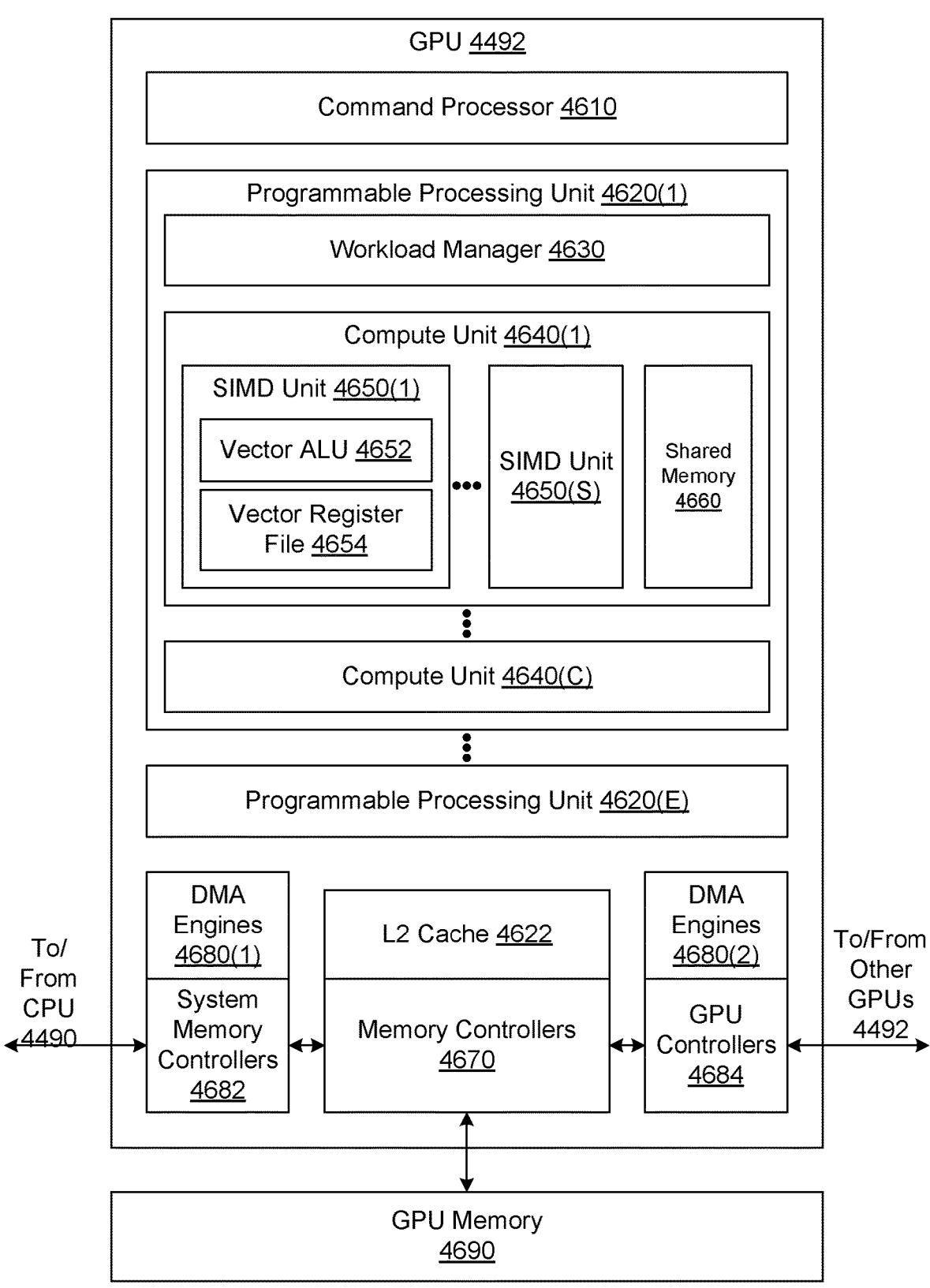
FIG. 46 illustrates non-CUDA-enabled GPU of FIG. 44C in greater detail, in accordance with at least one embodiment.

FIG. 46 illustrates non-CUDA-enabled GPU 4492 of FIG. 44C in greater detail, in accordance with at least one embodiment. In at least one embodiment, GPU 4492 is developed by AMD corporation of Santa Clara. In at least one embodiment, GPU 4492 can be configured to perform compute operations in a highly-parallel fashion. In at least one embodiment, GPU 4492 is configured to execute graphics pipeline operations such as draw commands, pixel operations, geometric computations, and other operations associated with rendering an image to a display. In at least one embodiment, GPU 4492 is configured to execute operations unrelated to graphics. In at least one embodiment, GPU 4492 is configured to execute both operations related to graphics and operations unrelated to graphics. In at least one embodiment, GPU 4492 can be configured to execute device code included in HIP source code 4430.

In at least one embodiment, GPU 4492 includes, without limitation, any number of programmable processing units 4620, a command processor 4610, an L2 cache 4622, memory controllers 4670, DMA engines 4680(1), system memory controllers 4682, DMA engines 4680(2), and GPU controllers 4684. In at least one embodiment, each programmable processing unit 4620 includes, without limitation, a workload manager 4630 and any number of compute units 4640. In at least one embodiment, command processor 4610 reads commands from one or more command queues (not shown) and distributes commands to workload managers 4630. In at least one embodiment, for each programmable processing unit 4620, associated workload manager 4630 distributes work to compute units 4640 included in programmable processing unit 4620. In at least one embodiment, each compute unit 4640 may execute any number of thread blocks, but each thread block executes on a single compute unit 4640. In at least one embodiment, a workgroup is a thread block.

In at least one embodiment, each compute unit 4640 includes, without limitation, any number of SIMD units 4650 and a shared memory 4660. In at least one embodiment, each SIMD unit 4650 implements a SIMD architecture and is configured to perform operations in parallel. In at least one embodiment, each SIMD unit 4650 includes, without limitation, a vector ALU 4652 and a vector register file 4654. In at least one embodiment, each SIMD unit 4650 executes a different warp. In at least one embodiment, a warp is a group of threads (e.g., 16 threads), where each thread in the warp belongs to a single thread block and is configured to process a different set of data based on a single set of instructions. In at least one embodiment, predication can be used to disable one or more threads in a warp. In at least one embodiment, a lane is a thread. In at least one embodiment, a work item is a thread. In at least one embodiment, a wavefront is a warp. In at least one embodiment, different wavefronts in a thread block may synchronize together and communicate via shared memory 4660.

In at least one embodiment, programmable processing units 4620 are referred to as "shader engines." In at least one embodiment, each programmable processing unit 4620 includes, without limitation, any amount of dedicated graphics hardware in addition to compute units 4640. In at least one embodiment, each programmable processing unit 4620 includes, without limitation, any number (including zero) of geometry processors, any number (including zero) of rasterizers, any number (including zero) of render back ends, workload manager 4630, and any number of compute units 4640.

In at least one embodiment, compute units 4640 share L2 cache 4622. In at least one embodiment, L2 cache 4622 is partitioned. In at least one embodiment, a GPU memory 4690 is accessible by all compute units 4640 in GPU 4492. In at least one embodiment, memory controllers 4670 and system memory controllers 4682 facilitate data transfers between GPU 4492 and a host, and DMA engines 4680(1) enable asynchronous memory transfers between GPU 4492 and such a host. In at least one embodiment, memory controllers 4670 and GPU controllers 4684 facilitate data transfers between GPU 4492 and other GPUs 4492, and DMA engines 4680(2) enable asynchronous memory transfers between GPU 4492 and other GPUs 4492.

In at least one embodiment, GPU 4492 includes, without limitation, any amount and type of system interconnect that facilitates data and control transmissions across any number and type of directly or indirectly linked components that may be internal or external to GPU 4492. In at least one embodiment, GPU 4492 includes, without limitation, any number and type of I/O interfaces (e.g., PCIe) that are coupled to any number and type of peripheral devices. In at least one embodiment, GPU 4492 may include, without limitation, any number (including zero) of display engines and any number (including zero) of multimedia engines. In at least one embodiment, GPU 4492 implements a memory subsystem that includes, without limitation, any amount and type of memory controllers (e.g., memory controllers 4670 and system memory controllers 4682) and memory devices (e.g., shared memories 4660) that may be dedicated to one component or shared among multiple components. In at least one embodiment, GPU 4492 implements a cache subsystem that includes, without limitation, one or more cache memories (e.g., L2 cache 4622) that may each be private to or shared between any number of components (e.g., SIMD units 4650, compute units 4640, and programmable processing units 4620).

Figure 47:
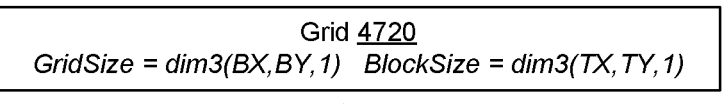
FIG. 47 illustrates how threads of an exemplary CUDA grid are mapped to different compute units of FIG. 46, in accordance with at least one embodiment.

FIG. 47 illustrates how threads of an exemplary CUDA grid 4720 are mapped to different compute units 4640 of FIG. 46, in accordance with at least one embodiment. In at least one embodiment and for explanatory purposes only, grid 4720 has a GridSize of BX by BY by 1 and a BlockSize of TX by TY by 1. In at least one embodiment, grid 4720 therefore includes, without limitation, (BX*BY) thread blocks 4730 and each thread block 4730 includes, without limitation, (TX*TY) threads 4740. Threads 4740 are depicted in FIG. 47 as squiggly arrows.

In at least one embodiment, grid 4720 is mapped to programmable processing unit 4620(1) that includes, without limitation, compute units 4640(1)-4640(C). In at least one embodiment and as shown, (BJ*BY) thread blocks 4730 are mapped to compute unit 4640(1), and the remaining thread blocks 4730 are mapped to compute unit 4640(2). In at least one embodiment, each thread block 4730 may include, without limitation, any number of warps, and each warp is mapped to a different SIMD unit 4650 of FIG. 46.

In at least one embodiment, warps in a given thread block 4730 may synchronize together and communicate through shared memory 4660 included in associated compute unit 4640. For example and in at least one embodiment, warps in thread block 4730(BJ,1) can synchronize together and communicate through shared memory 4660(1). For example and in at least one embodiment, warps in thread block 4730(BJ+1,1) can synchronize together and communicate through shared memory 4660(2).

Figure 48:
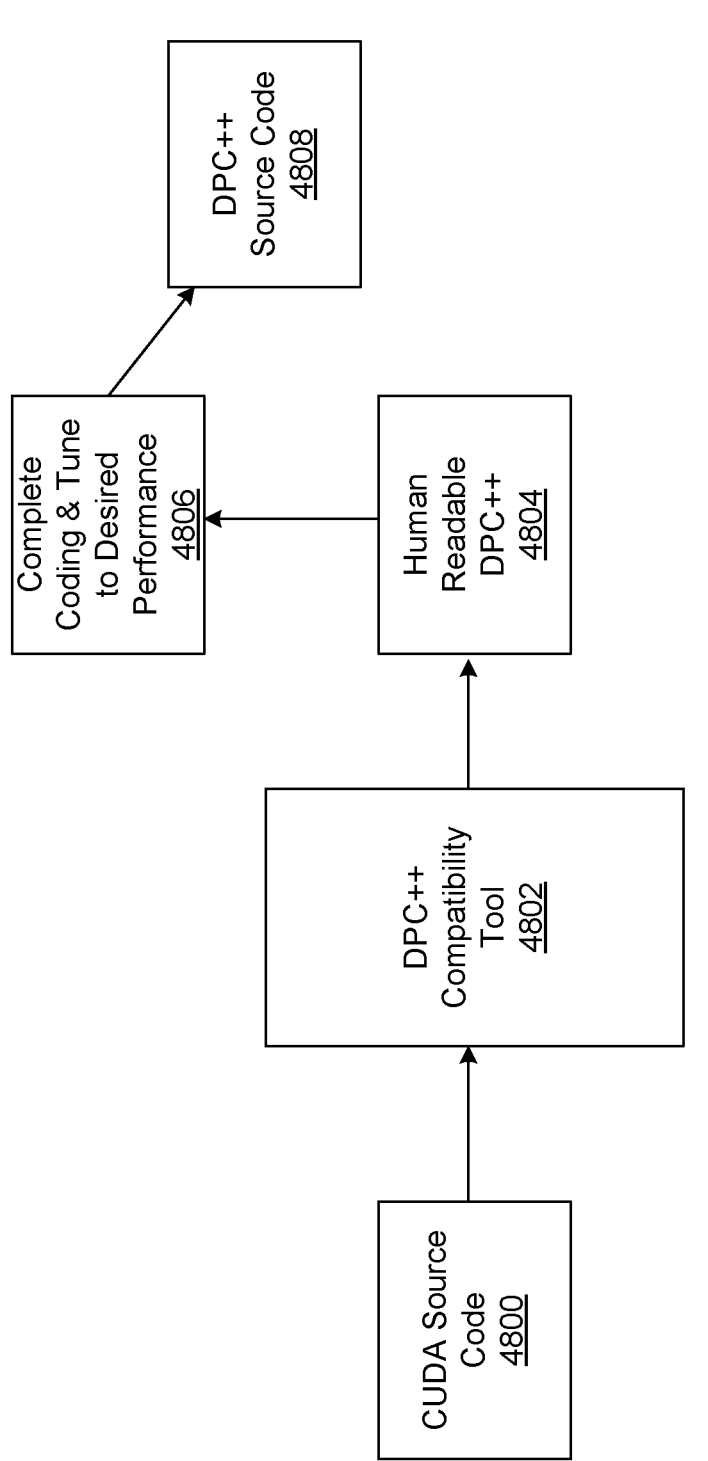
FIG. 48 illustrates how to migrate existing CUDA code to Data Parallel C++ code, in accordance with at least one embodiment.

FIG. 48 illustrates how to migrate existing CUDA code to Data Parallel C++ code, in accordance with at least one embodiment. Data Parallel C++ (DPC++) may refer to an open, standards-based alternative to single-architecture proprietary languages that allows developers to reuse code across hardware targets (CPUs and accelerators such as GPUs and FPGAs) and also perform custom tuning for a specific accelerator. DPC++ use similar and/or identical C and C++ constructs in accordance with ISO C++ which developers may be familiar with. DPC++ incorporates standard SYCL from The Khronos Group to support data parallelism and heterogeneous programming. SYCL refers to a cross-platform abstraction layer that builds on underlying concepts, portability and efficiency of OpenCL that enables code for heterogeneous processors to be written in a "single-source" style using standard C++. SYCL may enable single source development where C++ template functions can contain both host and device code to construct complex algorithms that use OpenCL acceleration, and then re-use them throughout their source code on different types of data.

In at least one embodiment, a DPC++ compiler is used to compile DPC++ source code which can be deployed across diverse hardware targets. In at least one embodiment, a DPC++ compiler is used to generate DPC++ applications that can be deployed across diverse hardware targets and a DPC++ compatibility tool can be used to migrate CUDA applications to a multiplatform program in DPC++. In at least one embodiment, a DPC++ base tool kit includes a DPC++ compiler to deploy applications across diverse hardware targets; a DPC++ library to increase productivity and performance across CPUs, GPUs, and FPGAs; a DPC++ compatibility tool to migrate CUDA applications to multiplatform applications; and any suitable combination thereof.

In at least one embodiment, a DPC++ programming model is utilized to simply one or more aspects relating to programming CPUs and accelerators by using modern C++ features to express parallelism with a programming language called Data Parallel C++. DPC++ programming language may be utilized to code reuse for hosts (e.g., a CPU) and accelerators (e.g., a GPU or FPGA) using a single source language, with execution and memory dependencies being clearly communicated. Mappings within DPC++ code can be used to transition an application to run on a hardware or set of hardware devices that best accelerates a workload. A host may be available to simplify development and debugging of device code, even on platforms that do not have an accelerator available.

In at least one embodiment, CUDA source code 4800 is provided as an input to a DPC++ compatibility tool 4802 to generate human readable DPC++ 4804. In at least one embodiment, human readable DPC++ 4804 includes inline comments generated by DPC++ compatibility tool 4802 that guides a developer on how and/or where to modify DPC++ code to complete coding and tuning to desired performance 4806, thereby generating DPC++ source code 4808.

In at least one embodiment, CUDA source code 4800 is or includes a collection of human-readable source code in a CUDA programming language. In at least one embodiment, CUDA source code 4800 is human-readable source code in a CUDA programming language. In at least one embodiment, a CUDA programming language is an extension of the C++ programming language that includes, without limitation, mechanisms to define device code and distinguish between device code and host code. In at least one embodiment, device code is source code that, after compilation, is executable on a device (e.g., GPU or FPGA) and may include or more parallelizable workflows that can be executed on one or more processor cores of a device. In at least one embodiment, a device may be a processor that is optimized for parallel instruction processing, such as CUDA-enabled GPU, GPU, or another GPGPU, etc. In at least one embodiment, host code is source code that, after compilation, is executable on a host. In least one embodiment, some or all of host code and device code can be executed in parallel across a CPU and GPU/FPGA. In at least one embodiment, a host is a processor that is optimized for sequential instruction processing, such as CPU. CUDA source code 4800 described in connection with FIG. 48 may be in accordance with those discussed elsewhere in this document.

In at least one embodiment, DPC++ compatibility tool 4802 refers to an executable tool, program, application, or any other suitable type of tool that is used to facilitate migration of CUDA source code 4800 to DPC++ source code 4808. In at least one embodiment, DPC++ compatibility tool 4802 is a command-line-based code migration tool available as part of a DPC++ tool kit that is used to port existing CUDA sources to DPC++. In at least one embodiment, DPC++ compatibility tool 4802 converts some or all source code of a CUDA application from CUDA to DPC++ and generates a resulting file that is written at least partially in DPC++, referred to as human readable DPC++ 4804. In at least one embodiment, human readable DPC++ 4804 includes comments that are generated by DPC++ compatibility tool 4802 to indicate where user intervention may be necessary. In at least one embodiment, user intervention is necessary when CUDA source code 4800 calls a CUDA API that has no analogous DPC++ API; other examples where user intervention is required are discussed later in greater detail.

In at least one embodiment, a workflow for migrating CUDA source code 4800 (e.g., application or portion thereof) includes creating one or more compilation database files; migrating CUDA to DPC++ using a DPC++ compatibility tool 4802; completing migration and verifying correctness, thereby generating DPC++ source code 4808; and compiling DPC++ source code 4808 with a DPC++ compiler to generate a DPC++ application. In at least one embodiment, a compatibility tool provides a utility that intercepts commands used when Makefile executes and stores them in a compilation database file. In at least one embodiment, a file is stored in JSON format. In at least one embodiment, an intercept-built command converts Makefile command to a DPC compatibility command.

In at least one embodiment, intercept-build is a utility script that intercepts a build process to capture compilation options, macro defs, and include paths, and writes this data to a compilation database file. In at least one embodiment, a compilation database file is a JSON file. In at least one embodiment, DPC++ compatibility tool 4802 parses a compilation database and applies options when migrating input sources. In at least one embodiment, use of intercept-build is optional, but highly recommended for Make or CMake based environments. In at least one embodiment, a migration database includes commands, directories, and files: command may include necessary compilation flags; directory may include paths to header files; file may include paths to CUDA files.

In at least one embodiment, DPC++ compatibility tool 4802 migrates CUDA code (e.g., applications) written in CUDA to DPC++ by generating DPC++ wherever possible. In at least one embodiment, DPC++ compatibility tool 4802 is available as part of a tool kit. In at least one embodiment, a DPC++ tool kit includes an intercept-build tool. In at least one embodiment, an intercept-built tool creates a compilation database that captures compilation commands to migrate CUDA files. In at least one embodiment, a compilation database generated by an intercept-built tool is used by DPC++ compatibility tool 4802 to migrate CUDA code to DPC++. In at least one embodiment, non-CUDA C++ code and files are migrated as is. In at least one embodiment, DPC++ compatibility tool 4802 generates human readable DPC++ 4804 which may be DPC++ code that, as generated by DPC++ compatibility tool 4802, cannot be compiled by DPC++ compiler and requires additional plumbing for verifying portions of code that were not migrated correctly, and may involve manual intervention, such as by a developer. In at least one embodiment, DPC++ compatibility tool 4802 provides hints or tools embedded in code to help developers manually migrate additional code that could not be migrated automatically. In at least one embodiment, migration is a one-time activity for a source file, project, or application.

In at least one embodiment, DPC++ compatibility tool 48002 is able to successfully migrate all portions of CUDA code to DPC++ and there may simply be an optional step for manually verifying and tuning performance of DPC++ source code that was generated. In at least one embodiment, DPC++ compatibility tool 4802 directly generates DPC++ source code 4808 which is compiled by a DPC++ compiler without requiring or utilizing human intervention to modify DPC++ code generated by DPC++ compatibility tool 4802. In at least one embodiment, DPC++ compatibility tool generates compile-able DPC++ code which can be optionally tuned by a developer for performance, readability, maintainability, other various considerations; or any combination thereof.

In at least one embodiment, one or more CUDA source files are migrated to DPC++ source files at least partially using DPC++ compatibility tool 4802. In at least one embodiment, CUDA source code includes one or more header files which may include CUDA header files. In at least one embodiment, a CUDA source file includes a <cuda.h> header file and a <stdio.h> header file which can be used to print text. In at least one embodiment, a portion of a vector addition kernel CUDA source file may be written as or related to:

```
#include <cuda.h>
#include <stdio.h>
#define VECTOR_SIZE 256
[ ] global__ void VectorAddKernel(float* A, float* B, float* C)
{
  A[threadIdx.x] = threadIdx.x + 1.0f;
  B[threadIdx.x] = threadIdx.x + 1.0f;
  C[threadIdx.x] = A[threadIdx.x] + B[threadIdx.x];
}
int main( )
{
  float *d_A, *d_B, *d_C;
  cudaMalloc(&d_A, VECTOR_SIZE*sizeof(float));
  cudaMalloc(&d_B, VECTOR_SIZE*sizeof(float));
  cudaMalloc(&d_C, VECTOR_SIZE*sizeof(float));
  VectorAddKernel <<<1, VECTOR_SIZE>>>(d_A, d_B, d_C);
  float Result[VECTOR_SIZE] = { };
  cudaMemcpy(Result, d_C, VECTOR_SIZE*sizeof(float),
cudaMemcpyDeviceToHost);
  cudaFree(d_A);
  cudaFree(d_B);
  cudaFree(d_C);
  for (int i=0; i<VECTOR_SIZE; i++ {
    if (i % 16 == 0) {
      printf("\n");
    }
    printf("%f ", Result[i]);
  }
  return 0;
}
```

In at least one embodiment and in connection with CUDA source file presented above, DPC++ compatibility tool 4802 parses a CUDA source code and replaces header files with appropriate DPC++ and SYCL header files. In at least one embodiment, DPC++ header files includes helper declarations. In CUDA, there is a concept of a thread ID and correspondingly, in DPC++ or SYCL, for each element there is a local identifier.

In at least one embodiment and in connection with CUDA source file presented above, there are two vectors A and B which are initialized and a vector addition result is put into vector C as part of VectorAddKernel( ). In at least one embodiment, DPC++ compatibility tool 4802 converts CUDA thread IDs used to index work elements to SYCL standard addressing for work elements via a local ID as part of migrating CUDA code to DPC++ code. In at least one embodiment, DPC++ code generated by DPC++ compatibility tool 4802 can be optimized—for example, by reducing dimensionality of an nd_item, thereby increasing memory and/or processor utilization.

In at least one embodiment and in connection with CUDA source file presented above, memory allocation is migrated. In at least one embodiment, cudaMalloco is migrated to a unified shared memory SYCL call malloc_deviceo to which a device and context is passed, relying on SYCL concepts such as platform, device, context, and queue. In at least one embodiment, a SYCL platform can have multiple devices (e.g., host and GPU devices); a device may have multiple queues to which jobs can be submitted; each device may have a context; and a context may have multiple devices and manage shared memory objects.

In at least one embodiment and in connection with CUDA source file presented above, a main( ) function invokes or calls VectorAddKernel( ) to add two vectors A and B together and store result in vector C. In at least one embodiment, CUDA code to invoke VectorAddKernel( ) is replaced by DPC++ code to submit a kernel to a command queue for execution. In at least one embodiment, a command group handler cgh passes data, synchronization, and computation that is submitted to the queue, parallel_for is called for a number of global elements and a number of work items in that work group where VectorAddKernel( ) is called.

In at least one embodiment and in connection with CUDA source file presented above, CUDA calls to copy device memory and then free memory for vectors A, B, and C are migrated to corresponding DPC++ calls. In at least one embodiment, C++ code (e.g., standard ISO C++ code for printing a vector of floating point variables) is migrated as is, without being modified by DPC++ compatibility tool 4802. In at least one embodiment, DPC++ compatibility tool 4802 modify CUDA APIs for memory setup and/or host calls to execute kernel on the acceleration device. In at least one embodiment and in connection with CUDA source file presented above, a corresponding human readable DPC++ 4804 (e.g., which can be compiled) is written as or related to:

```
#include <CL/sycl.hpp>
#include <dpct/dpct.hpp>
#define VECTOR_SIZE 256
void VectorAddKernel(float* A, float* B, float* C,
        sycl::nd_item<3> item_ct1)
{
  A[item_ct1.get_local_id(2)] = item_ct1.get_local_id(2) + 1.0f;
  B[item_ct1.get_local_id(2)] = item_ct1.get_local_id(2) + 1.0f;
  C[item_ct1.get_local_id(2)] =
      A[item_ct1.get_local_id(2)] + B[item_ct1.get_local_id(2)];
}
int main( )
{
  float *d_A, *d_B, *d_C;
  d_A = (float *)sycl::malloc_device(VECTOR_SIZE * sizeof(float),
    dpct::get_current_device( ),
    dpct::get_default_context( ));
  d_B = (float *)sycl::malloc_device(VECTOR_SIZE * sizeof(float),
    dpct::get_current_device( ),
    dpct::get_default_context( ));
```

```
  d_C = (float *)sycl::malloc_device(VECTOR_SIZE * sizeof(float),
    dpct::get_current_device( ),
    dpct::get_default_context( ));
  dpct::get_default_queue_wait( ).submit([&](sycl::handler &cgh) {
    cgh.parallel_for(
      sycl::nd_range<3>(sycl::range<3>(1, 1, 1) *
          sycl::range<3>(1, 1, VECTOR_SIZE) *
          sycl::range<3>(1, 1, VECTOR_SIZE)),
      [=](sycl::nd_items<3> item_ct1) {
        VectorAddKernel(d_A, d_B, d_C, item_ct1);
      });
  });
  float Result[VECTOR_SIZE] = { };
  dpct::get_default_queue_wait( )
    .memcpy(Result, d_C, VECTOR_SIZE * sizeof(float))
    .wait( );
  sycl::free(d_A, dpct::get_default_context( ));
  sycl::free(d_B, dpct::get_default_context( ));
  sycl::free(d_C, dpct::get_default_context( ));
  for (int i=0; i<VECTOR_SIZE; i++ {
    if (i % 16 == 0) {
      printf("\n");
    }
    printf("%f ", Result[i]);
  }
  return 0;
}
```

In at least one embodiment, human readable DPC++ 4804 refers to output generated by DPC++ compatibility tool 4802 and may be optimized in one manner or another. In at least one embodiment, human readable DPC++ 4804 generated by DPC++ compatibility tool 4802 can be manually edited by a developer after migration to make it more maintainable, performance, or other considerations. In at least one embodiment, DPC++ code generated by DPC++ compatibility tool 48002 such as DPC++ disclosed can be optimized by removing repeat calls to get_current_device( ) and/or get_default_context( ) for each malloc_device( ) call. In at least one embodiment, DPC++ code generated above uses a 3 dimensional nd_range which can be refactored to use only a single dimension, thereby reducing memory usage. In at least one embodiment, a developer can manually edit DPC++ code generated by DPC++ compatibility tool 4802 replace uses of unified shared memory with accessors. In at least one embodiment, DPC++ compatibility tool 4802 has an option to change how it migrates CUDA code to DPC++ code. In at least one embodiment, DPC++ compatibility tool 4802 is verbose because it is using a general template to migrate CUDA code to DPC++ code that works for a large number of cases.

In at least one embodiment, a CUDA to DPC++ migration workflow includes steps to: prepare for migration using intercept-build script; perform migration of CUDA projects to DPC++ using DPC++ compatibility tool 4802; review and edit migrated source files manually for completion and correctness; and compile final DPC++ code to generate a DPC++ application. In at least one embodiment, manual review of DPC++ source code may be required in one or more scenarios including but not limited to: migrated API does not return error code (CUDA code can return an error code which can then be consumed by the application but SYCL uses exceptions to report errors, and therefore does not use error codes to surface errors); CUDA compute capability dependent logic is not supported by DPC++; statement could not be removed. In at least one embodiment, scenarios in which DPC++ code requires manual intervention may include, without limitation: error code logic replaced with (*,0) code or commented out; equivalent DPC++ API not available; CUDA compute capability-dependent logic; hardware-dependent API (clock( )); missing features unsupported API; execution time measurement logic; handling built-in vector type conflicts; migration of cuBLAS API; and more.

In at least one embodiment, one or more techniques described herein utilize a oneAPI programming model. In at least one embodiment, a oneAPI programming model refers to a programming model for interacting with various compute accelerator architectures. In at least one embodiment, oneAPI refers to an application programming interface (API) designed to interact with various compute accelerator architectures. In at least one embodiment, a oneAPI programming model utilizes a DPC++ programming language. In at least one embodiment, a DPC++ programming language refers to a high-level language for data parallel programming productivity. In at least one embodiment, a DPC++ programming language is based at least in part on C and/or C++ programming languages. In at least one embodiment, a oneAPI programming model is a programming model such as those developed by Intel Corporation of Santa Clara, CA.

In at least one embodiment, oneAPI and/or oneAPI programming model is utilized to interact with various accelerator, GPU, processor, and/or variations thereof, architectures. In at least one embodiment, oneAPI includes a set of libraries that implement various functionalities. In at least one embodiment, oneAPI includes at least a oneAPI DPC++ library, a oneAPI math kernel library, a oneAPI data analytics library, a oneAPI deep neural network library, a oneAPI collective communications library, a oneAPI threading building blocks library, a oneAPI video processing library, and/or variations thereof.

In at least one embodiment, a oneAPI DPC++ library, also referred to as oneDPL, is a library that implements algorithms and functions to accelerate DPC++ kernel programming. In at least one embodiment, oneDPL implements one or more standard template library (STL) functions. In at least one embodiment, oneDPL implements one or more parallel STL functions. In at least one embodiment, oneDPL provides a set of library classes and functions such as parallel algorithms, iterators, function object classes, range-based API, and/or variations thereof. In at least one embodiment, oneDPL implements one or more classes and/or functions of a C++ standard library. In at least one embodiment, oneDPL implements one or more random number generator functions.

In at least one embodiment, a oneAPI math kernel library, also referred to as oneMKL, is a library that implements various optimized and parallelized routines for various mathematical functions and/or operations. In at least one embodiment, oneMKL implements one or more basic linear algebra subprograms (BLAS) and/or linear algebra package (LAPACK) dense linear algebra routines. In at least one embodiment, oneMKL implements one or more sparse BLAS linear algebra routines. In at least one embodiment, oneMKL implements one or more random number generators (RNGs). In at least one embodiment, oneMKL implements one or more vector mathematics (VM) routines for mathematical operations on vectors. In at least one embodiment, oneMKL implements one or more Fast Fourier Transform (FFT) functions.

In at least one embodiment, a oneAPI data analytics library, also referred to as oneDAL, is a library that implements various data analysis applications and distributed computations. In at least one embodiment, oneDAL implements various algorithms for preprocessing, transformation, analysis, modeling, validation, and decision making for data analytics, in batch, online, and distributed processing modes of computation. In at least one embodiment, oneDAL implements various C++ and/or Java APIs and various connectors to one or more data sources. In at least one embodiment, oneDAL implements DPC++ API extensions to a traditional C++ interface and enables GPU usage for various algorithms.

In at least one embodiment, a oneAPI deep neural network library, also referred to as oneDNN, is a library that implements various deep learning functions. In at least one embodiment, oneDNN implements various neural network, machine learning, and deep learning functions, algorithms, and/or variations thereof.

In at least one embodiment, a oneAPI collective communications library, also referred to as oneCCL, is a library that implements various applications for deep learning and machine learning workloads. In at least one embodiment, oneCCL is built upon lower-level communication middleware, such as message passing interface (MPI) and libfabrics. In at least one embodiment, oneCCL enables a set of deep learning specific optimizations, such as prioritization, persistent operations, out of order executions, and/or variations thereof. In at least one embodiment, oneCCL implements various CPU and GPU functions.

In at least one embodiment, a oneAPI threading building blocks library, also referred to as oneTBB, is a library that implements various parallelized processes for various applications. In at least one embodiment, oneTBB is utilized for task-based, shared parallel programming on a host. In at least one embodiment, oneTBB implements generic parallel algorithms. In at least one embodiment, oneTBB implements concurrent containers. In at least one embodiment, oneTBB implements a scalable memory allocator. In at least one embodiment, oneTBB implements a work-stealing task scheduler. In at least one embodiment, oneTBB implements low-level synchronization primitives. In at least one embodiment, oneTBB is compiler-independent and usable on various processors, such as GPUs, PPUs, CPUs, and/or variations thereof.

In at least one embodiment, a oneAPI video processing library, also referred to as oneVPL, is a library that is utilized for accelerating video processing in one or more applications. In at least one embodiment, oneVPL implements various video decoding, encoding, and processing functions. In at least one embodiment, oneVPL implements various functions for media pipelines on CPUs, GPUs, and other accelerators. In at least one embodiment, oneVPL implements device discovery and selection in media centric and video analytics workloads. In at least one embodiment, oneVPL implements API primitives for zero-copy buffer sharing.

In at least one embodiment, a oneAPI programming model utilizes a DPC++ programming language. In at least one embodiment, a DPC++ programming language is a programming language that includes, without limitation, functionally similar versions of CUDA mechanisms to define device code and distinguish between device code and host code. In at least one embodiment, a DPC++ programming language may include a subset of functionality of a CUDA programming language. In at least one embodiment, one or more CUDA programming model operations are performed using a oneAPI programming model using a DPC++ programming language.

It should be noted that, while example embodiments described herein may relate to a CUDA programming model, techniques described herein can be utilized with any suitable programming model, such HIP, oneAPI (e.g., using oneAPI-based programming to perform or implement a method disclosed herein), and/or variations thereof.

In at least one embodiment, one or more components of systems and/or processors disclosed above can communicate with one or more CPUs, ASICs, GPUs, FPGAs, or other hardware, circuitry, or integrated circuit components that include, e.g., an upscaler or upsampler to upscale an image, an image blender or image blender component to blend, mix, or add images together, a sampler to sample an image (e.g., as part of a DSP), a neural network circuit that is configured to perform an upscaler to upscale an image (e.g., from a low resolution image to a high resolution image), or other hardware to modify or generate an image, frame, or video to adjust its resolution, size, or pixels; one or more components of systems and/or processors disclosed above can use components described in this disclosure to perform methods, operations, or instructions that generate or modify an image.

At least one embodiment of the disclosure can be described in view of the following clauses:

1. A processor comprising: one or more circuits to perform an application programming interface (API) to cause one or more memory transactions to be performed without storing information about the one or more memory transactions.

2. The processor of clause 1, wherein the one or more memory transactions are to be asynchronously performed.

3. The processor of any one of clauses 1-2, wherein the one or more memory transactions are to be asynchronously performed between a first memory and a second memory of a graphics processing unit (GPU).

4. The processor of any one of clauses 1-3, wherein the one or more memory transactions are to be asynchronously performed between a first memory and a second memory of a graphics processing unit (GPU) using manual transaction accounting.

5. The processor of any one of clauses 1-4, wherein the one or more memory transactions include one or more copy operations to be asynchronously performed between a first memory and a second memory of a graphics processing unit (GPU) using manual transaction accounting.

6. The processor of any one of clauses 1-5, wherein the one or more memory transactions include one or more copy operations to be asynchronously performed between a global memory and a shared memory of a graphics processing unit (GPU) using manual transaction accounting.

7. The processor of any one of clauses 1-6, wherein the API is to return an indication of whether asynchronous data movement hardware is to be used to perform the one or more memory transactions.

8. A system, comprising: one or more processors to perform an application programming interface (API) to cause one or more memory transactions to be performed without storing information about the one or more memory transactions.

9. The system of clause 8, wherein the one or more memory transactions are to be asynchronously performed.

10. The system of any one of clauses 8-9, wherein the one or more memory transactions are to be asynchronously performed between a first memory and a second memory of a graphics processing unit (GPU) using manual transaction accounting.

11. The system of any one of clauses 8-10, wherein the one or more memory transactions include one or more copy operations to be asynchronously performed between a global memory and a shared memory of a graphics processing unit (GPU) using manual transaction accounting.

12. The system of any one of clauses 8-11, wherein the one or more memory transactions include one or more copy operations to be asynchronously performed between a first memory and a second memory of a graphics processing unit (GPU) using manual transaction accounting.

13. The system of any one of clauses 8-12, wherein the API is to return an indication of whether asynchronous data movement hardware is to be used to perform the one or more memory transactions.

14. A method, comprising: performing an application programming interface (API) to cause one or more memory transactions to be performed without storing information about the one or more memory transactions.

15. The method of clause 14, wherein the one or more memory transactions include one or more copy operations to be asynchronously performed between a first memory and a second memory of a graphics processing unit (GPU) using manual transaction accounting.

16. The method of any one of clauses 14-15, wherein the one or more memory transactions are to be asynchronously performed using manual transaction accounting.

17. The method of any one of clauses 14-16, wherein the one or more memory transactions are to be asynchronously performed using manual transaction accounting, and performing the API includes receiving an identifier of a source memory location and an identifier of a destination memory location as inputs.

18. The method of any one of clauses 14-17, wherein the one or more memory transactions are to be asynchronously performed using asynchronous data movement hardware using manual transaction accounting.

19. The method of any one of clauses 14-18, wherein performing the API includes returning an indication of whether asynchronous data movement hardware is to be used to perform one or more asynchronous data movement operations.

20. A non-transitory computer-readable medium having stored thereon a set of instructions, which if performed by one or more processors, cause the one or more processors to at least perform the method of any one of clauses 14-19.

21. A processor, comprising: one or more circuits to perform an application programming interface (API) to cause information received by the API about one or more memory transactions to be stored.

22. The processor of clause 21, wherein the one or more memory transactions are asynchronous memory transactions, and the one or more circuits are to cause the information to be stored by updating a thread synchronization object to be updated based, at least in part, on the information received by the API.

23. The processor of any one of clauses 21-22, wherein the one or more memory transactions are asynchronous memory transactions between a first memory and a second memory of a graphics processing unit (GPU), and the one or more circuits are to cause a thread synchronization object to be updated based, at least in part, on the information received by the API.

24. The processor of any one of clauses 21-23, wherein the one or more memory transactions are asynchronous memory transactions between a first memory and a second memory of a graphics processing unit (GPU), and the one or more circuits are to update a barrier object to indicate that one or more threads have arrived at the barrier object based, at least in part, on the information received by the API.

25. The processor of any one of clauses 21-24, wherein the one or more circuits are to update a barrier object to indicate that one or more threads have arrived at the barrier object based, at least in part, on an amount of data to be asynchronously moved.

26. The processor of any one of clauses 21-25, wherein the one or more circuits are to update a barrier object to indicate that a portion of an asynchronous data movement operation has been performed.

27. The processor of any one of clauses 21-26, wherein the API is to be performed without providing a token to indicate a state of a synchronization object.

28. A system, comprising: one or more processors to perform an application programming interface (API) to cause information received by the API about one or more memory transactions to be stored.

29. The system of clause 28, wherein the one or more memory transactions are asynchronous memory transactions, and the one or more processors are to cause the information to be stored by updating a thread synchronization object to be updated based, at least in part, on the information received by the API.

30. The system of any one of clauses 28-29, wherein the one or more memory transactions are asynchronous memory transactions between a first memory and a second memory of a graphics processing unit (GPU), and the one or more processors are to cause a thread synchronization object to be updated based, at least in part, on the information received by the API.

31. The system of any one of clauses 28-30, wherein the one or more memory transactions are asynchronous memory transactions between a first memory and a second memory of a graphics processing unit (GPU), and the one or more processors are to update a barrier object to indicate that one or more threads have arrived at the barrier object based, at least in part, on the information received by the API.

32. The system of any one of clauses 28-31, wherein the one or more circuits are to update a barrier object to indicate that one or more threads have arrived at the barrier object based, at least in part, on an amount of data to be asynchronously moved.

33. The system of any one of clauses 28-32, wherein the API is to be performed without providing a token to indicate a state of a synchronization object.

34. A method, comprising: performing an application programming interface (API) to cause information received by the API about one or more memory transactions to be stored.

35. The method of clause 34, wherein the one or more memory transactions are asynchronous memory transactions, and performing the API includes causing the information to be stored by updating a thread synchronization object to be updated based, at least in part, on the information received by the API.

36. The method of any one of clauses 34-35, wherein the one or more memory transactions are asynchronous memory transactions between a first memory and a second memory of a graphics processing unit (GPU), and performing the API includes causing a thread synchronization object to be updated based, at least in part, on the information received by the API.

37. The method of any one of clauses 34-36, wherein the one or more memory transactions are asynchronous memory transactions between a first memory and a second memory of a graphics processing unit (GPU), and performing the API includes updating a barrier object to indicate that one or more threads have arrived at the barrier object based, at least in part, on the information received by the API.

38. The method of any one of clauses 34-37, wherein performing the API includes updating a barrier object to indicate that one or more threads have arrived at the barrier object based, at least in part, on an amount of data to be asynchronously moved.

39. The method of any one of clauses 34-38, wherein the API is to be performed without providing a token to indicate a state of a synchronization object.

40. A non-transitory computer-readable medium having stored thereon a set of instructions, which if performed by one or more processors, cause the one or more processors to at least perform the method of any one of clauses 34-39.

41. A processor, comprising, one or more circuits to perform an application programming interface (API) to cause information about one or more memory transactions to be provided to one or more users.

42. The processor of clause 41, wherein the one or more memory transactions are asynchronous memory transactions, the information includes an indication of a state of a thread synchronization object, and the one or more circuits are to cause the information to be provided based, at least in part, on an amount of data to be asynchronously moved.

43. The processor of any one of clauses 41-42, wherein the one or more memory transactions are asynchronous memory transactions between a first memory of a graphics processing unit (GPU) and a second memory of the GPU, the information includes an indication of a state of a thread synchronization object, the one or more users include computer program code operating on the GPU, and the one or more circuits are to cause the information to be provided based, at least in part, on an amount of data to be asynchronously moved.

44. The processor of any one of clauses 41-43, wherein the one or more memory transactions are one or more asynchronous data movement transactions.

45. The processor of any one of clauses 41-44, wherein the API is to provide a token to indicate the state of the one or more memory transactions.

46. The processor of any one of clauses 41-45, wherein the API is to indicate that one or more threads have finished one or more stages of work involved with the one or more memory transactions.

47. The processor of any one of clauses 41-46, wherein the API is to update a synchronization object with a transaction count.

48. A system, comprising: one or more processors to perform an application programming interface (API) to cause information about one or more memory transactions to be provided to one or more users.

49. The system of clause 48, wherein the one or more memory transactions are asynchronous memory transactions, the information includes an indication of a state of a thread synchronization object, and the one or more processors are to cause the information to be provided based, at least in part, on an amount of data to be asynchronously moved.

50. The system of any one of clauses 48-49, the one or more memory transactions are asynchronous memory transactions between a first memory of a graphics processing unit (GPU) and a second memory of the GPU, the information includes an indication of a state of a thread synchronization object, the one or more users include computer program code operating on the GPU, and the one or more processors are to cause the information to be provided based, at least in part, on an amount of data to be asynchronously moved.

51. The system of any one of clauses 48-50, wherein the one or more memory transactions are one or more asynchronous data movement transactions.

52. The system of any one of clauses 48-51, wherein the API is to provide a token to indicate the state of the one or more memory transactions.

53. The system of any one of clauses 48-52, wherein the API is to update a synchronization object with a transaction count.

54. A method, comprising: performing an application programming interface (API) to cause information about one or more memory transactions to be provided to one or more users.

55. The method of clause 54, wherein the one or more memory transactions are asynchronous memory transactions, the information includes an indication of a state of a thread synchronization object, and performing the API includes causing the information to be provided based, at least in part, on an amount of data to be asynchronously moved.

56. The method of any one of clauses 54-55, wherein the one or more memory transactions are asynchronous memory transactions between a first memory of a graphics processing unit (GPU) and a second memory of the GPU, the information includes an indication of a state of a thread synchronization object, the one or more users include computer program code operating on the GPU, and performing the API includes causing the information to be provided based, at least in part, on an amount of data to be asynchronously moved.

57. The method of any one of clauses 54-56, wherein the one or more memory transactions are one or more asynchronous data movement transactions.

58. The method of any one of clauses 54-57, wherein the API is to provide a token to indicate the state of the one or more memory transactions.

59. The method of any one of clauses 54-58, wherein the API is to update a synchronization object with a transaction count.

60. A non-transitory computer-readable medium having stored thereon a set of instructions, which if performed by one or more processors, cause the one or more processors to at least perform the method of any one of clauses 54-59.

61. A processor, comprising, one or more circuits to perform an application programming interface (API) to check for information provided in a token by one or more users about one or more memory transactions after a first amount of time indicated by the one or more users.

62. The processor of clause 61, wherein the information includes a state of a thread synchronization object, the one or more users include computer program code, and the one or more memory transactions are asynchronous memory transactions.

63. The processor of any one of clauses 61-62, wherein the information includes a state of a thread synchronization object, the one or more users include computer program code, and the one or more memory transactions are asynchronous memory transactions between a first memory of a graphics processing unit (GPU) and a second memory of the GPU.

64. The processor of any one of clauses 61-63, wherein the information includes a parity state of a barrier object, the one or more users include computer program code, and the one or more memory transactions are asynchronous memory transactions between a first memory of a graphics processing unit (GPU) and a second memory of the GPU.

65. The processor of any one of clauses 61-64, wherein the API is to receive the token as an input.

66. The processor of any one of clauses 61-65, wherein the API is to receive an identifier of a synchronization object as an input.

67. The processor of any one of clauses 61-66, wherein the API is to provide an indication of a state of a synchronization object.

68. A system, comprising: one or more processors to perform an application programming interface (API) to check for information provided in a token by one or more users about one or more memory transactions after a first amount of time indicated by the one or more users.

69. The system of clause 68, wherein the information includes a state of a thread synchronization object, the one or more users include computer program code, and the one or more memory transactions are asynchronous memory transactions.

70. The system of any one of clauses 68-69, wherein the information includes a state of a thread synchronization object, the one or more users include computer program code, and the one or more memory transactions are asynchronous memory transactions between a first memory of a graphics processing unit (GPU) and a second memory of the GPU.

71. The system of any one of clauses 68-70, wherein the information includes a parity state of a barrier object, the one or more users include computer program code, and the one or more memory transactions are asynchronous memory transactions between a first memory of a graphics processing unit (GPU) and a second memory of the GPU.

72. The system of any one of clauses 68-71, wherein the API is to receive a pointer to a synchronization object as an input.

73. The system of any one of clauses 68-72, wherein the API is to provide an indication of a state of a synchronization object.

74. A method, comprising: performing an application programming interface (API) to check for information provided in a token by one or more users about one or more memory transactions after a first amount of time indicated by the one or more users.

75. The method of clause 74, wherein the information includes a state of a thread synchronization object, the one or more users include computer program code, and the one or more memory transactions are asynchronous memory transactions.

76. The method of any one of clauses 74-75, wherein the information includes a state of a thread synchronization object, the one or more users include computer program code, and the one or more memory transactions are asynchronous memory transactions between a first memory of a graphics processing unit (GPU) and a second memory of the GPU.

77. The method of any one of clauses 74-76, wherein the information includes a parity state of a barrier object, the one or more users include computer program code, and the one or more memory transactions are asynchronous memory transactions between a first memory of a graphics processing unit (GPU) and a second memory of the GPU.

78. The method of any one of clauses 74-77, wherein the API is to receive the token as an input.

79. The method of any one of clauses 74-78, wherein the API is to provide an indication of a state of a synchronization object.

80. A non-transitory computer-readable medium having stored thereon a set of instructions, which if performed by one or more processors, cause the one or more processors to at least perform the method of any one of clauses 74-79.

81. A processor, comprising, one or more circuits to perform an application programming interface (API) to check for information provided by one or more users about one or more memory transactions after a timeout event indicated by the one or more users.

82. The processor of clause 81, wherein the information includes a state of a thread synchronization object, the one or more users include computer program code, and the one or more memory transactions are asynchronous memory transactions.

83. The processor of any one of clauses 81-82, wherein the information includes a state of a thread synchronization object, the one or more users include computer program code, and the one or more memory transactions are asynchronous memory transactions between a first memory of a graphics processing unit (GPU) and a second memory of the GPU.

84. The processor of any one of clauses 81-83, wherein the API is to receive a state of a synchronization object as an input.

85. The processor of any one of clauses 81-84, wherein the API is to receive an identifier of a synchronization object as an input.

86. The processor of any one of clauses 81-85, wherein the API is to provide an indication of a state of a synchronization object.

87. The processor of any one of clauses 81-86, wherein the one or more users are to perform other operations before a barrier event has been performed.

88. A system, comprising: one or more processors to perform an application programming interface (API) to check for information provided by one or more users about one or more memory transactions after a timeout event indicated by the one or more users.

89. The system of clause 88, wherein the information includes a state of a thread synchronization object, the one or more users include computer program code, and the one or more memory transactions are asynchronous memory transactions.

90. The system of any one of clauses 88-89, wherein the information includes a state of a thread synchronization object, the one or more users include computer program code, and the one or more memory transactions are asynchronous memory transactions between a first memory of a graphics processing unit (GPU) and a second memory of the GPU.

91. The system of any one of clauses 88-90, wherein the API is to receive a state of a synchronization object as an input.

92. The system of any one of clauses 88-91, wherein the API is to receive a pointer to a synchronization object as an input.

93. The system of any one of clauses 88-92, wherein the API is to provide an indication of a state of a synchronization object.

94. A method, comprising: performing an application programming interface (API) to check for information provided by one or more users about one or more memory transactions after a timeout event indicated by the one or more users.

95. The method of clause 94, wherein the information includes a state of a thread synchronization object, the one or more users include computer program code, and the one or more memory transactions are asynchronous memory transactions.

96. The method of any one of clauses 94-95, wherein the information includes a state of a thread synchronization object, the one or more users include computer program code, and the one or more memory transactions are asynchronous memory transactions between a first memory of a graphics processing unit (GPU) and a second memory of the GPU.

97. The method of any one of clauses 94-96, wherein the API is to receive a state of a synchronization object as an input.

98. The method of any one of clauses 94-97, wherein the API is to receive an identifier of a synchronization object as an input.

99. The method of any one of clauses 94-98, wherein the API is to provide information indicating a state of completion of the one or more memory transactions.

100. A non-transitory computer-readable medium having stored thereon a set of instructions, which if performed by one or more processors, cause the one or more processors to at least perform the method of any one of clauses 94-99.

101. A processor, comprising, one or more circuits to perform an application programming interface (API) to cause one or more software objects to indicate whether one or more memory transactions have been performed.

102. The processor of clause 101, wherein the one or more memory transactions are asynchronous memory transactions, and the one or more software objects include a thread synchronization object to be used to perform manual transaction accounting.

103. The processor of any one of clauses 101-102, wherein the one or more memory transactions are asynchronous memory transactions between a first memory of a graphics processing unit (GPU and a second memory of the GPU, and the one or more software objects include a pipeline object to be used to perform manual transaction accounting.

104. The processor of any one of clauses 101-103, wherein the software object is to be used to perform manual transaction accounting of the one or more memory transactions.

105. The processor of any one of clauses 101-104, wherein information of the software object is to be accessible via one or more other APIs.

106. The processor of any one of clauses 101-105, wherein the API is to receive an identifier of a group of threads to perform the one or more memory transactions as an input.

107. The processor of any one of clauses 101-106, wherein the API is to receive an indication of a state of a group of threads as an input.

108. A system, comprising: one or more processors to perform an application programming interface (API) to cause one or more software objects to indicate whether one or more memory transactions have been performed.

109. The system of clause 108, wherein the one or more memory transactions are asynchronous memory transactions, and the one or more software objects include a thread synchronization object to be used to perform manual transaction accounting.

110. The system of any one of clauses 108-109, wherein the one or more memory transactions are asynchronous memory transactions between a first memory of a graphics processing unit (GPU and a second memory of the GPU, and the one or more software objects include a pipeline object to be used to perform manual transaction accounting.

111. The system of any one of clauses 108-110, wherein the software object is to be used to perform manual transaction accounting of the one or more memory transactions.

112. The system of any one of clauses 108-111, wherein the API is to receive an identifier of a group of threads to perform the one or more memory transactions and a pointer to a state of the group of threads as inputs.

113. The system of any one of clauses 108-112, wherein the one or more memory transactions are asynchronous memory transactions, the one or more software objects include a thread synchronization object to be used to perform manual transaction accounting, and information of the software object is to be accessible via one or more other APIs.

114. A method, comprising: performing an application programming interface (API) to cause one or more software objects to indicate whether one or more memory transactions have been performed.

115. The method of clause 114, wherein the one or more memory transactions are asynchronous memory transactions, and the one or more software objects include a thread synchronization object to be used to perform manual transaction accounting.

116. The method of any one of clauses 114-115, wherein the one or more memory transactions are asynchronous memory transactions between a first memory of a graphics processing unit (GPU and a second memory of the GPU, and the one or more software objects include a pipeline object to be used to perform manual transaction accounting.

117. The method of any one of clauses 114-116, wherein the software object is to be used to perform manual transaction accounting of the one or more memory transactions.

118. The method of any one of clauses 114-117, wherein the API is to receive an identifier of a group of threads to perform the one or more memory transactions, a pointer to a state of the group of threads, and a number of threads in the group that are involved in performing an asynchronous data movement operation as inputs.

119. The method of any one of clauses 114-118, wherein the one or more memory transactions are asynchronous memory transactions, the one or more software objects include a thread synchronization object to be used to perform manual transaction accounting, and information of the software object is to be accessible via one or more other APIs.

120. A non-transitory computer-readable medium having stored thereon a set of instructions, which if performed by one or more processors, cause the one or more processors to at least perform the method of any one of clauses 114-119.

121. A processor, comprising, one or more circuits to perform an application programming interface (API) to cause an amount of information to be accessed as a result of one or more memory transactions to be provided to one or more users.

122. The processor of clause 121, wherein the one or more memory transactions are asynchronous memory transactions that include data movement operations, and wherein the API is to cause the amount of information to be accessed to be provided by updating one or more synchronization objects.

123. The processor of any one of clauses 121-122, wherein the one or more users comprises a thread that is to use the result, wherein the thread is to update a synchronization object using the API.

124. The processor of any one of clauses 121-123, wherein the one or more memory transactions comprise one or more asynchronous memory transactions.

125. The processor of any one of clauses 121-124, wherein the information is to be accessed by moving the information from a first one or more memory locations to a second one or more memory locations.

126. The processor of any one of clauses 121-125, wherein the information is to be accessed by moving the information from a first type of memory of a graphics processing unit (GPU) to a second type of memory of the GPU.

127. The processor of any one of clauses 121-126, wherein the amount of information to be accessed is to be specified using a transaction count.

128. A system, comprising: one or more processors to perform an application programming interface (API) to cause an amount of information to be accessed as a result of one or more memory transactions to be provided to one or more users.

129. The system of clause 128, wherein the one or more memory transactions are asynchronous memory transactions that include data movement operations, and wherein the API is to cause the amount of information to be accessed to be provided by updating one or more synchronization objects.

130. The system of any one of clauses 128-129, wherein the one or more users comprises a thread that is to use the result, wherein the thread is to update a synchronization object using the API.

131. The system of any one of clauses 128-130, wherein the one or more memory transactions comprise one or more asynchronous memory transactions.

132. The system of any one of clauses 128-131, wherein the information is to be accessed by moving the information from a first type of memory of a graphics processing unit (GPU) to a second type of memory of the GPU.

133. The system of any one of clauses 128-132, wherein the amount of information to be accessed is to be specified using a transaction count.

134. A method, comprising: performing an application programming interface (API) to cause an amount of information to be accessed as a result of one or more memory transactions to be provided to one or more users.

135. The method of clause 134, wherein the one or more memory transactions are asynchronous memory transactions that include data movement operations, and wherein the API is to cause the amount of information to be accessed to be provided by updating one or more synchronization objects.

136. The method of any one of clauses 134-135, wherein the one or more users comprises a thread that is to use the result, wherein the thread is to update a synchronization object using the API.

137. The method of any one of clauses 134-136, wherein the one or more memory transactions comprise one or more asynchronous memory transactions.

138. The method of any one of clauses 134-137, wherein the information is to be accessed by moving the information from a first type of memory of a graphics processing unit (GPU) to a second type of memory of the GPU.

139. The method of any one of clauses 134-138, wherein the amount of information to be accessed is to be specified using a transaction count.

140. A non-transitory computer-readable medium having stored thereon a set of instructions, which if performed by one or more processors, cause the one or more processors to at least perform the method of any one of clauses 134-139.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). A number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (e.g., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In at least one embodiment, an arithmetic logic unit is a set of combinational logic circuitry that takes one or more inputs to produce a result. In at least one embodiment, an arithmetic logic unit is used by a processor to implement mathematical operation such as addition, subtraction, or multiplication. In at least one embodiment, an arithmetic logic unit is used to implement logical operations such as logical AND/OR or XOR. In at least one embodiment, an arithmetic logic unit is stateless, and made from physical switching components such as semiconductor transistors arranged to form logical gates. In at least one embodiment, an arithmetic logic unit may operate internally as a stateful logic circuit with an associated clock. In at least one embodiment, an arithmetic logic unit may be constructed as an asynchronous logic circuit with an internal state not maintained in an associated register set. In at least one embodiment, an arithmetic logic unit is used by a processor to combine operands stored in one or more registers of the processor and produce an output that can be stored by the processor in another register or a memory location.

In at least one embodiment, as a result of processing an instruction retrieved by the processor, the processor presents one or more inputs or operands to an arithmetic logic unit, causing the arithmetic logic unit to produce a result based at least in part on an instruction code provided to inputs of the arithmetic logic unit. In at least one embodiment, the instruction codes provided by the processor to the ALU are based at least in part on the instruction executed by the processor. In at least one embodiment combinational logic in the ALU processes the inputs and produces an output which is placed on a bus within the processor. In at least one embodiment, the processor selects a destination register, memory location, output device, or output storage location on the output bus so that clocking the processor causes the results produced by the ALU to be sent to the desired location.

In present document, references may be made to obtaining, acquiring, receiving, or inputting analog or digital data into a subsystem, computer system, or computer-implemented machine. Process of obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. One or more processors, comprising:
   circuitry configured to, in response to a call to an application programming interface (API), check for information about one or more memory transactions after a timeout event indicated by one or more input parameters of the API.

2. The one or more processors of claim 1, wherein the information includes a state of a thread synchronization object and the one or more memory transactions are asynchronous memory transactions.

3. The one or more processors of claim 1, wherein the information includes a state of a thread synchronization object and the one or more memory transactions are asynchronous memory transactions between a first memory of a graphics processing unit (GPU) and a second memory of the GPU.

4. The one or more processors of claim 1, wherein the API is to receive a state of a synchronization object as an input.

5. The one or more processors of claim 1, wherein the API is to receive an identifier of a synchronization object as an input.

6. The one or more processors of claim 1, wherein the API is to provide an indication of a state of a synchronization object.

7. The one or more processors of claim 1, wherein other operations are to be performed before a barrier event has been performed.

8. A system, comprising:
one or more processors configured to, in response to a call to an application programming interface (API), check for information about one or more memory transactions after a timeout event indicated by one or more input parameters of the API.

9. The system of claim 8, wherein the information includes a state of a thread synchronization object and the one or more memory transactions are asynchronous memory transactions.

10. The system of claim 8, wherein the information includes a state of a thread synchronization object and the one or more memory transactions are asynchronous memory transactions between a first memory of a graphics processing unit (GPU) and a second memory of the GPU.

11. The system of claim 8, wherein the API is to receive a state of a synchronization object as an input.

12. The system of claim 8, wherein the API is to receive a pointer to a synchronization object as an input.

13. The system of claim 8, wherein the API is to provide an indication of a state of a synchronization object.

14. A method, comprising:
receiving an application programming interface (API) call; and
in response to receiving the API call, checking for information about one or more memory transactions after a timeout event indicated by one or more input parameters of the API.

15. The method of claim 14, wherein the information includes a state of a thread synchronization object and the one or more memory transactions are asynchronous memory transactions.

16. The method of claim 14, wherein the information includes a state of a thread synchronization object and the one or more memory transactions are asynchronous memory transactions between a first memory of a graphics processing unit (GPU) and a second memory of the GPU.

17. The method of claim 14, wherein the API is to receive a state of a synchronization object as an input.

18. The method of claim 14, wherein the API is to receive an identifier of a synchronization object as an input.

19. The method of claim 14, wherein the API is to provide information indicating a state of completion of the one or more memory transactions.

20. A non-transitory computer-readable medium having stored thereon a set of instructions, which when performed by one or more processors, cause the one or more processors to at least perform the method of claim 14.

* * * * *